US012322316B2

(12) United States Patent
Bogdanowicz et al.

(10) Patent No.: US 12,322,316 B2
(45) **Date of Patent: *Jun. 3, 2025**

(54) SYSTEM AND METHOD FOR A MULTI-PRIMARY WIDE GAMUT COLOR SYSTEM

(71) Applicant: Baylor University, Waco, TX (US)

(72) Inventors: Mitchell J. Bogdanowicz, Somis, CA (US); Corey P. Carbonara, Waco, TX (US); Michael F. Korpi, Hewitt, TX (US); James M. DeFilippis, Pacific Palisades, CA (US); Gary B. Mandle, Los Altos, CA (US)

(73) Assignee: Baylor University, Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,758

(22) Filed: May 10, 2023

(65) Prior Publication Data

US 2023/0290291 A1 Sep. 14, 2023

Related U.S. Application Data

(63) Continuation of application No. 17/703,580, filed on Mar. 24, 2022, now Pat. No. 11,651,717, which is a (Continued)

(51) Int. Cl.
*G09G 3/20* (2006.01)
*G02B 5/20* (2006.01)
(Continued)

(52) U.S. Cl.
CPC ........... *G09G 3/2003* (2013.01); *G02B 5/201* (2013.01); *G02F 1/133514* (2013.01); (Continued)

(58) Field of Classification Search
None
See application file for complete search history.

(56) References Cited

U.S. PATENT DOCUMENTS

| | | |
|---|---|---|
| 3,481,258 A | 12/1969 | Mori et al. |
| 3,971,065 A | 7/1976 | Bayer |

(Continued)

FOREIGN PATENT DOCUMENTS

| | | |
|---|---|---|
| JP | H07873 B2 * | 1/1995 |
| JP | 2003315529 A | 11/2003 |

(Continued)

OTHER PUBLICATIONS

"Affordable Colour Grading Monitors", downloaded@https://jonnyelwyn.co.uk/film-and-video-editing/affordable-colour-grading-monitors-2/, posted on Apr. 4, 2015 (Year: 2015).

(Continued)

*Primary Examiner* — Yingchun He
(74) *Attorney, Agent, or Firm* — NEO IP

(57) ABSTRACT

Systems and methods for a multi-primary color system for display. A multi-primary color system increases the number of primary colors available in a color system and color system equipment. Increasing the number of primary colors reduces metameric errors from viewer to viewer. One embodiment of the multi-primary color system includes Red, Green, Blue, Cyan, Yellow, and Magenta primaries. The systems of the present invention maintain compatibility with existing color systems and equipment and provide systems for backwards compatibility with older color systems.

20 Claims, 110 Drawing Sheets
(81 of 110 Drawing Sheet(s) Filed in Color)

12P Transport

Related U.S. Application Data continuation of application No. 17/376,897, filed on Jul. 15, 2021, now Pat. No. 11,289,001, which is a continuation of application No. 17/082,741, filed on Oct. 28, 2020, now Pat. No. 11,069,280, which is a continuation-in-part of application No. 17/009,408, filed on Sep. 1, 2020, now Pat. No. 11,043,157, which is a continuation-in-part of application No. 16/887,807, filed on May 29, 2020, now Pat. No. 10,950,162, which is a continuation-in-part of application No. 16/860,769, filed on Apr. 28, 2020, now Pat. No. 10,950,161, which is a continuation-in-part of application No. 16/853,203, filed on Apr. 20, 2020, now Pat. No. 10,997,896, which is a continuation-in-part of application No. 16/831,157, filed on Mar. 26, 2020, now Pat. No. 10,950,160, which is a continuation of application No. 16/659,307, filed on Oct. 21, 2019, now Pat. No. 10,607,527.

(60) Provisional application No. 62/876,878, filed on Jul. 22, 2019, provisional application No. 62/847,630, filed on May 14, 2019, provisional application No. 62/805,705, filed on Feb. 14, 2019, provisional application No. 62/750,673, filed on Oct. 25, 2018.

(51) Int. Cl.

*G02F 1/1335* (2006.01)
*G09G 3/34* (2006.01)
*G09G 5/02* (2006.01)

(52) U.S. Cl.

CPC ............ *G09G 3/3413* (2013.01); *G09G 5/02* (2013.01); *G09G 2300/0452* (2013.01); *G09G 2320/0242* (2013.01); *G09G 2340/06* (2013.01)

(56) References Cited

U.S. PATENT DOCUMENTS 4,489,349 A 12/1984 Okada
4,967,263 A 10/1990 Dieterich
5,216,522 A 6/1993 Ishikawa
5,479,189 A 12/1995 Chesavage et al.
5,543,820 A 8/1996 Edgar
5,844,629 A 12/1998 Murray et al.
5,937,089 A 8/1999 Kobayashi
6,118,441 A 9/2000 Kobayashi et al.
6,160,579 A 12/2000 Shiraiwa et al.
6,175,644 B1 1/2001 Scola et al.
6,539,110 B2 3/2003 Myers
6,570,584 B1 5/2003 Cok et al.
6,769,772 B2 8/2004 Roddy et al.
6,870,523 B1 3/2005 Ben-David et al.
6,897,876 B2 5/2005 Murdoch et al.
6,962,414 B2 11/2005 Roth
7,077,524 B2 7/2006 Roth
7,113,152 B2 9/2006 Ben-David et al.
7,242,478 B1 7/2007 Dombrowski et al.
7,535,433 B2 5/2009 Ledebohm et al.
7,627,167 B2 12/2009 Roth et al.
7,787,702 B2 8/2010 Elliott et al.
7,812,797 B2 10/2010 Joo et al.
7,876,341 B2 1/2011 Credelle et al.
7,916,939 B2 3/2011 Roth et al.
7,929,193 B2 4/2011 Roth
7,948,507 B2 5/2011 Okada et al.
7,990,393 B2 8/2011 Higgins
8,018,476 B2 9/2011 Credelle et al.
8,044,967 B2 10/2011 Belik et al.
8,063,862 B2 11/2011 Hisatake
8,081,835 B2 12/2011 Elliott et al.
8,228,275 B2 7/2012 Langendijk
8,237,751 B2 8/2012 Belik
8,248,430 B2 8/2012 Hekstra et al.
8,310,498 B2 11/2012 Ben-Chorin et al.
8,339,344 B2 12/2012 Okada et al.
8,390,652 B2 3/2013 Nakanishi et al.
8,405,675 B2 3/2013 Peng et al.
8,405,687 B2 3/2013 Miyazaki et al.
8,411,022 B2 4/2013 Elliott et al.
8,436,875 B2 5/2013 Ueki et al.
8,451,405 B2 5/2013 Roth et al.
8,599,226 B2 12/2013 Ben-Chorin et al.
8,654,050 B2 2/2014 Ueki et al.
8,698,856 B2 4/2014 Roth et al.
8,717,348 B2 5/2014 Basile et al.
8,773,340 B2 7/2014 Tomizawa et al.
8,837,562 B1 9/2014 Betts et al.
8,885,120 B2 11/2014 Ben-David et al.
8,911,291 B2 12/2014 Liu
8,922,603 B2 12/2014 Yonemaru et al.
8,979,272 B2 3/2015 Roth
8,982,038 B2 3/2015 Higgins et al.
8,982,144 B2 3/2015 Park
9,035,969 B2 5/2015 Ivashin et al.
9,041,724 B2 5/2015 Zeng et al.
9,091,884 B2 7/2015 Kim et al.
9,099,046 B2 8/2015 Whitehead et al.
9,117,711 B2 8/2015 Suzuki et al.
9,147,362 B2 9/2015 Znamenskiy et al.
9,280,940 B2 3/2016 Chen et al.
9,307,616 B2 4/2016 Robinson et al.
9,311,841 B2 4/2016 Nakagawa et al.
9,317,939 B2 4/2016 Yang et al.
9,318,075 B2 4/2016 Kim et al.
9,324,286 B2 4/2016 Mori et al.
9,363,421 B1 6/2016 Russell
9,373,305 B2 6/2016 Kawaguchi
9,412,316 B2 8/2016 Ben-David et al.
9,430,974 B2 8/2016 Roth
9,430,986 B2 8/2016 Ito et al.
9,583,054 B2 2/2017 Nakagawa et al.
9,607,576 B2 3/2017 Buckley
9,659,517 B2 5/2017 Wu
9,697,761 B2 7/2017 Li
9,886,932 B2 2/2018 Yoshida et al.
9,911,176 B2 3/2018 Griffin et al.
9,911,387 B2 3/2018 Kim et al.
9,953,590 B2 4/2018 Ben-David et al.
9,966,014 B2 5/2018 Yashiki
10,079,963 B1 9/2018 Liu et al.
10,162,590 B2 12/2018 Ritter
10,185,533 B2 1/2019 Kim et al.
10,222,263 B2 3/2019 Shigezane
10,289,205 B1 5/2019 Sumter et al.
10,504,437 B2 12/2019 Zhang et al.
10,607,527 B1 3/2020 Mandle
10,832,611 B2 11/2020 Xi et al.
10,847,498 B2 11/2020 Nakamura et al.
10,896,635 B2 1/2021 Xi et al.
2001/0021260 A1 9/2001 Chung et al.
2002/0130957 A1 9/2002 Gallagher et al.
2003/0137610 A1 7/2003 Ohsawa
2003/0160881 A1 8/2003 Roddy et al.
2003/0185302 A1 10/2003 Abrams, Jr.
2004/0017379 A1 1/2004 Ajito et al.
2004/0070736 A1 4/2004 Roddy et al.
2004/0070834 A1 4/2004 Hendrix et al.
2004/0111627 A1 6/2004 Evans et al.
2004/0145599 A1 7/2004 Taoka et al.
2004/0196381 A1 10/2004 Matsuzaka
2004/0234098 A1 11/2004 Reed
2004/0263638 A1 12/2004 Ohsawa et al.
2005/0083344 A1 4/2005 Higgins
2005/0083352 A1 4/2005 Higgins
2005/0099426 A1 5/2005 Primerano et al.
2005/0134808 A1 6/2005 Pettitt
2005/0190967 A1 9/2005 Ok et al.
2005/0244051 A1 11/2005 Shiohara
2005/0275806 A1 12/2005 Roth
2005/0280851 A1 12/2005 Kim et al.

(56) References Cited

U.S. PATENT DOCUMENTS

2006/0285217 A1 12/2006 Roth
2007/0001994 A1 1/2007 Roth
2007/0035752 A1 2/2007 Evans et al.
2007/0052861 A1 3/2007 Osawa et al.
2007/0070086 A1 3/2007 Elliott et al.
2007/0118821 A1 5/2007 Yee et al.
2007/0160057 A1 7/2007 Kimn et al.
2007/0165946 A1 7/2007 Hong et al.
2007/0176948 A1 8/2007 Ben-David et al.
2007/0189266 A1 8/2007 Izumi et al.
2007/0199039 A1 8/2007 Diroo et al.
2007/0220525 A1 9/2007 State et al.
2007/0268205 A1 11/2007 Sasaguri
2008/0012805 A1 1/2008 Duncan et al.
2008/0018506 A1 1/2008 Raveendran
2008/0024410 A1 1/2008 Ben-David et al.
2008/0158097 A1 7/2008 Guo
2008/0204469 A1 8/2008 Jaspers
2008/0252797 A1 10/2008 Hamer et al.
2008/0303927 A1 12/2008 Khanh
2009/0058777 A1 3/2009 Cheng
2009/0085924 A1 4/2009 Ben-Chorin et al.
2009/0091582 A1 4/2009 Ajito et al.
2009/0096815 A1 4/2009 Fukuda et al.
2009/0116085 A1 5/2009 Yoshimura et al.
2009/0220120 A1 9/2009 Yen et al.
2009/0313669 A1 12/2009 Boudani et al.
2010/0103200 A1 4/2010 Langendijk
2010/0118047 A1 5/2010 Ajito et al.
2010/0188437 A1 7/2010 Itoh et al.
2010/0214315 A1 8/2010 Nguyen et al.
2010/0225806 A1 9/2010 Hsu et al.
2010/0254452 A1 10/2010 Unger
2010/0265283 A1 10/2010 Langendijk et al.
2011/0080520 A1 4/2011 Tomizawa et al.
2011/0148910 A1 6/2011 Botzas et al.
2011/0188744 A1 8/2011 Sun
2011/0255608 A1 10/2011 Kim et al.
2011/0273493 A1 11/2011 Yoshiga et al.
2011/0303750 A1 12/2011 Wang
2011/0316973 A1 12/2011 Miller et al.
2012/0117365 A1 5/2012 Navy et al.
2012/0242719 A1 9/2012 Klompenhouwer et al.
2012/0287146 A1 11/2012 Elliott et al.
2012/0287168 A1 11/2012 Botzas et al.
2012/0299946 A1 11/2012 Kim et al.
2012/0320036 A1 12/2012 Kang
2012/0326627 A1 12/2012 McDaniel, Jr.
2013/0010187 A1 1/2013 Yamashita
2013/0057567 A1 3/2013 Frank et al.
2013/0063573 A1 3/2013 Erinjippurath
2013/0222708 A1 8/2013 Seetzen et al.
2013/0258147 A1 10/2013 Kachi
2013/0278993 A1 10/2013 Heikenfeld et al.
2014/0022410 A1 1/2014 Gish et al.
2014/0028698 A1 1/2014 Maier et al.
2014/0028699 A1 1/2014 Kurtz et al.
2014/0043371 A1 2/2014 Langendijk et al.
2014/0092105 A1 4/2014 Guttag et al.
2014/0218511 A1 8/2014 Lee
2014/0218610 A1 8/2014 Chujoh et al.
2014/0225912 A1 8/2014 Govil et al.
2014/0341272 A1 11/2014 Miller et al.
2015/0009360 A1 1/2015 Takasumi et al.
2015/0022685 A1 1/2015 Gish et al.
2015/0062124 A1 3/2015 Goel et al.
2015/0123083 A1 5/2015 Xi et al.
2015/0189329 A1 7/2015 Wada
2015/0221281 A1 8/2015 Bosco et al.
2015/0256778 A1 9/2015 Kusaka
2015/0339996 A1 11/2015 Schuck et al.
2016/0005349 A1 1/2016 Atkins et al.
2016/0117993 A1 4/2016 Buckley et al.
2016/0119595 A1* 4/2016 Lyubarsky ......... G02B 27/0961 353/121
2016/0125580 A1 5/2016 He
2016/0189399 A1 6/2016 Liu et al.
2016/0205367 A1 7/2016 Wallace et al.
2016/0286187 A1 9/2016 Takenaga et al.
2016/0299417 A1 10/2016 Lambot
2016/0300538 A1 10/2016 Lee et al.
2016/0360214 A1 12/2016 Rojals et al.
2017/0006273 A1 1/2017 Borer et al.
2017/0026646 A1 1/2017 Minoo et al.
2017/0054989 A1 2/2017 Stessen et al.
2017/0074652 A1 3/2017 Send et al.
2017/0085878 A1 3/2017 Rojals et al.
2017/0085896 A1 3/2017 Ramasubramonian et al.
2017/0140556 A1 5/2017 Safaee-Rad et al.
2017/0147516 A1 5/2017 De
2017/0153382 A1 6/2017 Wang et al.
2017/0178277 A1 6/2017 Sharma et al.
2017/0185596 A1 6/2017 Spirer
2017/0200309 A1 7/2017 Qian et al.
2017/0201751 A1 7/2017 Seo
2017/0285307 A1 10/2017 Kamm et al.
2017/0339418 A1 11/2017 Ramasubramonian et al.
2018/0007374 A1 1/2018 Atkins et al.
2018/0063500 A1 3/2018 Rusanovskyy et al.
2018/0084024 A1 3/2018 Xie et al.
2018/0146533 A1 5/2018 Goodman et al.
2018/0160126 A1 6/2018 Andersson et al.
2018/0160127 A1 6/2018 Ström et al.
2018/0198754 A1 7/2018 Kielhofner et al.
2018/0224333 A1 8/2018 Sakakibara et al.
2018/0308410 A1 10/2018 Chen
2018/0308450 A1 10/2018 Appu et al.
2018/0324481 A1 11/2018 Bordes et al.
2018/0348574 A1 12/2018 Lin et al.
2018/0350322 A1 12/2018 Marcu et al.
2018/0359489 A1 12/2018 Lakshman et al.
2018/0376047 A1 12/2018 Li et al.
2019/0043179 A1 2/2019 Lucas et al.
2019/0069768 A1 3/2019 Chiba
2019/0098317 A1 3/2019 Lu et al.
2019/0130519 A1 5/2019 Hu et al.
2019/0141291 A1 5/2019 McNelley et al.
2019/0147832 A1 5/2019 Kim et al.
2019/0158894 A1 5/2019 Lee et al.
2019/0172415 A1 6/2019 Davis et al.
2019/0189084 A1 6/2019 Anderson et al.
2019/0265552 A1 8/2019 Shiomi
2019/0356881 A1 11/2019 Huang et al.
2020/0045340 A1 2/2020 Chen et al.
2020/0105221 A1 4/2020 Marcu et al.
2020/0105657 A1 4/2020 Lee et al.
2020/0128220 A1 4/2020 Bao et al.
2020/0144327 A1 5/2020 Lee et al.
2020/0209678 A1 7/2020 Hsu et al.
2020/0226965 A1 7/2020 Xi et al.
2020/0226967 A1 7/2020 Mandle
2020/0251039 A1 8/2020 Mandle et al.
2020/0258442 A1 8/2020 Mandle et al.
2020/0294439 A1 9/2020 Mandle et al.
2020/0402441 A1 12/2020 Mandle
2021/0020094 A1 1/2021 Bogdanowicz et al.
2021/0027692 A1 1/2021 Mandle et al.
2021/0027693 A1 1/2021 Mandle et al.
2021/0035486 A1 2/2021 Mandle
2021/0035487 A1 2/2021 Bogdanowicz et al.
2021/0043127 A1 2/2021 Bogdanowicz et al.
2021/0097922 A1 4/2021 Mandle
2021/0097923 A1 4/2021 Mandle
2021/0097943 A1 4/2021 Wyatt
2021/0174729 A1 6/2021 Mandle
2021/0209990 A1 7/2021 Bogdanowicz et al.
2021/0233454 A1 7/2021 Mandle et al.
2021/0272500 A1 9/2021 Mandle
2021/0280118 A1 9/2021 Mandle et al.
2021/0295762 A1 9/2021 Mandle et al.
2021/0304656 A1 9/2021 Mandle et al.
2021/0304657 A1 9/2021 Mandle
2021/0327330 A1 10/2021 Bogdanowicz et al.
2021/0335188 A1 10/2021 Mandle

(56) References Cited

U.S. PATENT DOCUMENTS

| | | | |
|---|---|---|---|
| 2021/0343218 | A1 | 11/2021 | Bogdanowicz et al. |
| 2021/0343219 | A1 | 11/2021 | Bogdanowicz et al. |
| 2021/0390899 | A1 | 12/2021 | Mandle |
| 2022/0036794 | A1 | 2/2022 | Mandle et al. |
| 2022/0051605 | A1 | 2/2022 | Bogdanowicz et al. |
| 2022/0059008 | A1 | 2/2022 | Bogdanowicz et al. |
| 2022/0059009 | A1 | 2/2022 | Mandle |
| 2022/0165198 | A1 | 5/2022 | Bogdanowicz et al. |
| 2022/0165199 | A1 | 5/2022 | Mandle et al. |
| 2022/0172663 | A1 | 6/2022 | Bogdanowicz et al. |
| 2022/0215787 | A1 | 7/2022 | Mandle et al. |
| 2022/0230577 | A1 | 7/2022 | Bogdanowicz et al. |
| 2022/0254295 | A1 | 8/2022 | Mandle et al. |
| 2022/0383795 | A1 | 12/2022 | Bogdanowicz et al. |
| 2022/0383796 | A1 | 12/2022 | Bogdanowicz et al. |
| 2023/0056348 | A1 | 2/2023 | Bogdanowicz et al. |

FOREIGN PATENT DOCUMENTS

| | | | |
|---|---|---|---|
| JP | 2005260318 | A | 9/2005 |
| WO | 2017184784 | A1 | 10/2017 |

OTHER PUBLICATIONS

"Color Temperature Scale", downloaded@https://web.archive.org/web/20170711064110/https://www.atlantalightbulbs.com/color-temperature-scale/, available online Jul. 2017 (Year: 2017).

Ajito, T., Obi, T., Yamaguchi, M., & Ohyama, N. (2000). Expanded color gamut reproduced by six-primary projection display. In Projection Displays 2000: Sixth in a Series (vol. 3954, pp. 130-138). International Society for Optics and Photonics. https://doi.org/10.1117/12.383364.

Anzagira "Color filter array patterns for small-pixel image sensors with substantial cross talk", J. Opt. Soc. Am. A vol. 32, No. 1, Jan. 2015 (Year: 2015).

Baylor University, U.S. Appl. No. 17/516,143, Non-Provisional Patent Application; Entire Document.

Brill, M. H., & Larimer, J. (2005a). Avoiding on-screen metamerism in N-primary displays. Journal of the Society for Information Display, 13(6), 509-516. https://doi.org/10.1889/1.1974003.

Brill, M. H., & Larimer, J. (2005b). Color-matching issues in multi-primary displays. SID Conference Record of the International Display Research Conference, 119-122.

Centore, et. al, Extensible Multi-Primary Control Sequences, Oct. 2011.

Chan, C.-C., Wei, G.-F., Hui, C.-K., & Cheng, S.-W. (2007). Development of multi-primary color LCD.

Chang, C.-K. (2013). The Effect on Gamut Expansion of Real Object Colors in Multi-primary Display. Retrieved from http://www.color.org/events/chiba/Chang.pdf.

Charles Poynton "Digital Video and HD Algorithms and Interfaces" ISBN 978-0-12-391926-7, 2012 (Year: 2012).

ColorSpace.Rgb, downloaded@https://web.archive.org/ web/20171113045313/ https://developer.android.com/reference/ android/graphics/ ColorSpace.Rgb.html, archived on Nov. 13, 2017 (Year: 2017).

Consumer Technology Association CTA Standard CTA-861-G (Nov. 2016). A DTV Profile for Uncompressed High Speed Digital Interfaces including errata dated Sep. 13, 2017 and Nov. 28, 2017.

CYGM filter, Wikipedia published on Dec. 14, 2017, downloaded@https://en.wikipedia.org/w/index.php?title=CYGM_filter&oldid=815388285 (Year: 2017).

De Vaan, A. T. S. M. (2007). Competing display technologies for the best image performance. Journal of the Society for Information Display, 15(9), 657-666. https://doi.org/10.1889/1.2785199.

Decarlo, Blog "4:4:4 vs 4:2:0: Which Chroma Subsampling Do You Need for Your Video Application?", posted on May 2, 2014 @ https://www.semiconductorstore.com/blog/2014/444-vs-420-chroma-subsampling/667/ (Year: 2014).

Display Daily WCG Standards Needed for Multi-Primary Displays, Matthew Brennesholtz. https://www.displaydaily.com/article/display-daily/wcg-standards-needed-for-multi-primary-displays.

Dolby Labs white paper V7.2 What is ICtCp? https://www.dolby.com/us/en/technologies/dolby-vision/ICtCp-white-paper.pdf.

Eliav, D., Roth, S., & Chorin, M. B. (2006). Application driven design of multi-primary displays.

Hsieh, Y.-F., Chuang, M.-C., Ou-Yang, M., Huang, S.-W., Li, J., & Kuo, Y.-T. (2008). Establish a six-primary color display without pixel-distortion and brightness loss. In Emerging Liquid Crystal Technologies III (vol. 6911, p. 69110R). International Society for Optics and Photonics. https://doi.org/10.1117/12.762944.

Jansen, "The Pointer's Gamut—The Coverage of Real Surface Colors by RGB Color Spaces and Wide Gamut Displays", TFT Central, downloaded @https://tftcentral.co.uk/articles/pointers_gamut, posted on Feb. 19, 2014 (Year: 2014).

Kerr, The CIE XYZ and xyY Color Space, downloaded @ https://graphics.stanford.edu/courses/cs 148-10-summer/docs/2010--kerr--cie_xyz.pdf, Mar. 21, 2010 (Year: 2010).

Langendijk, E. H. A., Belik, O., Budzelaar, F., & Vossen, F. (2007). Dynamic Wide-Color-Gamut RGBW Display. SID Symposium Digest of Technical Papers, 38(1), 1458-1461. https://doi.org/10.1889/1.2785590.

Li, Y., Majumder, A., Lu, D., & Gopi, M. (2015). Content-Independent Multi-Spectral Display Using Superimposed Projections. Computer Graphics Forum, 34(2), 337-348. https://doi.org/10.1111/cgf.12564.

Lovetskiy et al. "Numerical modeling of color perception of optical radiation", Mathematical Modelling and Geometry, vol. 6, No. 1, pp. 21-36, 2018 (Year: 2018).

Nagase, A., Kagawa, S., Someya, J., Kuwata, M., Sasagawa, T., Sugiura, H., & Miyata, A. (2007). Development of PTV Using Six-Primary-Color Display Technology. SID Symposium Digest of Technical Papers, 38(1), 27-30. https://doi.org/10.1889/1.2785217.

Noble, The Technology Inside the New Kodak Professional DCS 620x Digital Camera High-Quality Images at Extremely High ISO Settings, available online @ https://web.archive.org/web/20160303171931/http://www.modernimaging.com/Kodak_DCS-620x_ Technology.htm on Mar. 3, 2016 (Year: 2016).

Pascale, A Review of RGB Color Spaces, downloaded @https://www.babelcolor.com/index_htm_files/A%20review%20of%20RGB%20color%20spaces.pdf, 2003 (Year: 2003).

Pointer, M. R. (1980), The Gamut of Real Surface Colours. Color Res. Appl., 5: 145-155. doi:10.1002/col.5080050308.

Poynton, Chroma subsampling notation, downloaded @ https://poynton.ca/PDFs/Chroma_subsampling_notation.pdf, published on Jan. 24, 2008 (Year: 2008).

RFC4566, SOP: Session Description Protocol, published in Jul. 2006 (Year: 2006).

Samsung You tube video "Quantum Dot Technology on Samsung monitors", posted on Mar. 24, 2017 (Year: 2017).

Song et al. Studies on different primaries for a nearly-ultimate gamut in a laser display, Optics Express, vol. 36, No. 18, Sep. 3, 2018 (Year: 2018).

Susstrunk, "Computing Chromatic Adaptation", PhD thesis, Univ. of East Anglia Norwich, Jul. 2005 (Year: 2005).

Toda et al. "High Dynamic Range Rendering for YUV Images with a constraint on Perceptual Chroma Preservation", CIP 2009 (Year: 2009).

Trémeau, A., Tominaga, S., & Plataniotis, K. N. (2008). Color in Image and Video Processing: Most Recent Trends and Future Research Directions. EURASIP Journal on Image and Video Processing, 2008, 1-26. https://doi.org/10.1155/2008/581371.

Urban, "How Chroma Subsampling Works", downloaded @ https://blog.biamp.com/how-chroma-subsampling-works/, posted on Sep. 14, 2017 (Year: 2017).

Xilinx, Implementing Smpte Sdi Interfaces with 7 Series GTX transceivers, 2018 (Year: 2018).

Toto, Video: NH K's Super Hi-Vision Camera With 33-Megapixel Sensor, downloaded@https://web.archive.org/web/20140618050248/

(56) References Cited

OTHER PUBLICATIONS https://techcrunch.com/2011/06/01 /videonhks-super-hi-vision-camera-with-33-megapixel-sensor (Year: 2014).

* cited by examiner

System 1

System 2

System 3

$$E'_R = \frac{E'_{CR} - E'_{Y_6}}{1.7874} \qquad E'_B = \frac{E'_{CB} - E'_{Y_6}}{1.9278} \qquad E'_C = \frac{E'_{CC} - E'_{Y_6}}{1.6063} \qquad E'_Y = \frac{E'_{CY} - E'_{Y_6}}{1.5361} \qquad E'_M = \frac{\frac{E'_B}{2} + \frac{E'_R}{2}}{2}$$

| Value | Sampling | Value | Sampling | Value | Sampling | Value | Sampling |
|---|---|---|---|---|---|---|---|
| **0h** | 4:2:2<br>(Y/Cb/Cr) | **1h** | 4:4:4<br>(Y/Cb/Cr) | **2h** | 4:4:4<br>(G/B/R) | **3h** | 4:2:0<br>(Y/Cb/Cr) |
| **4h** | 4:2:2:4<br>(Y/Cb/Cr/A) | **5h** | 4:4:4:4<br>(Y/Cb/Cr/A) | **6h** | 4:4:4:4<br>(G/B/R/A) | **7h** | 4:2:0<br>(Y/Cb/Cr/Cc/Cy) |
| **8h** | 4:2:2:4<br>(Y/Cb/Cr/D) | **9h** | 4:4:4:4<br>(Y/Cb/Cr/D) | **Ah** | 4:4:4:4<br>(G/B/R/D) | **Bh** | 4:2:2<br>(CL-Y/Cb/Cr/Cc/Cy) |
| **Ch** | 4:2:2<br>(Y/Cb/Cr/Cc/Cy) | **Dh** | 4:4:4<br>(G/B/R/M/Y/C) | **Eh** | 4:4:4<br>(X'Y'Z') | **Fh** | Sys 1/Sys2 |

FIG. 52

| Value | Sampling | Value | Sampling | Value | Sampling | Value | Sampling |
|---|---|---|---|---|---|---|---|
| **0h** | Unknown/Unspecified | 1h | 4:2:2<br>10 bit | 2h | 4:4:4<br>10 bit | 3h | 4:4:4:4<br>10 bit |
| **4h** | Reserved | 5h | 4:2:2<br>12 bit | 6h | 4:4:4<br>12 bit | 7h | 4:4:4:4<br>12 bit |
| **8h** | (4:2:2:4)<br>12 bit | 9h | 6P 4:2:0<br>10 bit | Ah | 6P 4:2:0<br>12 bit | Bh | 6P 4:2:2<br>10 bit |
| **Ch** | 6P 4:2:2<br>12 bit | Dh | 6P 4:4:4<br>10 bit | Eh | 6P 4:4:4<br>12 bit | Fh | Reserved |

FIG. 53

| | R0' | G0' | B0' | R1' | G1' | B1' | R2' | G2' | B2' | R3' | G3' | B3' |
|---|---|---|---|---|---|---|---|---|---|---|---|---|
| $G'_{INT} + M'_{INT}$ | | O | | | O | | | O | | | O | |
| $R'_{INT} + C'_{INT}$ | O | | | O | | | O | | | O | | |
| $B'_{INT} + Y'_{INT}$ | | | O | | | O | | | O | | | O |

FIG. 54

| | R0’ | G0’ | B0’ | R1’ | G1’ | B1’ | R0’ | G0’ | B0’ | R1’ | G1’ | B1’ |
|---|---|---|---|---|---|---|---|---|---|---|---|---|
| $G'_{INT} + M'_{INT}$ | | O | | | O | | | O | | | O | |
| $R'_{INT} + C'_{INT}$ | O | | | O | | | O | | | O | | |
| $B'_{INT} + Y'_{INT}$ | | | O | | | O | | | O | | | O |

FIG. 55

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_6-INT}$ | | O | | O | | O | | O | | O | | O |
| $E'_{Cb-INT} + E'_{Cy-INT}$ | O | | | | O | | | | O | | | |
| $E'_{Cr-INT} + E'_{Cc-INT}$ | | | O | | | | O | | | | O | |

FIG. 56

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_6-INT}$ | | O | | O | | O | | O | | O | | O |
| $E'_{Cb-INT} + E'_{Cy-INT}$ | O | | | | O | | | | O | | | |
| $E'_{Cr-INT} + E'_{Cc-INT}$ | | | O | | | | O | | | | O | |

FIG. 58

| | R0’ | G0’ | B0’ | R1’ | G1’ | B1’ | R2’ | G2’ | B2’ | R3’ | G3’ | B3’ |
|---|---|---|---|---|---|---|---|---|---|---|---|---|
| $G'_{INT}$ | | O | | | | | | O | | | | |
| $B'_{INT}$ | | | O | | | | | | O | | | |
| $R'_{INT}$ | O | | | | | | O | | | | | |
| $M'_{INT}$ | | | | | O | | | | | | O | |
| $Y'_{INT}$ | | | | | | O | | | | | | O |
| $C'_{INT}$ | | | | O | | | | | | O | | |

FIG. 60

| | R0' | G0' | B0' | R1' | G1' | B1' | R0' | G0' | B0' | R1' | G1' | B1' |
|---|---|---|---|---|---|---|---|---|---|---|---|---|
| $G'_{INT}$ | | O | | | | | | O | | | | |
| $R'_{INT}$ | | | O | | | | | | O | | | |
| $B'_{INT}$ | O | | | | | | O | | | | | |
| $M'_{INT}$ | | | | | O | | | | | | O | |
| $Y'_{INT}$ | | | | | | O | | | | | | O |
| $C'_{INT}$ | | | | O | | | | | | O | | |

| | R2' | G2' | B2' | R3' | G3' | B3' | R2' | G2' | B2' | R3' | G3' | B3' |
|---|---|---|---|---|---|---|---|---|---|---|---|---|
| $G'_{INT}$ | | O | | | | | | O | | | | |
| $R'_{INT}$ | | | O | | | | | | O | | | |
| $B'_{INT}$ | O | | | | | | O | | | | | |
| $M'_{INT}$ | | | | | O | | | | | | O | |
| $Y'_{INT}$ | | | | | | O | | | | | | O |
| $C'_{INT}$ | | | | O | | | | | | O | | |

FIG. 61

| | Cb0' | Y0' | Cr0' | Y1' | Cb1' | Y2' | Cr1' | Y3' | Cb2' | Y4' | Cr2' | Y5' |
|---|---|---|---|---|---|---|---|---|---|---|---|---|
| $E'_{Y_{RGB}-INT}$ | | O | | | | O | | | | O | | |
| $E'_{Y_{CYM}-INT}$ | | | | O | | | | O | | | | O |
| $E'_{Cr-INT}$ | | | O | | | | | | O | | | |
| $E'_{Cb-INT}$ | O | | | | | | | | | | O | |
| $E'_{Cc-INT}$ | | | | | | | O | | | | | |
| $E'_{Cy-INT}$ | | | | | O | | | | | | | |

FIG. 62

| | Cb0’ | Y0’ | Cr0’ | Y1’ | Cb1’ | Y2’ | Cr1’ | Y3’ | Cb2’ | Y4’ | Cr2’ | Y5’ |
|---|---|---|---|---|---|---|---|---|---|---|---|---|
| $E'_{Y_{RGB}-INT}$ | | O | | | | O | | | | O | | |
| $E'_{Y_{CYM}-INT}$ | | | | O | | | | O | | | | O |
| $E'_{Cr-INT}$ | O | | | | | | | | O | | | |
| $E'_{Cb-INT}$ | | | O | | | | | | | | O | |
| $E'_{Cc-INT}$ | | | | | O | | | | | | | |
| $E'_{Cy-INT}$ | | | | | | | O | | | | | |

FIG. 63

12P Transport

SMPTE ST 2082-1 Six Color Primary Mapping-12P Link A

SMPTE ST 2082-1 Six Color Primary Mapping-12P Link B

SMPTE ST 2082-1 Six Color Primary Mapping-12P Link A

SMPTE ST 2082-1 Six Color Primary Mapping-12P Link B

Link B 4:2:2 Non Constant decode

SYSTEM AND METHOD FOR A MULTI-PRIMARY WIDE GAMUT COLOR SYSTEM

CROSS REFERENCES TO RELATED APPLICATIONS

This application is a continuation of U.S. application Ser. No. 17/703,580, filed Mar. 24, 2022, which is a continuation of U.S. application Ser. No. 17/376,897, filed Jul. 15, 2021, which is a continuation of U.S. application Ser. No. 17/082,741, filed Oct. 28, 2020, now U.S. Pat. No. 11,069,280, which is a continuation-in-part of U.S. application Ser. No. 17/009,408, filed Sep. 1, 2020, now U.S. Pat. No. 11,043,157, which is a continuation-in-part of U.S. application Ser. No. 16/887,807, filed May 29, 2020, now U.S. Pat. No. 10,950,162, which is a continuation-in-part of U.S. application Ser. No. 16/860,769, filed Apr. 28, 2020, now U.S. Pat. No. 10,950,161, which is a continuation-in-part of U.S. application Ser. No. 16/853,203, filed Apr. 20, 2020, now U.S. Pat. No. 10,997,896, which is a continuation-in-part of U.S. patent application Ser. No. 16/831,157, filed Mar. 26, 2020, now U.S. Pat. No. 10,950,160, which is a continuation of U.S. patent application Ser. No. 16/659,307, filed Oct. 21, 2019, now U.S. Pat. No. 10,607,527, which is related to and claims priority from U.S. Provisional Patent Application No. 62/876,878, filed Jul. 22, 2019, U.S. Provisional Patent Application No. 62/847,630, filed May 14, 2019, U.S. Provisional Patent Application No. 62/805,705, filed Feb. 14, 2019, and U.S. Provisional Patent Application No. 62/750,673, filed Oct. 25, 2018, each of which is incorporated herein by reference in its entirety.

BACKGROUND OF THE INVENTION

1. Field of the Invention

The present invention relates to color systems, and more specifically to a wide gamut color system with an increased number of primary colors.

2. Description of the Prior Art

It is generally known in the prior art to provide for an increased color gamut system within a display.

Prior art patent documents include the following:

U.S. Pat. No. 10,222,263 for RGB value calculation device by inventor Yasuyuki Shigezane, filed Feb. 6, 2017 and issued Mar. 5, 2019, is directed to a microcomputer that equally divides the circumference of an RGB circle into 6×n (n is an integer of 1 or more) parts, and calculates an RGB value of each divided color. (255, 0, 0) is stored as a reference RGB value of a reference color in a ROM in the microcomputer. The microcomputer converts the reference RGB value depending on an angular difference of the RGB circle between a designated color whose RGB value is to be found and the reference color, and assumes the converted RGB value as an RGB value of the designated color.

U.S. Pat. No. 9,373,305 for Semiconductor device, image processing system and program by inventor Hiorfumi Kawaguchi, filed May 29, 2015 and issued Jun. 21, 2016, is directed to an image process device including a display panel operable to provide an input interface for receiving an input of an adjustment value of at least a part of color attributes of each vertex of n axes (n is an integer equal to or greater than 3) serving as adjustment axes in an RGB color space, and an adjustment data generation unit operable to calculate the degree of influence indicative of a following index of each of the n-axis vertices, for each of the n axes, on a basis of distance between each of the n-axis vertices and a target point which is an arbitrary lattice point in the RGB color space, and operable to calculate adjusted coordinates of the target point in the RGB color space.

U.S. Publication No. 20130278993 for Color-mixing bi-primary color systems for displays by inventor Heikenfeld, et. al, filed Sep. 1, 2011 and published Oct. 24, 2013, is directed to a display pixel. The pixel includes first and second substrates arranged to define a channel. A fluid is located within the channel and includes a first colorant and a second colorant. The first colorant has a first charge and a color. The second colorant has a second charge that is opposite in polarity to the first charge and a color that is complimentary to the color of the first colorant. A first electrode, with a voltage source, is operably coupled to the fluid and configured to moving one or both of the first and second colorants within the fluid and alter at least one spectral property of the pixel.

U.S. Pat. No. 8,599,226 for Device and method of data conversion for wide gamut displays by inventor Ben-Chorin, et. al, filed Feb. 13, 2012 and issued Dec. 3, 2013, is directed to a method and system for converting color image data from a, for example, three-dimensional color space format to a format usable by an n-primary display, wherein n is greater than or equal to 3. The system may define a two-dimensional sub-space having a plurality of two-dimensional positions, each position representing a set of n primary color values and a third, scaleable coordinate value for generating an n-primary display input signal. Furthermore, the system may receive a three-dimensional color space input signal including out-of range pixel data not reproducible by a three-primary additive display, and may convert the data to side gamut color image pixel data suitable for driving the wide gamut color display.

U.S. Pat. No. 8,081,835 for Multiprimary color sub-pixel rendering with metameric filtering by inventor Elliot, et. al, filed Jul. 13, 2010 and issued Dec. 20, 2011, is directed to systems and methods of rendering image data to multiprimary displays that adjusts image data across metamers as herein disclosed. The metamer filtering may be based upon input image content and may optimize sub-pixel values to improve image rendering accuracy or perception. The optimizations may be made according to many possible desired effects. One embodiment comprises a display system comprising: a display, said display capable of selecting from a set of image data values, said set comprising at least one metamer; an input image data unit; a spatial frequency detection unit, said spatial frequency detection unit extracting a spatial frequency characteristic from said input image data; and a selection unit, said unit selecting image data from said metamer according to said spatial frequency characteristic.

U.S. Pat. No. 7,916,939 for High brightness wide gamut display by inventor Roth, et. al, filed Nov. 30, 2009 and issued Mar. 29, 2011, is directed to a device to produce a color image, the device including a color filtering arrangement to produce at least four colors, each color produced by a filter on a color filtering mechanism having a relative segment size, wherein the relative segment sizes of at least two of the primary colors differ.

U.S. Pat. No. 6,769,772 for Six color display apparatus having increased color gamut by inventor Roddy, et. al, filed Oct. 11, 2002 and issued Aug. 3, 2004, is directed to a display system for digital color images using six color light sources or two or more multicolor LED arrays or OLEDs to provide an expanded color gamut. Apparatus uses two or more spatial light modulators, which may be cycled between two or more color light sources or LED arrays to provide a six-color display output. Pairing of modulated colors using relative luminance helps to minimize flicker effects.

SUMMARY OF THE INVENTION

It is an object of this invention to provide an enhancement to the current RGB systems or a replacement for them.

In one embodiment, the present invention is a system for displaying a six primary color system, including a set of image data, wherein the set of image data is comprised of a first set of color channel data and a second set of color channel data, wherein the set of image data further includes a bit level, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters is modifiable, at least one display device, wherein the at least one display device and the image data converter are in network communication, wherein the image data converter is operable to convert the bit level of the set of image data, thereby creating an updated bit level, wherein the image data converter is operable to convert the set of image data for display on the at least one display device, wherein once the set of image data has been converted by the image data converter for the at least one display device the set of SDP parameters are modified based on the conversion, and wherein the at least one display device is operable to display a six-primary color system based on the set of image data, such that the SDP parameters indicate that the set of image data being displayed on the at least one display device is using a six-primary color system.

In another embodiment, the present invention is a system for displaying a six-primary color system, including a set of image data, wherein the set of image data includes a first set of color channel data and a second set of color channel data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one display device, wherein the at least one display device and the image data converter are in network communication, wherein the image data converter is operable to convert the bit level for the set of image data to a new bit level, wherein the at least one data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value and that the set of image data being displayed on the at least one display device is using a six-primary color system.

In yet another embodiment, the present invention is a system for displaying a set of image data using a six-primary color system, including a set of image data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one electronic luminance component, wherein the electronic luminance component is derived from the set of image data, at least one display device, wherein the at least one display device and the image data converter are in network communication, wherein the image data converter is operable to convert the set of image data to a new bit level, wherein the data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value, the at least one electronic luminance component, and that the set of image data being displayed on the at least one display device is using a six-primary color system.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 52 illustrates modifications to the SMPTE ST352 standards for a six-primary color system.

FIG. 53 illustrates modifications to the SMPTE ST2022 standard for a six-primary color system.

FIG. 54 illustrates a table of 4:4:4 sampling for a six-primary color system for a 10-bit video system.

FIG. 55 illustrates a table of 4:4:4 sampling for a six-primary color system for a 12-bit video system.

FIG. 56 illustrates sequence substitutions for 10-bit and 12-bit video in 4:2:2 sampling systems in a Y Cb Cr Cc Cy color space.

FIG. 58 illustrates sequence substitutions for 10-bit and 12-bit video in 4:2:0 sampling systems using a Y Cb Cr Cc Cy color space.

FIG. 60 illustrates modifications to SMPTE ST2110-20 for a 10-bit six-primary color system in 4:4:4 video.

FIG. 61 illustrates modifications to SMPTE ST2110-20 for a 12-bit six-primary color system in 4:4:4 video.

FIG. 62 illustrates modifications to SMPTE ST2110-20 for a 10-bit six primary color system in 4:2:2 video.

FIG. 63 illustrates modifications to SMPTE ST2110-20 for a 12-bit six-primary color system in 4:2:0 video.

DETAILED DESCRIPTION

Figure 1:
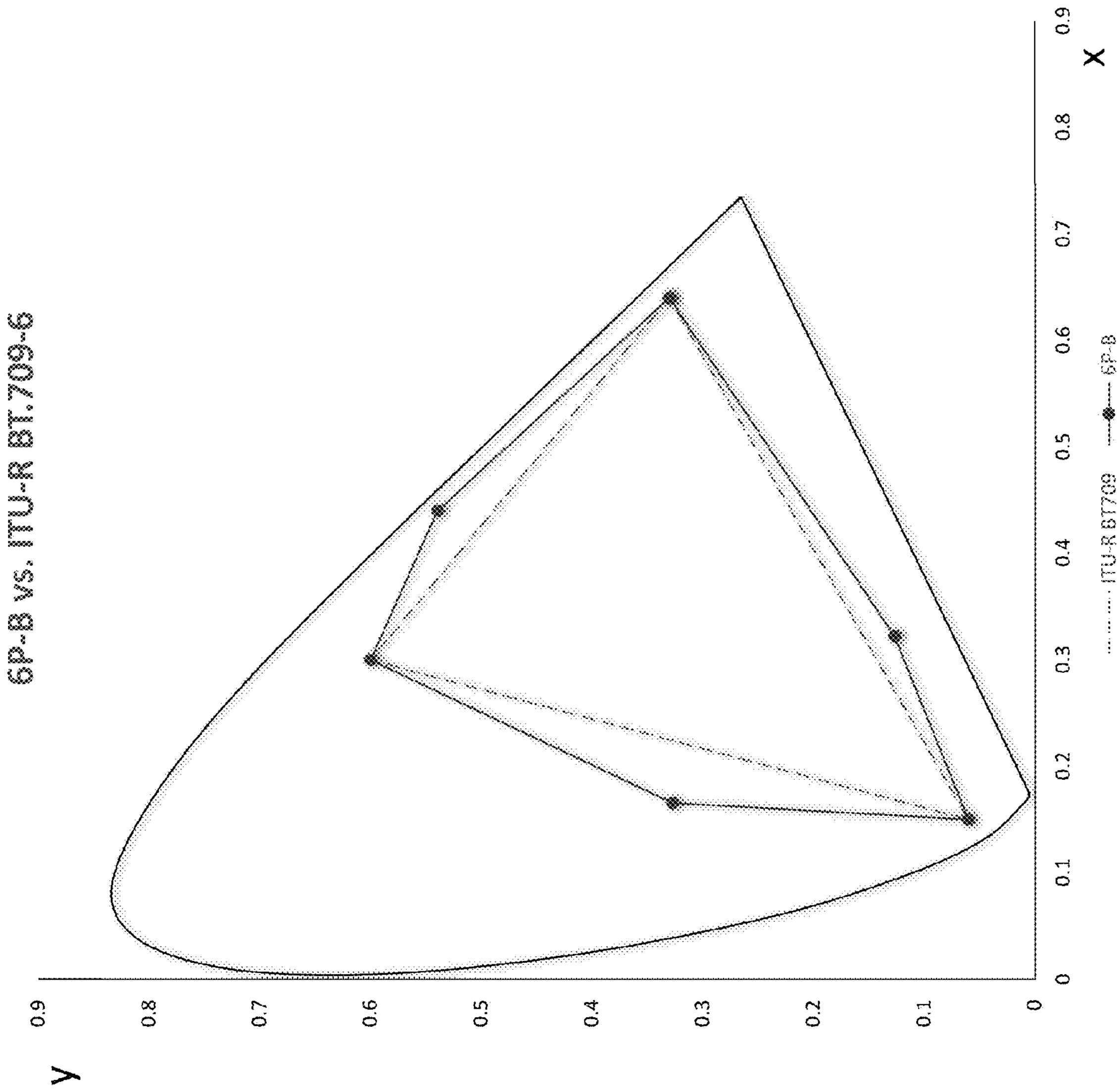
FIG. 1 illustrates one embodiment of a six primary system including a red primary, a green primary, a blue primary, a cyan primary, a magenta primary, and a yellow primary ("6P-B") compared to ITU-R BT.709-6.

The present invention is generally directed to a multi-primary color system.

In one embodiment, the present invention is a system for displaying a six primary color system, including a set of image data, wherein the set of image data is comprised of a first set of color channel data and a second set of color channel data, wherein the set of image data further includes a bit level, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters is modifiable, at least one display device, wherein the at least one display device and the image data converter are in network communication, wherein the image data converter is operable to convert the bit level of the set of image data, thereby creating an updated bit level, wherein the image data converter is operable to convert the set of image data for display on the at least one display device, wherein once the set of image data has been converted by the image data converter for the at least one display device the set of SDP parameters are modified based on the conversion, and wherein the at least one display device is operable to display a six-primary color system based on the set of image data, such that the SDP parameters indicate that the set of image data being displayed on the at least one display device is using a six-primary color system.

In another embodiment, the present invention is a system for displaying a six-primary color system, including a set of image data, wherein the set of image data includes a first set of color channel data and a second set of color channel data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one display device, wherein the at least one display device and the image data converter are in network communication, wherein the image data converter is operable to convert the bit level for the set of image data to a new bit level, wherein the at least one data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value and that the set of image data being displayed on the at least one display device is using a six-primary color system.

In yet another embodiment, the present invention is a system for displaying a set of image data using a six-primary color system, including a set of image data, wherein the set of image data includes a bit level, a magenta primary value, wherein the magenta primary value is derived from the set of image data, an image data converter, wherein the image data converter includes a digital interface, wherein the digital interface is operable to encode and decode the set of image data, at least one transfer function (TF) for processing the set of image data, a set of Session Description Protocol (SDP) parameters, wherein the set of SDP parameters are modifiable, at least one electronic luminance component, wherein the electronic luminance component is derived from the set of image data, at least one display device, wherein the at least one display device and the image data converter are in network communication, wherein the image data converter is operable to convert the set of image data to a new bit level, wherein the data converter is operable to convert the set of image data for display on the at least one display device, wherein once the set of image data has been converted for the at least one display device the set of SDP parameters are modified based on the conversion, and wherein the at least one display device is operable to display a six-primary color system based on the set of image data, such that the SDP parameters indicate the magenta primary value, the at least one electronic luminance component, and that the set of image data being displayed on the at least one display device is using a six-primary color system.

The present invention relates to color systems. A multitude of color systems are known, but they continue to suffer numerous issues. As imaging technology is moving forward, there has been a significant interest in expanding the range of colors that are replicated on electronic displays. Enhancements to the television system have expanded from the early CCIR 601 standard to ITU-R BT.709-6, to SMPTE RP431-2, and ITU-R BT.2020. Each one has increased the gamut of visible colors by expanding the distance from the reference white point to the position of the Red (R), Green (G), and Blue (B) color primaries (collectively known as "RGB") in chromaticity space. While this approach works, it has several disadvantages. When implemented in content presentation, issues arise due to the technical methods used to expand the gamut of colors seen (typically using a more-narrow emissive spectrum) can result in increased viewer metameric errors and require increased power due to lower illumination source. These issues increase both capital and operational costs.

With the current available technologies, displays are limited in respect to their range of color and light output. There are many misconceptions regarding how viewers interpret the display output technically versus real-world sensations viewed with the human eye. The reason we see more than just the three emitting primary colors is because the eye combines the spectral wavelengths incident on it into the three bands. Humans interpret the radiant energy (spectrum and amplitude) from a display and process it so that an individual color is perceived. The display does not emit a color or a specific wavelength that directly relates to the sensation of color. It simply radiates energy at the same spectrum which humans sense as light and color. It is the observer who interprets this energy as color.

When the CIE 2° standard observer was established in 1931, common understanding of color sensation was that the eye used red, blue, and green cone receptors (James Maxwell & James Forbes 1855). Later with the Munsell vision model (Munsell 1915), Munsell described the vision system to include three separate components: luminance, hue, and saturation. Using RGB emitters or filters, these three primary colors are the components used to produce images on today's modern electronic displays.

There are three primary physical variables that affect sensation of color. These are the spectral distribution of radiant energy as it is absorbed into the retina, the sensitivity of the eye in relation to the intensity of light landing on the retinal pigment epithelium, and the distribution of cones within the retina. The distribution of cones (e.g., L cones, M cones, and S cones) varies considerably from person to person.

Enhancements in brightness have been accomplished through larger backlights or higher efficiency phosphors. Encoding of higher dynamic ranges is addressed using higher range, more perceptually uniform electro-optical transfer functions to support these enhancements to brightness technology, while wider color gamuts are produced by using narrow bandwidth emissions. Narrower bandwidth emitters result in the viewer experiencing higher color saturation. But there can be a disconnect between how saturation is produced and how it is controlled. What is believed to occur when changing saturation is that increasing color values of a color primary represents an increase to saturation. This is not true, as changing saturation requires the variance of a color primary spectral output as parametric. There are no variable spectrum displays available to date as the technology to do so has not been commercially developed, nor has the new infrastructure required to support this been discussed.

Instead, the method that a display changes for viewer color sensation is by changing color luminance. As data values increase, the color primary gets brighter. Changes to color saturation are accomplished by varying the brightness of all three primaries and taking advantage of the dominant color theory.

Expanding color primaries beyond RGB has been discussed before. There have been numerous designs of multi-primary displays. For example, SHARP has attempted this with their four-color QUATTRON TV systems by adding a yellow color primary and developing an algorithm to drive it. Another four primary color display was proposed by Matthew Brennesholtz which included an additional cyan primary, and a six primary display was described by Yan Xiong, Fei Deng, Shan Xu, and Sufang Gao of the School of Physics and Optoelectric Engineering at the Yangtze University Jingzhou China. In addition, AU OPTRONICS has developed a five primary display technology. SONY has also recently disclosed a camera design featuring RGBCMY (red, green, blue, cyan, magenta, and yellow) and RGBCMYW (red, green, blue cyan, magenta, yellow, and white) sensors.

Actual working displays have been shown publicly as far back as the late 1990's, including samples from Tokyo Polytechnic University, Nagoya City University, and Genoa Technologies. However, all of these systems are exclusive to their displays, and any additional color primary information is limited to the display's internal processing.

Additionally, the Visual Arts System for Archiving and Retrieval of Images (VASARI) project developed a colorimetric scanner system for direct digital imaging of paintings. The system provides more accurate coloring than conventional film, allowing it to replace film photography. Despite the project beginning in 1989, technical developments have continued. Additional information is available at https://www.southampton.ac.uk/~km2/projs/vasari/ (last accessed Mar. 30, 2020), which is incorporated herein by reference in its entirety.

None of the prior art discloses developing additional color primary information outside of the display. Moreover, the system driving the display is often proprietary to the demonstration. In each of these executions, nothing in the workflow is included to acquire or generate additional color primary information. The development of a multi-primary color system is not complete if the only part of the system that supports the added primaries is within the display itself.

Referring now to the drawings in general, the illustrations are for the purpose of describing one or more preferred embodiments of the invention and are not intended to limit the invention thereto.

Additional details about multi-primary systems are available in U.S. Pat. No. 10,607,527 and U.S. Publication No. 20200251039, each of which is incorporated herein by reference in its entirety.

The multi-primary system of the present invention includes at least four primaries. The at least four primaries preferably include at least one red primary, at least one green primary, and/or at least one blue primary. In one embodiment, the at least four primaries include a cyan primary, a magenta primary, and/or a yellow primary.

In one embodiment, the multi-primary system includes six primaries. In one preferred embodiment, the six primaries include a red primary, a green primary, a blue primary, a cyan primary, a magenta primary, and a yellow primary.

6P-B

6P-B is a color set that uses the same RGB values that are defined in the ITU-R BT.709-6 television standard. The gamut includes these RGB primary colors and then adds three more color primaries orthogonal to these based on the white point. The white point used in 6P-B is D65 (ISO 11664-2).

In one embodiment, the red primary has a dominant wavelength of 609 nm, the yellow primary has a dominant wavelength of 571 nm, the green primary has a dominant wavelength of 552 nm, the cyan primary has a dominant wavelength of 491 nm, and the blue primary has a dominant wavelength of 465 nm as shown in Table 1. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 1

| | x | y | u' | v' | λ |
|---|---|---|---|---|---|
| W (D65) | 0.3127 | 0.3290 | 0.1978 | 0.4683 | |
| R | 0.6400 | 0.3300 | 0.4507 | 0.5228 | 609 nm |
| G | 0.3000 | 0.6000 | 0.1250 | 0.5625 | 552 nm |
| B | 0.1500 | 0.0600 | 0.1754 | 0.1578 | 464 nm |

TABLE 1-continued

| | x | y | u' | v' | λ |
|---|---|---|---|---|---|
| C | 0.1655 | 0.3270 | 0.1041 | 0.4463 | 491 nm |
| M | 0.3221 | 0.1266 | 0.3325 | 0.2940 | |
| Y | 0.4400 | 0.5395 | 0.2047 | 0.5649 | 571 nm |

FIG. 1 illustrates 6P-B compared to ITU-R BT.709-6.

6P-C

6P-C is based on the same RGB primaries defined in SMPTE RP431-2 projection recommendation. Each gamut includes these RGB primary colors and then adds three more color primaries orthogonal to these based on the white point. The white point used in 6P-B is D65 (ISO 11664-2). Two versions of 6P-C are used. One is optimized for a D60 white point (SMPTE ST2065-1), and the other is optimized for a D65 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 493 nm, and the blue primary has a dominant wavelength of 465 nm as shown in Table 2. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 2

| | x | y | u' | v' | λ |
|---|---|---|---|---|---|
| W (D60) | 0.3217 | 0.3377 | 0.2008 | 0.4742 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1627 | 0.3419 | 0.0960 | 0.4540 | 493 nm |
| M | 0.3523 | 0.1423 | 0.3520 | 0.3200 | |
| Y | 0.4502 | 0.5472 | 0.2078 | 0.5683 | 570 nm |

Figure 2:
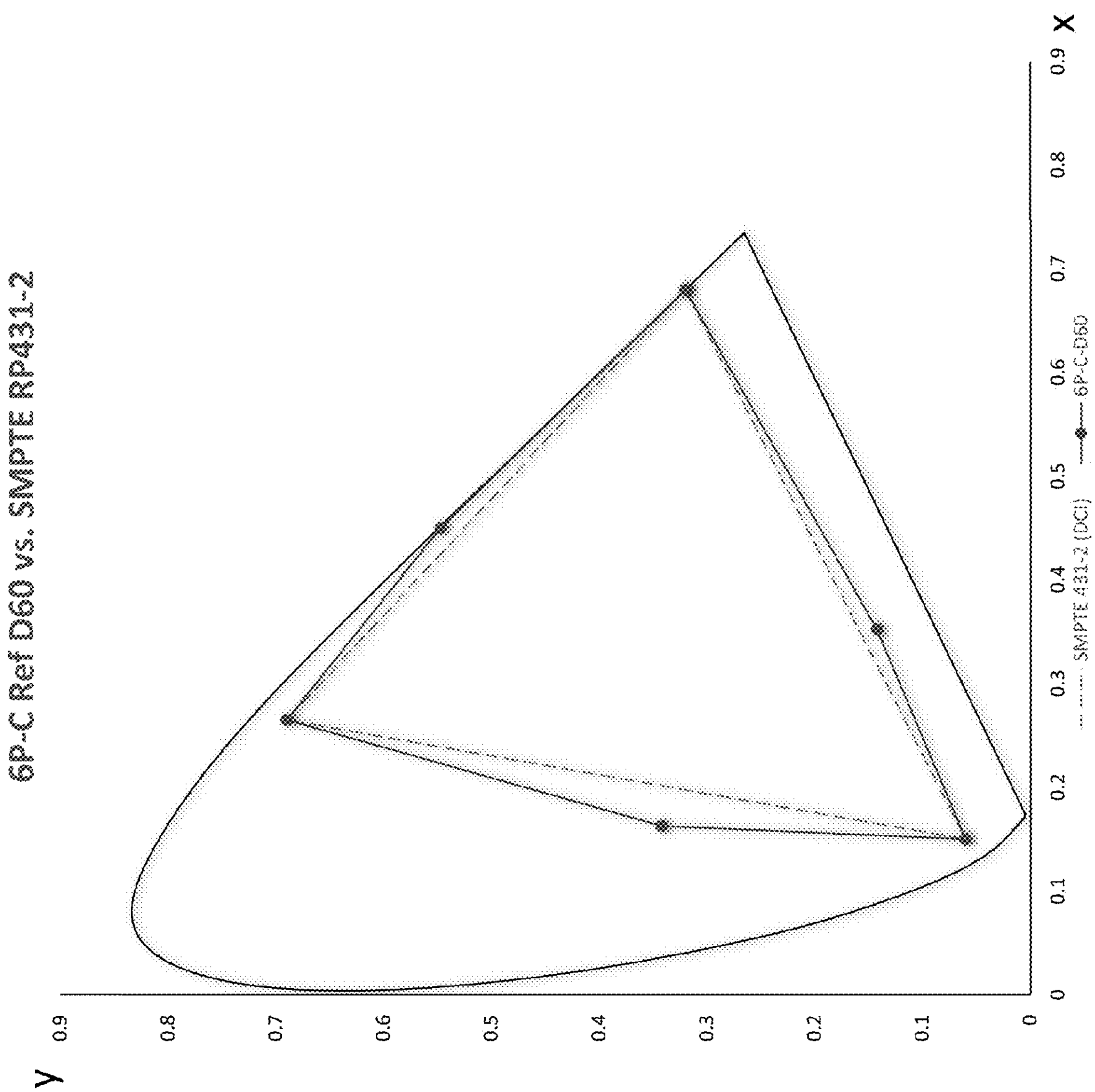
FIG. 2 illustrates another embodiment of a six primary system including a red primary, a green primary, a blue primary, a cyan primary, a magenta primary, and a yellow primary ("6P-C") compared to SMPTE RP431-2 for a D60 white point.

FIG. 2 illustrates 6P-C compared to SMPTE RP431-2 for a D60 white point.

In one embodiment, the red primary has a dominant wavelength of 615 nm, the yellow primary has a dominant wavelength of 570 nm, the green primary has a dominant wavelength of 545 nm, the cyan primary has a dominant wavelength of 423 nm, and the blue primary has a dominant wavelength of 465 nm as shown in Table 3. In one embodiment, the dominant wavelength is approximately (e.g., within ±10%) the value listed in the table below. Alternatively, the dominant wavelength is within ±5% of the value listed in the table below. In yet another embodiment, the dominant wavelength is within ±2% of the value listed in the table below.

TABLE 3

| | x | y | u' | v' | λ |
|---|---|---|---|---|---|
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1617 | 0.3327 | 0.0970 | 0.4490 | 492 nm |
| M | 0.3383 | 0.1372 | 0.3410 | 0.3110 | |
| Y | 0.4470 | 0.5513 | 0.2050 | 0.5689 | 570 nm |

Figure 3:
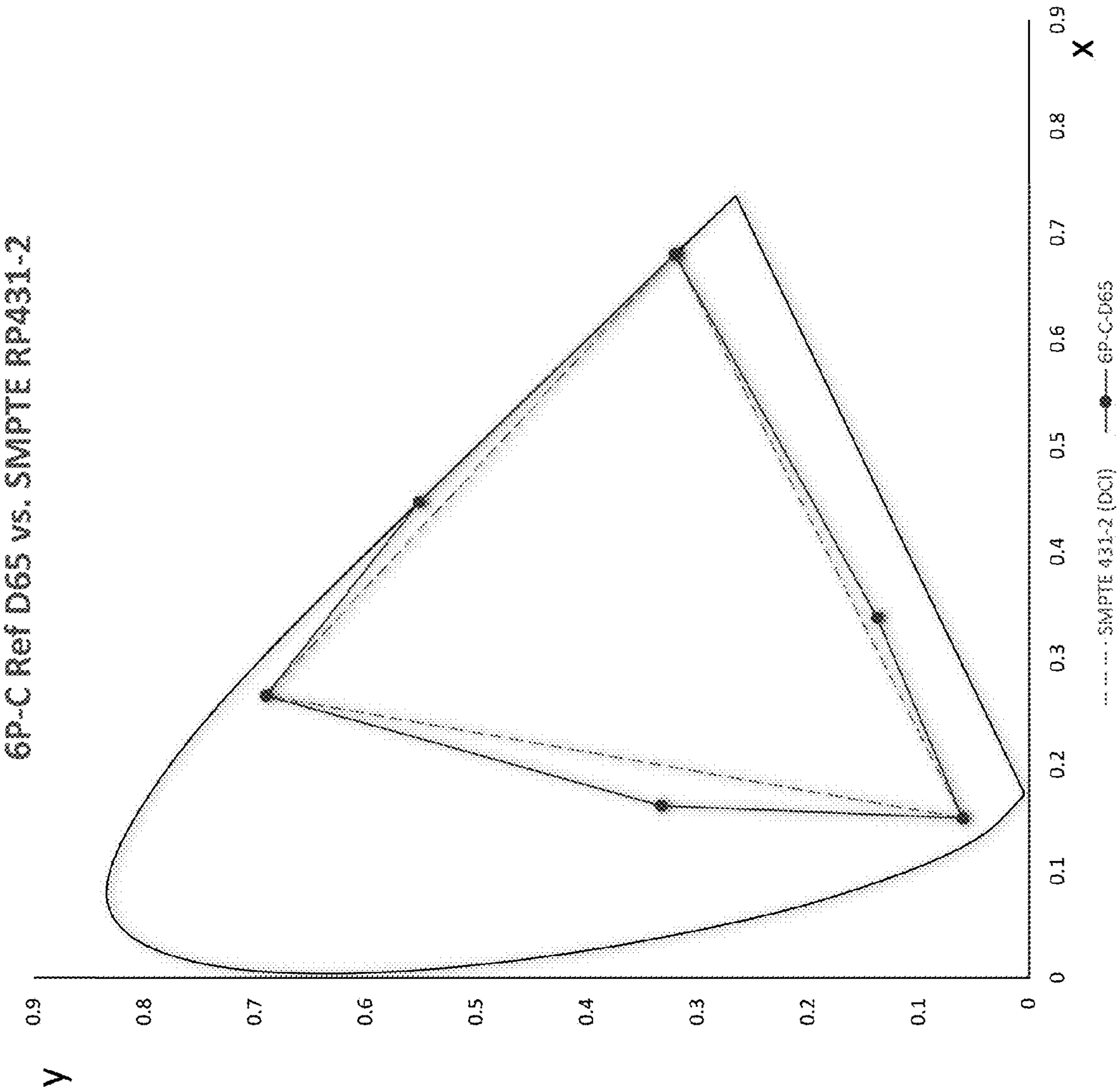
FIG. 3 illustrates yet another embodiment of a six primary system including a red primary, a green primary, a blue primary, a cyan primary, a magenta primary, and a yellow primary ("6P-C") compared to SMPTE RP431-2 for a D65 white point.

FIG. 3 illustrates 6P-C compared to SMPTE RP431-2 for a D65 white point.

Super 6P

Figure 4:
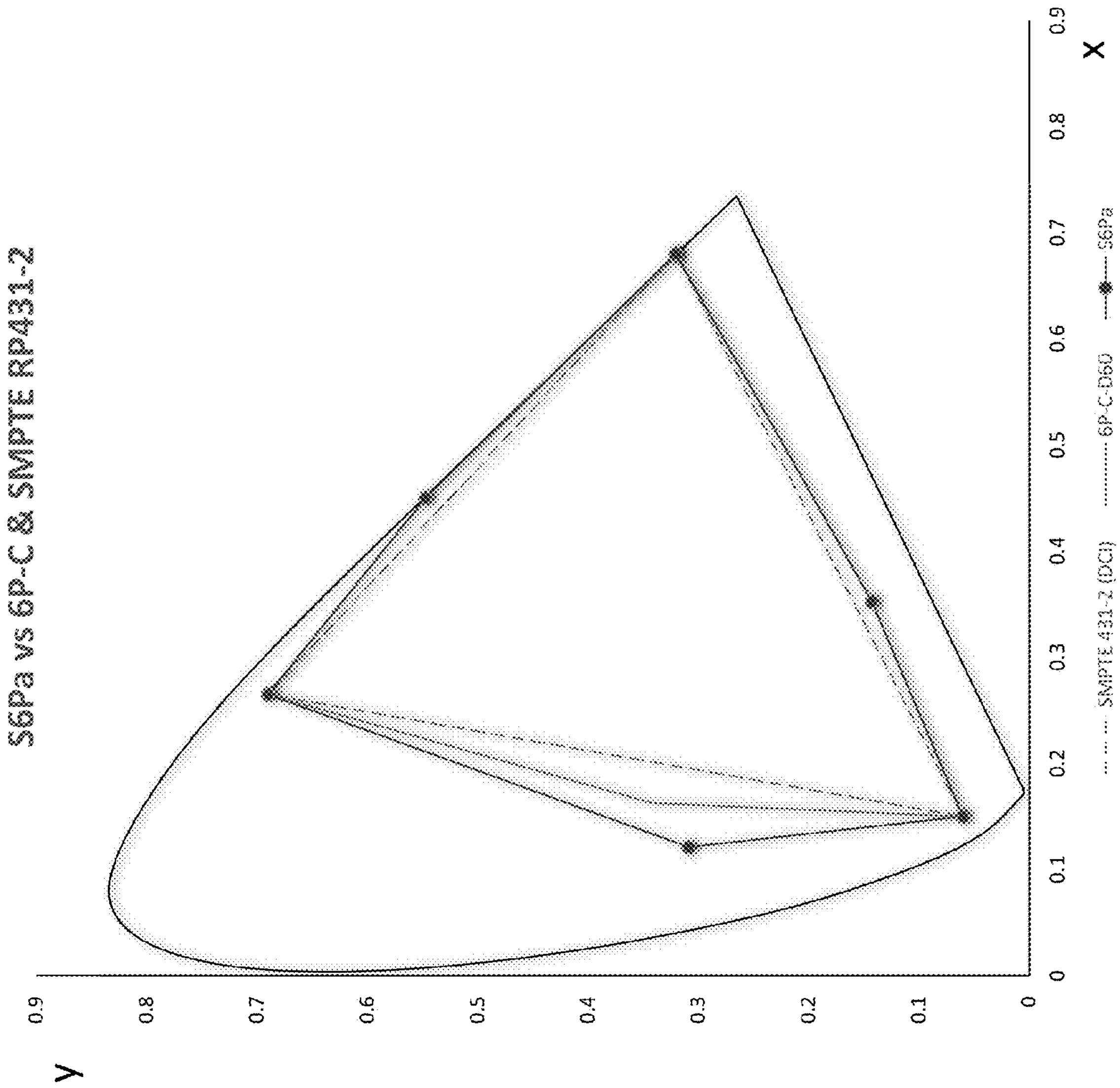
FIG. 4 illustrates Super 6 Pa compared to 6P-C.

One of the advantages of ITU-R BT.2020 is that it can include all of the Pointer colors and that increasing primary saturation in a six-color primary design could also do this. Pointer is described in "The Gamut of Real Surface Colors, M. R. Pointer, Published in Colour Research and Application Volume #5, Issue #3 (1980), which is incorporated herein by reference in its entirety. However, extending the 6P gamut beyond SMPTE RP431-2 ("6P-C") adds two problems. The first problem is the requirement to narrow the spectrum of the extended primaries. The second problem is the complexity of designing a backwards compatible system using color primaries that are not related to current standards. But in some cases, there may be a need to extend the gamut beyond 6P-C and avoid these problems. If the goal is to encompass Pointer's data set, then it is possible to keep most of the 6P-C system and only change the cyan color primary position. In one embodiment, the cyan color primary position is located so that the gamut edge encompasses all of Pointer's data set. In another embodiment, the cyan color primary position is a location that limits maximum saturation. With 6P-C, cyan is positioned as u'=0.096, v'=0.454. In one embodiment of Super 6P, cyan is moved to u'=0.075, v'=0.430 ("Super 6 Pa" (S6 Pa)). Advantageously, this creates a new gamut that covers Pointer's data set almost in its entirety. FIG. 4 illustrates Super 6 Pa compared to 6P-C.

Table 4 is a table of values for Super 6 Pa. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. λ defines each color primary as dominant color wavelength for RGB and complementary wavelengths CMY.

TABLE 4

| | x | y | u' | v' | λ |
|---|---|---|---|---|---|
| W (D60) | 0.3217 | 0.3377 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1211 | 0.3088 | 0.0750 | 0.4300 | 490 nm |
| M | 0.3523 | 0.1423 | 0.3520 | 0.3200 | |
| Y | 0.4502 | 0.5472 | 0.2078 | 0.5683 | 570 nm |

Figure 5:
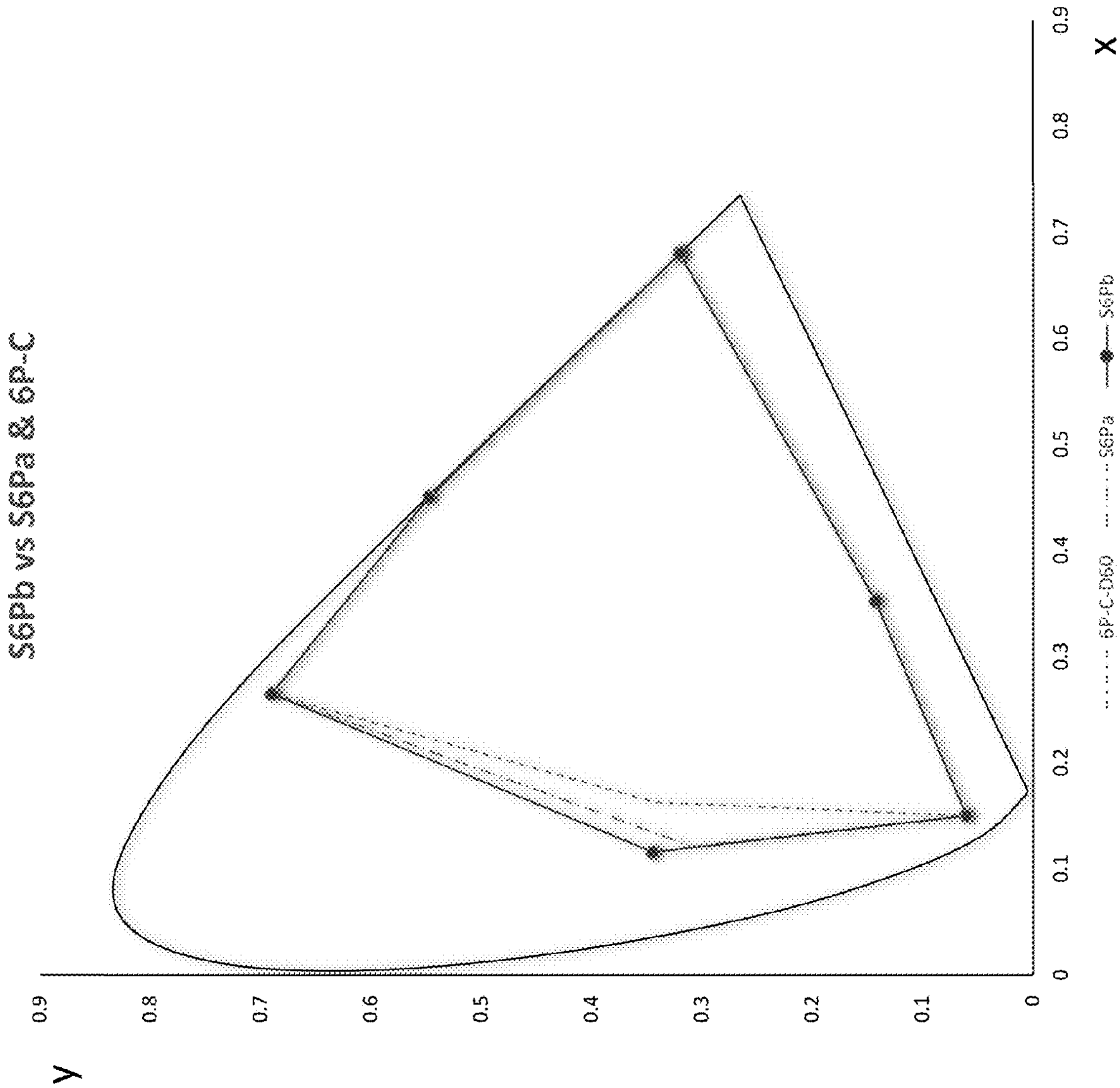
FIG. 5 illustrates Super 6Pb compared to Super 6 Pa and 6P-C.

In an alternative embodiment, the saturation is expanded on the same hue angle as 6P-C as shown in FIG. 5. Advantageously, this makes backward compatibility less complicated. However, this requires much more saturation (i.e., narrower spectra). In another embodiment of Super 6P, cyan is moved to u'=0.067, v'=0.449 ("Super 6Pb" (S6Pb)). Additionally, FIG. 5 illustrates Super 6Pb compared to Super 6 Pa and 6P-C.

Table 5 is a table of values for Super 6Pb. The definition of x,y are described in ISO 11664-3:2012/CIE S 014 Part 3, which is incorporated herein by reference in its entirety. The definition of u',v' are described in ISO 11664-5:2016/CIE S 014 Part 5, which is incorporated herein by reference in its entirety. λ defines each color primary as dominant color wavelength for RGB and complementary wavelengths CMY.

TABLE 5

| | x | y | u' | v' | λ |
|---|---|---|---|---|---|
| W (ACES D60) | 0.32168 | 0.33767 | 0.2008 | 0.4742 | |
| W (D65) | 0.3127 | 0.3290 | 0.1978 | 0.4683 | |
| R | 0.6800 | 0.3200 | 0.4964 | 0.5256 | 615 nm |
| G | 0.2650 | 0.6900 | 0.0980 | 0.5777 | 545 nm |
| B | 0.1500 | 0.0600 | 0.1754 | 0.1579 | 465 nm |
| C | 0.1156 | 0.3442 | 0.0670 | 0.4490 | 493 nm |
| M | 0.3523 | 0.1423 | 0.3520 | 0.3200 | |
| Y | 0.4502 | 0.5472 | 0.2078 | 0.5683 | 570 nm |

In a preferred embodiment, a matrix is created from XYZ values of each of the primaries. As the XYZ values of the primaries change, the matrix changes. Additional details about the matrix are described below.

Formatting and Transportation of Multi-Primary Signals

The present invention includes three different methods to format video for transport: System 1, System 2, and System 3. System 1 is comprised of an encode and decode system, which can be divided into base encoder and digitation, image data stacking, mapping into the standard data transport, readout, unstack, and finally image decoding. In one embodiment, the basic method of this system is to combine opposing color primaries within the three standard transport channels and identify them by their code value.

System 2 uses a sequential method where three color primaries are passed to the transport format as full bit level image data and inserted as normal. The three additional channels are delayed by one pixel and then placed into the transport instead of the first colors. This is useful in situations where quantizing artifacts may be critical to image performance. In one embodiment, this system is comprised of the six primaries (e.g., RGB plus a method to delay the CYM colors for injection), image resolution identification to allow for pixel count synchronization, start of video identification, and RGB Delay.

System 3 utilizes a dual link method where two wires are used. In one embodiment, a first set of three channels (e.g., RGB) are sent to link A and a second set of three channels (e.g., CYM) is sent to link B. Once they arrive at the image destination, they are recombined.

To transport up to six color components (e.g., four, five, or six), System 1, System 2, or System 3 can be used as described. If four color components are used, two of the channels are set to "0". If five color components are used, one of the channels is set to "0". Advantageously, this transportation method works for all primary systems described herein that include up to six color components.

Comparison of Three Systems

Advantageously, System 1 fits within legacy SDI, CTA, and Ethernet transports. Additionally, System 1 has zero latency processing for conversion to an RGB display. However, System 1 is limited to 11-bit words.

System 2 is advantageously operable to transport 6 channels using 16-bit words with no compression. Additionally, System 2 fits within newer SDI, CTA, and Ethernet transport formats. However, System 2 requires double bit rate speed. For example, a 4K image requires a data rate for an 8K RGB image.

In comparison, System 3 is operable to transport up to 6 channels using 16-bit words with compression and at the same data required for a specific resolution. For example, a data rate for an RGB image is the same as for a 6P image using System 3. However, System 3 requires a twin cable connection within the video system.

Nomenclature

In one embodiment, a standard video nomenclature is used to better describe each system.

R describes red data as linear light. G describes green data as linear light. B describes blue data as linear light. C describes cyan data as linear light. M describes magenta data as linear light. $Y^c$ and/or Y describe yellow data as linear light.

R' describes red data as non-linear light. G' describes green data as non-linear light. B' describes blue data as non-linear light. C' describes cyan data as non-linear light. M' describes magenta data as non-linear light. $Y^{c'}$ and/or Y' describe yellow data as non-linear light.

$Y_6$ describes the luminance sum of RGBCMY data. $Y_{RGB}$ describes a System 2 encode that is the linear luminance sum of the RGB data. $Y_{CMY}$ describes a System 2 encode that is the linear luminance sum of the CMY data.

$C_R$ describes the data value of red after subtracting linear image luminance. $C_B$ describes the data value of blue after subtracting linear image luminance. $C_C$ describes the data value of cyan after subtracting linear image luminance. $C_Y$ describes the data value of yellow after subtracting linear image luminance.

$Y'_{RGB}$ describes a System 2 encode that is the nonlinear luminance sum of the RGB data. $Y'_{CMY}$ describes a System 2 encode that is the nonlinear luminance sum of the CMY data. −Y describes the sum of RGB data subtracted from $Y_6$.

$C'_R$ describes the data value of red after subtracting nonlinear image luminance. $C'_B$ describes the data value of blue after subtracting nonlinear image luminance. $C'_C$ describes the data value of cyan after subtracting nonlinear image luminance. $C'_Y$ describes the data value of yellow after subtracting nonlinear image luminance.

B+Y describes a System 1 encode that includes either blue or yellow data. G+M describes a System 1 encode that includes either green or magenta data. R+C describes a System 1 encode that includes either green or magenta data.

$C_R+C_C$ describes a System 1 encode that includes either color difference data. $C_B+C_Y$ describes a System 1 encode that includes either color difference data.

4:4:4 describes full bandwidth sampling of a color in an RGB system. 4:4:4:4:4:4 describes full sampling of a color in an RGBCMY system. 4:2:2 describes an encode where a full bandwidth luminance channel (Y) is used to carry image detail and the remaining components are half sampled as a Cb Cr encode. 4:2:2:2:2 describes an encode where a full bandwidth luminance channel (Y) is used to carry image detail and the remaining components are half sampled as a Cb Cr Cy Cc encode. 4:2:0 describes a component system similar to 4:2:2, but where Cr and Cb samples alternate per line. 4:2:0:2:0 describes a component system similar to 4:2:2, but where Cr, Cb, Cy, and Cc samples alternate per line.

Constant luminance is the signal process where luminance (Y) are calculated in linear light. Non-constant luminance is the signal process where luminance (Y) are calculated in nonlinear light.

Deriving Color Components

When using a color difference method (4:2:2), several components need specific processing so that they can be used in lower frequency transports. These are derived as:

$$Y'_6 = 0.1063R' + 0.23195Y^{c'} + 0.3576G' + 0.19685C' + 0.0361B' + 0.0712M'$$

$$G'_6 = \left(\frac{1}{0.3576Y}\right) - (0.1063R') - (0.0361B') - (0.19685C') - \left(0.23195Y^{C'}\right) - (0.0712M')$$

$$-Y' = Y'_6 - \left(C' + Y^{c'} + M'\right)$$

$$C'_R = \frac{R' - Y'_6}{1.7874} \quad C'_B = \frac{B' - Y'_6}{1.9278} \quad C'_C = \frac{C' - Y'_6}{1.6063} \quad C'_Y = \frac{Y^{C'} - Y'_6}{1.5361}$$

$$R' = \frac{C'_R - Y'_6}{1.7874} \quad B' = \frac{C'_B - Y'_6}{1.9278} \quad C' = \frac{C'_C - Y'_6}{1.6063} \quad Y^{C'} = \frac{C'_Y - Y'_6}{1.5361}$$

The ratios for Cr, Cb, Cc, and Cy are also valid in linear light calculations.

Magenta can be calculated as follows:

$$M' = \frac{B' + R'}{B' \times R'} \text{ or } M = \frac{B + R}{B \times R}$$

System 1

In one embodiment, the multi-primary color system is compatible with legacy systems. A backwards compatible multi-primary color system is defined by a sampling method. In one embodiment, the sampling method is 4:4:4. In one embodiment, the sampling method is 4:2:2. In another embodiment, the sampling method is 4:2:0. In one embodiment of a backwards compatible multi-primary color system, new encode and decode systems are divided into the steps of performing base encoding and digitization, image data stacking, mapping into the standard data transport, readout, unstacking, and image decoding ("System 1"). In one embodiment, System 1 combines opposing color primaries within three standard transport channels and identifies them by their code value. In one embodiment of a backwards compatible multi-primary color system, the processes are analog processes. In another embodiment of a backwards compatible multi-primary color system, the processes are digital processes.

In one embodiment, the sampling method for a multi-primary color system is a 4:4:4 sampling method. Black and white bits are redefined. In one embodiment, putting black at midlevel within each data word allows the addition of CYM color data.

Figure 6:
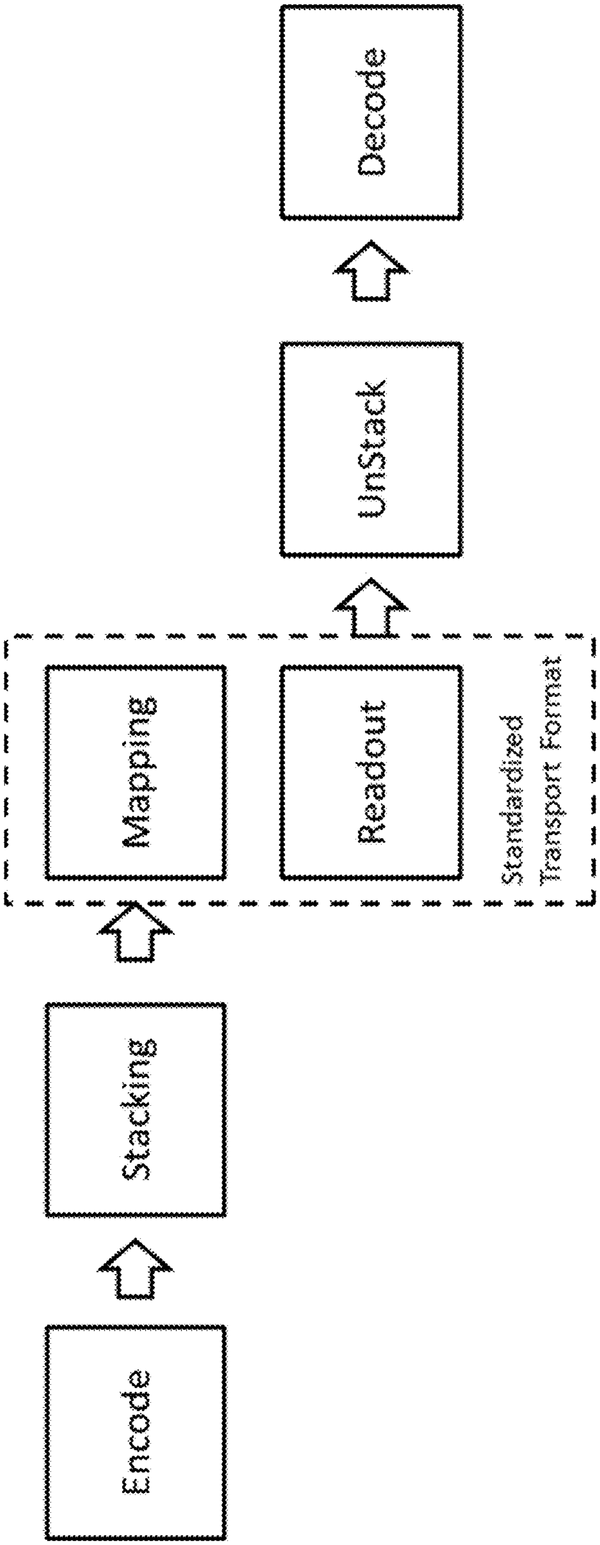
FIG. 6 illustrates an embodiment of an encode and decode system for a multi-primary color system.

FIG. 6 illustrates an embodiment of an encode and decode system for a multi-primary color system. In one embodiment, the multi-primary color encode and decode system is divided into a base encoder and digitation, image data stacking, mapping into the standard data transport, readout, unstack, and finally image decoding ("System 1"). In one embodiment, the method of this system combines opposing color primaries within the three standard transport channels and identifies them by their code value. In one embodiment, the encode and decode for a multi-primary color system are analog-based. In another embodiment, the encode and decode for a multi-primary color system are digital-based. System 1 is designed to be compatible with lower bandwidth systems and allows a maximum of 11 bits per channel and is limited to sending only three channels of up to six primaries at a time. In one embodiment, it does this by using a stacking system where either the color channel or the complementary channel is decoded depending on the bit level of that one channel.

System 2

Figure 7:
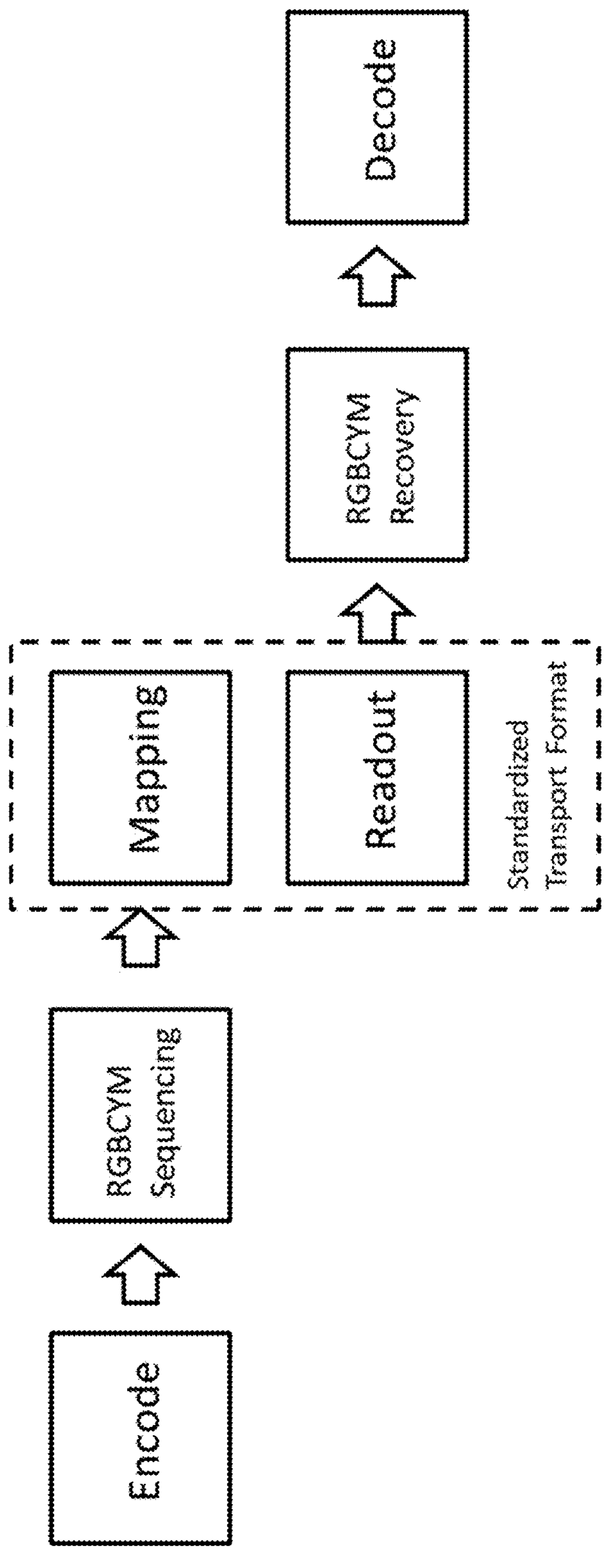
FIG. 7 illustrates a sequential method where three color primaries are passed to the transport format as full bit level image data and inserted as normal ("System 2").

FIG. 7 illustrates a sequential method where three color primaries are passed to the transport format as full bit level image data and inserted as normal ("System 2"). The three additional channels are delayed by one pixel and then placed into the transport instead of the first colors. This method is useful in situations where quantizing artifacts is critical to image performance. In one embodiment, this system is comprised of six primaries (RGBCYM), a method to delay the CYM colors for injection, image resolution identification to all for pixel count synchronization, start of video identification, RGB delay, and for YCCCCC systems, logic to select the dominant color primary. The advantage of System 2 is that full bit level video can be transported, but at double the normal data rate.

System 3

Figure 8:
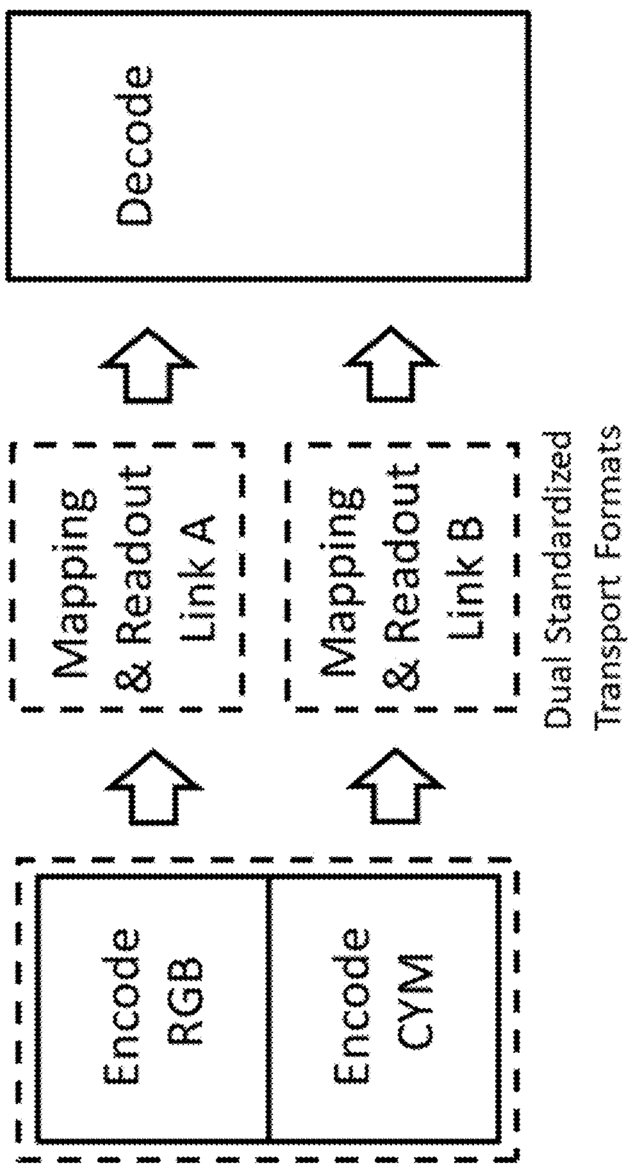
FIG. 8 illustrates one embodiment of a system encode and decode process using a dual link method ("System 3").

FIG. 8 illustrates one embodiment of a system encode and decode process using a dual link method ("System 3"). System 3 utilizes a dual link method where two wires are used. In one embodiment, RGB is sent to link A and CYM is sent to link B. After arriving at the image destination, the two links are recombined.

System 3 is simpler and more straight forward than Systems 1 and 2. The advantage with this system is that adoption is simply to format non-RGB primaries (e.g., CYM) on a second link. So, in one example, for an SDI design, RGB is sent on a standard SDI stream just as it is currently done. There is no modification to the transport and this link is operable to be sent to any RGB display requiring only the compensation for the luminance difference because the CYM components are not included. CYM data is transported in the same manner as RGB data. This data is then combined in the display to make up a 6P image. The downside is that the system requires two wires to move one image. This system is operable to work with most any format including SMPTE ST292, 424, 2082, and 2110. It also is operable to work with dual HDMI/CTA connections. In one embodiment, the system includes at least one transfer function (e.g., OETF, EOTF).

Figure 9:
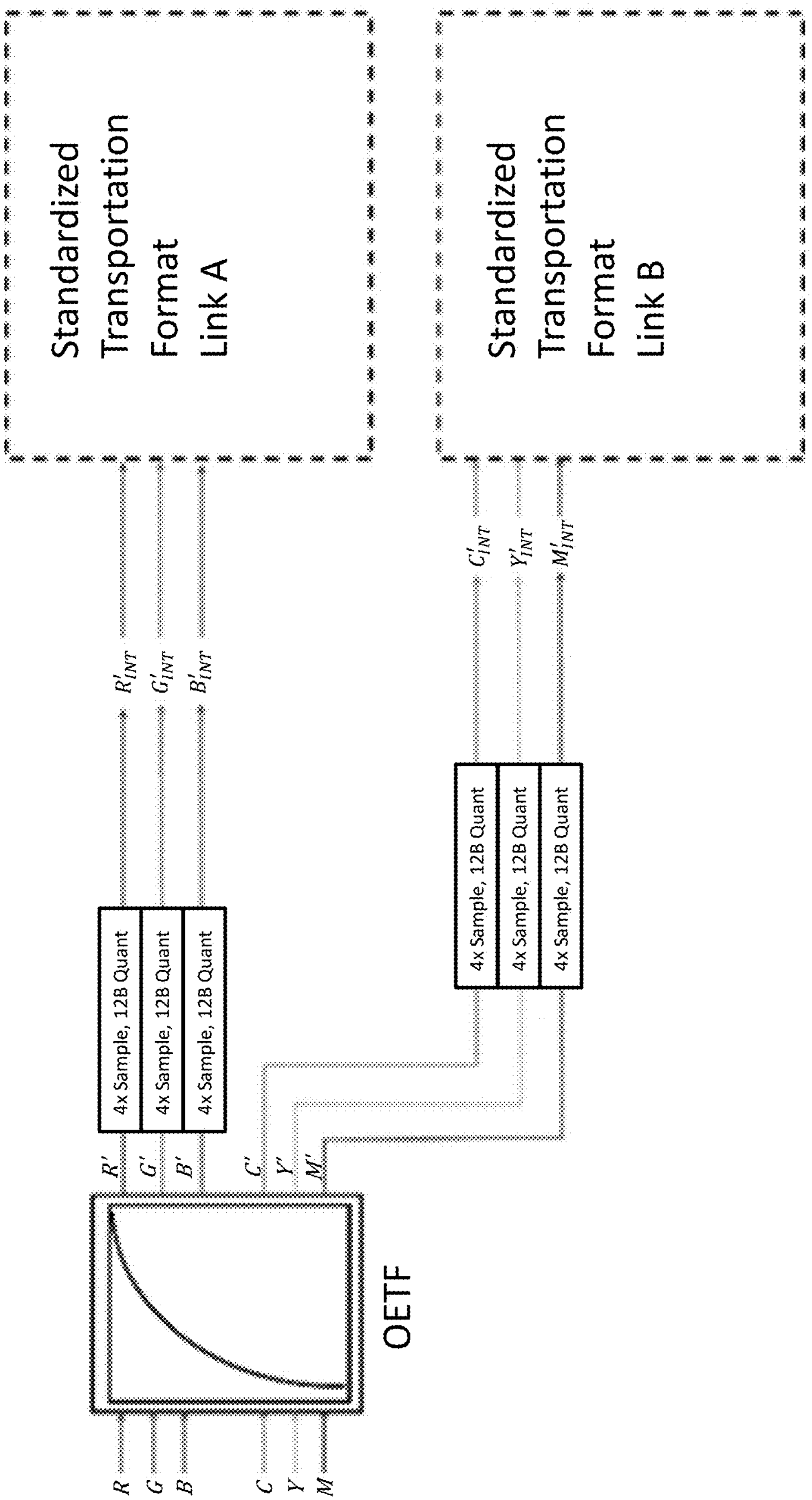
FIG. 9 illustrates one embodiment of an encoding process using a dual link method.

FIG. 9 illustrates one embodiment of an encoding process using a dual link method.

Figure 10:
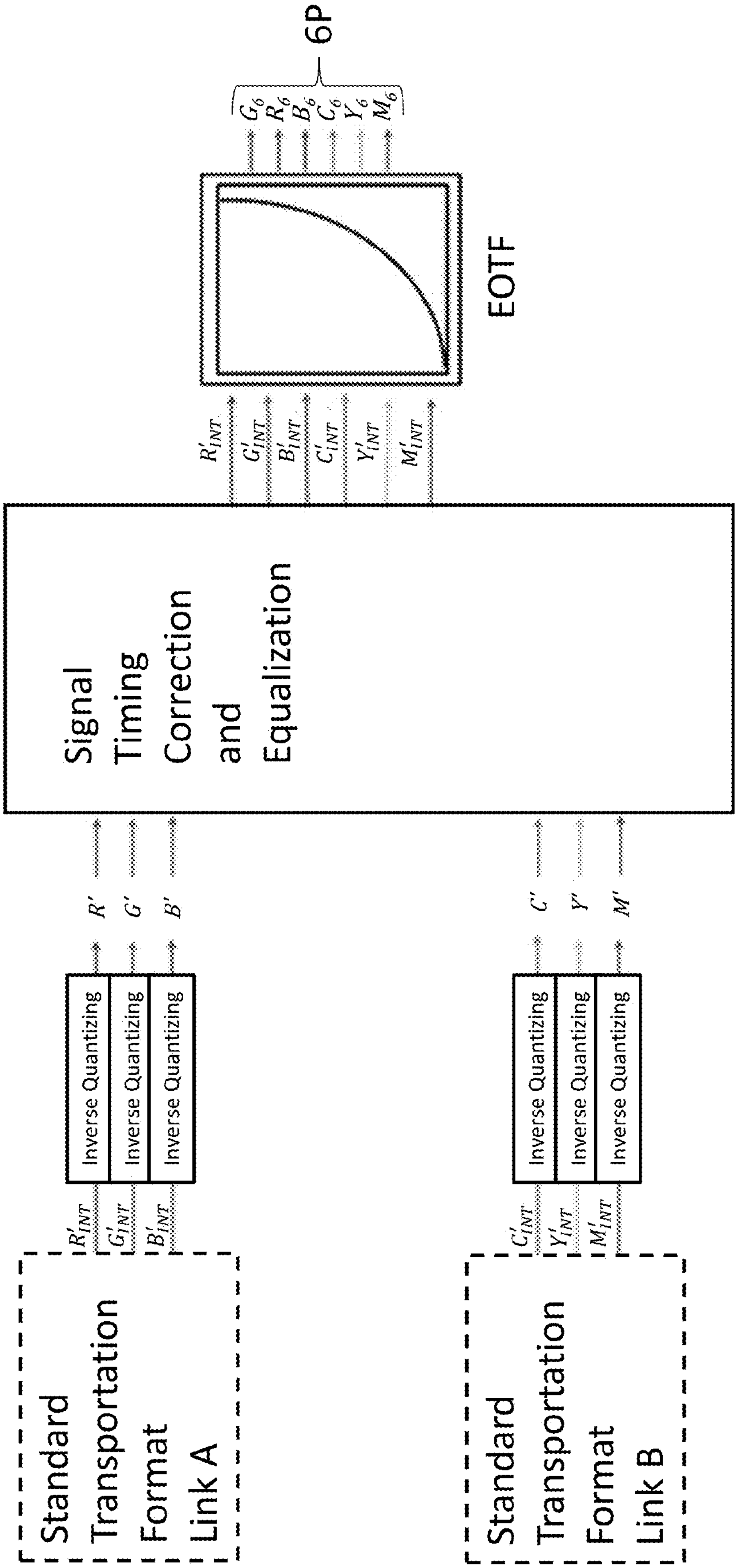
FIG. 10 illustrates one embodiment of a decoding process using a dual link method.

FIG. 10 illustrates one embodiment of a decoding process using a dual link method.

Transfer Functions

The system design minimizes limitations to use standard transfer functions for both encode and/or decode processes. Current practices used in standards include, but are not limited to, ITU-R BT.1886, ITU-R BT.2020, SMPTE ST274, SMPTE ST296, SMPTE ST2084, and ITU-R BT.2100. These standards are compatible with this system and require no modification.

Encoding and decoding 6P images is formatted into several different configurations to adapt to image transport frequency limitations. The highest quality transport is obtained by keeping all components as RGBCMY components. This uses the highest sampling frequencies and requires the most signal bandwidth. An alternate method is to sum the image details in a luminance channel at full bandwidth and then send the color difference signals at half or quarter sampling (e.g., Y Cr Cb Cc Cy). This allows a similar image to pass through lower bandwidth transports.

Six-Primary Color Encode Using a 4:4:4 Sampling Method

Figure 11:
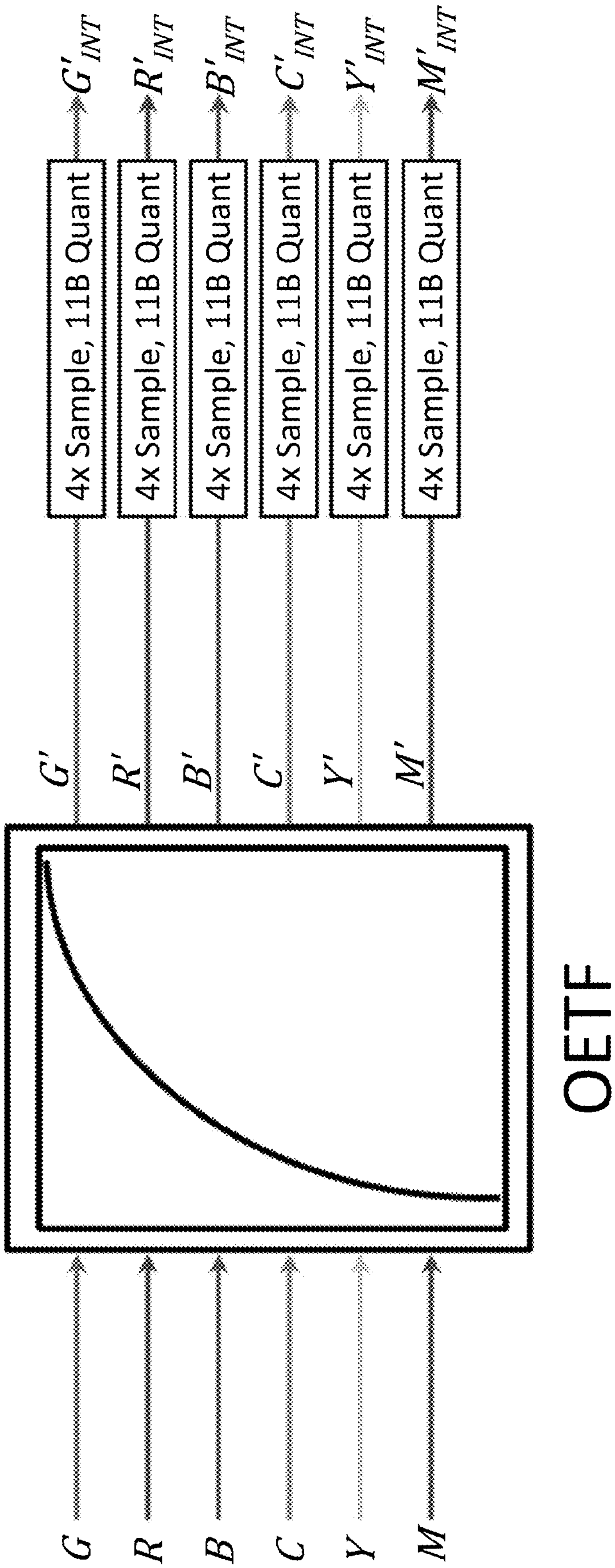
FIG. 11 illustrates one embodiment of a six-primary color system encode using a 4:4:4 sampling method.

FIG. 11 illustrates one embodiment of a six-primary color system encode using a 4:4:4 sampling method.

Subjective testing during the development and implementation of the current digital cinema system (DCI Version 1.2) showed that perceptible quantizing artifacts were not noticeable with system bit resolutions higher than 11 bits. Current serial digital transport systems support 12 bits. Remapping six color components to a 12-bit stream is accomplished by lowering the bit limit to 11 bits (values 0 to 2047) for 12-bit serial systems or 9 bits (values 0 to 512) for 10-bit serial systems. This process is accomplished by processing RGBCYM video information through a standard Optical Electronic Transfer Function (OETF) (e.g., ITU-R BT.709-6), digitizing the video information as four samples per pixel, and quantizing the video information as 11-bit or 9-bit.

In another embodiment, the RGBCYM video information is processed through a standard Optical Optical Transfer Function (OOTF). In yet another embodiment, the RGBCYM video information is processed through a Transfer Function (TF) other than OETF or OOTF. TFs consist of two components, a Modulation Transfer Function (MTF) and a Phase Transfer Function (PTF). The MTF is a measure of the ability of an optical system to transfer various levels of detail from object to image. In one embodiment, performance is measured in terms of contrast (degrees of gray), or of modulation, produced for a perfect source of that detail level. The PTF is a measure of the relative phase in the image(s) as a function of frequency. A relative phase change of 180°, for example, indicates that black and white in the image are reversed. This phenomenon occurs when the TF becomes negative.

There are several methods for measuring MTF. In one embodiment, MTF is measured using discrete frequency generation. In one embodiment, MTF is measured using continuous frequency generation. In another embodiment, MTF is measured using image scanning. In another embodiment, MTF is measured using waveform analysis.

In one embodiment, the six-primary color system is for a 12-bit serial system. Current practices normally set black at bit value 0 and white at bit value 4095 for 12-bit video. In order to package six colors into the existing three-serial streams, the bit defining black is moved to bit value 2048. Thus, the new encode has RGB values starting at bit value 2048 for black and bit value 4095 for white and CYM values starting at bit value 2047 for black and bit value 0 as white. In another embodiment, the six-primary color system is for a 10-bit serial system.

Figure 12:
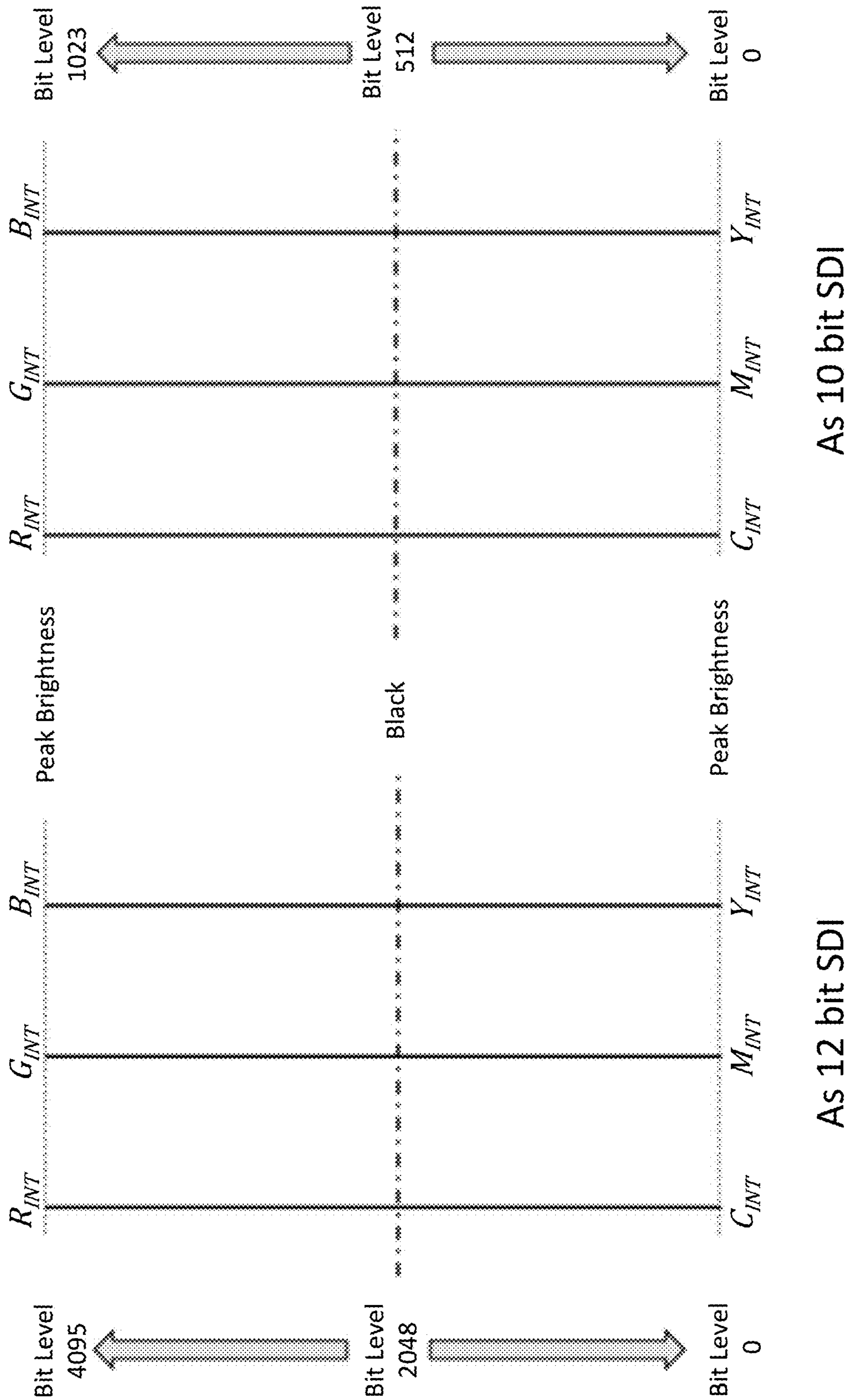
FIG. 12 illustrates one embodiment for a method to package six channels of primary information into the three standard primary channels used in current serial video standards by modifying bit numbers for a 12-bit SDI and a 10-bit SDI.
Figure 13:
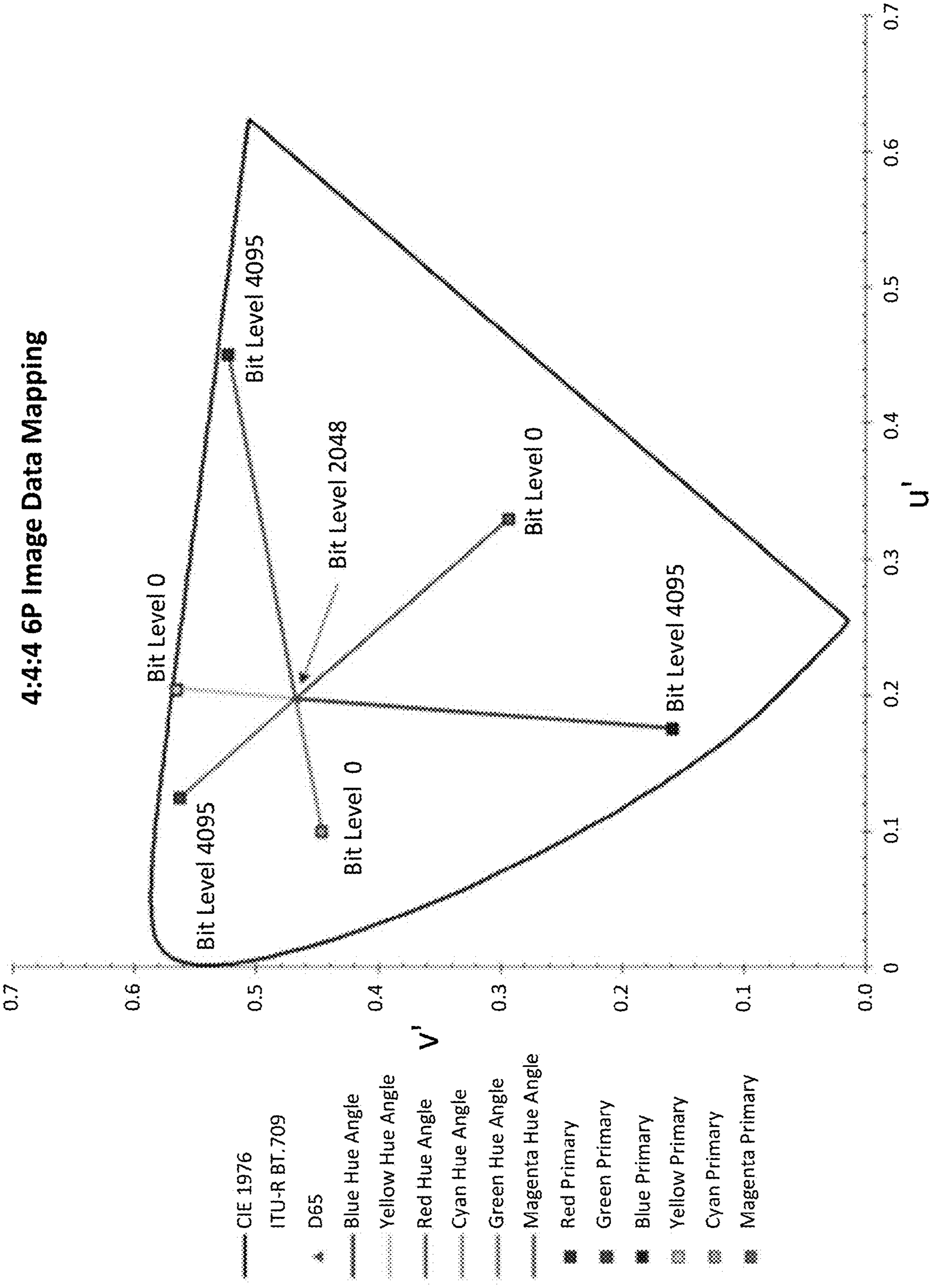
FIG. 13 illustrates a simplified diagram estimating perceived viewer sensation as code values define each hue angle.

FIG. 12 illustrates one embodiment for a method to package six channels of primary information into the three standard primary channels used in current serial video standards by modifying bit numbers for a 12-bit SDI and a 10-bit SDI. FIG. 13 illustrates a simplified diagram estimating perceived viewer sensation as code values define each hue angle. TABLE 6 and TABLE 7 list bit assignments for computer, production, and broadcast for a 12-bit system and a 10-bit system, respectively. In one embodiment, "Computer" refers to bit assignments compatible with CTA 861-G, November 2016, which is incorporated herein by reference in its entirety. In one embodiment, "Production" and/or "Broadcast" refer to bit assignments compatible with SMPTE ST 2082-0 (2016), SMPTE ST 2082-1 (2015), SMPTE ST 2082-10 (2015), SMPTE ST 2082-11 (2016), SMPTE ST 2082-12 (2016), SMPTE ST 2110-10 (2017), SMPTE ST 2110-20 (2017), SMPTE ST 2110-21 (2017), SMPTE ST 2110-30 (2017), SMPTE ST 2110-31 (2018), and/or SMPTE ST 2110-40 (2018), each of which is incorporated herein by reference in its entirety.

TABLE 6

| 12-Bit Assignments | | | | | | |
|---|---|---|---|---|---|---|
| | Computer | | Production | | Broadcast | |
| | RGB | CYM | RGB | CYM | RGB | CYM |
| Peak Brightness | 4095 | 0 | 4076 | 16 | 3839 | 256 |
| Minimum Brightness | 2048 | 2047 | 2052 | 2032 | 2304 | 1792 |

TABLE 7

| 10-Bit Assignments | | | | | | |
|---|---|---|---|---|---|---|
| | Computer | | Production | | Broadcast | |
| | RGB | CYM | RGB | CYM | RGB | CYM |
| Peak Brightness | 1023 | 0 | 1019 | 4 | 940 | 64 |
| Minimum Brightness | 512 | 511 | 516 | 508 | 576 | 448 |

In one embodiment, the OETF process is defined in ITU-R BT.709-6, which is incorporated herein by reference in its entirety. In one embodiment, the OETF process is defined in ITU-R BT.709-5, which is incorporated herein by reference in its entirety. In another embodiment, the OETF process is defined in ITU-R BT.709-4, which is incorporated herein by reference in its entirety. In yet another embodiment, the OETF process is defined in ITU-R BT.709-3, which is incorporated herein by reference in its entirety. In yet another embodiment, the OETF process is defined in ITU-R BT.709-2, which is incorporated herein by reference in its entirety. In yet another embodiment, the OETF process is defined in ITU-R BT.709-1, which is incorporated herein by reference in its entirety.

In one embodiment, the encoder is a non-constant luminance encoder. In another embodiment, the encoder is a constant luminance encoder.

Six-Primary Color Packing/Stacking Using a 4:4:4 Sampling Method

Figure 14:
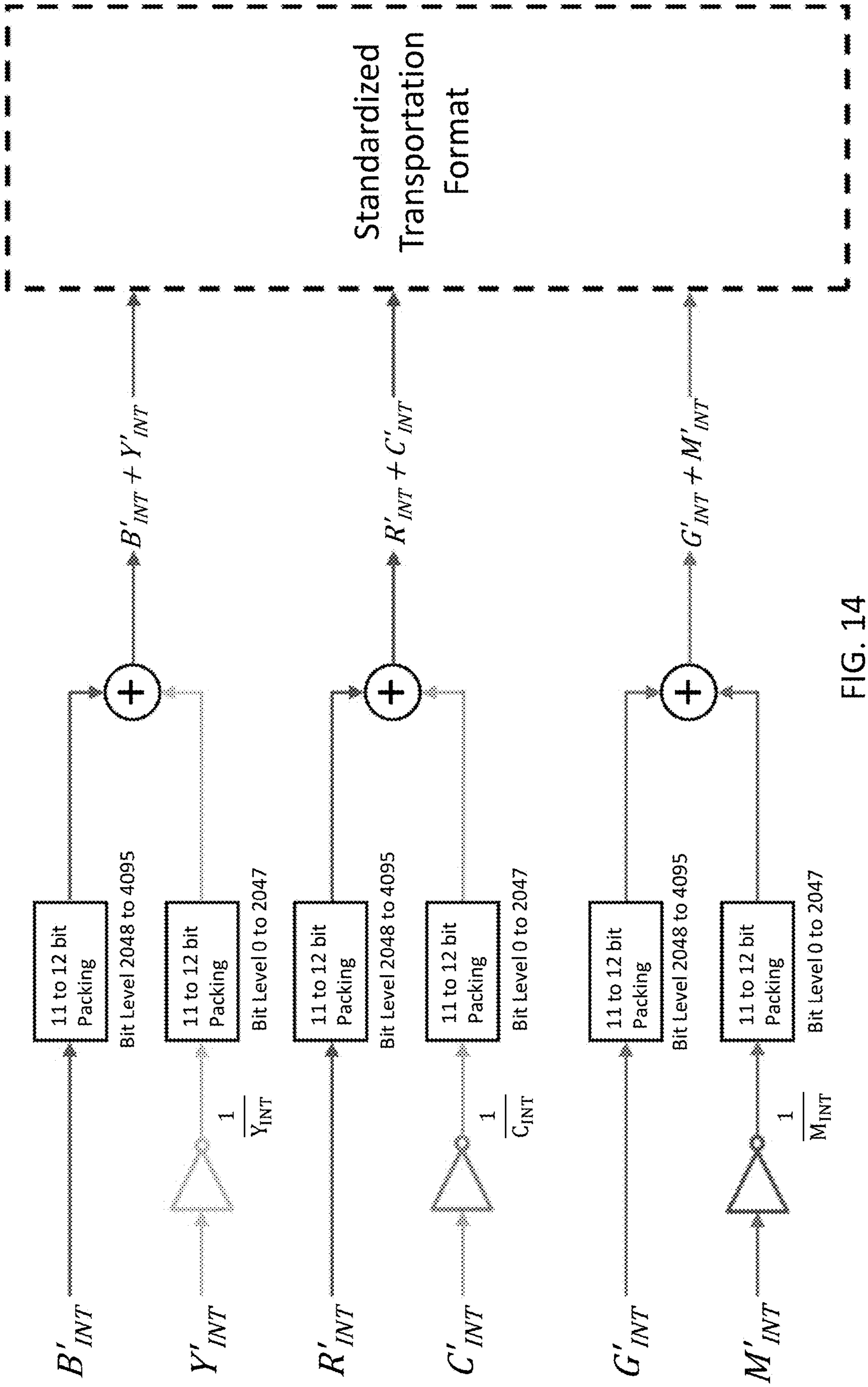
FIG. 14 illustrates one embodiment for a method of stacking/encoding six-primary color information using a 4:4:4 video system.

FIG. 14 illustrates one embodiment for a method of stacking/encoding six-primary color information using a 4:4:4 video system. Image data must be assembled according the serial system used. This is not a conversion process, but instead is a packing/stacking process. In one embodiment, the packing/stacking process is for a six-primary color system using a 4:4:4 sampling method.

Figure 15:
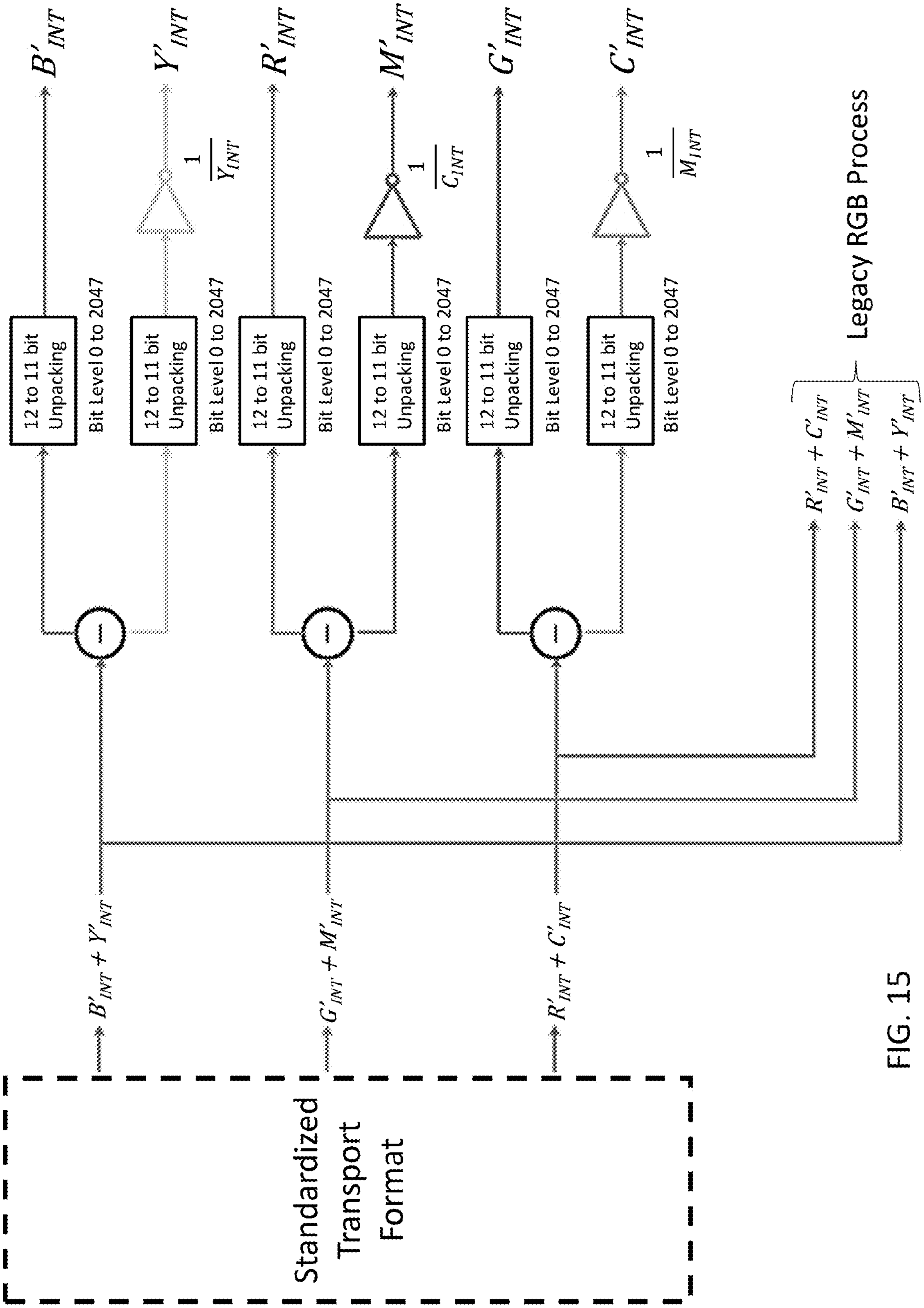
FIG. 15 illustrates one embodiment for a method of unstacking/decoding six-primary color information using a 4:4:4 video system.
Figure 16:
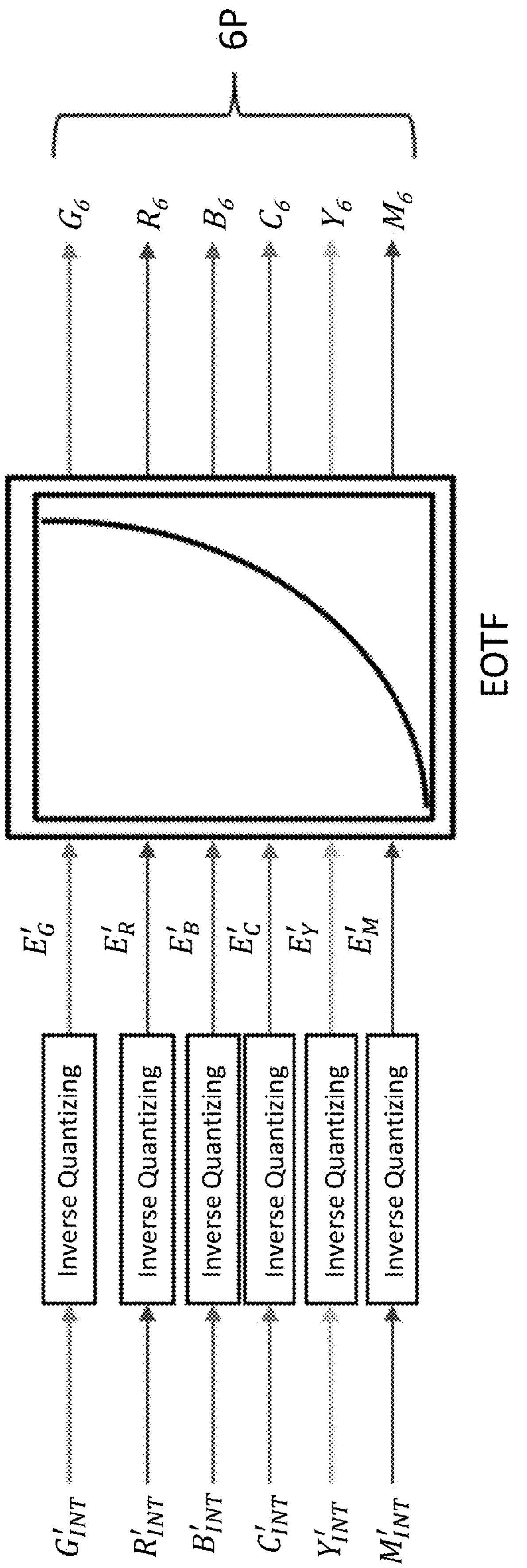
FIG. 16 illustrates one embodiment of a 4:4:4 decoder for a six-primary color system.

FIG. 15 illustrates one embodiment for a method of unstacking/decoding six-primary color information using a 4:4:4 video system. In one embodiment, the RGB channels and the CYM channels are combined into one 12-bit word and sent to a standardized transport format. In one embodiment, the standardized transport format is SMPTE ST424 SDI. In one embodiment, the decode is for a non-constant luminance, six-primary color system. In another embodiment, the decode is for a constant luminance, six-primary color system. In yet another embodiment, an electronic optical transfer function (EOTF) (e.g., ITU-R BT.1886) coverts image data back to linear for display. In one embodiment, the EOTF is defined in ITU-R BT.1886 (2011), which is incorporated herein by reference in its entirety. FIG. 16 illustrates one embodiment of a 4:4:4 decoder.

System 2 uses sequential mapping to the standard transport format, so it includes a delay for the CYM data. The CYM data is recovered in the decoder by delaying the RGB data. Since there is no stacking process, the full bit level video can be transported. For displays that are using optical filtering, this RGB delay could be removed and the process of mapping image data to the correct filter could be eliminated by assuming this delay with placement of the optical filter and the use of sequential filter colors.

Figure 17:
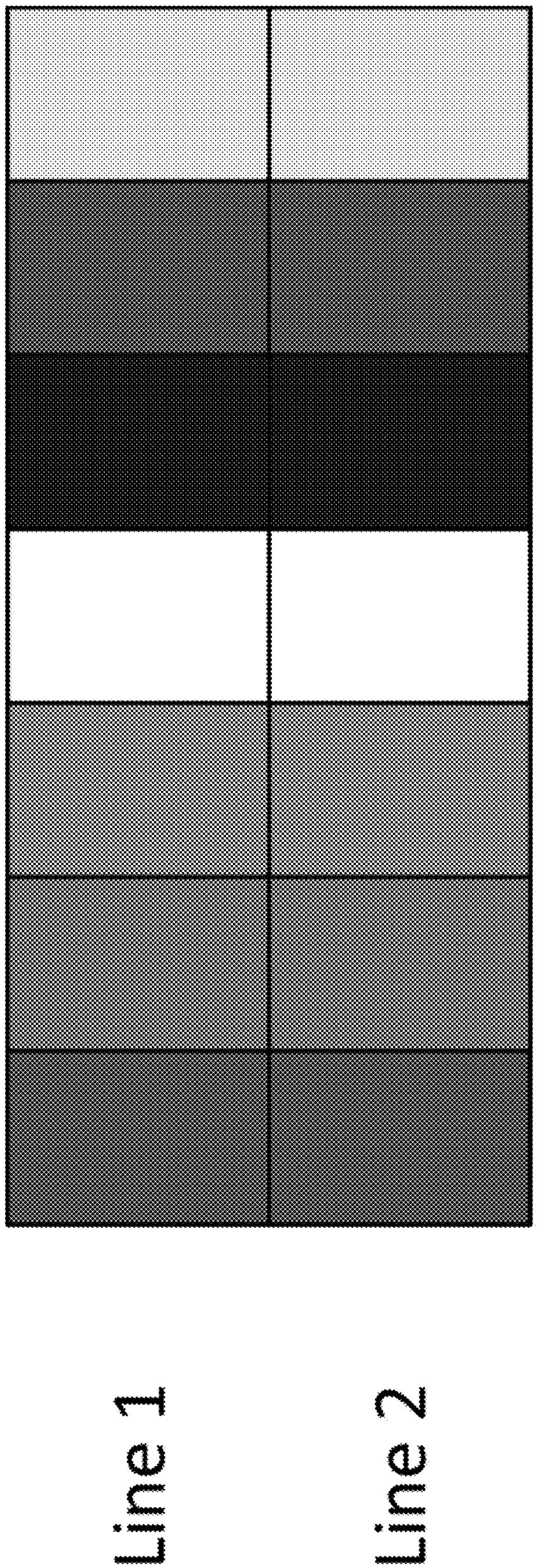
FIG. 17 illustrates one embodiment of an optical filter.
Figure 18:
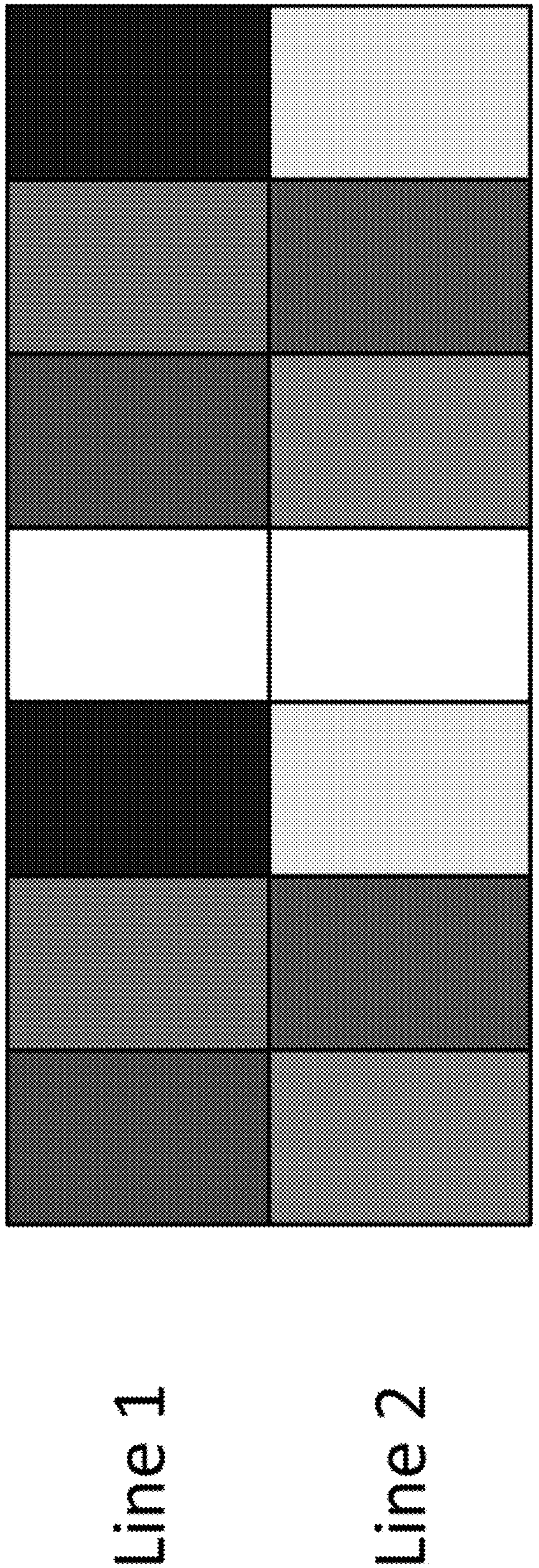
FIG. 18 illustrates another embodiment of an optical filter.

Two methods can be used based on the type of optical filter used. Since this system is operating on a horizontal pixel sequence, some vertical compensation is required and pixels are rectangular. This can be either as a line double repeat using the same RGBCYM data to fill the following line as shown in FIG. 17, or could be separated as RGB on line one and CYM on line two as shown in FIG. 18. The format shown in FIG. 18 allows for square pixels, but the CMY components requires a line delay for synchronization. Other patterns eliminating the white subpixel are also compatible with the present invention.

Figure 19:
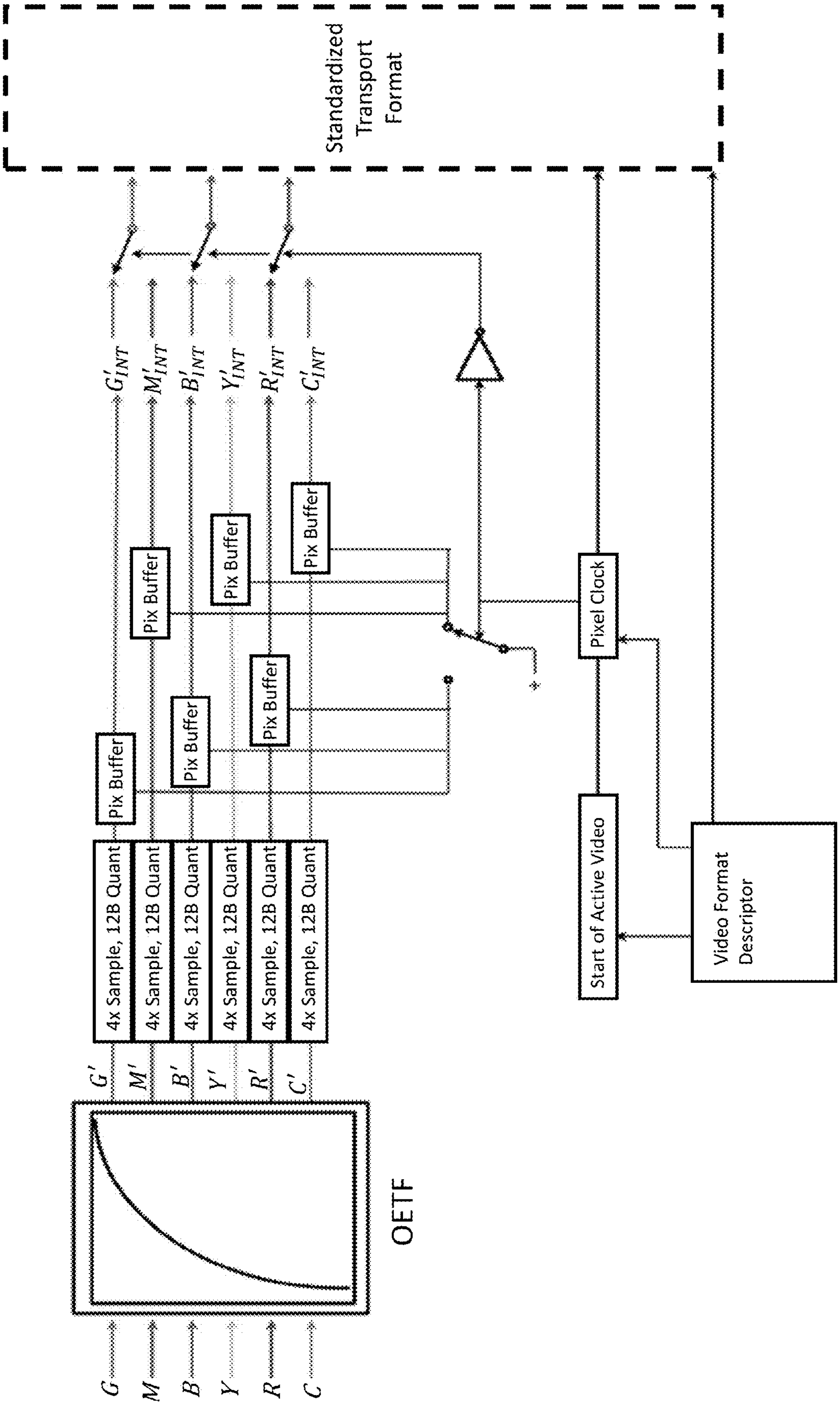
FIG. 19 illustrates an embodiment of the present invention for sending six primary colors to a standardized transport format.

FIG. 19 illustrates an embodiment of the present invention for sending six primary colors to a standardized transport format using a 4:4:4 encoder according to System 2. Encoding is straight forward with a path for RGB sent directly to the transport format. RGB data is mapped to each even numbered data segment in the transport. CYM data is mapped to each odd numbered segment. Because different resolutions are used in all of the standardized transport formats, there must be identification for what they are so that the start of each horizontal line and horizontal pixel count can be identified to time the RGB/CYM mapping to the transport. The identification is the same as currently used in each standardized transport function. TABLE 8, TABLE 9, TABLE 10, and TABLE 11 list 16-bit assignments, 12-bit assignments, 10-bit assignments, and 8-bit assignments, respectively. In one embodiment, "Computer" refers to bit assignments compatible with CTA 861-G, November 2016, which is incorporated herein by reference in its entirety. In one embodiment, "Production" and/or "Broadcast" refer to bit assignments compatible with SMPTE ST 2082-0 (2016), SMPTE ST 2082-1 (2015), SMPTE ST 2082-10 (2015), SMPTE ST 2082-11 (2016), SMPTE ST 2082-12 (2016), SMPTE ST 2110-10 (2017), SMPTE ST 2110-20 (2017), SMPTE ST 2110-21 (2017), SMPTE ST 2110-30 (2017), SMPTE ST 2110-31 (2018), and/or SMPTE ST 2110-40 (2018), each of which is incorporated herein by reference in its entirety

TABLE 8

| 16-Bit Assignments | | | | |
|---|---|---|---|---|
| | Computer | | Production | |
| | RGB | CYM | RGB | CYM |
| Peak Brightness | 65536 | 65536 | 65216 | 65216 |
| Minimum Brightness | 0 | 0 | 256 | 256 |

TABLE 9

| 12-Bit Assignments | | | | | | |
|---|---|---|---|---|---|---|
| | Computer | | Production | | Broadcast | |
| | RGB | CYM | RGB | CYM | RGB | CYM |
| Peak Brightness | 4095 | 4095 | 4076 | 4076 | 3839 | 3839 |
| Minimum Brightness | 0 | 0 | 16 | 16 | 256 | 256 |

TABLE 10

| 10-Bit Assignments | | | | | | |
|---|---|---|---|---|---|---|
| | Computer | | Production | | Broadcast | |
| | RGB | CYM | RGB | CYM | RGB | CYM |
| Peak Brightness | 1023 | 1023 | 1019 | 1019 | 940 | 940 |
| Minimum Brightness | 0 | 0 | 4 | 4 | 64 | 64 |

TABLE 11

| 8-Bit Assignments | | | | | | |
|---|---|---|---|---|---|---|
| | Computer | | Production | | Broadcast | |
| | RGB | CYM | RGB | CYM | RGB | CYM |
| Peak Brightness | 255 | 255 | 254 | 254 | 235 | 235 |
| Minimum Brightness | 0 | 0 | 1 | 1 | 16 | 16 |

Figure 20:
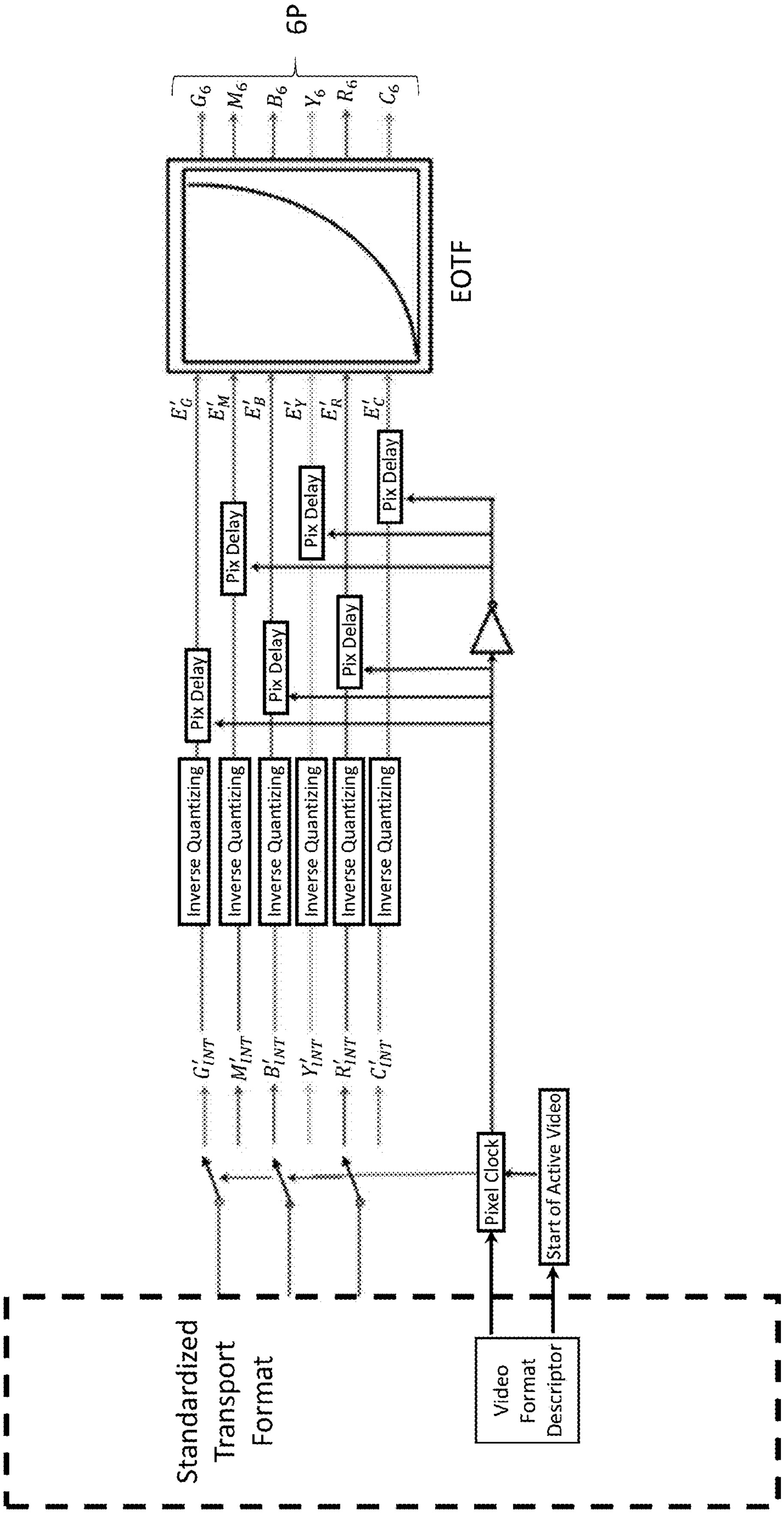
FIG. 20 illustrates one embodiment of a decode process adding a pixel delay to the RGB data for realigning the channels to a common pixel timing.

The decode adds a pixel delay to the RGB data to realign the channels to a common pixel timing. EOTF is applied and the output is sent to the next device in the system. Metadata based on the standardized transport format is used to identify the format and image resolution so that the unpacking from the transport can be synchronized. FIG. 20 shows one embodiment of a decoding with a pixel delay.

In one embodiment, the decoding is 4:4:4 decoding. With this method, the six-primary color decoder is in the signal path, where 11-bit values for RGB are arranged above bit value 2048, while CYM levels are arranged below bit value 2047 as 11-bit. If the same data set is sent to a display and/or process that is not operable for six-primary color processing, the image data is assumed as black at bit value 0 as a full 12-bit word. Decoding begins by tapping image data prior to the unstacking process.

Six-Primary Color Encode Using a 4:2:2 Sampling Method

In one embodiment, the packing/stacking process is for a six-primary color system using a 4:2:2 sampling method. In order to fit the new six-primary color system into a lower bandwidth serial system, while maintaining backwards compatibility, the standard method of converting from RGBCYM to a luminance and a set of color difference signals requires the addition of at least one new image designator. In one embodiment, the encoding and/or decoding process is compatible with transport through SMPTE ST 292-0 (2011), SMPTE ST 292-1 (2011, 2012, and/or 2018), SMPTE ST 292-2 (2011), SMPTE ST 2022-1 (2007), SMPTE ST 2022-2 (2007), SMPTE ST 2022-3 (2010), SMPTE ST 2022-4 (2011), SMPTE ST 2022-5 (2012 and/or 2013), SMPTE ST 2022-6 (2012), SMPTE ST 2022-7 (2013), and/or and CTA 861-G (2106), each of which is incorporated herein by reference in its entirety.

In order for the system to package all of the image while supporting both six-primary and legacy displays, an electronic luminance component (Y) must be derived. The first component is: $E'_{Y_6}$. It can be described as:

$$E'_{Y_6}=0.1063E'_{Red}+0.23195E'_{Yellow}+0.3576E'_{Green}+0.19685E'_{Cyan}+0.0361E'_{Blue}+0.0712E'_{Magenta}$$

Critical to getting back to legacy display compatibility, value $E'_{-Y}$ is described as:

$$E'_{-Y}=E'_{Y_6}-(E'_{Cyan}+E'_{Yellow}+E'_{Magenta})$$

In addition, at least two new color components are disclosed. These are designated as Cc and Cy components. The at least two new color components include a method to compensate for luminance and enable the system to function with older Y Cb Cr infrastructures. In one embodiment, adjustments are made to Cb and Cr in a Y Cb Cr infrastructure since the related level of luminance is operable for division over more components. These new components are as follows:

$$E'_{CR}=\frac{(E'_R-E'_{Y_6})}{1.7874},\ E'_{CB}=\frac{(E'_B-E'_{Y_6})}{1.9278},$$

$$E'_{CC}=\frac{(E'_C-E'_{Y_6})}{1.6063},\ E'_{CY}=\frac{(E'_Y-E'_{Y_6})}{1.5361}$$

Within such a system, it is not possible to define magenta as a wavelength. This is because the green vector in CIE 1976 passes into, and beyond, the CIE designated purple line. Magenta is a sum of blue and red. Thus, in one embodiment, magenta is resolved as a calculation, not as optical data. In one embodiment, both the camera side and the monitor side of the system use magenta filters. In this case, if magenta were defined as a wavelength, it would not land at the point described. Instead, magenta would appear as a very deep blue which would include a narrow bandwidth primary, resulting in metameric issues from using narrow spectral components. In one embodiment, magenta as an integer value is resolved using the following equation:

$$M_{INT}=\left[\frac{\frac{B_{INT}}{2}+\frac{R_{INT}}{2}}{2}\right]$$

The above equation assists in maintaining the fidelity of a magenta value while minimizing any metameric errors. This is advantageous over prior art, where magenta appears instead as a deep blue instead of the intended primary color value.

Six-Primary Non-Constant Luminance Encode Using a 4:2:2 Sampling Method

In one embodiment, the six-primary color system using a non-constant luminance encode for use with a 4:2:2 sampling method. In one embodiment, the encoding process and/or decoding process is compatible with transport through SMPTE ST 292-0 (2011), SMPTE ST 292-1 (2011, 2012, and/or 2018), SMPTE ST 292-2 (2011), SMPTE ST 2022-1 (2007), SMPTE ST 2022-2 (2007), SMPTE ST 2022-3 (2010), SMPTE ST 2022-4 (2011), SMPTE ST 2022-5 (2012 and/or 2013), SMPTE ST 2022-6 (2012), SMPTE ST 2022-7 (2013), and/or and CTA 861-G (2106), each of which is incorporated herein by reference in its entirety.

Figure 21:
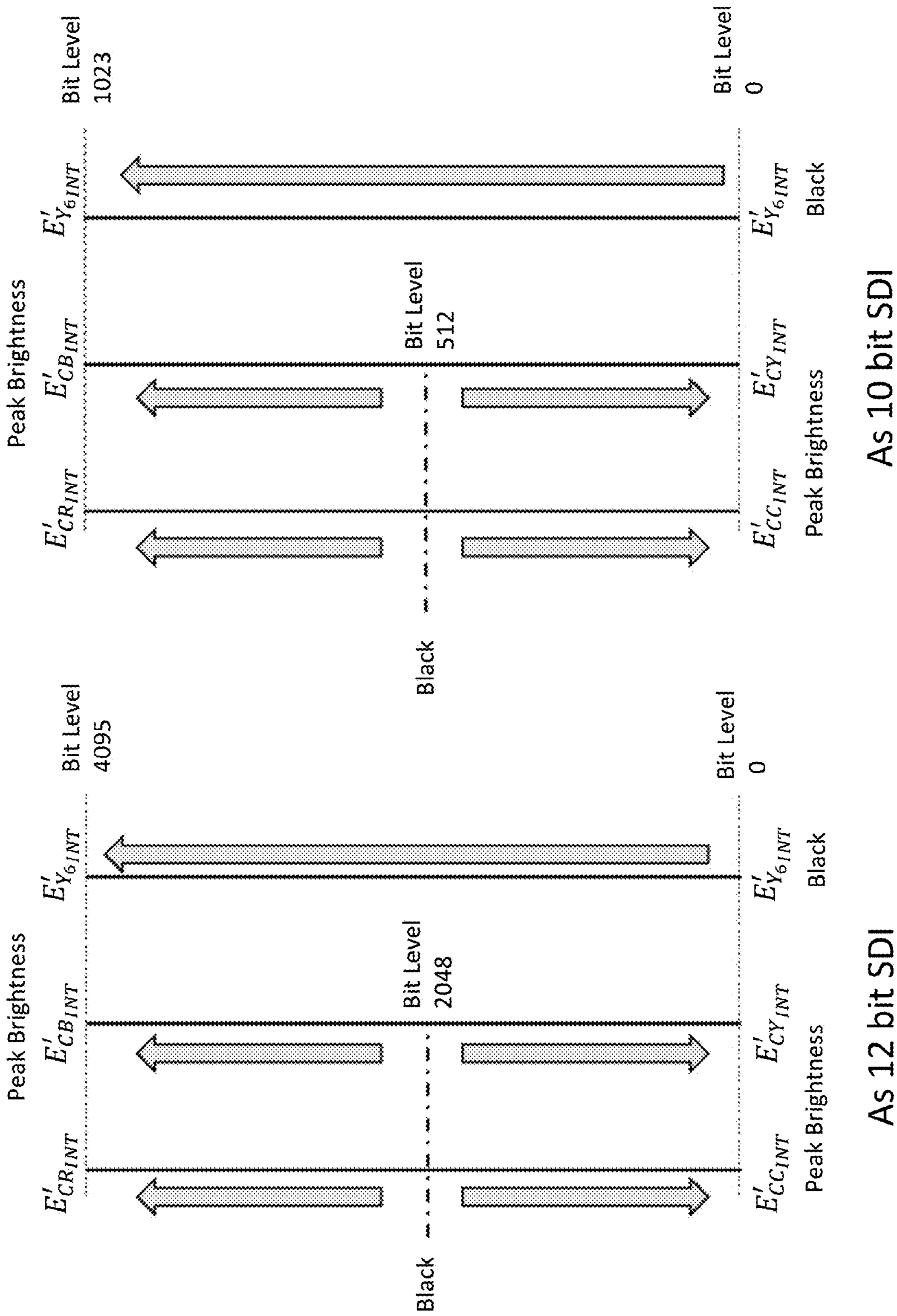
FIG. 21 illustrates one embodiment of an encode process for 4:2:2 video for packaging five channels of information into the standard three-channel designs.

Current practices use a non-constant luminance path design, which is found in all the video systems currently deployed. FIG. 21 illustrates one embodiment of an encode process for 4:2:2 video for packaging five channels of information into the standard three-channel designs. For 4:2:2, a similar method to the 4:4:4 system is used to package five channels of information into the standard three-channel designs used in current serial video standards. FIG. 21 illustrates 12-bit SDI and 10-bit SDI encoding for a 4:2:2 system. TABLE 12 and TABLE 13 list bit assignments for a 12-bit and 10-bit system, respectively. In one embodiment, "Computer" refers to bit assignments compatible with CTA 861-G, November 2016, which is incorporated herein by reference in its entirety. In one embodiment, "Production" and/or "Broadcast" refer to bit assignments compatible with SMPTE ST 2082-0 (2016), SMPTE ST 2082-1 (2015), SMPTE ST 2082-10 (2015), SMPTE ST 2082-11 (2016), SMPTE ST 2082-12 (2016), SMPTE ST 2110-10 (2017), SMPTE ST 2110-20 (2017), SMPTE ST 2110-21 (2017), SMPTE ST 2110-30 (2017), SMPTE ST 2110-31 (2018), and/or SMPTE ST 2110-40 (2018), each of which is incorporated herein by reference in its entirety.

through an electronic optical function transfer (EOTF) in a non-constant luminance system. The individual color components, as well as $E'_{Y_6\text{-}INT}$ are inversely quantized and summed to breakout each individual color. Magenta is then calculated and $E'_{Y_6\text{-}INT}$ is combined with these colors to resolve green. These calculations then go back through an

TABLE 12

| 12-Bit Assignments | | | | | | | | | |
|---|---|---|---|---|---|---|---|---|---|
| | Computer | | | Production | | | Broadcast | | |
| | $EY_6$ | $EC_R$, $EC_B$ | $EC_C$, $EC_Y$ | $EY_6$ | $EC_R$, $EC_B$ | $EC_C$, $EC_Y$ | $EY_6$ | $EC_R$, $EC_B$ | $EC_C$, $EC_Y$ |
| Peak Brightness | 4095 | 4095 | 0 | 4076 | 4076 | 16 | 3839 | 3839 | 256 |
| Minimum Brightness | 0 | 2048 | 2047 | 16 | 2052 | 2032 | 256 | 2304 | 1792 |

TABLE 13

| 10-Bit Assignments | | | | | | | | | |
|---|---|---|---|---|---|---|---|---|---|
| | Computer | | | Production | | | Broadcast | | |
| | $EY_6$ | $EC_R$, $EC_B$ | $EC_C$, $EC_Y$ | $EY_6$ | $EC_R$, $EC_B$ | $EC_C$, $EC_Y$ | $EY_6$ | $EC_R$, $EC_B$ | $EC_C$, $EC_Y$ |
| Peak Brightness | 1023 | 1023 | 0 | 1019 | 1019 | 4 | 940 | 940 | 64 |
| Minimum Brightness | 0 | 512 | 511 | 4 | 516 | 508 | 64 | 576 | 448 |

Figure 22:
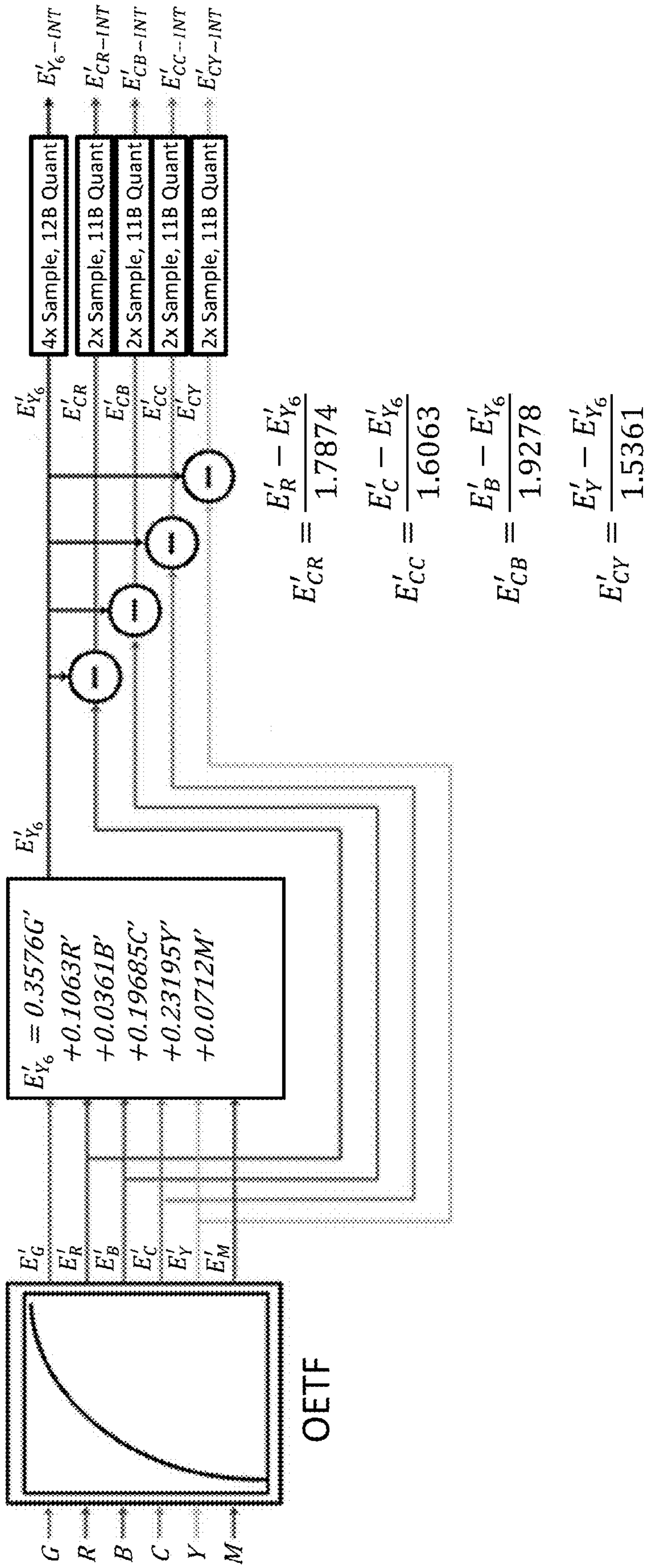
FIG. 22 illustrates one embodiment for a non-constant luminance encode for a six-primary color system.

FIG. 22 illustrates one embodiment for a non-constant luminance encoding process for a six-primary color system. The design of this process is similar to the designs used in current RGB systems. Input video is sent to the Optical Electronic Transfer Function (OETF) process and then to the $E_{Y_6}$ encoder. The output of this encoder includes all of the image detail information. In one embodiment, all of the image detail information is output as a monochrome image.

The output is then subtracted from $E'_R$, $E'_B$, $E'_C$, and $E'_Y$ to make the following color difference components:

$E'_{CR}, E'_{CB}, E'_{CC}, E'_{CY}$

These components are then half sampled (x2) while $E'_{Y_6}$ is fully sampled (x4).

Figure 23:
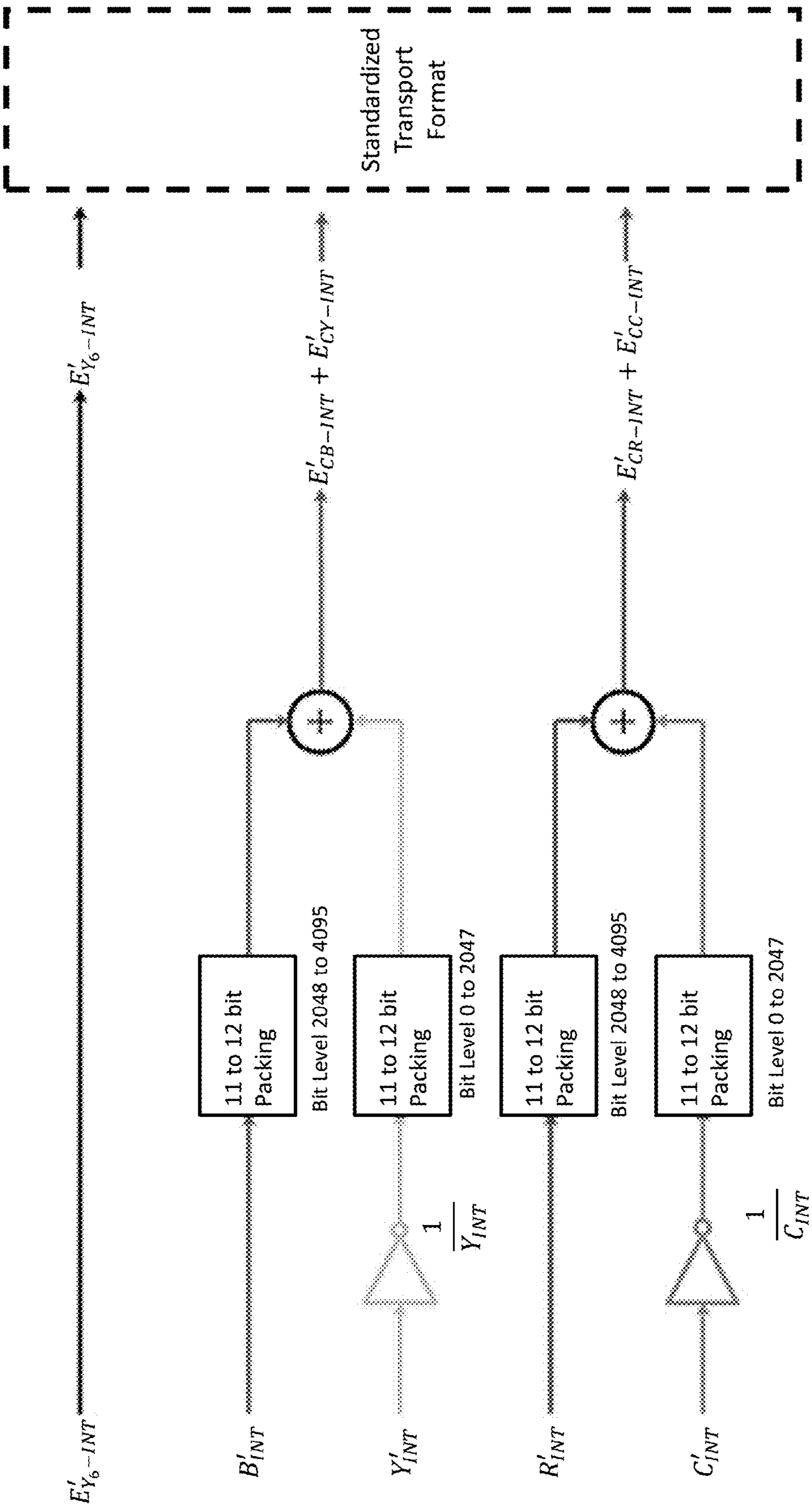
FIG. 23 illustrates one embodiment of a packaging process for a six-primary color system.

FIG. 23 illustrates one embodiment of a packaging process for a six-primary color system. These components are then sent to the packing/stacking process. Components $E'_{CY\text{-}INT}$ and $E'_{CC\text{-}INT}$ are inverted so that bit 0 now defines peak luminance for the corresponding component. In one embodiment, this is the same packaging process performed with the 4:4:4 sampling method design, resulting in two 11-bit components combining into one 12-bit component.

Six-Primary Non-Constant Luminance Decode Using a 4:2:2 Sampling Method

Figure 24:
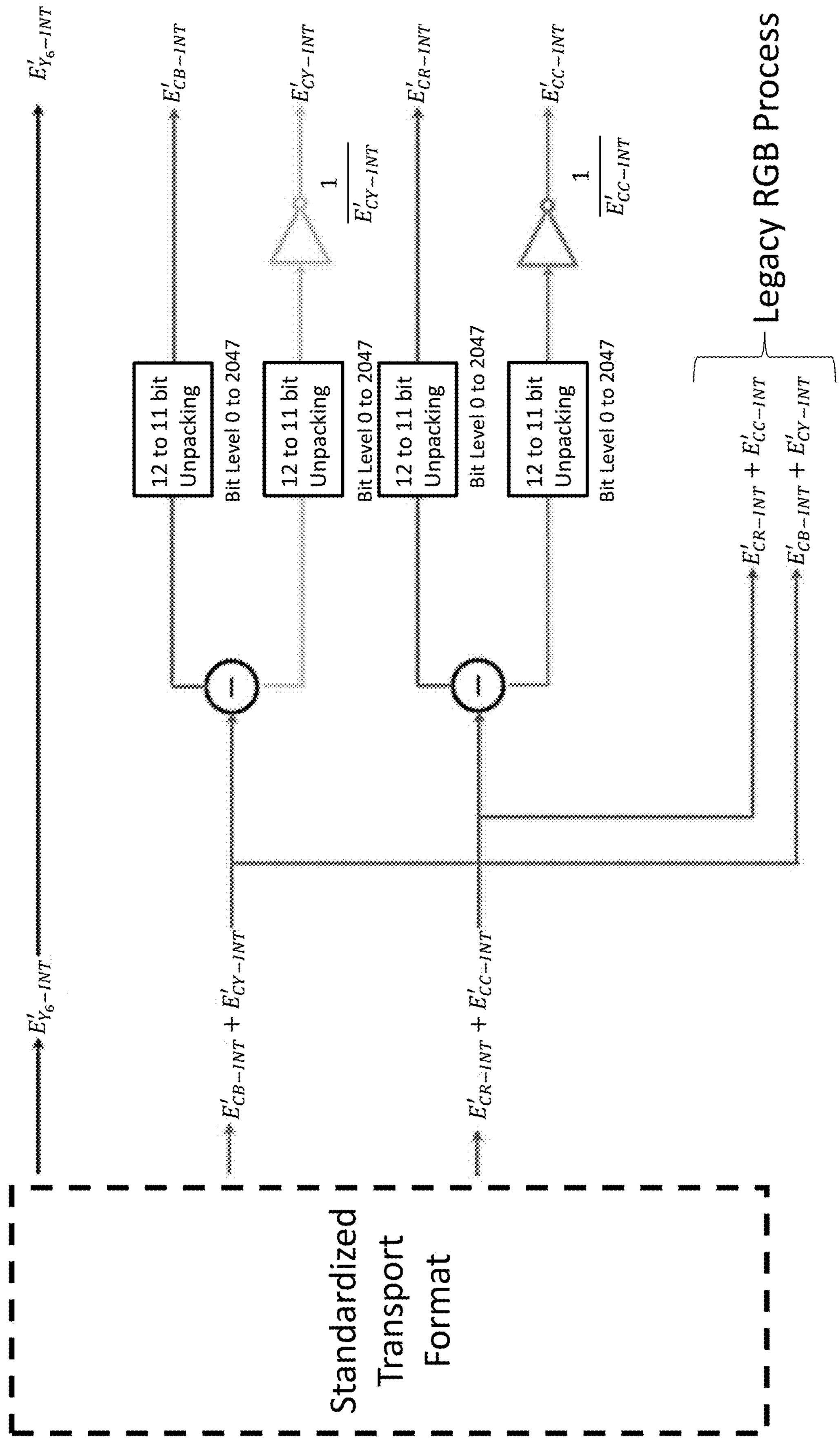
FIG. 24 illustrates a 4:2:2 unstack process for a six-primary color system.

FIG. 24 illustrates a 4:2:2 unstack process for a six-primary color system. In one embodiment, the image data is extracted from the serial format through the normal processes as defined by the serial data format standard. In another embodiment, the serial data format standard uses a 4:2:2 sampling structure. In yet another embodiment, the serial data format standard is SMPTE ST292. The color difference components are separated and formatted back to valid 11-bit data. Components $E'_{CY\text{-}INT}$ and $E'_{CC\text{-}INT}$ are inverted so that bit value 2047 defines peak color luminance.

Figure 25:
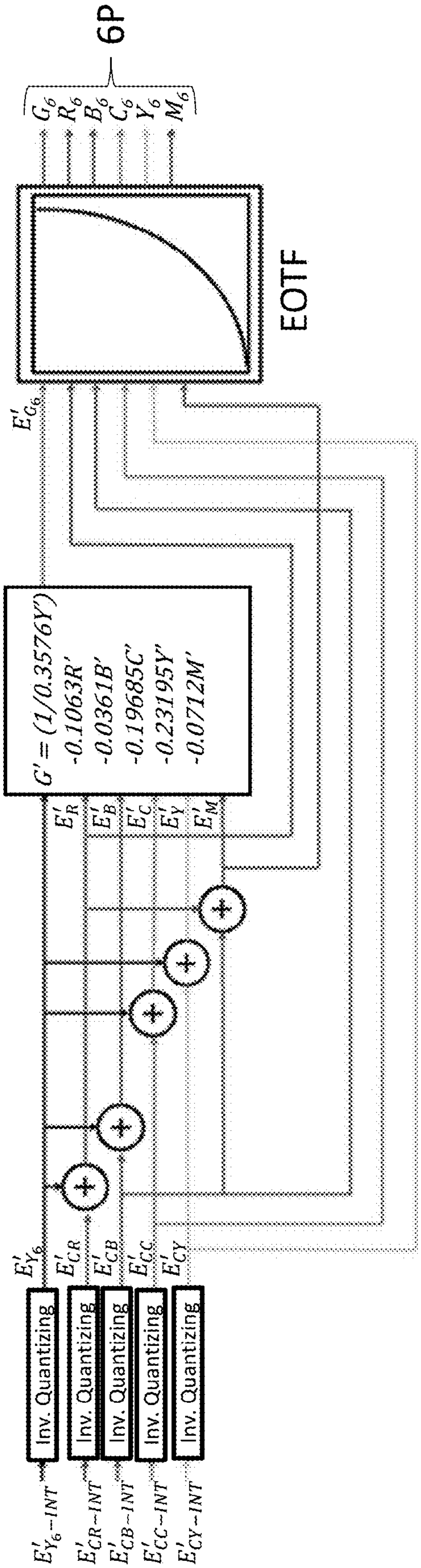
FIG. 25 illustrates one embodiment of a process to inversely quantize each individual color and pass the data through an electronic optical function transfer (EOTF) in a non-constant luminance system.

FIG. 25 illustrates one embodiment of a process to inversely quantize each individual color and pass the data Electronic Optical Transfer Function (EOTF) process to output the six-primary color system.

In one embodiment, the decoding is 4:2:2 decoding. This decode follows the same principles as the 4:4:4 decoder. However, in 4:2:2 decoding, a luminance channel is used instead of discrete color channels. Here, image data is still taken prior to unstack from the $E'_{CB\text{-}INT}+E'_{CY\text{-}INT}$ and $E'_{CR\text{-}INT}+E'_{CC\text{-}INT}$ channels. With a 4:2:2 decoder, a new component, called ELI', is used to subtract the luminance levels that are present from the CYM channels from the $E'_{CB\text{-}INT}+E'_{CY\text{-}INT}$ and $E'_{CR\text{-}INT}+E'_{CC\text{-}INT}$ components. The resulting output is now the R and B image components of the EOTF process. $E'_{\_Y}$ is also sent to the G matrix to convert the luminance and color difference components to a green output. Thus, R'G'B' is input to the EOTF process and output as $G_{RGB}$, $R_{RGB}$, and $B_{RGB}$. In another embodiment, the decoder is a legacy RGB decoder for non-constant luminance systems.

In one embodiment, the standard is SMPTE ST292. In one embodiment, the standard is SMPTE RP431-2. In one embodiment, the standard is ITU-R BT.2020. In another embodiment, the standard is SMPTE RP431-1. In another embodiment, the standard is ITU-R BT.1886. In another embodiment, the standard is SMPTE ST274. In another embodiment, the standard is SMPTE ST296. In another embodiment, the standard is SMPTE ST2084. In yet another embodiment, the standard is ITU-R BT.2100. In yet another embodiment, the standard is SMPTE ST424. In yet another embodiment, the standard is SMPTE ST425. In yet another embodiment, the standard is SMPTE ST2110.

Six-Primary Constant Luminance Decode Using a 4:2:2 Sampling Method

Figure 26:
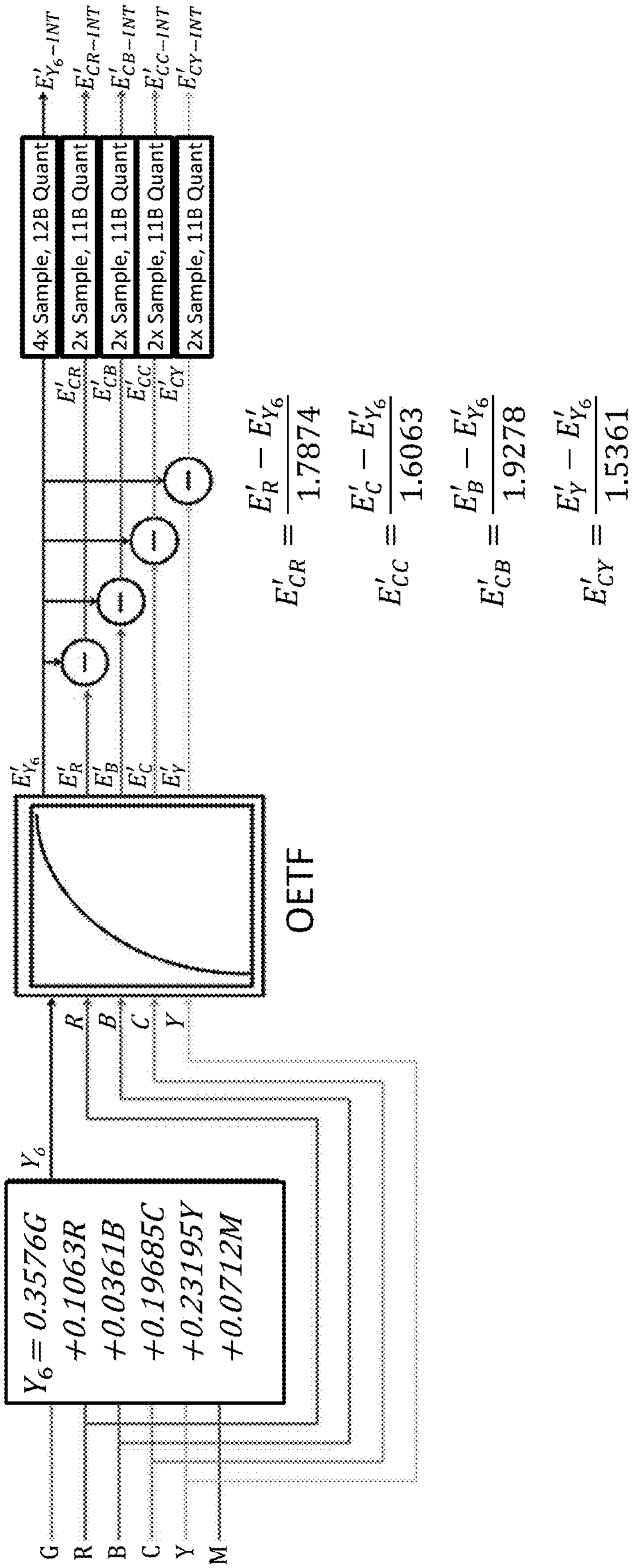
FIG. 26 illustrates one embodiment of a constant luminance encode for a six-primary color system.
Figure 27:
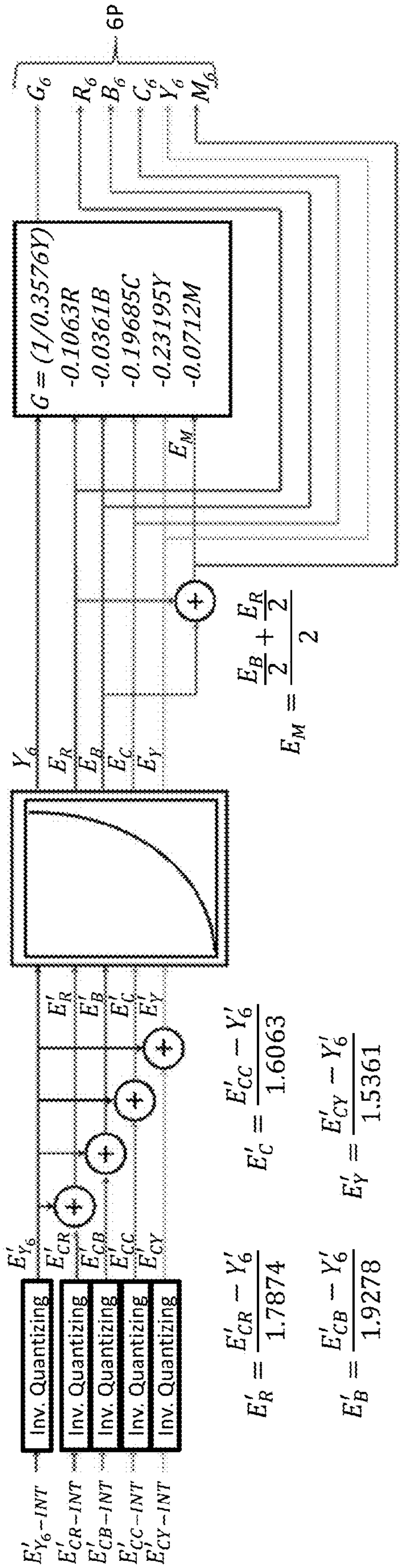
FIG. 27 illustrates one embodiment of a constant luminance decode for a six-primary color system.

FIG. 26 illustrates one embodiment of a constant luminance encode for a six-primary color system. FIG. 27 illustrates one embodiment of a constant luminance decode for a six-primary color system. The process for constant luminance encode and decode are very similar. The main difference being that the management of $E_{Y_6}$ is linear. The encode and decode processes stack into the standard serial data streams in the same way as is present in a non-constant luminance, six-primary color system. In one embodiment, the stacker design is the same as with the non-constant luminance system.

System 2 operation is using a sequential method of mapping to the standard transport instead of the method in System 1 where pixel data is combined to two color primaries in one data set as an 11-bit word. The advantage of System 1 is that there is no change to the standard transport. The advantage of System 2 is that full bit level video can be transported, but at double the normal data rate.

The difference between the systems is the use of two Y channels in System 2. $Y_{RGB}$ and $Y_{CYM}$ are used to define the luminance value for RGB as one group and CYM for the other.

Figure 28:
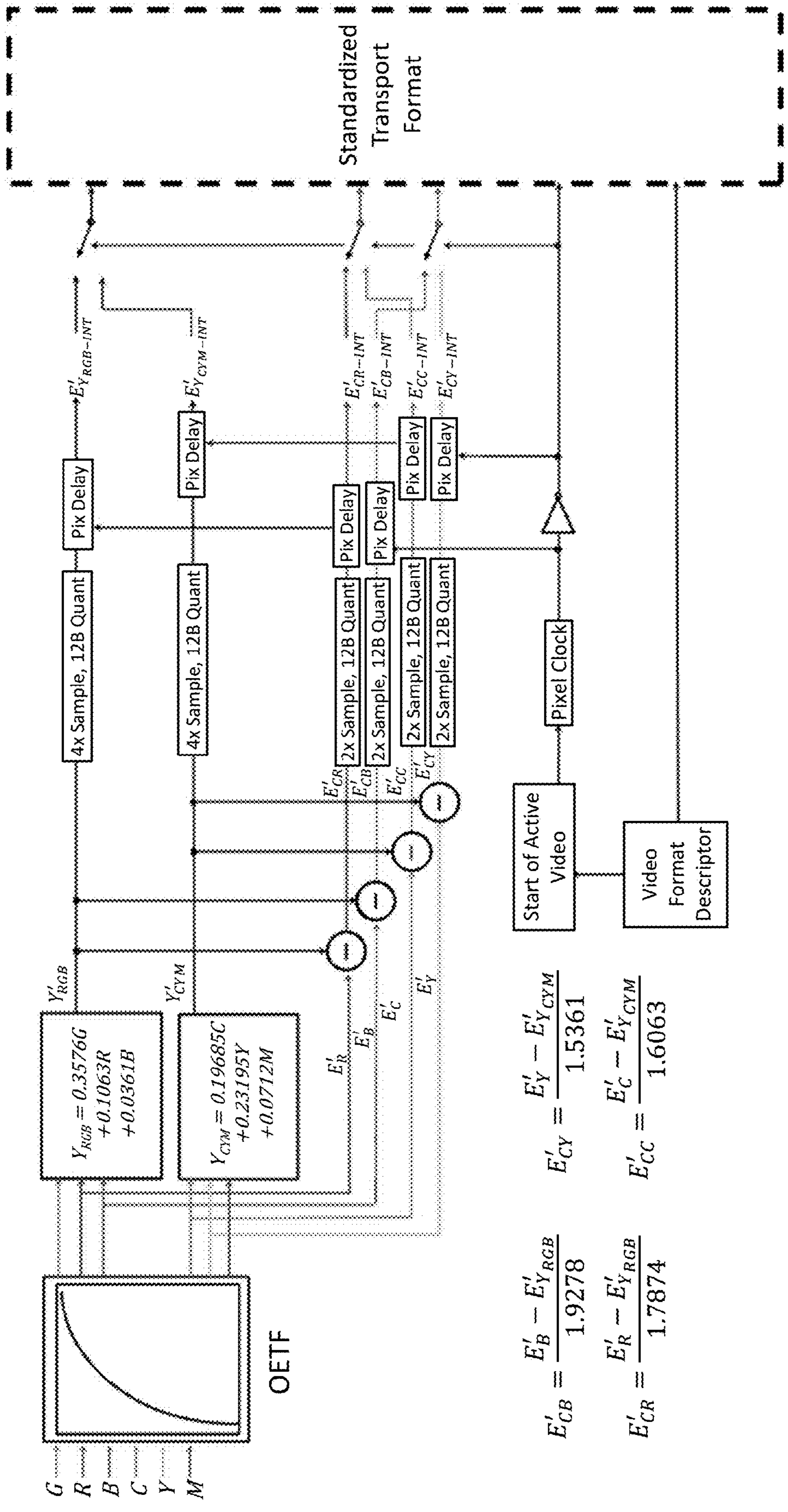
FIG. 28 illustrates one example of 4:2:2 non-constant luminance encoding.

FIG. 28 illustrates one example of 4:2:2 non-constant luminance encoding. Because the RGB and CYM components are mapped at different time intervals, there is no requirement for a stacking process and data is fed directly to the transport format. The development of the separate color difference components is identical to System 1.

The encoder for System 2 takes the formatted color components in the same way as System 1. Two matrices are used to build two luminance channels. $Y_{RGB}$ contains the luminance value for the RGB color primaries. $Y_{CYM}$ contains the luminance value for the CYM color primaries. A set of delays are used to sequence the proper channel for $Y_{RGB}$, $Y_{CMY}$, and the RBCY channels. Because the RGB and CYM components are mapped at different time intervals, there is no requirement for a stacking process, and data is fed directly to the transport format. The development of the separate color difference components is identical to System 1. The Encoder for System 2 takes the formatted color components in the same way as System 1. Two matrices are used to build two luminance channels: $Y_{RGB}$ contains the luminance value for the RGB color primaries and $Y_{CMY}$ contains the luminance value for the CMY color primaries. This sequences $Y_{RGB}$, CR, and CC channels into the even segments of the standardized transport and $Y_{CMY}$, CB, and CY into the odd numbered segments. Since there is no combining color primary channels, full bit levels can be used limited only by the design of the standardized transport method. In addition, for use in matrix driven displays, there is no change to the input processing and only the method of outputting the correct color is required if the filtering or emissive subpixel is also placed sequentially.

Timing for the sequence is calculated by the source format descriptor which then flags the start of video and sets the pixel timing.

Figure 29:
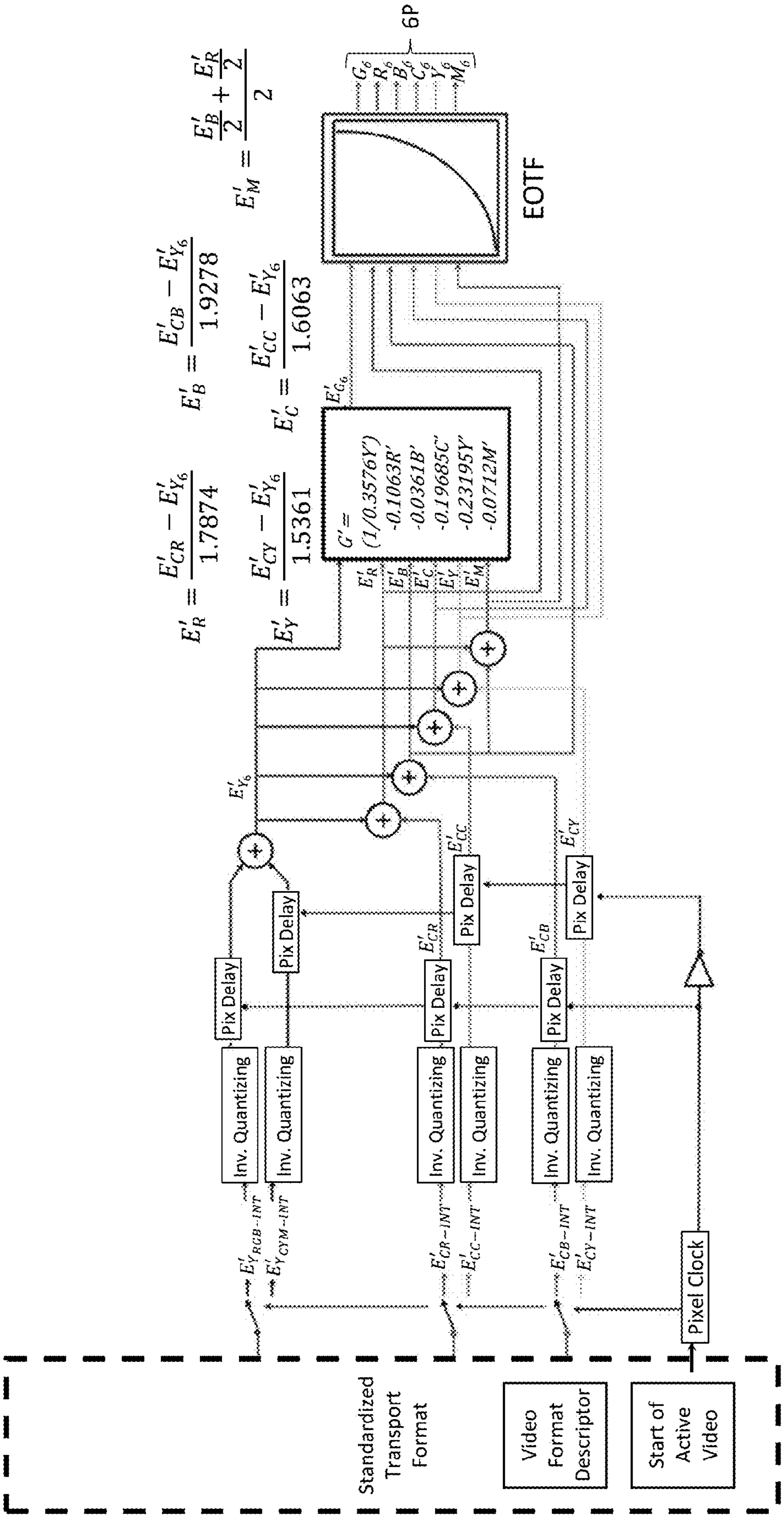
FIG. 29 illustrates one embodiment of a non-constant luminance decoding system.

FIG. 29 illustrates one embodiment of a non-constant luminance decoding system. Decoding uses timing synchronization from the format descriptor and start of video flags that are included in the payload ID, SDP, or EDID tables. This starts the pixel clock for each horizontal line of identify which set of components are routed to the proper part of the decoder. A pixel delay is used to realign the color primarily data of each subpixel. $Y_{RGB}$ and $Y_{CMY}$ are combined to assemble a new $Y_6$ component which is used to decode the CR, CB, CC, CY, and CM components into RGBCYM.

Figure 30:
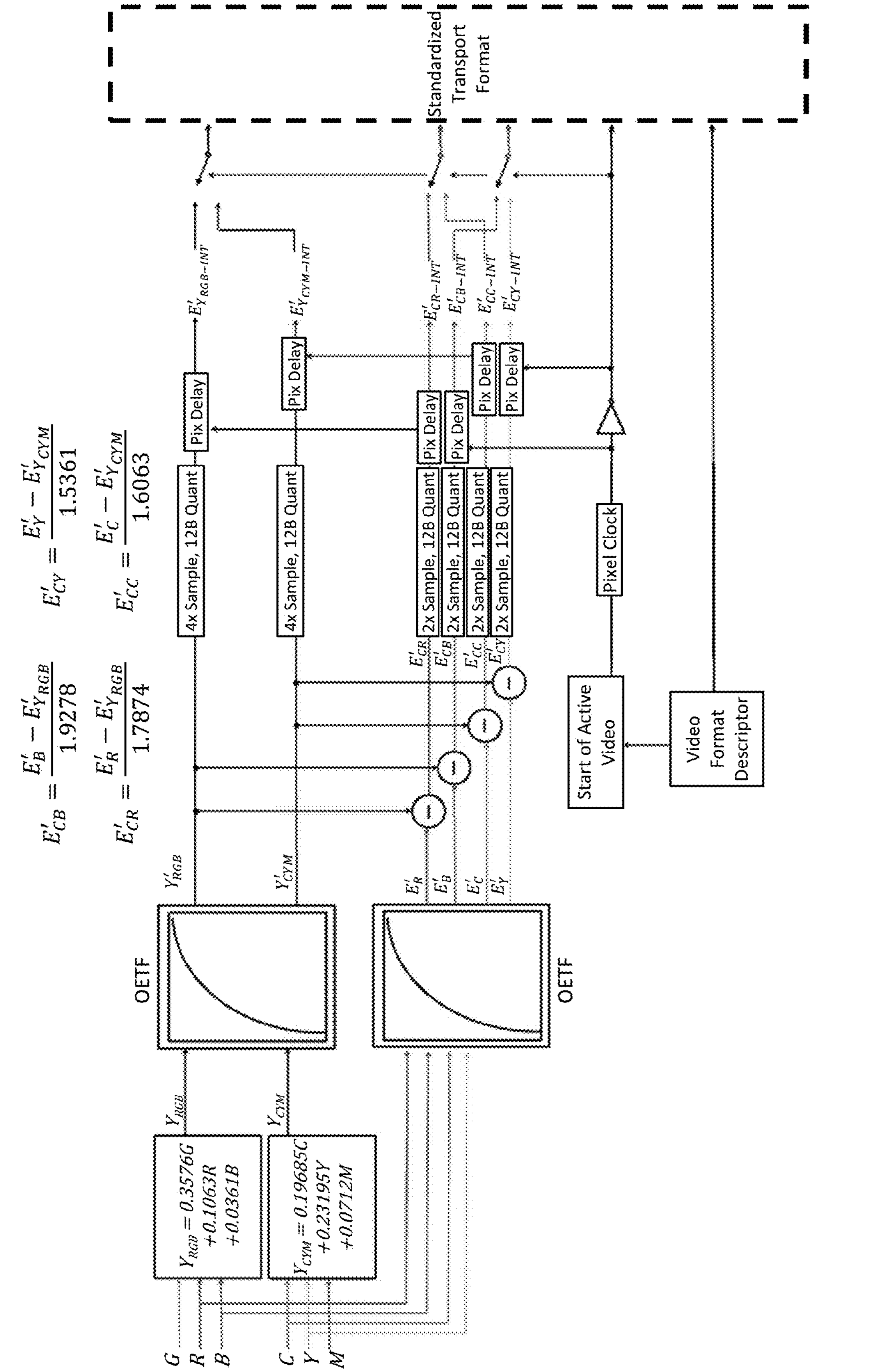
FIG. 30 illustrates one embodiment of a 4:2:2 constant luminance encoding system.
Figure 31:
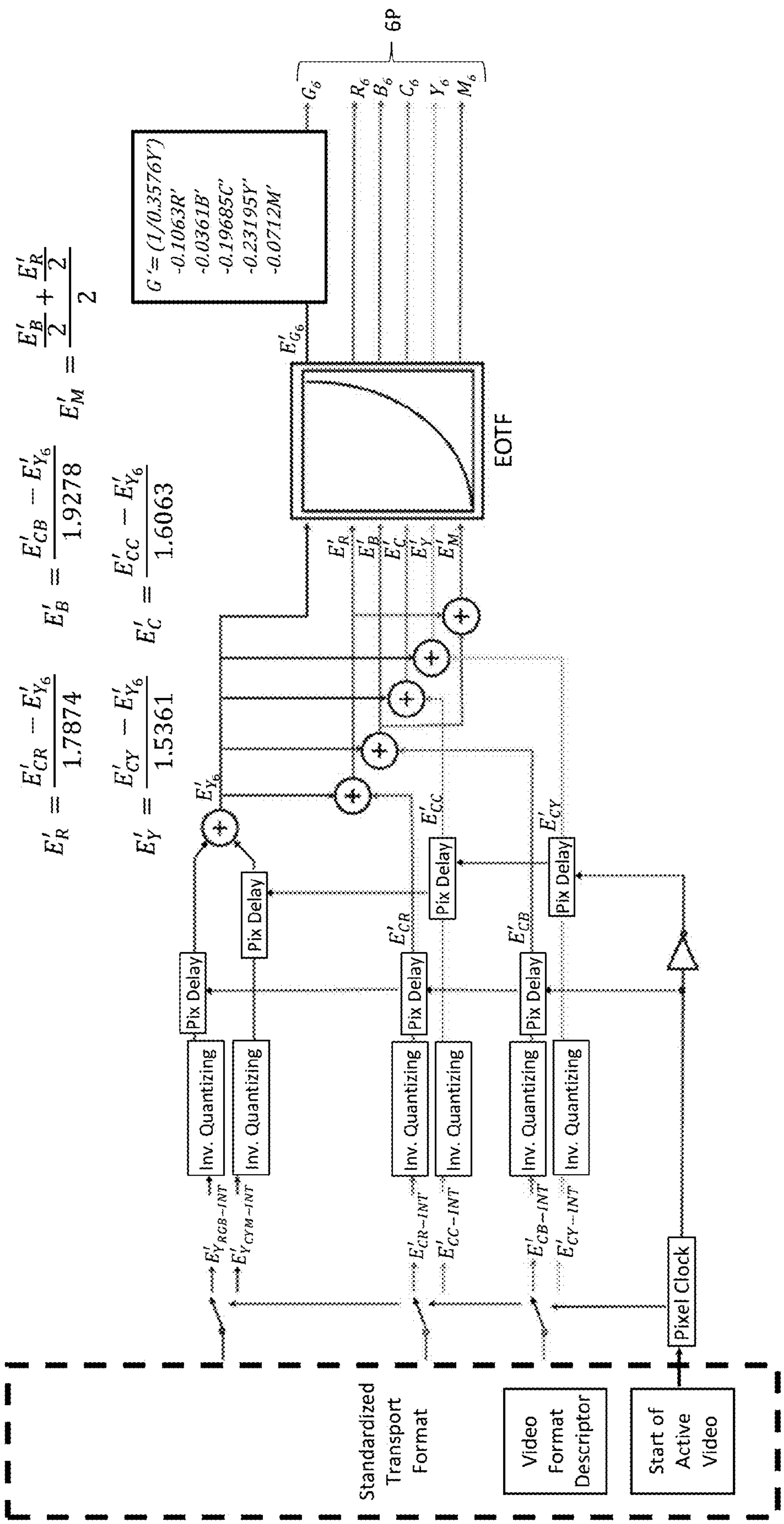
FIG. 31 illustrates one embodiment of a 4:2:2 constant luminance decoding system.

The constant luminance system is not different from the non-constant luminance system in regard to operation. The difference is that the luminance calculation is done as a linear function instead of including the OOTF. FIG. 30 illustrates one embodiment of a 4:2:2 constant luminance encoding system. FIG. 31 illustrates one embodiment of a 4:2:2 constant luminance decoding system.

Six-Primary Color System Using a 4:2:0 Sampling System

In one embodiment, the six-primary color system uses a 4:2:0 sampling system. The 4:2:0 format is widely used in H.262/MPEG-2, H.264/MPEG-4 Part 10 and VC-1 compression. The process defined in SMPTE RP2050-1 provides a direct method to convert from a 4:2:2 sample structure to a 4:2:0 structure. When a 4:2:0 video decoder and encoder are connected via a 4:2:2 serial interface, the 4:2:0 data is decoded and converted to 4:2:2 by up-sampling the color difference component. In the 4:2:0 video encoder, the 4:2:2 video data is converted to 4:2:0 video data by down-sampling the color difference component.

There typically exists a color difference mismatch between the 4:2:0 video data from the 4:2:0 video data to be encoded. Several stages of codec concatenation are common through the processing chain. As a result, color difference signal mismatch between 4:2:0 video data input to 4:2:0 video encoder and 4:2:0 video output from 4:2:0 video decoder is accumulated and the degradation becomes visible.

Filtering within a Six-Primary Color System Using a 4:2:0 Sampling Method

When a 4:2:0 video decoder and encoder are connected via a serial interface, 4:2:0 data is decoded and the data is converted to 4:2:2 by up-sampling the color difference component, and then the 4:2:2 video data is mapped onto a serial interface. In the 4:2:0 video encoder, the 4:2:2 video data from the serial interface is converted to 4:2:0 video data by down-sampling the color difference component. At least one set of filter coefficients exists for 4:2:0/4:2:2 up-sampling and 4:2:2/4:2:0 down-sampling. The at least one set of filter coefficients provide minimally degraded 4:2:0 color difference signals in concatenated operations.

Filter Coefficients in a Six-Primary Color System Using a 4:2:0 Sampling Method

Figure 32:
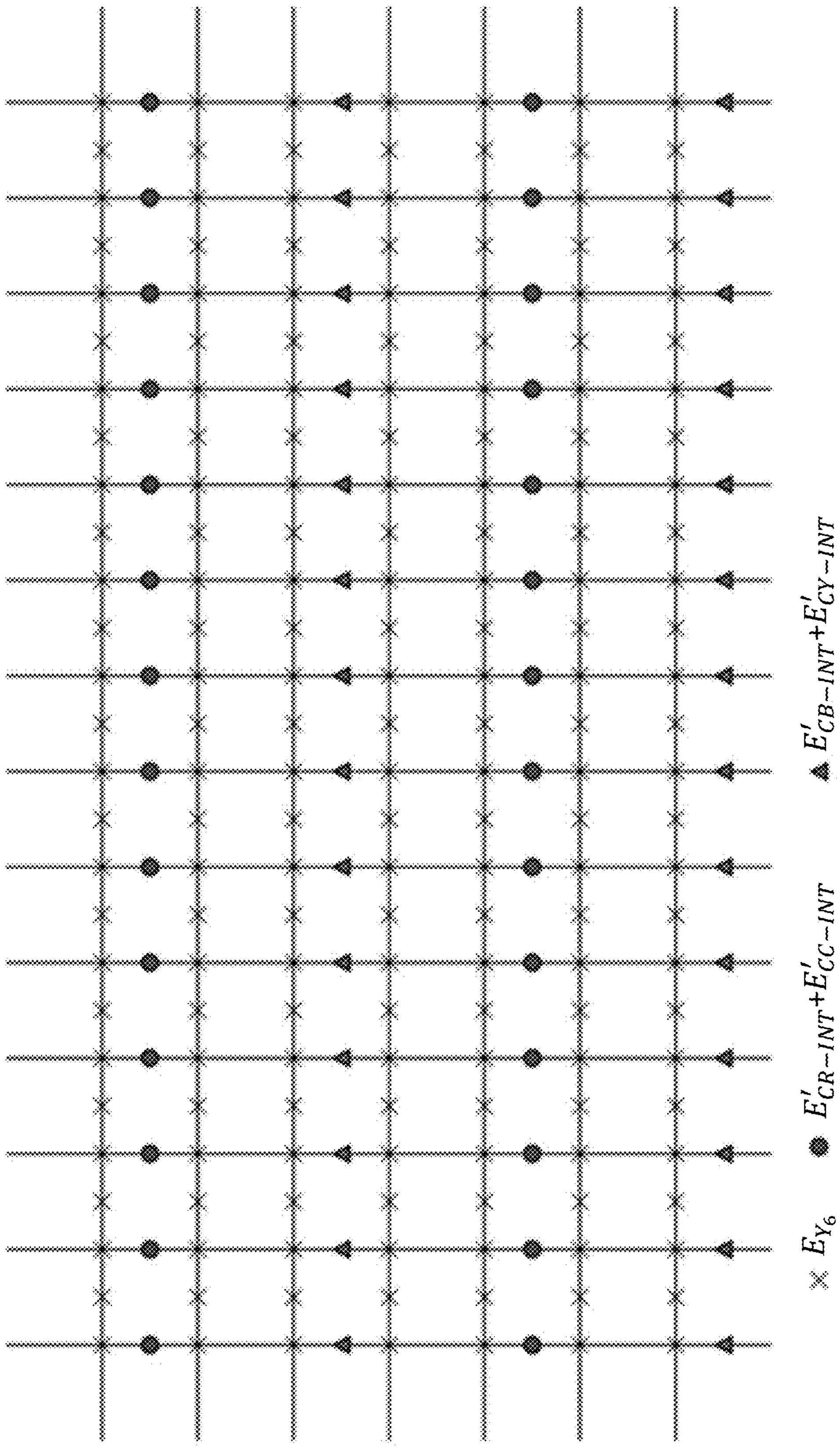
FIG. 32 illustrates a raster encoding diagram of sample placements for a six-primary color system.

FIG. 32 illustrates one embodiment of a raster encoding diagram of sample placements for a six-primary color 4:2:0 progressive scan system. Within this compression process, horizontal lines show the raster on a display matrix. Vertical lines depict drive columns. The intersection of these is a pixel calculation. Data around a particular pixel is used to calculate color and brightness of the subpixels. Each "X" shows placement timing of the $E_{Y_6\text{-}INT}$ sample. Red dots depict placement of the $EE'_{CR\text{-}INT}+E'_{CC\text{-}INT}$ sample. Blue triangles show placement of the $E'_{CB\text{-}INT}+E'_{CY\text{-}INT}$ sample.

In one embodiment, the raster is an RGB raster. In another embodiment, the raster is a RGBCYM raster.

Six-Primary Color System Backwards Compatibility

By designing the color gamut within the saturation levels of standard formats and using inverse color primary positions, it is easy to resolve an RGB image with minimal processing. In one embodiment for six-primary encoding, image data is split across three color channels in a transport system. In one embodiment, the image data is read as six-primary data. In another embodiment, the image data is read as RGB data. By maintaining a standard white point, the axis of modulation for each channel is considered as values describing two colors (e.g., blue and yellow) for a six-primary system or as a single color (e.g., blue) for an RGB system. This is based on where black is referenced. In one embodiment of a six-primary color system, black is decoded at a mid-level value. In an RGB system, the same data stream is used, but black is referenced at bit zero, not a mid-level.

In one embodiment, the RGB values encoded in the 6P stream are based on ITU-R BT.709. In another embodiment, the RGB values encoded are based on SMPTE RP431. Advantageously, these two embodiments require almost no processing to recover values for legacy display.

Two decoding methods are proposed. The first is a preferred method that uses very limited processing, negating any issues with latency. The second is a more straightforward method using a set of matrices at the end of the signal path to conform the 6P image to RGB.

In one embodiment, the decoding is for a 4:4:4 system. In one embodiment, the assumption of black places the correct data with each channel. If the 6P decoder is in the signal path, 11-bit values for RGB are arranged above bit value 2048, while CYM level are arranged below bit value 2047 as 11-bit. However, if this same data set is sent to a display or process that is does not understand 6P processing, then that image data is assumed as black at bit value 0 as a full 12-bit word.

Figure 33:
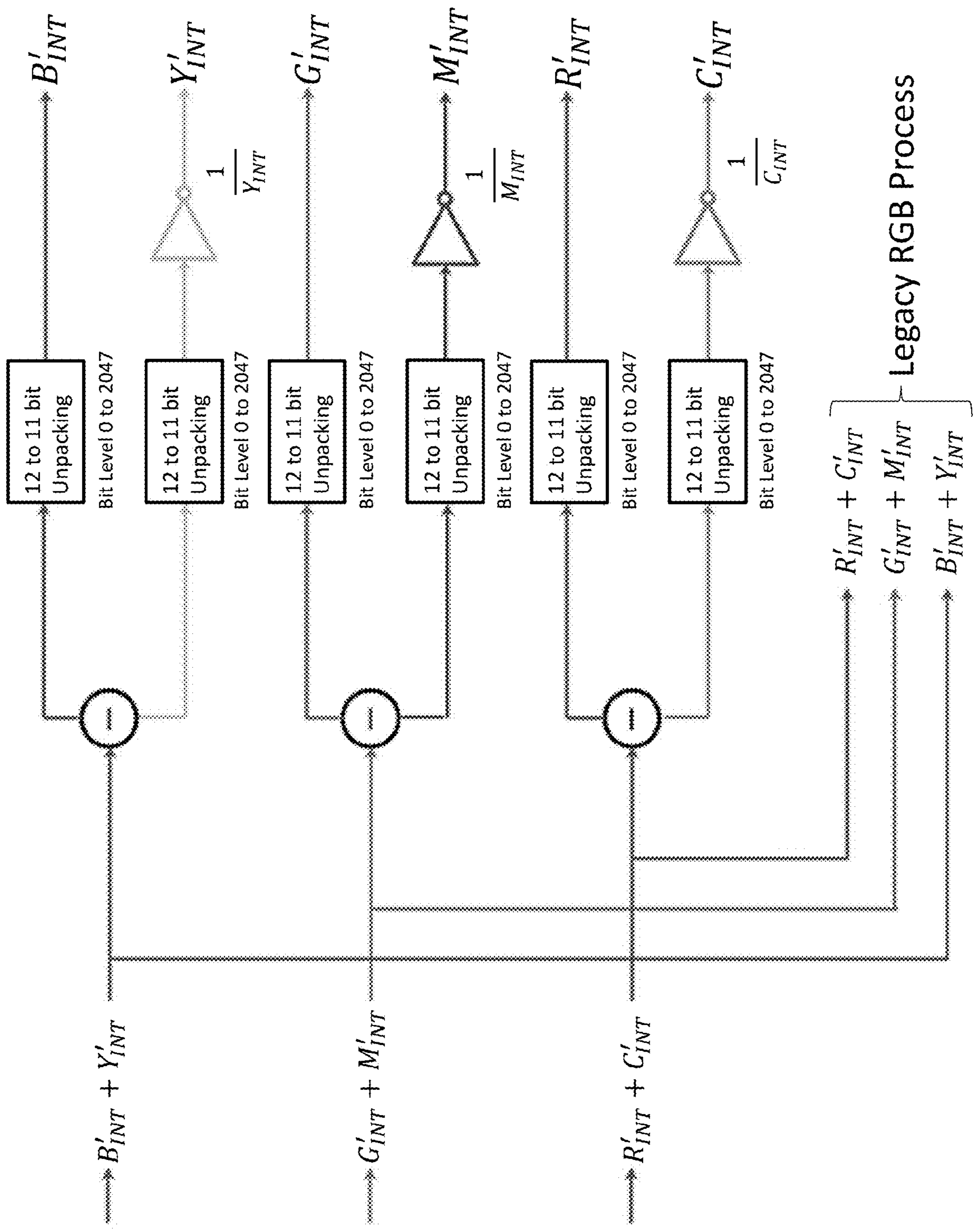
FIG. 33 illustrates one embodiment of the six-primary color unstack process in a 4:2:2 video system.
Figure 34:
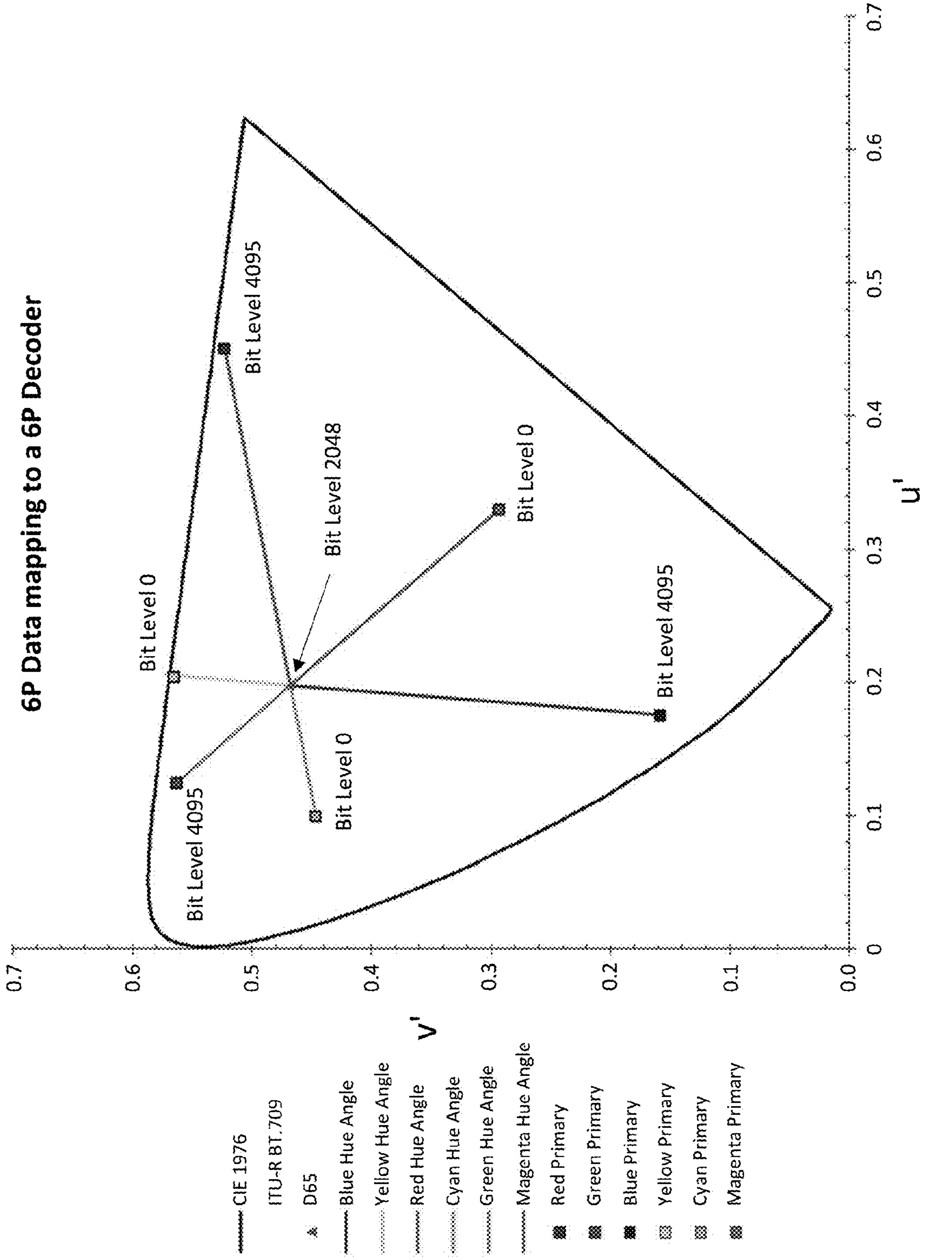
FIG. 34 illustrates one embodiment of mapping input to the six-primary color system unstack process.
Figure 35:
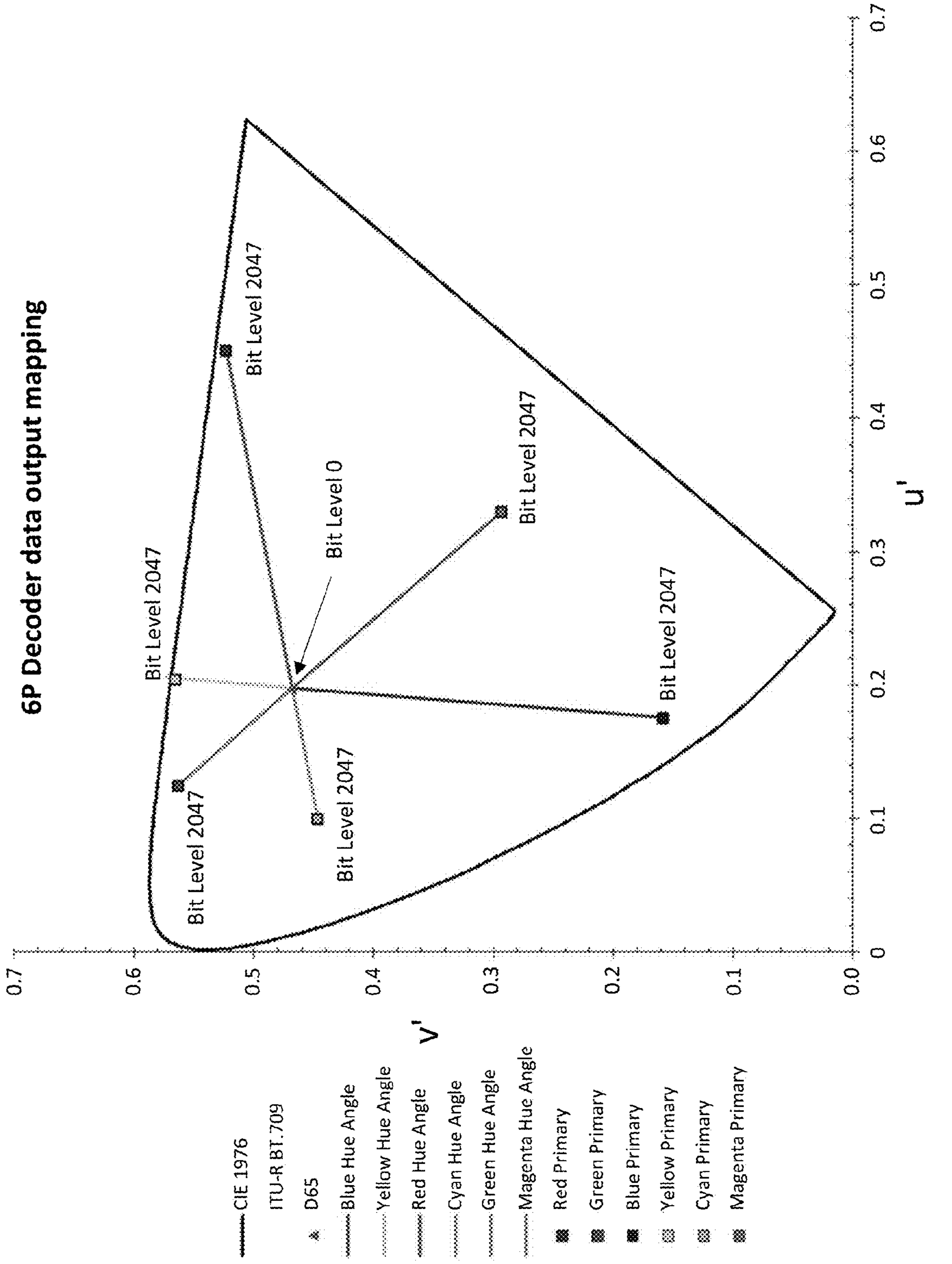
FIG. 35 illustrates one embodiment of mapping the output of a six-primary color system decoder.
Figure 36:
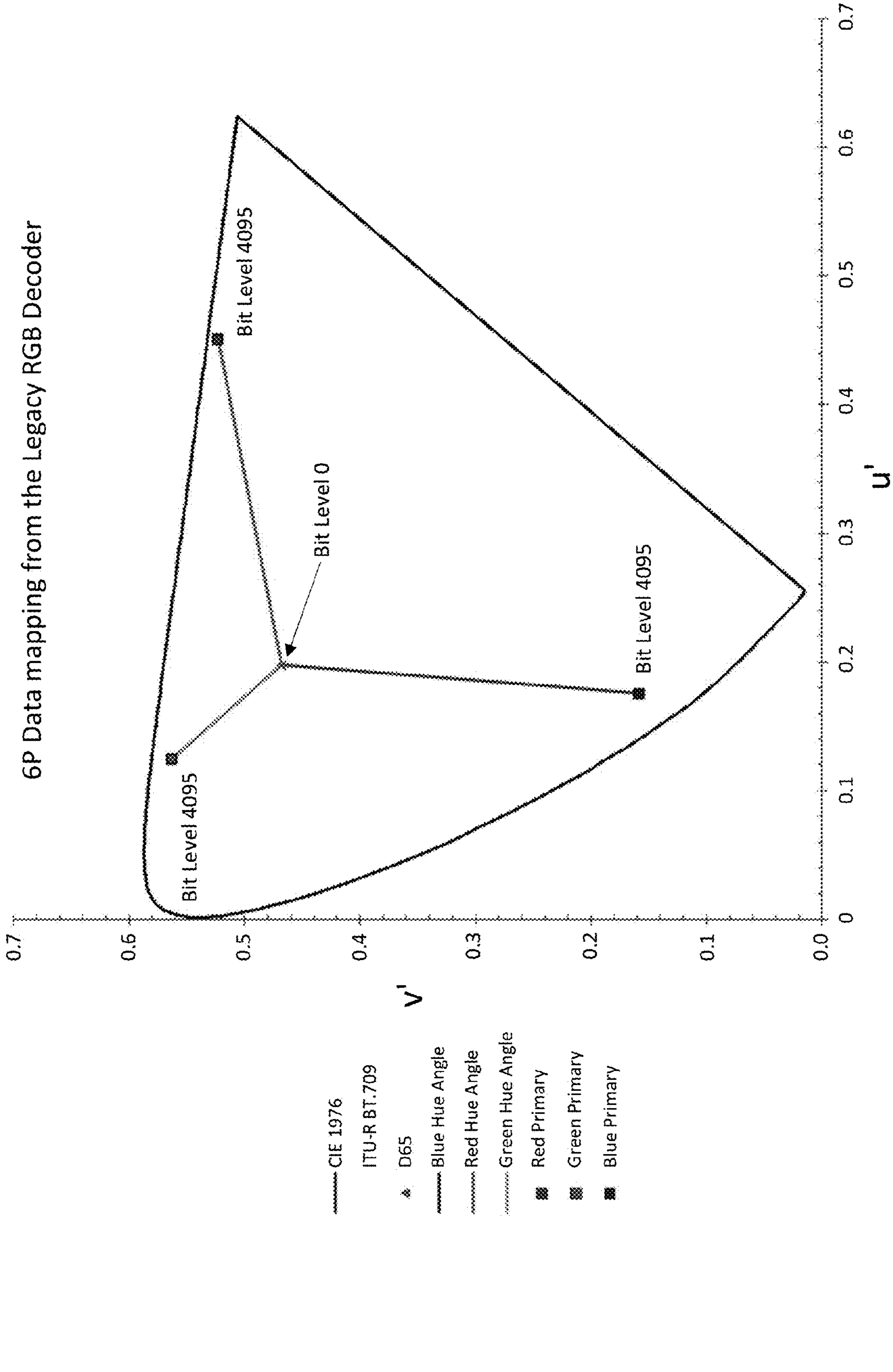
FIG. 36 illustrates one embodiment of mapping the RGB decode for a six-primary color system.

FIG. 33 illustrates one embodiment of the six-primary color unstack process in a 4:2:2 video system. Decoding starts by tapping image data prior to the unstacking process. The input to the 6P unstack will map as shown in FIG. 34. The output of the 6P decoder will map as shown in FIG. 35. This same data is sent uncorrected as the legacy RGB image data. The interpretation of the RGB decode will map as shown in FIG. 36.

Figure 37:
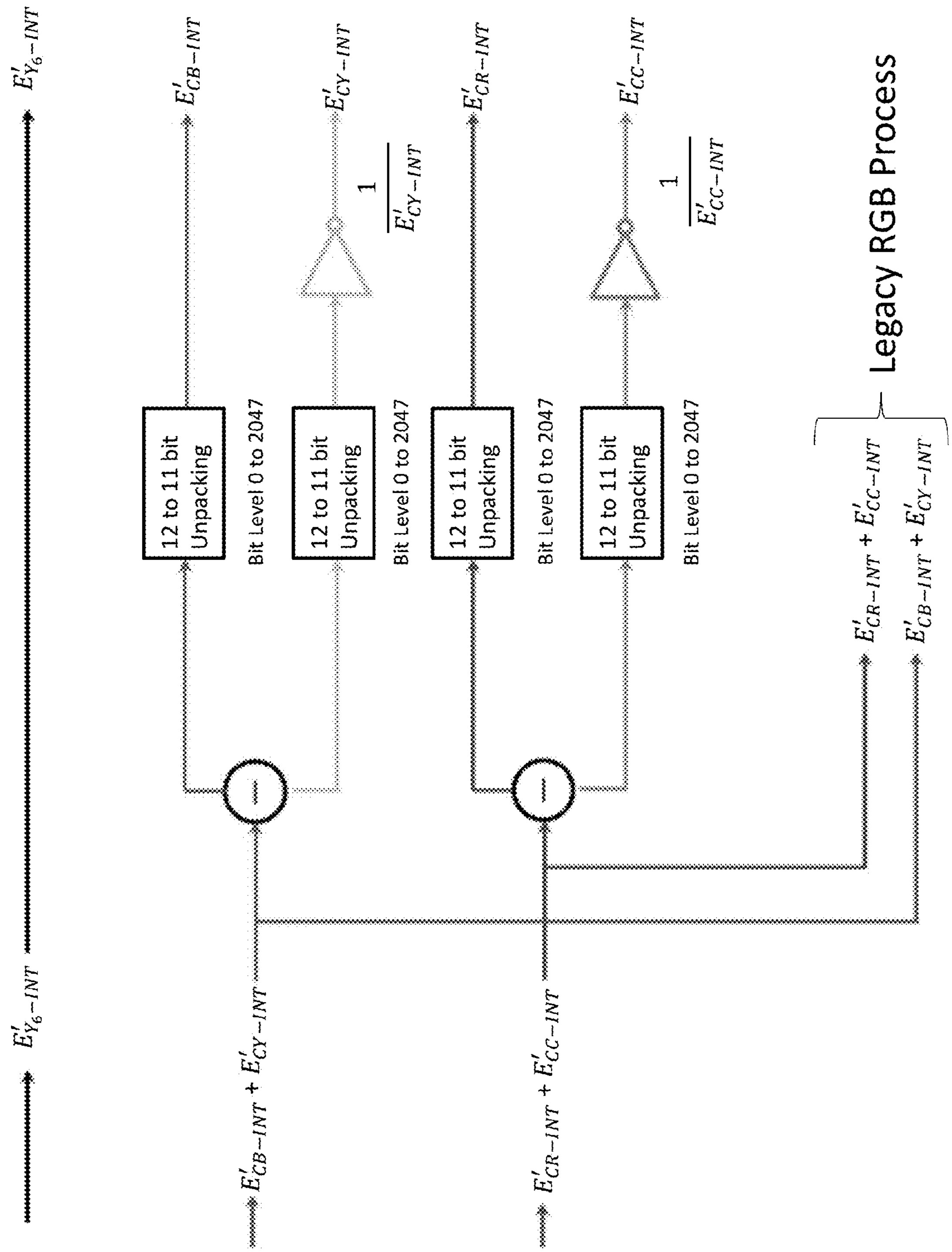
FIG. 37 illustrates one embodiment of an unstack system for a six-primary color system.

Alternatively, the decoding is for a 4:2:2 system. This decode uses the same principles as the 4:4:4 decoder, but because a luminance channel is used instead of discrete color channels, the processing is modified. Legacy image data is still taken prior to unstack from the $E'_{CB-INT}+E'_{CY-INT}$ and $E'_{CR-INT}+E'_{CC-INT}$ channels as shown in FIG. 37.

Figure 38:
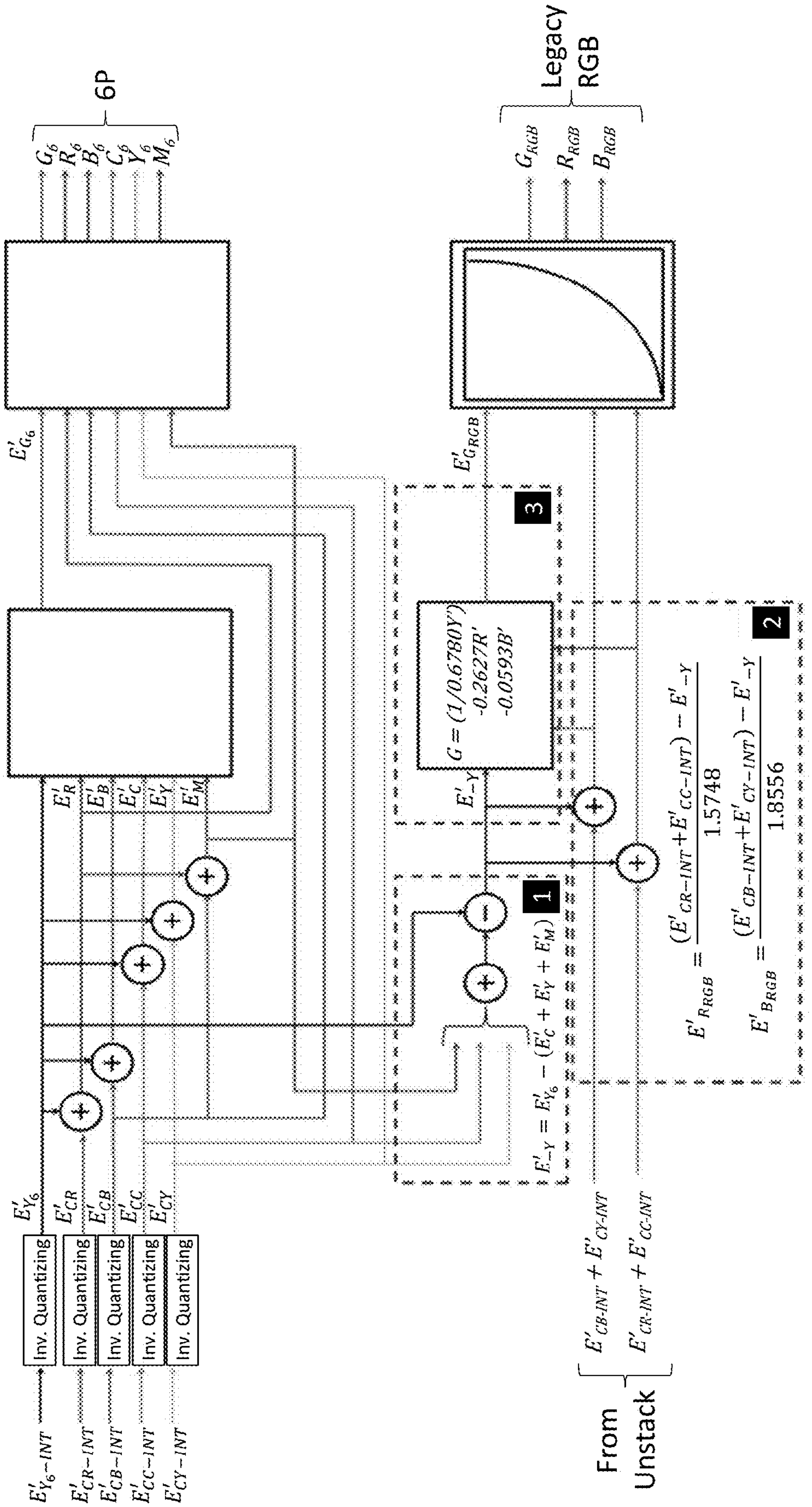
FIG. 38 illustrates one embodiment of a legacy RGB decoder for a six-primary, non-constant luminance system.

FIG. 38 illustrates one embodiment of a non-constant luminance decoder with a legacy process. The dotted box marked (1) shows the process where a new component called $E'_{-Y}$ is used to subtract the luminance levels that are present from the CYM channels from the $E'_{CB-INT}+E'_{CY-INT}$ and $E'_{CR-INT}+E'_{CC-INT}$ components as shown in box (2). The resulting output is now the R and B image components of the EOTF process. $E'_{-Y}$ is also sent to the G matrix to convert the luminance and color difference components to a green output as shown in box (3). Thus, R'G'B' is input to the EOTF process and output as $G_{RGB}$, $R_{RGB}$, and $B_{RGB}$. In another embodiment, the decoder is a legacy RGB decoder for non-constant luminance systems.

Figure 39:
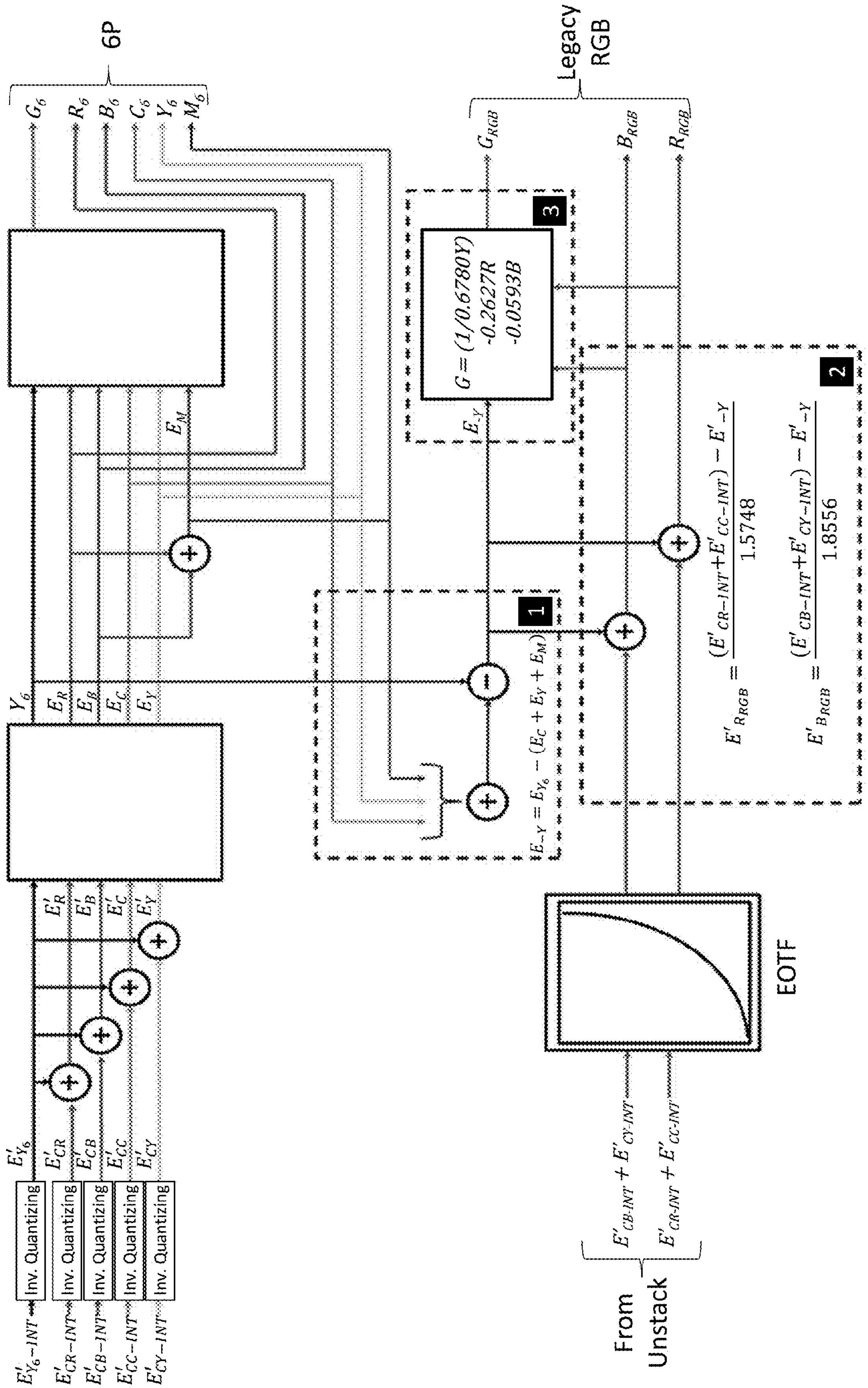
FIG. 39 illustrates one embodiment of a legacy RGB decoder for a six-primary, constant luminance system.

For a constant luminance system, the process is very similar with the exception that green is calculated as linear as shown in FIG. 39.

Six-Primary Color System Using a Matrix Output

Figure 40:
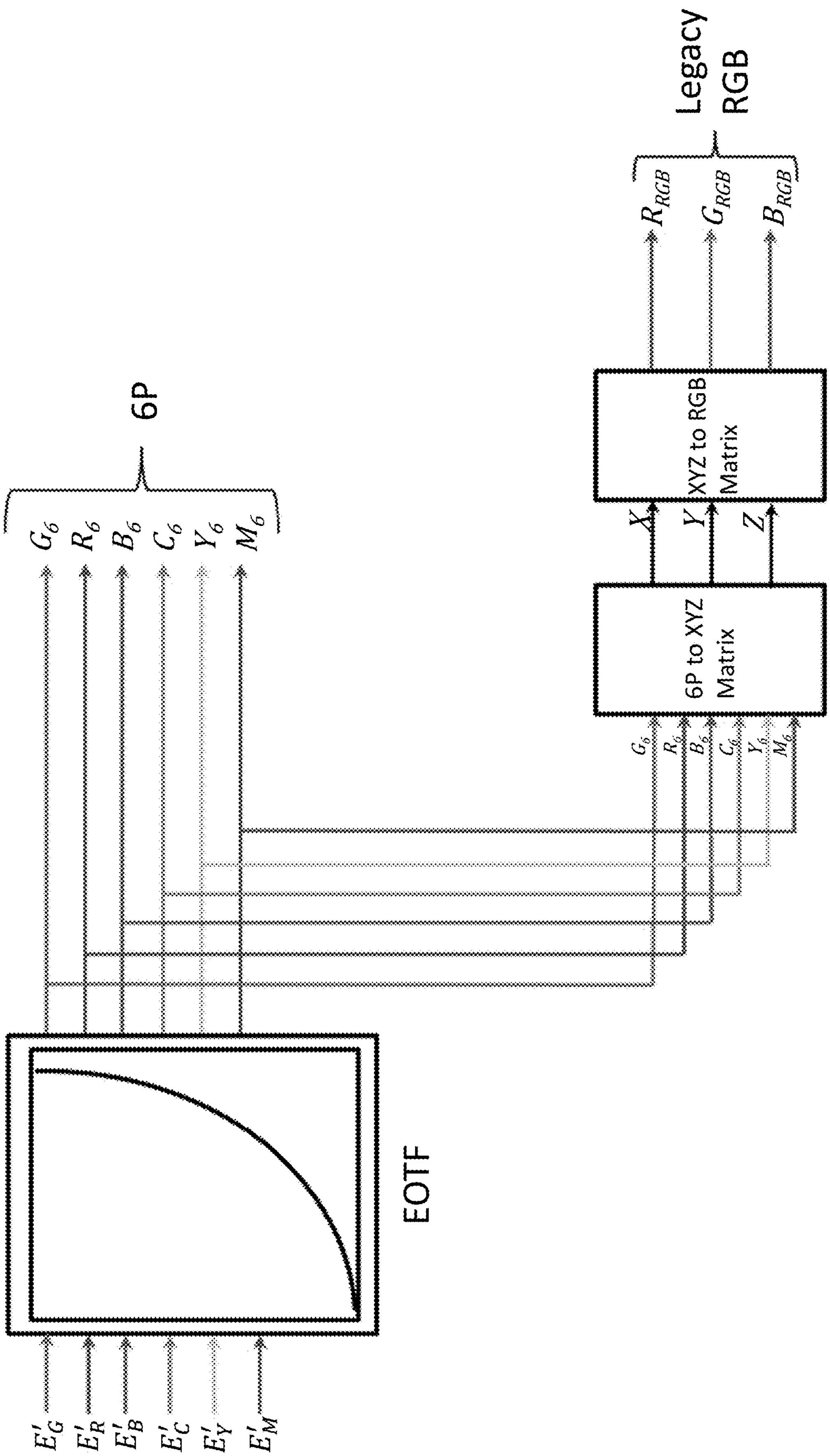
FIG. 40 illustrates one embodiment of a six-primary color system with output to a legacy RGB system.

In one embodiment, the six-primary color system outputs a legacy RGB image. This requires a matrix output to be built at the very end of the signal path. FIG. 40 illustrates one embodiment of a legacy RGB image output at the end of the signal path. The design logic of the C, M, and Y primaries is in that they are substantially equal in saturation and placed at substantially inverted hue angles compared to R, G, and B primaries, respectively. In one embodiment, substantially equal in saturation refers to a ±10% difference in saturation values for the C, M, and Y primaries in comparison to saturation values for the R, G, and B primaries, respectively. In addition, substantially equal in saturation covers additional percentage differences in saturation values falling within the ±10% difference range. For example, substantially equal in saturation further covers a ±7.5% difference in saturation values for the C, M, and Y primaries in comparison to the saturation values for the R, G, and B primaries, respectively; a ±5% difference in saturation values for the C, M, and Y primaries in comparison to the saturation values for the R, G, and B primaries, respectively; a ±2% difference in saturation values for the C, M, and Y primaries in comparison to the saturation values for the R, G, and B primaries, respectively; a ±1% difference in saturation values for the C, M, and Y primaries in comparison to the saturation values for the R, G, and B primaries, respectively; and/or a ±0.5% difference in saturation values for the C, M, and Y primaries in comparison to the saturation values for the R, G, and B primaries, respectively. In a preferred embodiment, the C, M, and Y primaries are equal in saturation to the R, G, and B primaries, respectively. For example, the cyan primary is equal in saturation to the red primary, the magenta primary is equal in saturation to the green primary, and the yellow primary is equal in saturation to the blue primary.

In an alternative embodiment, the saturation values of the C, M, and Y primaries are not required to be substantially equal to their corollary primary saturation value among the R, G, and B primaries, but are substantially equal in saturation to a primary other than their corollary R, G, or B primary value. For example, the C primary saturation value is not required to be substantially equal in saturation to the R primary saturation value, but rather is substantially equal in saturation to the G primary saturation value and/or the B primary saturation value. In one embodiment, two different color saturations are used, wherein the two different color saturations are based on standardized gamuts already in use.

In one embodiment, substantially inverted hue angles refers to a ±10% angle range from an inverted hue angle (e.g., 180 degrees). In addition, substantially inverted hue angles cover additional percentage differences within the ±10% angle range from an inverted hue angle. For example, substantially inverted hue angles further covers a ±7.5% angle range from an inverted hue angle, a ±5% angle range from an inverted hue angle, a ±2% angle range from an inverted hue angle, a ±1% angle range from an inverted hue angle, and/or a ±0.5% angle range from an inverted hue angle. In a preferred embodiment, the C, M, and Y primaries are placed at inverted hue angles (e.g., 180 degrees) compared to the R, G, and B primaries, respectively.

In one embodiment, the gamut is the ITU-R BT.709-6 gamut. In another embodiment, the gamut is the SMPTE RP431-2 gamut.

The unstack process includes output as six, 11-bit color channels that are separated and delivered to a decoder. To convert an image from a six-primary color system to an RGB image, at least two matrices are used. One matrix is a 3×3 matrix converting a six-primary color system image to XYZ values. A second matrix is a 3×3 matrix for converting from XYZ to the proper RGB color space. In one embodiment, XYZ values represent additive color space values, where XYZ matrices represent additive color space matrices. Additive color space refers to the concept of describing a color by stating the amounts of primaries that, when combined, create light of that color.

Figure 41:
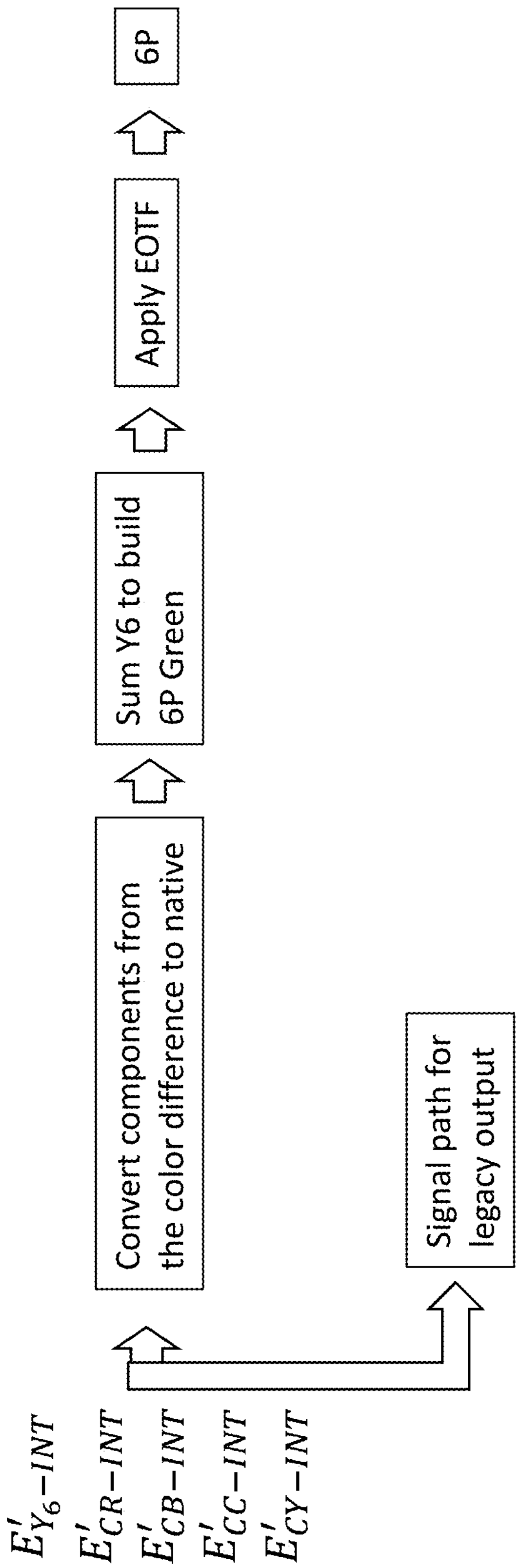
FIG. 41 illustrates one embodiment of six-primary color output using a non-constant luminance decoder.
Figure 42:
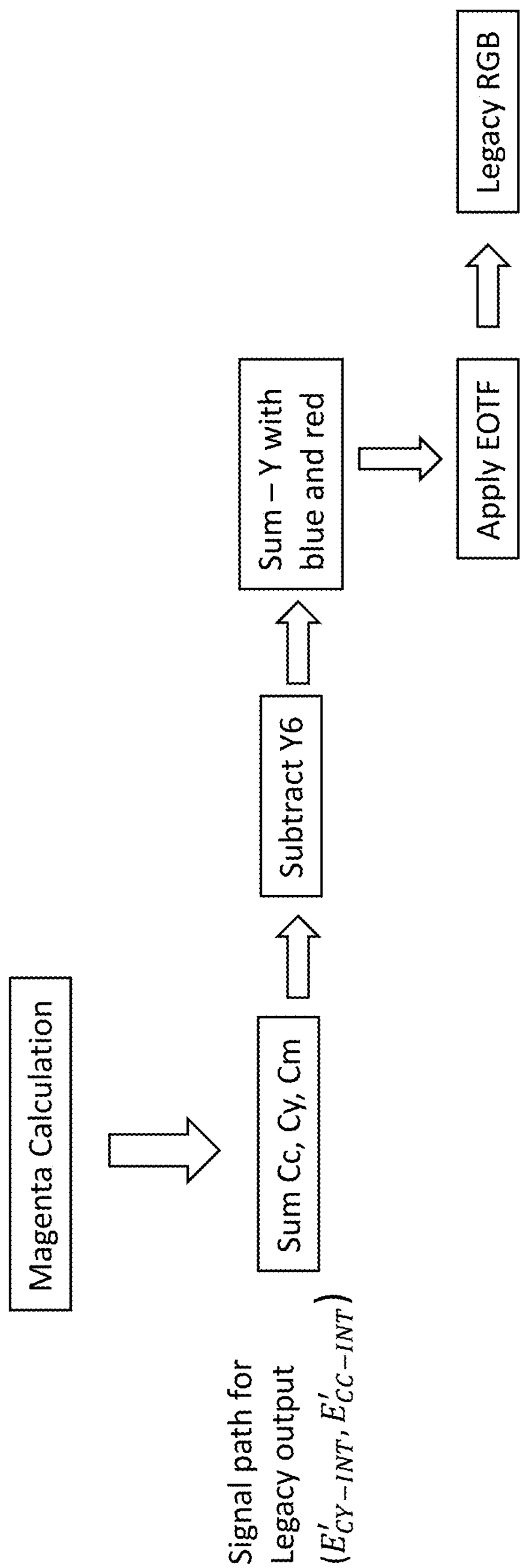
FIG. 42 illustrates one embodiment of a legacy RGB process within a six-primary color system.

When a six-primary display is connected to the six-primary output, each channel will drive each color. When this same output is sent to an RGB display, the CYM channels are ignored and only the RGB channels are displayed. An element of operation is that both systems drive from the black area. At this point in the decoder, all are coded as bit value 0 being black and bit value 2047 being peak color luminance. This process can also be reversed in a situation where an RGB source can feed a six-primary display. The six-primary display would then have no information for the CYM channels and would display the input in a standard RGB gamut. FIG. 41 illustrates one embodiment of six-primary color output using a non-constant luminance decoder. FIG. 42 illustrates one embodiment of a legacy RGB process within a six-primary color system.

The design of this matrix is a modification of the CIE process to convert RGB to XYZ. First, u' v' values are converted back to CIE 1931 xyz values using the following formulas:

$$x = \frac{9u'}{(6u' - 16v' + 12)} \quad y = \frac{4v'}{(6u' - 16v' + 12)} \quad z = 1 - x - y$$

Next, RGBCYM values are mapped to a matrix. The mapping is dependent upon the gamut standard being used. In one embodiment, the gamut is ITU-R BT.709-6. The mapping for RGBCYM values for an ITU-R BT.709-6 (6P-B) gamut are:

$$\left[\begin{pmatrix} & x & y & z \\ R & 0.640 & 0.330 & 0.030 \\ G & 0.300 & 0.600 & 0.100 \\ B & 0.150 & 0.060 & 0.790 \\ C & 0.439 & 0.540 & 0.021 \\ Y & 0.165 & 0.327 & 0.509 \\ M & 0.320 & 0.126 & 0.554 \end{pmatrix}\right.$$

$$\left.\begin{pmatrix} & R & G & B & C & Y & M \\ x & 0.640 & 0.300 & 0.150 & 0.439 & 0.165 & 0.319 \\ y & 0.330 & 0.600 & 0.060 & 0.540 & 0.327 & 0.126 \\ z & 0.030 & 0.100 & 0.790 & 0.021 & 0.509 & 0.554 \end{pmatrix}\right] = \begin{pmatrix} 0.519 & 0.393 & 0.140 \\ 0.393 & 0.460 & 0.160 \\ 0.140 & 0.160 & 0.650 \end{pmatrix}$$

In one embodiment, the gamut is SMPTE RP431-2. The mapping for RGBCYM values for a SMPTE RP431-2 (6P-C) gamut are:

$$\left[\begin{pmatrix} & x & y & z \\ R & 0.680 & 0.320 & 0.000 \\ G & 0.264 & 0.691 & 0.045 \\ B & 0.150 & 0.060 & 0.790 \\ C & 0.450 & 0.547 & 0.026 \\ Y & 0.163 & 0.342 & 0.496 \\ M & 0.352 & 0.142 & 0.505 \end{pmatrix}\right.$$

$$\left.\begin{pmatrix} & R & G & B & C & Y & M \\ x & 0.680 & 0.264 & 0.150 & 0.450 & 0.163 & 0.352 \\ y & 0.320 & 0.690 & 0.060 & 0.547 & 0.342 & 0.142 \\ z & 0.000 & 0.045 & 0.790 & 0.026 & 0.496 & 0.505 \end{pmatrix}\right] = \begin{pmatrix} 0.565 & 0.400 & 0.121 \\ 0.400 & 0.549 & 0.117 \\ 0.121 & 0.117 & 0.650 \end{pmatrix}$$

Following mapping the RGBCYM values to a matrix, a white point conversion occurs:

$$X = \frac{x}{y} \quad Y = 1 \quad Z = 1 - x - y$$

For a six-primary color system using an ITU-R BT.709-6 (6P-B) color gamut, the white point is D65:

$$0.9504 = \frac{0.3127}{0.3290} \quad 0.3584 = 1 - 0.3127 - 0.3290$$

For a six-primary color system using a SMPTE RP431-2 (6P-C) color gamut, the white point is D60:

$$0.9541 = \frac{0.3218}{0.3372} \quad 0.3410 = 1 - 0.3218 - 0.3372$$

Following the white point conversion, a calculation is required for RGB saturation values, $S_R$, $S_G$, and $S_B$. The results from the second operation are inverted and multiplied with the white point XYZ values. In one embodiment, the color gamut used is an ITU-R BT.709-6 color gamut. The values calculate as:

$$\begin{bmatrix} S_R \\ S_G \\ S_B \end{bmatrix}^{ITU-RBT.709-6} = \left[\begin{pmatrix} 5.445 & -4.644 & -0.0253 \\ -4.644 & 6.337 & -0.563 \\ -0.0253 & -0.563 & 1.682 \end{pmatrix}\begin{pmatrix} 0.950 \\ 1 \\ 0.358 \end{pmatrix}\right]$$

Where $$\begin{bmatrix} S_R \\ S_G \\ S_B \end{bmatrix}^{ITU-RBT.709-6} = \begin{bmatrix} 0.522 \\ 1.722 \\ 0.015 \end{bmatrix}$$

In one embodiment, the color gamut is a SMPTE RP431-2 color gamut. The values calculate as:

$$\begin{bmatrix} S_R \\ S_G \\ S_B \end{bmatrix}^{SMPTERP431-2} = \left[\begin{pmatrix} 3.692 & -2.649 & -0.211 \\ -2.649 & 3.795 & -0.189 \\ -0.211 & -0.189 & 1.611 \end{pmatrix}\begin{pmatrix} 0.954 \\ 1 \\ 0.341 \end{pmatrix}\right]$$

Where $$\begin{bmatrix} S_R \\ S_G \\ S_B \end{bmatrix}^{SMPTERP431-2} = \begin{bmatrix} 0.802 \\ 1.203 \\ 0.159 \end{bmatrix}$$

Next, a six-primary color-to-XYZ matrix must be calculated. For an embodiment where the color gamut is an ITU-R BT.709-6 color gamut, the calculation is as follows:

$$\begin{bmatrix} X \\ Y \\ Z \end{bmatrix} = \left[\begin{pmatrix} 0.519 & 0.393 & 0.140 \\ 0.393 & 0.460 & 0.160 \\ 0.140 & 0.160 & 0.650 \end{pmatrix}^{ITU-RBT.709-6}\begin{pmatrix} 0.522 & 1.722 & 0.153 \\ 0.522 & 1.722 & 0.153 \\ 0.522 & 1.722 & 0.153 \end{pmatrix}^{D65}\right]$$

Wherein the resulting matrix is multiplied by the $S_R S_G S_B$ matrix:

$$\begin{bmatrix} X \\ Y \\ Z \end{bmatrix} = \begin{bmatrix} 0.271 & 0.677 & 0.002 \\ 0.205 & 0.792 & 0.003 \\ 0.073 & 0.276 & 0.010 \end{bmatrix}\begin{bmatrix} R \\ G \\ B \\ C \\ Y \\ M \end{bmatrix}^{ITU-RBT.709-6}$$

For an embodiment where the color gamut is a SMPTE RP431-2 color gamut, the calculation is as follows:

$$\begin{bmatrix} X \\ Y \\ Z \end{bmatrix} = \left[ \begin{pmatrix} 0.565 & 0.401 & 0.121 \\ 0.401 & 0.549 & 0.117 \\ 0.121 & 0.117 & 0.650 \end{pmatrix}^{SMPTERP431-2} \begin{pmatrix} 0.802 & 1.203 & 0.159 \\ 0.802 & 1.203 & 0.159 \\ 0.802 & 1.203 & 0.159 \end{pmatrix}^{D60} \right]$$

Wherein the resulting matrix is multiplied by the $S_R S_G S_B$ matrix:

$$\begin{bmatrix} X \\ Y \\ Z \end{bmatrix} = \begin{bmatrix} 0.453 & 0.482 & 0.019 \\ 0.321 & 0.660 & 0.019 \\ 0.097 & 0.141 & 0.103 \end{bmatrix} \begin{bmatrix} R \\ G \\ B \\ C \\ Y \\ M \end{bmatrix}^{SMPTERP431-2}$$

Finally, the XYZ matrix must converted to the correct standard color space. In an embodiment where the color gamut used is an ITU-R BT709.6 color gamut, the matrices are as follows:

$$\begin{bmatrix} R \\ G \\ B \end{bmatrix}^{ITU-RBT709.6} = \begin{bmatrix} 3.241 & -1.537 & -0.499 \\ -0.969 & 1.876 & 0.042 \\ 0.056 & -0.204 & 1.057 \end{bmatrix} \begin{bmatrix} X \\ Y \\ Z \end{bmatrix}$$

In an embodiment where the color gamut used is a SMPTE RP431-2 color gamut, the matrices are as follows:

$$\begin{bmatrix} R \\ G \\ B \end{bmatrix}^{SMPTERP431-2} = \begin{bmatrix} 2.73 & -1.018 & -0.440 \\ -0.795 & 1.690 & 0.023 \\ 0.041 & -0.088 & 1.101 \end{bmatrix} \begin{bmatrix} X \\ Y \\ Z \end{bmatrix}$$

Packing a Six-Primary Color System into $IC_TC_P$ $IC_TC_P$ (ITP) is a color representation format specified in the Rec. ITU-R BT.2100 standard that is used as a part of the color image pipeline in video and digital photography systems for high dynamic range (HDR) and wide color gamut (WCG) imagery. The I (intensity) component is a luma component that represents the brightness of the video. $C_T$ and $C_P$ are blue-yellow ("tritanopia") and red-green ("protanopia") chroma components. The format is derived from an associated RGB color space by a coordination transformation that includes two matrix transformations and an intermediate non-linear transfer function, known as a gamma pre-correction. The transformation produces three signals: I, $C_T$, and $C_P$. The ITP transformation can be used with RGB signals derived from either the perceptual quantizer (PQ) or hybrid log-gamma (HLG) nonlinearity functions. The PQ curve is described in ITU-R BT2100-2:2018, Table 4, which is incorporated herein by reference in its entirety.

Figure 43:
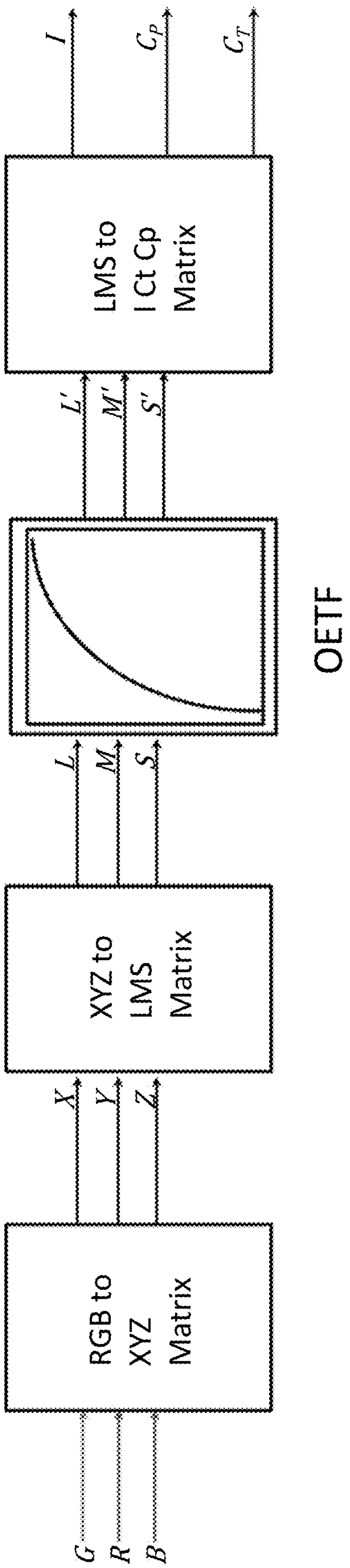
FIG. 43 illustrates one embodiment of packing six-primary color system image data into an $IC_TC_P$ (ITP) format.

FIG. 43 illustrates one embodiment of packing six-primary color system image data into an $IC_TC_P$ (ITP) format. In one embodiment, RGB image data is converted to an XYZ matrix. The XYZ matrix is then converted to an LMS matrix. The LMS matrix is then sent to an optical electronic transfer function (OETF). The conversion process is represented below:

$$\begin{bmatrix} L \\ M \\ S \end{bmatrix} = \left[ \begin{pmatrix} a_{11} & a_{12} & a_{13} \\ a_{21} & a_{22} & a_{23} \\ a_{31} & a_{32} & a_{33} \end{pmatrix} \begin{pmatrix} 0.359 & 0.696 & -0.036 \\ -0.192 & 1.100 & 0.075 \\ 0.007 & 0.075 & 0.843 \end{pmatrix} \right] \begin{bmatrix} R \\ G \\ B \end{bmatrix}$$

Output from the OETF is converted to ITP format. The resulting matrix is:

$$\begin{pmatrix} 0.5 & 0.5 & 0 \\ 1.614 & -3.323 & 1.710 \\ 4.378 & -4.246 & -0.135 \end{pmatrix}$$

Figure 44:
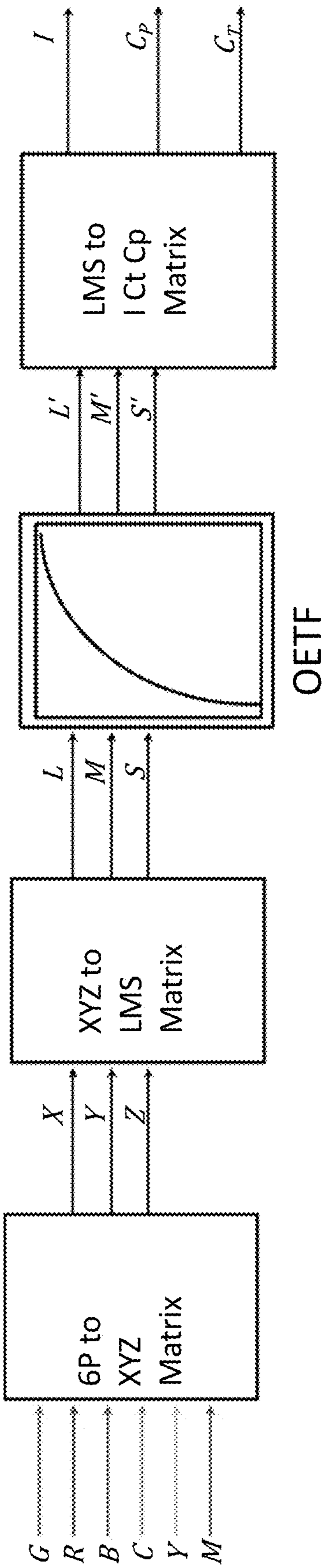
FIG. 44 illustrates one embodiment of a six-primary color system converting RGBCYM image data into XYZ image data for an ITP format.

FIG. 44 illustrates one embodiment of a six-primary color system converting RGBCYM image data into XYZ image data for an ITP format (e.g., 6P-B, 6P-C). For a six-primary color system, this is modified by replacing the RGB to XYZ matrix with a process to convert RGBCYM to XYZ. This is the same method as described in the legacy RGB process. The new matrix is as follows for an ITU-R BT.709-6 (6P-B) color gamut:

$$\begin{bmatrix} L \\ M \\ S \end{bmatrix} = \begin{pmatrix} 0.271 & 0.677 & 0.002 \\ 0.205 & 0.792 & 0.003 \\ 0.073 & 0.277 & 0.100 \end{pmatrix} \begin{pmatrix} 0.359 & 0.696 & -0.036 \\ -0.192 & 1.100 & 0.075 \\ 0.007 & 0.075 & 0.843 \end{pmatrix} \begin{bmatrix} R \\ G \\ B \\ C \\ Y \\ M \end{bmatrix}^{ITU-RBT.709-6}$$

RGBCYM data, based on an ITU-R BT.709-6 color gamut, is converted to an XYZ matrix. The resulting XYZ matrix is converted to an LMS matrix, which is sent to an OETF. Once processed by the OETF, the LMS matrix is converted to an ITP matrix. The resulting ITP matrix is as follows:

$$\begin{pmatrix} 0.5 & 0.5 & 0 \\ 1.614 & -3.323 & 1.710 \\ 4.378 & -4.246 & -0.135 \end{pmatrix}$$

In another embodiment, the LMS matrix is sent to an Optical Optical Transfer Function (OOTF). In yet another embodiment, the LMS matrix is sent to a Transfer Function other than OOTF or OETF.

In another embodiment, the RGBCYM data is based on the SMPTE ST431-2 (6P-C) color gamut. The matrices for an embodiment using the SMPTE ST431-2 color gamut are as follows:

$$\begin{bmatrix} L \\ M \\ S \end{bmatrix} = \begin{pmatrix} 0.453 & 0.481 & 0.019 \\ 0.321 & 0.660 & 0.019 \\ 0.097 & 0.141 & 0.103 \end{pmatrix} \begin{pmatrix} 0.359 & 0.696 & -0.036 \\ -0.192 & 1.100 & 0.075 \\ 0.007 & 0.075 & 0.843 \end{pmatrix} \begin{bmatrix} R \\ G \\ B \\ C \\ Y \\ M \end{bmatrix}^{SMPTEST431-2}$$

The resulting ITP matrix is:

$$\begin{pmatrix} 0.5 & 0.5 & 0 \\ 1.614 & -3.323 & 1.710 \\ 4.378 & -4.246 & -0.135 \end{pmatrix}$$

The decode process uses the standard ITP decode process, as the $S_R S_G S_B$ cannot be easily inverted. This makes it difficult to recover the six RGBCYM components from the ITP encode. Therefore, the display is operable to use the standard ICtCp decode process as described in the standards and is limited to just RGB output.

Converting to a Five-Color Multi-Primary Display

In one embodiment, the system is operable to convert image data incorporating five primary colors. In one embodiment, the five primary colors include Red (R), Green (G), Blue (G), Cyan (C), and Yellow (Y), collectively referred to as RGBCY. In another embodiment, the five primary colors include Red (R), Green (G), Blue (B), Cyan (C), and Magenta (M), collectively referred to as RGBCM. In one embodiment, the five primary colors do not include Magenta (M).

In one embodiment, the five primary colors include Red (R), Green (G), Blue (B), Cyan (C), and Orange (O), collectively referred to as RGBCO. RGBCO primaries provide optimal spectral characteristics, transmittance characteristics, and makes use of a D65 white point. See, e.g., Moon-Cheol Kim et al., *Wide Color Gamut Five Channel Multi-Primary for HDTV Application*, Journal of Imaging Sci. & Tech. Vol. 49, No. 6, November/December 2005, at 594-604, which is hereby incorporated by reference in its entirety.

In one embodiment, a five-primary color model is expressed as F=M·C, where F is equal to a tristimulus color vector, $F=(X, Y, Z)^T$, and C is equal to a linear display control vector, $C=(C1, C2, C3, C4, C5)^T$. Thus, a conversion matrix for the five-primary color model is represented as $$M = \begin{pmatrix} X_1 & X_2 & X_3 & X_4 & X_5 \\ Y_1 & Y_2 & Y_3 & Y_4 & Y_5 \\ Z_1 & Z_2 & Z_3 & Z_4 & Z_5 \end{pmatrix}$$

Using the above equation and matrix, a gamut volume is calculated for a set of given control vectors on the gamut boundary. The control vectors are converted into CIELAB uniform color space. However, because matrix M is non-square, the matrix inversion requires splitting the color gamut into a specified number of pyramids, with the base of each pyramid representing an outer surface and where the control vectors are calculated using linear equation for each given XYZ triplet present within each pyramid. By separating regions into pyramids, the conversion process is normalized. In one embodiment, a decision tree is created in order to determine which set of primaries are best to define a specified color. In one embodiment, a specified color is defined by multiple sets of primaries. In order to locate each pyramid, 2D chromaticity look-up tables are used, with corresponding pyramid numbers for input chromaticity values in xy or u'v'. Typical methods using pyramids require 1000×1000 address ranges in order to properly search the boundaries of adjacent pyramids with look-up table memory. The system of the present invention uses a combination of parallel processing for adjacent pyramids and at least one algorithm for verifying solutions by checking constraint conditions. In one embodiment, the system uses a parallel computing algorithm. In one embodiment, the system uses a sequential algorithm. In another embodiment, the system uses a brightening image transformation algorithm. In another embodiment, the system uses a darkening image transformation algorithm. In another embodiment, the system uses an inverse sinusoidal contrast transformation algorithm. In another embodiment, the system uses a hyperbolic tangent contrast transformation algorithm. In yet another embodiment, the system uses a sine contrast transformation execution times algorithm. In yet another embodiment, the system uses a linear feature extraction algorithm. In yet another embodiment, the system uses a JPEG2000 encoding algorithm. In yet another embodiment, the system uses a parallelized arithmetic algorithm. In yet another embodiment, the system uses an algorithm other than those previously mentioned. In yet another embodiment, the system uses any combination of the aforementioned algorithms.

Mapping a Six-Primary Color System into Standardized Transport Formats

Each encode and/or decode system fits into existing video serial data streams that have already been established and standardized. This is key to industry acceptance. Encoder and/or decoder designs require little or no modification for a six-primary color system to map to these standard serial formats.

Figure 45:
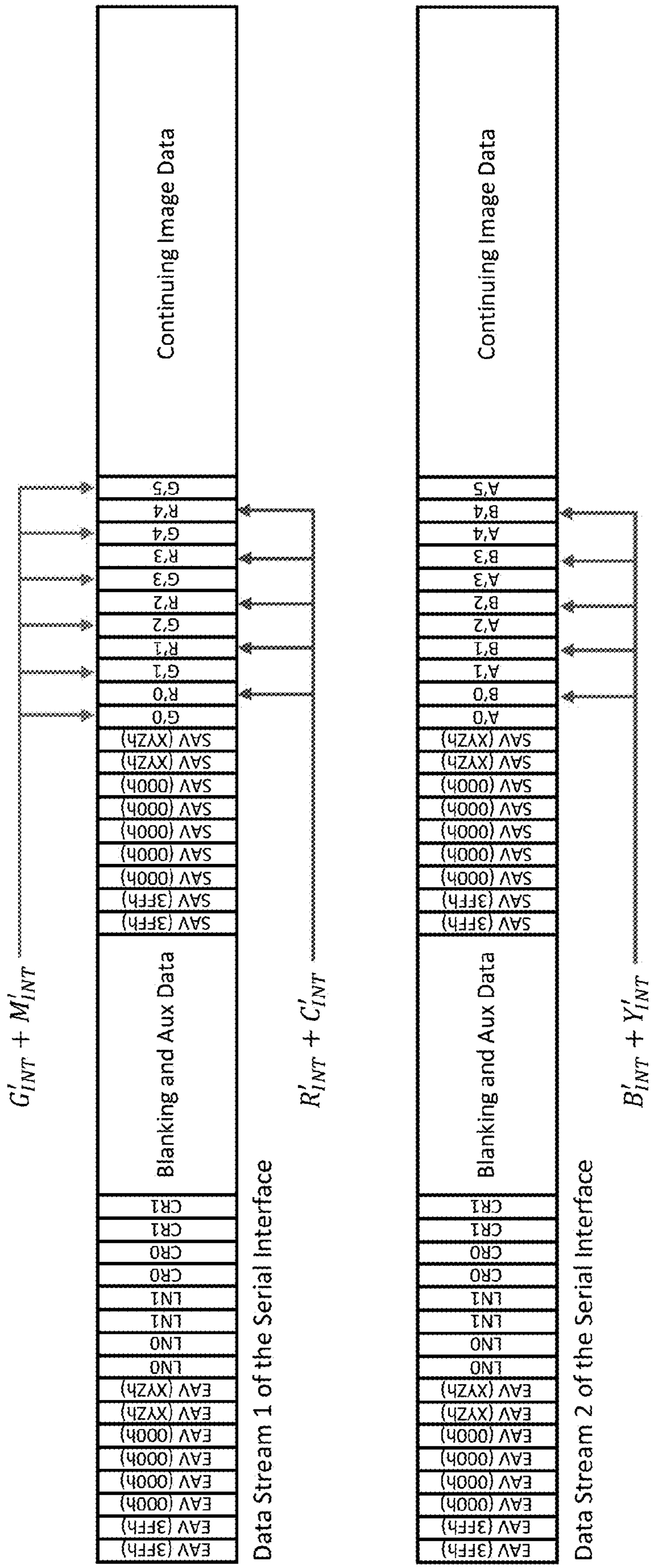
FIG. 45 illustrates one embodiment of six-primary color mapping with SMPTE ST424.

FIG. 45 illustrates one embodiment of a six-primary color system mapping to a SMPTE ST424 standard serial format. The SMPTE ST424/ST425 set of standards allow very high sampling systems to be passed through a single cable. This is done by using alternating data streams, each containing different components of the image. For use with a six-primary color system transport, image formats are limited to RGB due to the absence of a method to send a full bandwidth Y signal.

Figure 46:
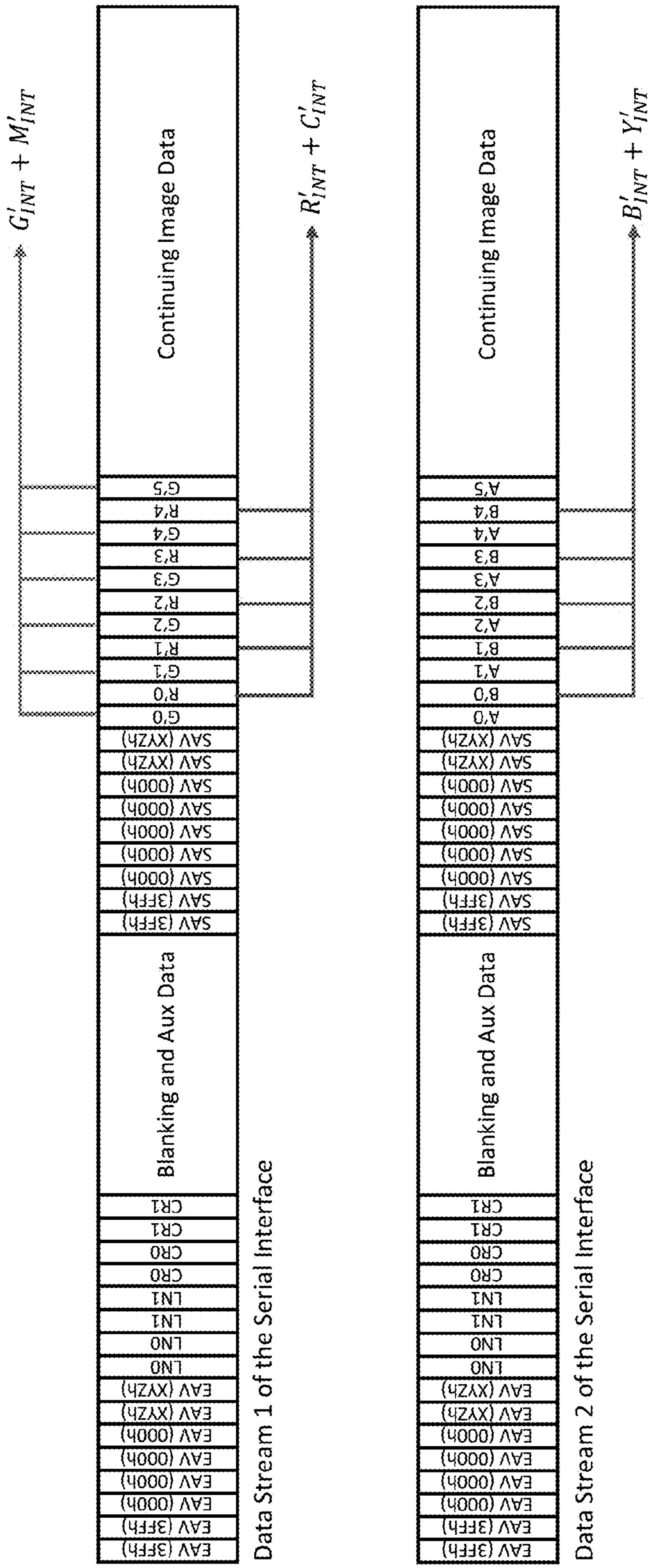
FIG. 46 illustrates one embodiment of a six-primary color system readout for a SMPTE ST424 standard.

The process for mapping a six-primary color system to a SMPTE ST425 format is the same as mapping to a SMPTE ST424 format. To fit a six-primary color system into a SMPTE ST425/424 stream involves the following substitutions: $G'_{INT}+M'_{INT}$ is placed in the Green data segments, $R'_{INT}+C'_{INT}$ is placed in the Red data segments, and $B'_{INT}+Y'_{INT}$ is placed into the Blue data segments. FIG. 46 illustrates one embodiment of an SMPTE 424 6P readout.

System 2 requires twice the data rate as System 1, so it is not compatible with SMPTE 424. However, it maps easily into SMPTE ST2082 using a similar mapping sequence. In one example, System 2 is used to have the same data speed defined for 8K imaging to show a 4K image.

Figure 47:
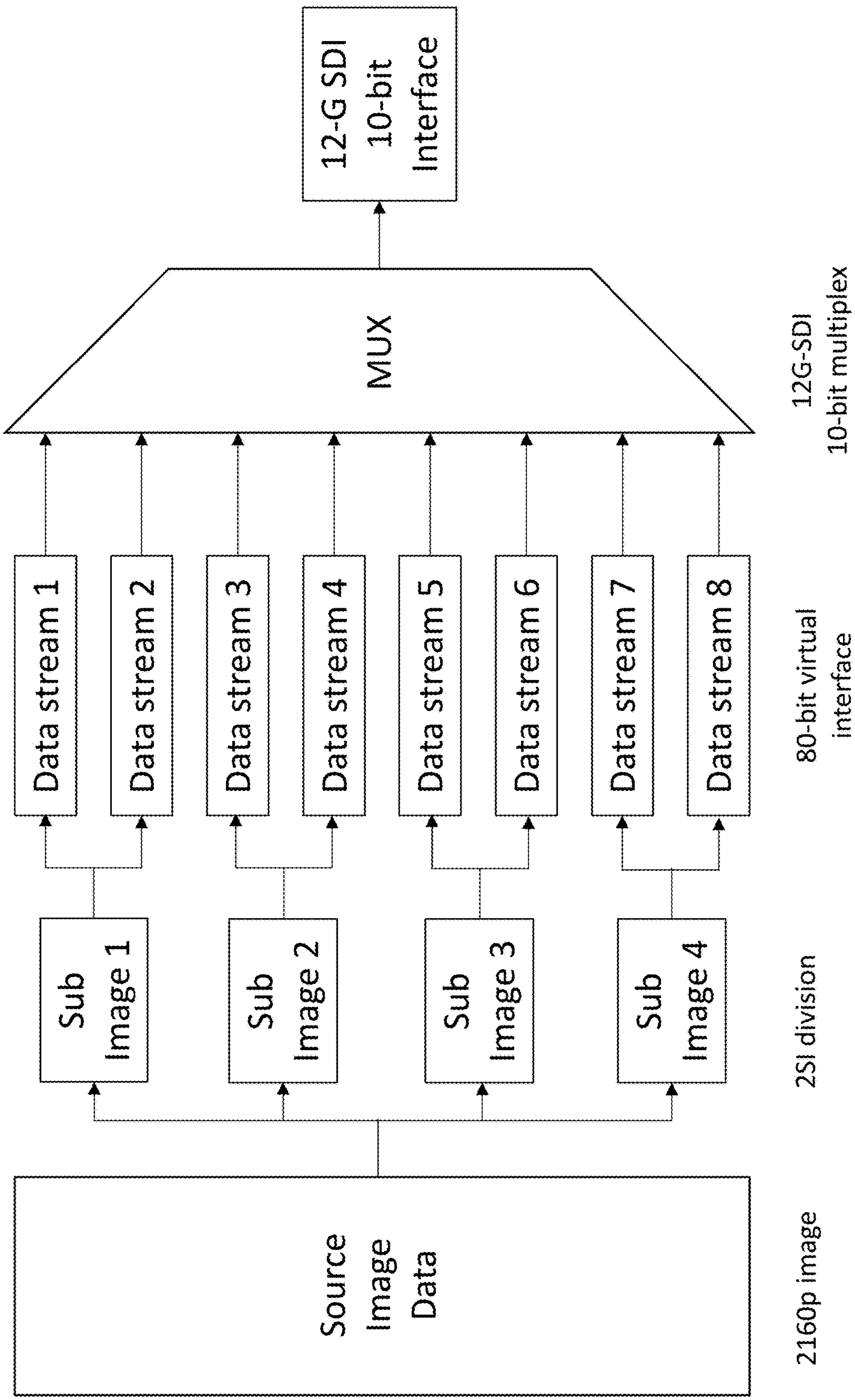
FIG. 47 illustrates a process of 2160p transport over 12G-SDI.

In one embodiment, sub-image and data stream mapping occur as shown in SMPTE ST2082. An image is broken into four sub-images, and each sub-image is broken up into two data streams (e.g., sub-image 1 is broken up into data stream 1 and data stream 2). The data streams are put through a multiplexer and then sent to the interface as shown in FIG. 47.

Figure 48:
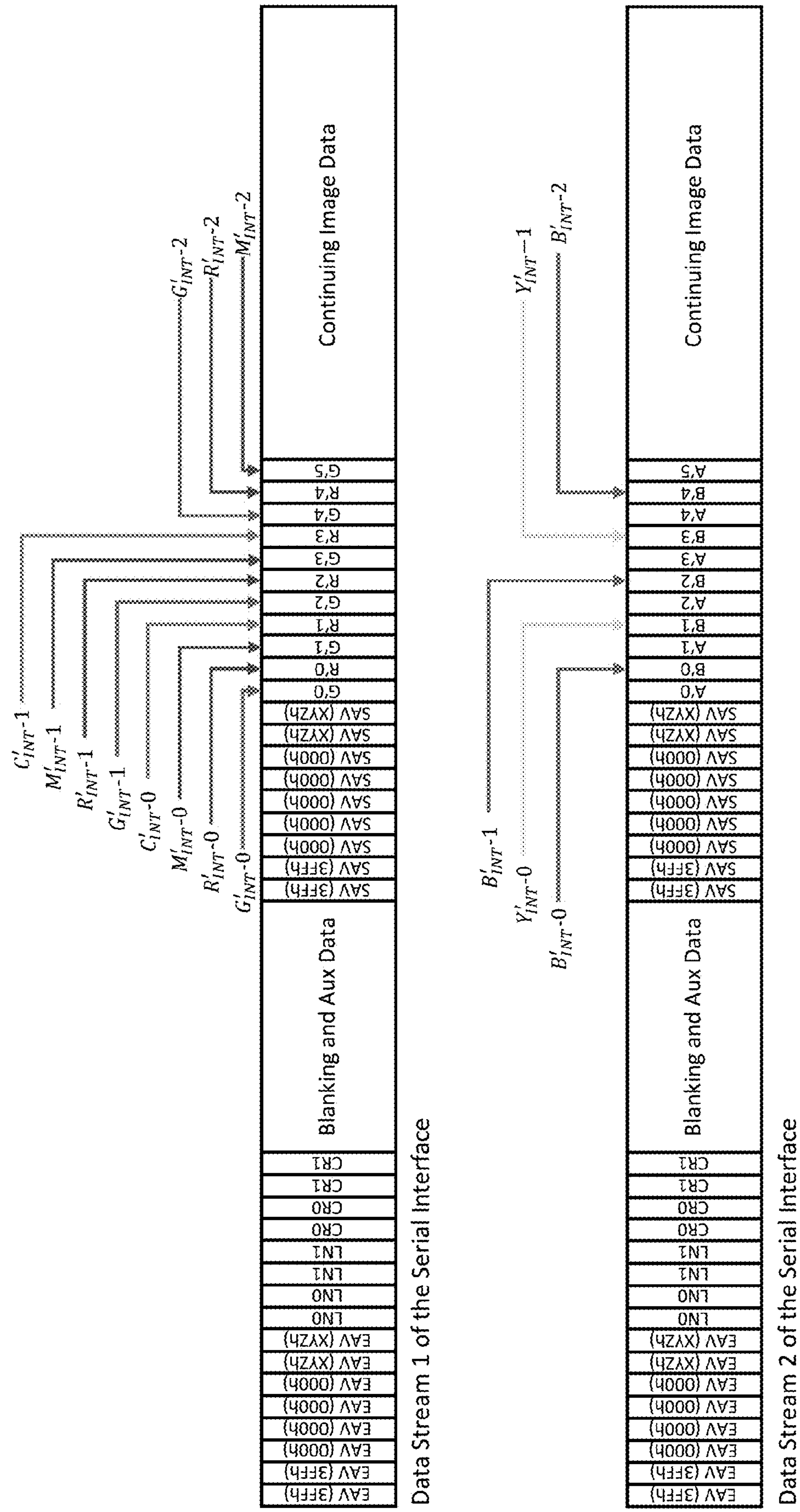
FIG. 48 illustrates one embodiment for mapping RGBCYM data to the SMPTE ST2082 standard for a six-primary color system.
Figure 49:
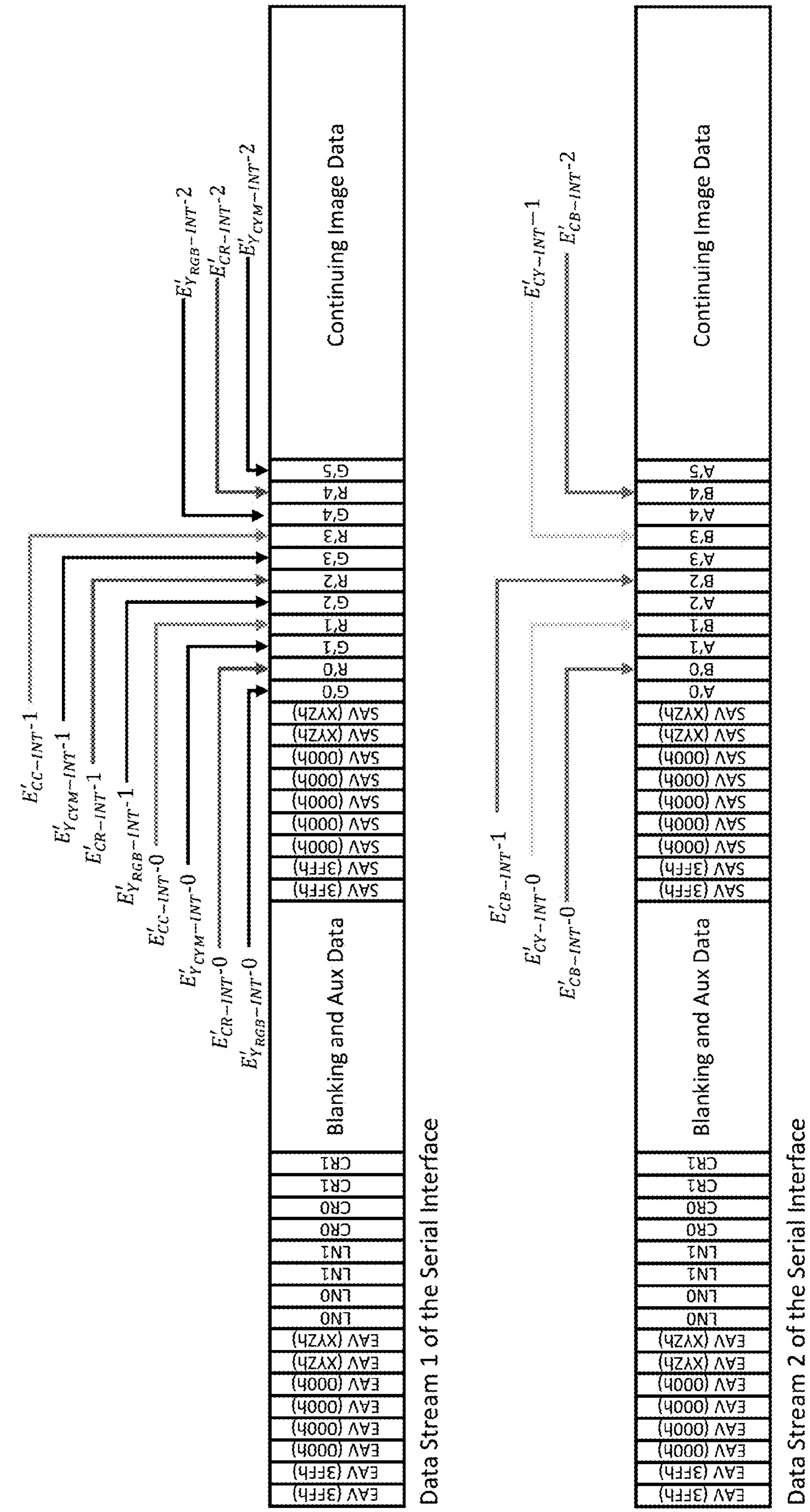
FIG. 49 illustrates one embodiment for mapping $Y_{RGB}$ $Y_{CYM}$ $C_R$ $C_B$ $C_C$ $C_Y$ data to the SMPTE ST2082 standard for a six-primary color system.

FIG. 48 and FIG. 49 illustrate serial digital interfaces for a six-primary color system using the SMPTE ST2082 standard. In one embodiment, the six-primary color system data is RGBCYM data, which is mapped to the SMPTE ST2082 standard (FIG. 48). Data streams 1, 3, 5, and 7 follow the pattern shown for data stream 1. Data streams 2, 4, 6, and 8 follow the pattern shown for data stream 2. In one embodiment, the six-primary color system data is $Y_{RGB}$ $Y_{CYM}$ $C_R$ $C_B$ $C_C$ $C_Y$ data, which is mapped to the SMPTE ST2082 standard (FIG. 49). Data streams 1, 3, 5, and 7 follow the pattern shown for data stream 1. Data streams 2, 4, 6, and 8 follow the pattern shown for data stream 2.

In one embodiment, the standard serial format is SMPTE ST292. SMPTE ST292 is an older standard than ST424 and is a single wire format for 1.5 GB video, whereas ST424 is designed for up to 3 GB video. However, while ST292 can identify the payload ID of SMPTE ST352, it is constrained to only accepting an image identified by a hex value, 0h. All other values are ignored. Due to the bandwidth and identifications limitations in ST292, a component video six-primary color system incorporates a full bit level luminance component. To fit a six-primary color system into a SMPTE ST292 stream involves the following substitutions: $E'_{Y_6\text{-}INT}$ is placed in the Y data segments, $E'_{Cb\text{-}INT}+E'_{Cy\text{-}INT}$ is placed in the Cb data segments, and $E'_{Cr\text{-}INT}+E'_{Cc\text{-}INT}$ is placed in the Cr data segments. In another embodiment, the standard serial format is SMPTE ST352.

SMPTE ST292 and ST424 Serial Digital Interface (SDI) formats include payload identification (ID) metadata to help the receiving device identify the proper image parameters. The tables for this need modification by adding at least one flag identifying that the image source is a six-primary color RGB image. Therefore, six-primary color system format additions need to be added. In one embodiment, the standard is the SMPTE ST352 standard.

Figure 50:
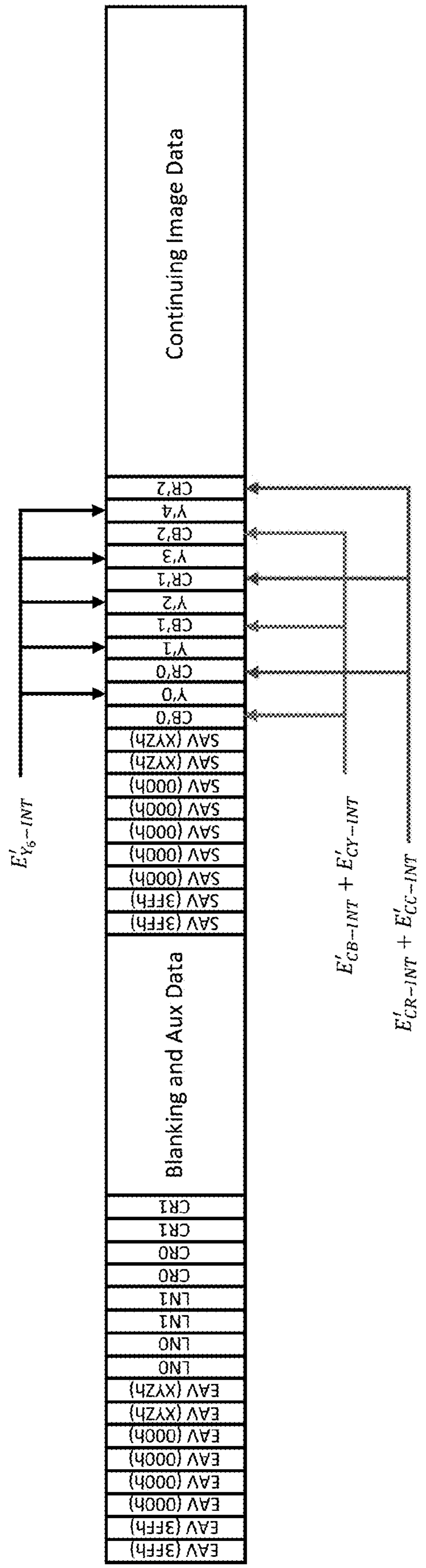
FIG. 50 illustrates one embodiment for mapping six-primary color system data using the SMPTE ST292 standard.
Figure 51:
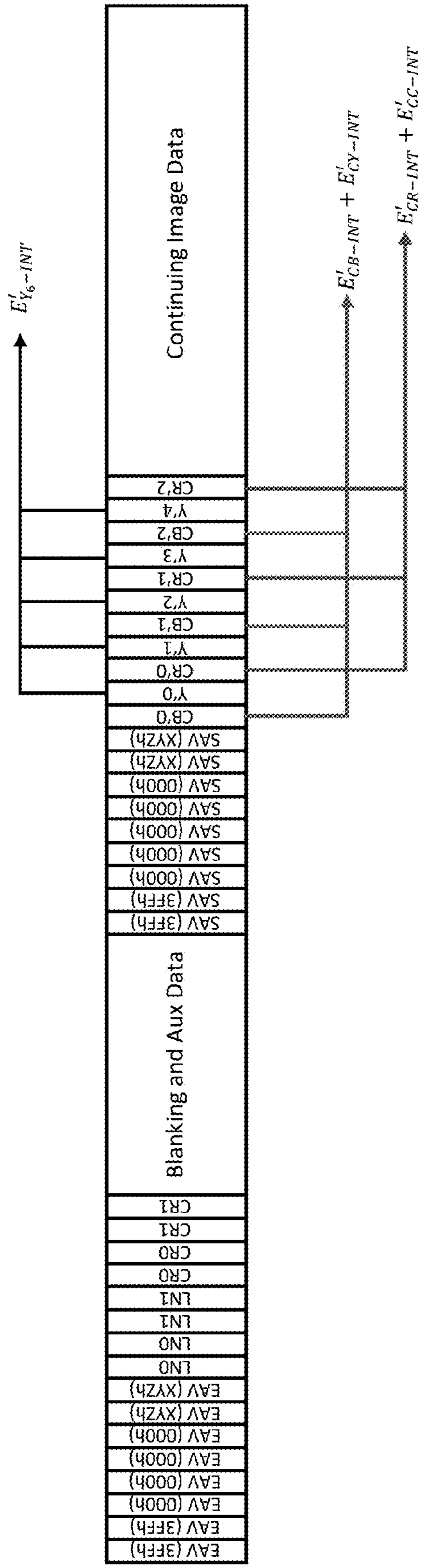
FIG. 51 illustrates one embodiment of the readout for a six-primary color system using the SMPTE ST292 standard.

FIG. 50 illustrates one embodiment of an SMPTE ST292 6P mapping. FIG. 51 illustrates one embodiment of an SMPTE ST292 6P readout.

FIG. 52 illustrates modifications to the SMPTE ST352 standards for a six-primary color system. Hex code "Bh" identifies a constant luminance source and flag "Fh" indicates the presence of a six-primary color system. In one embodiment, Fh is used in combination with at least one other identifier located in byte 3. In another embodiment, the Fh flag is set to 0 if the image data is formatted as System 1 and the Fh flag is set to 1 if the image data is formatted as System 2.

In another embodiment, the standard serial format is SMPTE ST2082. Where a six-primary color system requires more data, it may not always be compatible with SMPTE ST424. However, it maps easily into SMPTE ST2082 using the same mapping sequence. This usage would have the same data speed defined for 8K imaging in order to display a 4K image.

In another embodiment, the standard serial format is SMPTE ST2022. Mapping to ST2022 is similar to mapping to ST292 and ST242, but as an ETHERNET format. The output of the stacker is mapped to the media payload based on Real-time Transport Protocol (RTP) 3550, established by the Internet Engineering Task Force (IETF). RTP provides end-to-end network transport functions suitable for applications transmitting real-time data, including, but not limited to, audio, video, and/or simulation data, over multicast or unicast network services. The data transport is augmented by a control protocol (RTCP) to allow monitoring of the data delivery in a manner scalable to large multicast networks, and to provide control and identification functionality. There are no changes needed in the formatting or mapping of the bit packing described in SMPTE ST 2022-6: 2012 (HBRMT).

FIG. 53 illustrates one embodiment of a modification for a six-primary color system using the SMPTE ST2202 standard. For SMPTE ST2202-6:2012 (HBRMT), there are no changes needed in formatting or mapping of the bit packing. ST2022 relies on header information to correctly configure the media payload. Parameters for this are established within the payload header using the video source format fields including, but not limited to, MAP, FRAME, FRATE, and/or SAMPLE. MAP, FRAME, and FRATE remain as described in the standard. MAP is used to identify if the input is ST292 or ST425 (RGB or Y Cb Cr). SAMPLE is operable for modification to identify that the image is formatted as a six-primary color system image. In one embodiment, the image data is sent using flag "0h" (unknown/unspecified).

In another embodiment, the standard is SMPTE ST2110. SMPTE ST2110 is a relatively new standard and defines moving video through an Internet system. The standard is based on development from the IETF and is described under RFC3550. Image data is described through "pgroup" construction. Each pgroup consists of an integer number of octets. In one embodiment, a sample definition is RGB or YCbCr and is described in metadata. In one embodiment, the metadata format uses a Session Description Protocol (SDP) format. Thus, pgroup construction is defined for 4:4:4, 4:2:2, and 4:2:0 sampling as 8-bit, 10-bit, 12-bit, and in some cases 16-bit and 16-bit floating point wording. In one embodiment, six-primary color image data is limited to a 10-bit depth. In another embodiment, six-primary color image data is limited to a 12-bit depth. Where more than one sample is used, it is described as a set. For example, 4:4:4 sampling for blue, as a non-linear RGB set, is described as C0'B, C1'B, C2'B, C3'B, and C4'B. The lowest number index being left most within the image. In another embodiment, the method of substitution is the same method used to map six-primary color content into the ST2110 standard.

In another embodiment, the standard is SMPTE ST2110. SMPTE ST2110-20 describes the construction for each pgroup. In one embodiment, six-primary color system content arrives for mapping as non-linear data for the SMPTE ST2110 standard. In another embodiment, six-primary color system content arrives for mapping as linear data for the SMPTE ST2110 standard.

FIG. 54 illustrates a table of 4:4:4 sampling for a six-primary color system for a 10-bit video system. For 4:4:4 10-bit video, 15 octets are used and cover 4 pixels.

FIG. 55 illustrates a table of 4:4:4 sampling for a six-primary color system for a 12-bit video system. For 4:4:4 12-bit video, 9 octets are used and cover 2 pixels before restarting the sequence.

Non-linear GRBMYC image data would arrive as: $G'_{INT}+M'_{INT}$, $R'_{INT}+C'_{INT}$, and $B'_{INT}+Y'_{INT}$ Component substitution would follow what has been described for SMPTE ST424, where $G'_{INT}+M'_{INT}$ is placed in the Green data segments, $R'_{INT}+C'_{INT}$ is placed in the Red data segments, and $B'_{INT}+Y'_{INT}$ is placed in the Blue data segments. The sequence described in the standard is shown as R0', G0', B0', R1', G1', B1', etc.

FIG. 56 illustrates sequence substitutions for 10-bit and 12-bit video in 4:2:2 sampling systems in a Y Cb Cr Cc Cy color space. Components are delivered to a 4:2:2 pgroup including, but not limited to, $E'_{Y6-INT}$, $E'_{Cb-INT}+E'_{Cy-INT}$, and $E'_{Cr-INT}+E'_{Cc-INT}$. For 4:2:2 10-bit video, 5 octets are used and cover 2 pixels before restarting the sequence. For 4:2:2 12-bit video, 6 octets are used and cover 2 pixels before restarting the sequence. Component substitution follows what has been described for SMPTE ST292, where $E'_{Y6-INT}$ is placed in the Y data segments, $E'_{Cn-INT}+E'_{Cy-INT}$ is placed in the Cb data segments, and $E'_{Cr-INT}+E'_{Cc-INT}$ is placed in the Cr data segments. The sequence described in the standard is shown as Cb0', Y0', Cr0', Y1', Cr1', Y3', Cb2', Y4', Cr2', Y5', etc. In another embodiment, the video data is represented at a bit level other than 10-bit or 12-bit. In another embodiment, the sampling system is a sampling system other than 4:2:2. In another embodiment, the standard is STMPE ST2110.

Figure 57:
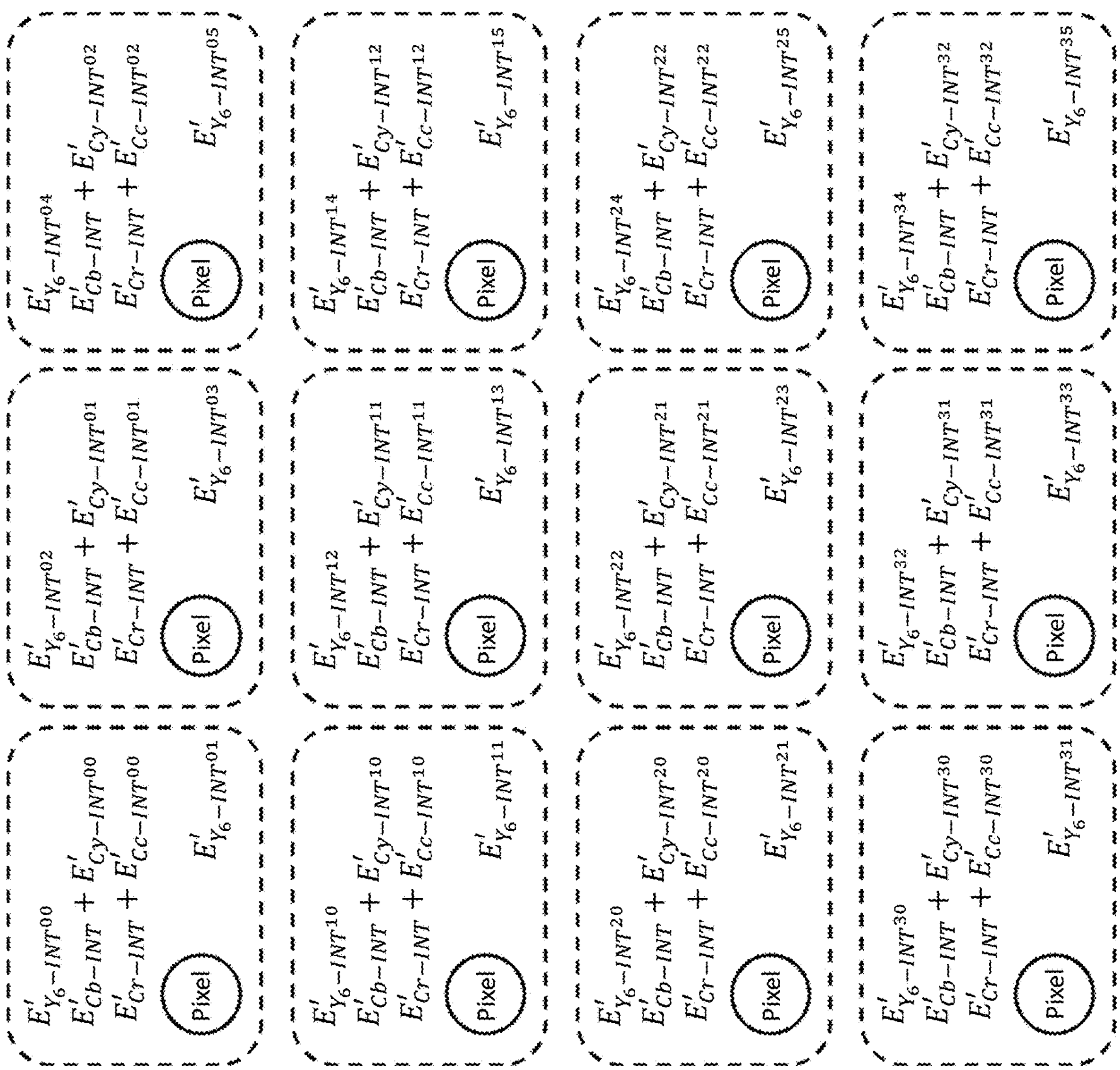
FIG. 57 illustrates sample placements of six-primary system components for a 4:2:2 sampling system image.

FIG. 57 illustrates sample placements of six-primary system components for a 4:2:2 sampling system image. This follows the substitutions illustrated in FIG. 56, using a 4:2:2 sampling system.

FIG. 58 illustrates sequence substitutions for 10-bit and 12-bit video in 4:2:0 sampling systems using a Y Cb Cr Cc Cy color space. Components are delivered to a pgroup including, but not limited to, $E'_{Y6-INT}$, $E'_{Cb-INT}+E'_{Cy-INT}$, and $E'_{Cr-INT}+E'_{Cc-INT}$. For 4:2:0 10-bit video data, 15 octets are used and cover 8 pixels before restarting the sequence. For 4:2:0 12-bit video data, 9 octets are used and cover 4 pixels before restarting the sequence. Component substitution follows what is described in SMPTE ST292 where $E'_{Y6-INT}$ is placed in the Y data segments, $E'_{Cb-INT}+E'_{Cy-INT}$ is placed in the Cb data segments, and $E'_{Cr-INT}+E'_{Cc-INT}$ is placed in the Cr data segments. The sequence described in the standard is shown as Y'00, Y'01, Y', etc.

Figure 59:
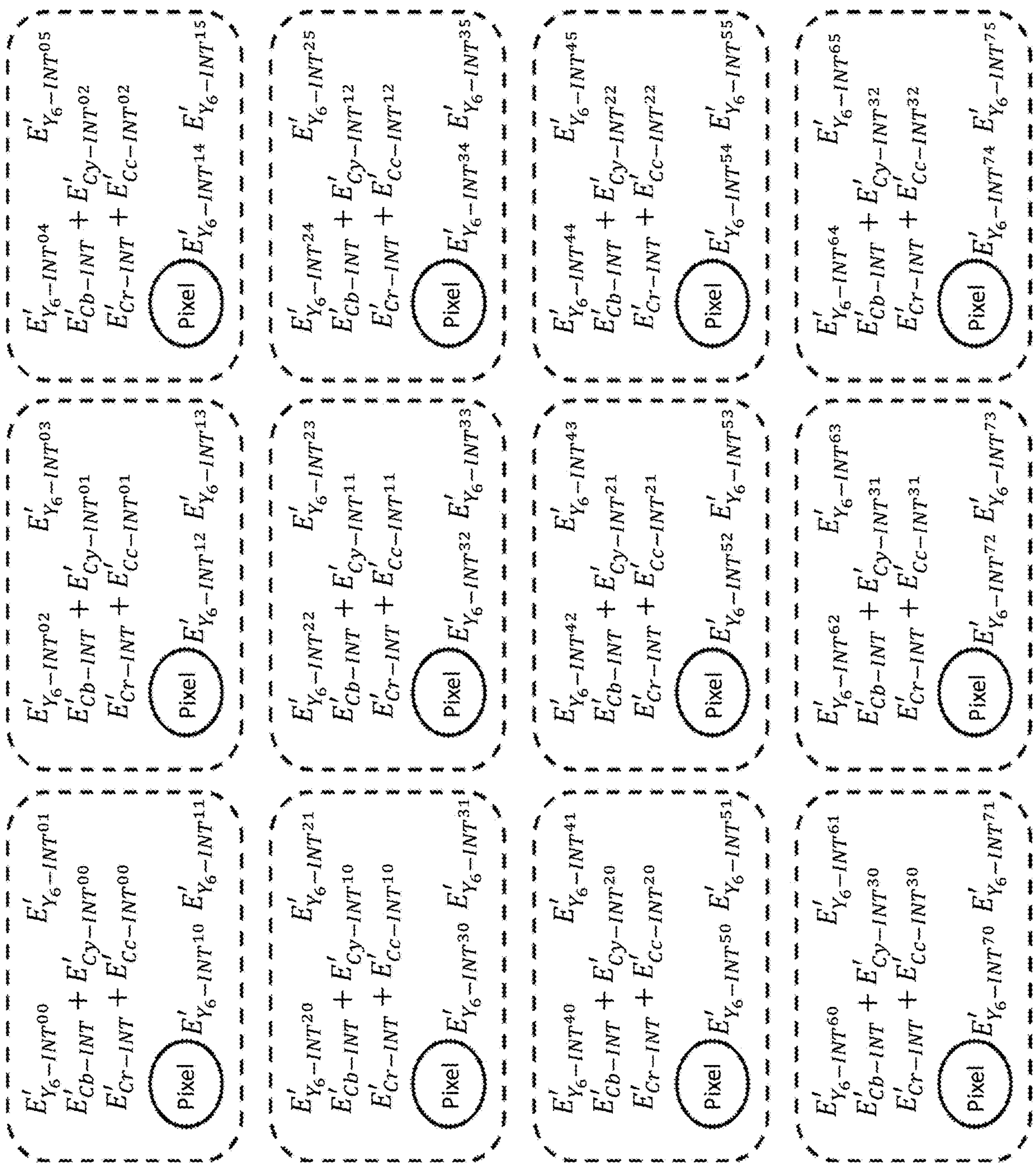
FIG. 59 illustrates sample placements of six-primary system components for a 4:2:0 sampling system image.

FIG. 59 illustrates sample placements of six-primary system components for a 4:2:0 sampling system image. This follows the substitutions illustrated in FIG. 58, using a 4:2:0 sampling system.

FIG. 60 illustrates modifications to SMPTE ST2110-20 for a 10-bit six-primary color system in 4:4:4 video. SMPTE ST2110-20 describes the construction of each "pgroup". Normally, six-primary color system data and/or content would arrive for mapping as non-linear. However, with the present system there is no restriction on mapping data and/or content. For 4:4:4, 10-bit video, 15 octets are used and cover 4 pixels before restarting the sequence. Non-linear, six-primary color system image data would arrive as $G'_{INT}$, $B'_{INT}$, $R'_{INT}$, $M'_{INT}$, $Y'_{INT}$, and $C'_{INT}$. The sequence described in the standard is shown as R0', G0', B0', R1', G1', B1', etc.

FIG. 61 illustrates modifications to SMPTE ST2110-20 for a 12-bit six-primary color system in 4:4:4 video. For 4:4:4, 12-bit video, 9 octets are used and cover 2 pixels before restarting the sequence. Non-linear, six-primary color system image data would arrive as $G'_{INT}$, $B'_{INT}$, $R'_{INT}$, $M'_{INT}$, $Y'_{INT}$, and $C'_{INT}$. The sequence described in the standard is shown as R0', G0', B0', R1', G1', B1', etc.

FIG. 62 illustrates modifications to SMPTE ST2110-20 for a 10-bit six primary color system in 4:2:2 video. Components that are delivered to a SMPTE ST2110 pgroup include, but are not limited to, $E'_{Yrgb-INT}$, $E'_{Ycym-INT}$, $E'_{Cb-INT}$, $E'_{Cr-INT}$, $E'_{Cy-INT}$, and $E'_{Cc-INT}$. For 4:2:2, 10-bit video, 5 octets are used and cover 2 pixels before restarting the sequence. For 4:2:2:2, 12-bit video, 6 octets are used and cover 2 pixels before restarting the sequence. Component substitution follows what is described for SMPTE ST292, where $E'_{Yrgb-INT}$ or $E'_{Ycym-INT}$ or are placed in the Y data segments, $E'_{Cr-INT}$ or $E'_{Cc-INT}$ are placed in the Cr data segments, and $E'_{Cb-INT}$ or $E'_{Cy-INT}$ are placed in the Cb data segments. The sequence described in the standard is shown as Cb'0, Y'0, Cr'0, Y'1, Cb'1, Y'2, Cr'1, Y'3, Cb'2, Y'4, Cr'2, etc.

FIG. 63 illustrates modifications to SMPTE ST2110-20 for a 12-bit six-primary color system in 4:2:0 video. Components that are delivered to a SMPTE ST2110 pgroup are the same as with the 4:2:2 method. For 4:2:0, 10-bit video, 15 octets are used and cover 8 pixels before restarting the sequence. For 4:2:0, 12-bit video, 9 octets are used and cover 4 pixels before restarting the sequence. Component substitution follows what is described for SMPTE ST292, where $E'_{Yrbg-INT}$ or $E'_{Ycym-INT}$ are placed in the Y data segments, $E'_{Cr-INT}$ or $E'_{Cc-INT}$ are placed in the Cr data segments, and $E'_{Cb-INT}$ or $E'_{Cy-INT}$ are placed in the Cb data segments. The sequence described in the standard is shown as Y'00, Y'01, Y', etc.

Table 14 summarizes mapping to SMPTE ST2110 for 4:2:2:2:2 and 4:2:0:2:0 sampling for System 1 and Table 15 summaries mapping to SMPTE ST2110 for 4:4:4:4:4:4 sampling (linear and non-linear) for System 1.

TABLE 14

| Sampling | Bit Depth | Pgroup Octets | Pgroup Pixels | Y PbPr Sample Order | 6P Sample Order |
|---|---|---|---|---|---|
| 4:2:2:2:2 | 8 | 4 | 2 | $C_B'$, Y0', $C_R'$, Y1' | |
| | 10 | 5 | 2 | $C_B'$, Y0', $C_R'$, Y1' | $C_B' + C_Y'$, Y0', $C_R' + C_C'$, Y1' |
| | 12 | 6 | 2 | $C_B'$, Y0', $C_R'$, Y1' | $C_B' + C_Y'$, Y0', $C_R' + C_C'$, Y1' |
| | 16, 16f | 8 | 2 | $C'_B$, Y'0, $C'_R$, Y'1 | $C_B' + C_Y'$, Y0', $C_R' + C_C'$, Y1' |
| 4:2:0:2:0 | 8 | 6 | 4 | Y'00, Y'01, Y'10, Y'11, $C_B'$00, $C_R'$00 | |
| | 10 | 15 | 8 | Y'00, Y'01, Y'10, Y'11, $C_B'$00, $C_R'$00 | Y'00, Y'01, Y'10, Y'11, $C_B'00 + C_Y'00$, $C_R'00 + C_C'00$ |
| | | | | Y'02, Y'03, Y'12, Y'13, $C_B'$01, $C_R'$01 | Y'02, Y'03, Y'12, Y'13, $C_B'01 + C_Y'01$, $C_R'01 + C_C'01$ |
| | 12 | 9 | 4 | Y'00, Y'01, Y'10, Y'11, $C_B'$00, $C_R'$00 | Y'00, Y'01, Y'10, Y'11, $C_B'00 + C_Y'00$, $C_R'00 + C_C'00$ |

TABLE 15

| Sampling | Bit Depth | pgroup Octets | pgroup pixels | RGB Sample Order | 6P Sample Order |
|---|---|---|---|---|---|
| 4:4:4:4:4:4 | 8 | 3 | 1 | R, G, B | |
| Linear | 10 | 15 | 4 | R0, G0, B0, R1, G1, B1, R2, G2, B2 | R + C0, G + M0, B + Y0, R + C1, G + M1, B + Y1, R + C2, G + M2, B + Y2 |
| | 12 | 9 | 2 | R0, G0, B0, R1, G1, B1 | R + C0, G + M0, B + Y0, R + C1, G + M1, B + Y1 |
| | 16, 16f | 6 | 1 | R, G, B | R + C, G + M, B + Y |
| 4:4:4:4:4:4 | 8 | 3 | 1 | R', G', B' | |
| Non-Linear | 10 | 15 | 4 | R0', G0', B0', R1', G1', B1', R2', G2', B2' | R' + C'0, G' + M'0, B' + Y'0, R' + C'1, G' + M'1, B' + Y'1, R' + C'2, G' + M'2, B' + Y'2 |
| | 12 | 9 | 2 | R0', G0', B0', R1', G1', B1' | R' + C'0, G' + M'0, B' + Y'0, R' + C'1, G' + M'1, B' + Y'1 |
| | 16, 16f | 6 | 1 | R', G', B' | R' + C', G' + M', B' + Y' |

Table 16 summarizes mapping to SMPTE ST2110 for 4:2:2:2:2 sampling for System 2 and Table 17 summaries mapping to SMPTE ST2110 for 4:4:4:4:4:4 sampling (linear and non-linear) for System 2.

TABLE 16

| Sampling | Bit Depth | pgroup octets | pgroup pixels | Y PbPr Sample Order | 6P Sample Order |
|---|---|---|---|---|---|
| 4:2:2:2:2 | 8 | 8 | 2 | $C_B$', Y0', $C_R$', Y1' | $C_B$', $C_Y$', $Y_{RGB}$0', $C_R$', $C_C$', $Y_{CMY}$0' $C_B$', $C_Y$', $Y_{RGB}$1' |
| | 10 | 10 | 2 | $C_B$', Y0', $C_R$', Y1' | $C_B$', $C_Y$', $Y_{RGB}$0', $C_R$', $C_C$', $Y_{CMY}$0' $C_B$', $C_Y$', $Y_{RGB}$1' |
| | 12 | 12 | 2 | $C_B$', Y0', $C_R$', Y1' | $C_B$', $C_Y$', $Y_{RGB}$0', $C_R$', $C_C$', $Y_{CMY}$0' $C_B$', $C_Y$', $Y_{RGB}$1' |
| | 16, 16f | 16 | 2 | C'$_B$, Y'0, C'$_R$, Y'1 | $C_B$', $C_Y$', $Y_{RGB}$0', $C_R$', $C_C$', $Y_{CMY}$0' $C_B$', $C_Y$', $Y_{RGB}$1' |

TABLE 17

| Sampling | Bit Depth | pgroup octets | pgroup pixels | RGB Sample Order | 6P Sample Order |
|---|---|---|---|---|---|
| 4:4:4:4:4:4 | 8 | 3 | 1 | R, G, B | R, C, G, M, B, Y |
| Linear | 10 | 15 | 4 | R0, G0, B0, R1, G1, B1, R2, G2, B2 | R0, C0, G0, M0, B0, Y0, R1, C1, G1, M1, B1, Y1, R2, C2, G2, M2, B2 + Y2 |
| | 12 | 9 | 2 | R0, G0, B0, R1, G1, B1 | R0, C0, G0, M0, B0, Y0, R1, C1, G1, M1, B1, Y1 |
| | 16, 16f | 6 | 1 | R, G, B | R, C, G, M, B, Y |
| 4:4:4:4:4:4 | 8 | 3 | 1 | R', G', B' | R', C', G', M', B', Y' |
| Non-Linear | 10 | 15 | 4 | R0', G0', B0', R1', G1', B1', R2', G2', B2' | R0', C0', G0', M0', B0', Y0', R1', C1', G1', M1', B1', Y1', R2', C2' G2', M2', B2' + Y2' |
| | 12 | 9 | 2 | R0', G0', B0', R1', G1', B1' | R0', C0', G0', M0', B0', Y0', R1', C1', G1', M1', B1', Y1' |
| | 16, 16f | 6 | 1 | R', G', B' | R', C', G', M', B', Y' |

Session Description Protocol (Sdp) Modification for a Six-Primary Color System

SDP is derived from IETF RFC 4566 which sets parameters including, but not limited to, bit depth and sampling parameters. In one embodiment, SDP parameters are contained within the RTP payload. In another embodiment, SDP parameters are contained within the media format and transport protocol. This payload information is transmitted as text. Therefore, modifications for the additional sampling identifiers requires the addition of new parameters for the sampling statement. SDP parameters include, but are not limited to, color channel data, image data, framerate data, a sampling standard, a flag indicator, an active picture size code, a timestamp, a clock frequency, a frame count, a scrambling indicator, and/or a video format indicator. For non-constant luminance imaging, the additional parameters include, but are not limited to, RGBCYM-4:4:4, YBRCY-4:2:2, and YBRCY-4:2:0. For constant luminance signals, the additional parameters include, but are not limited to, CLYBRCY-4:2:2 and CLYBRCY-4:2:0.

Additionally, differentiation is included with the colorimetry identifier in one embodiment. For example, 6PB1 defines 6P with a color gamut limited to ITU-R BT.709 formatted as System 1, 6PB2 defines 6P with a color gamut limited to ITU-R BT.709 formatted as System 2, 6PB3 defines 6P with a color gamut limited to ITU-R BT.709 formatted as System 3, 6PC1 defines 6P with a color gamut limited to SMPTE RP 431-2 formatted as System 1, 6PC2 defines 6P with a color gamut limited to SMPTE RP 431-2 formatted as System 2, 6PC3 defines 6P with a color gamut limited to SMPTE RP 431-2 formatted as System 3, 6PS1 defines 6P with a color gamut as Super 6P formatted as System 1, 6PS2 defines 6P with a color gamut as Super 6P formatted as System 2, and 6PS3 defines 6P with a color gamut as Super 6P formatted as System 3.

Colorimetry can also be defined between a six-primary color system using the ITU-R BT.709-6 standard and the SMPTE ST431-2 standard, or colorimetry can be left defined as is standard for the desired standard. For example, the SDP parameters for a 1920×1080 six-primary color system using the ITU-R BT.709-6 standard with a 10-bit signal as System 1 are as follows: m=video 30000 RTP/AVP 112, a=rtpmap:112 raw/90000, a=fmtp:112, sampling=YBRCY-4:2:2, width=1920, height=1080, exactframerate=30000/1001, depth=10, TCS=SDR, colorimetry=6PB1, PM=2110GPM, SSN=ST2110-20:2017.

In one embodiment, the six-primary color system is integrated with a Consumer Technology Association (CTA) 861-based system. CTA-861 establishes protocols, requirements, and recommendations for the utilization of uncompressed digital interfaces by consumer electronics devices including, but not limited to, digital televisions (DTVs), digital cable, satellite or terrestrial set-top boxes (STBs), and related peripheral devices including, but not limited to, DVD players and/or recorders, and other related Sources or Sinks.

These systems are provided as parallel systems so that video content is parsed across several line pairs. This enables each video component to have its own transition-minimized differential signaling (TMDS) path. TMDS is a technology for transmitting high-speed serial data and is used by the Digital Visual Interface (DVI) and High-Definition Multimedia Interface (HDMI) video interfaces, as well as other digital communication interfaces. TMDS is similar to low-voltage differential signaling (LVDS) in that it uses differential signaling to reduce electromagnetic interference (EMI), enabling faster signal transfers with increased accuracy. In addition, TMDS uses a twisted pair for noise reduction, rather than a coaxial cable that is conventional for carrying video signals. Similar to LVDS, data is transmitted serially over the data link. When transmitting video data, and using HDMI, three TMDS twisted pairs are used to transfer video data.

In such a system, each pixel packet is limited to 8 bits only. For bit depths higher than 8 bits, fragmented packs are used. This arrangement is no different than is already described in the current CTA-861 standard.

Based on CTA extension Version 3, identification of a six-primary color transmission would be performed by the sink device (e.g., the monitor). Adding recognition of the additional formats would be flagged in the CTA Data Block Extended Tag Codes (byte 3). Since codes 33 and above are reserved, any two bits could be used to identify that the format is RGB, RGBCYM, Y Cb Cr, or Y Cb Cr Cc Cy and/or identify System 1 or System 2. Should byte 3 define a six-primary sampling format, and where the block 5 extension identifies byte 1 as ITU-R BT.709, then logic assigns as 6P-B. However, should byte 4 bit 7 identify colorimetry as DCI-P3, the color gamut would be assigned as 6P-C.

In one embodiment, the system alters the AVI Infoframe Data to identify content. AVI Infoframe Data is shown in Table 10 of CTA 861-G. In one embodiment, Y2=1, Y1=0, and Y0=0 identifies content as 6P 4:2:0:2:0. In another embodiment, Y2=1, Y1=0, and Y0=1 identifies content as Y Cr Cb Cc Cy. In yet another embodiment, Y2=1, Y1=1, and Y0=0 identifies content as RGBCMY.

Byte 2 C1=1, C0=1 identifies extended colorimetry in Table 11 of CTA 861-G. Byte 3 EC2, EC1, ECO identifies additional colorimetry extension valid in Table 13 of CTA 861-G. Table 14 of CTA 861-G reserves additional extensions. In one embodiment, ACE3=1, ACE2=0, ACE1=0, and ACE0=X identifies 6P-B. In one embodiment, ACE3=0, ACE2=1, ACE1=0, and ACE0=X identifies 6P-C. In one embodiment, ACE3=0, ACE2=0, ACE1=1, and ACE0=X identifies System 1. In one embodiment, ACE3=1, ACE2=1, ACE1=0, and ACE0=X identifies System 2.

Figure 64:
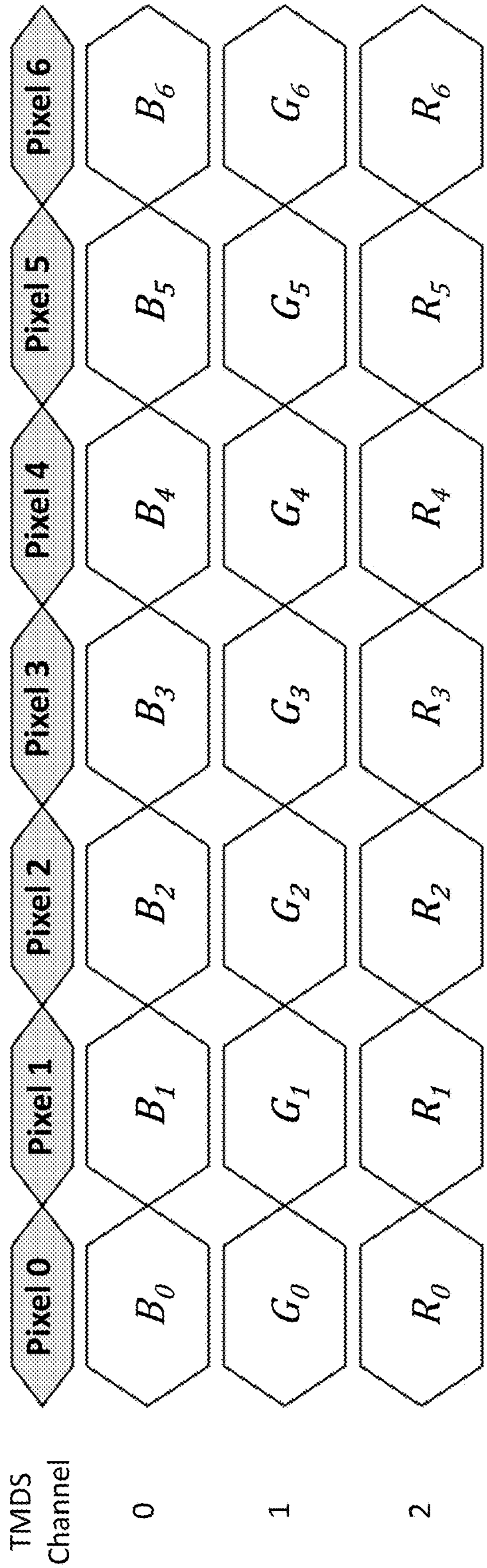
FIG. 64 illustrates an RGB sampling transmission for a 4:4:4 sampling system.
Figure 65:
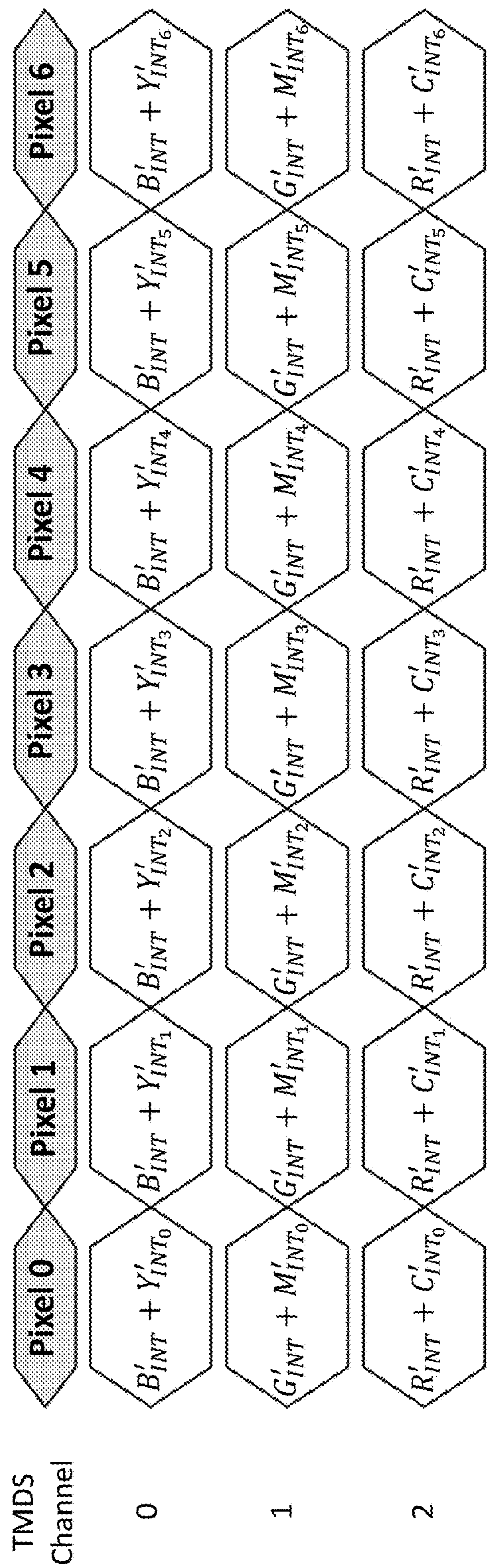
FIG. 65 illustrates a RGBCYM sampling transmission for a 4:4:4 sampling system.
Figure 66:
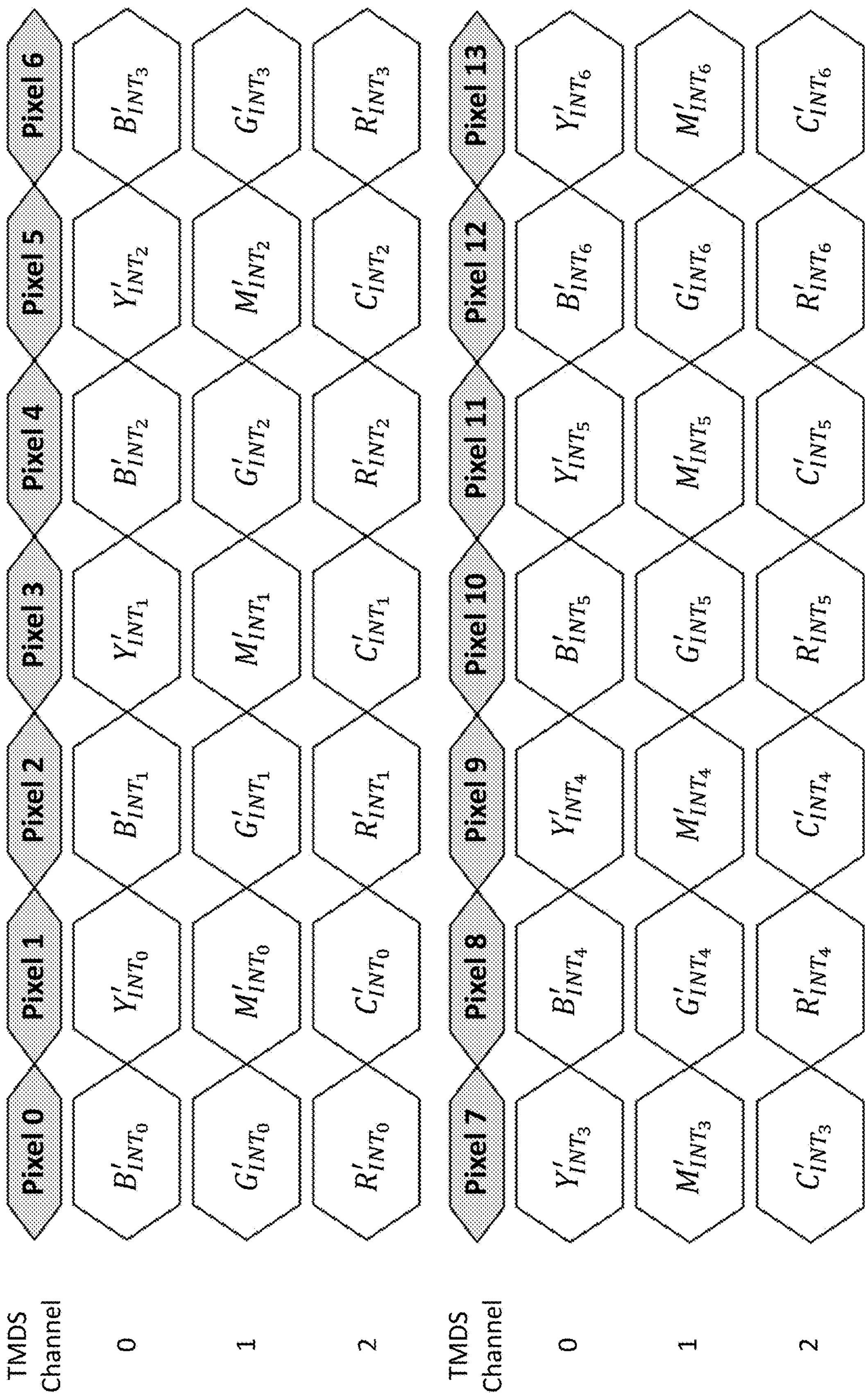
FIG. 66 illustrates an example of System 2 to RGBCYM 4:4:4 transmission.
Figure 67:
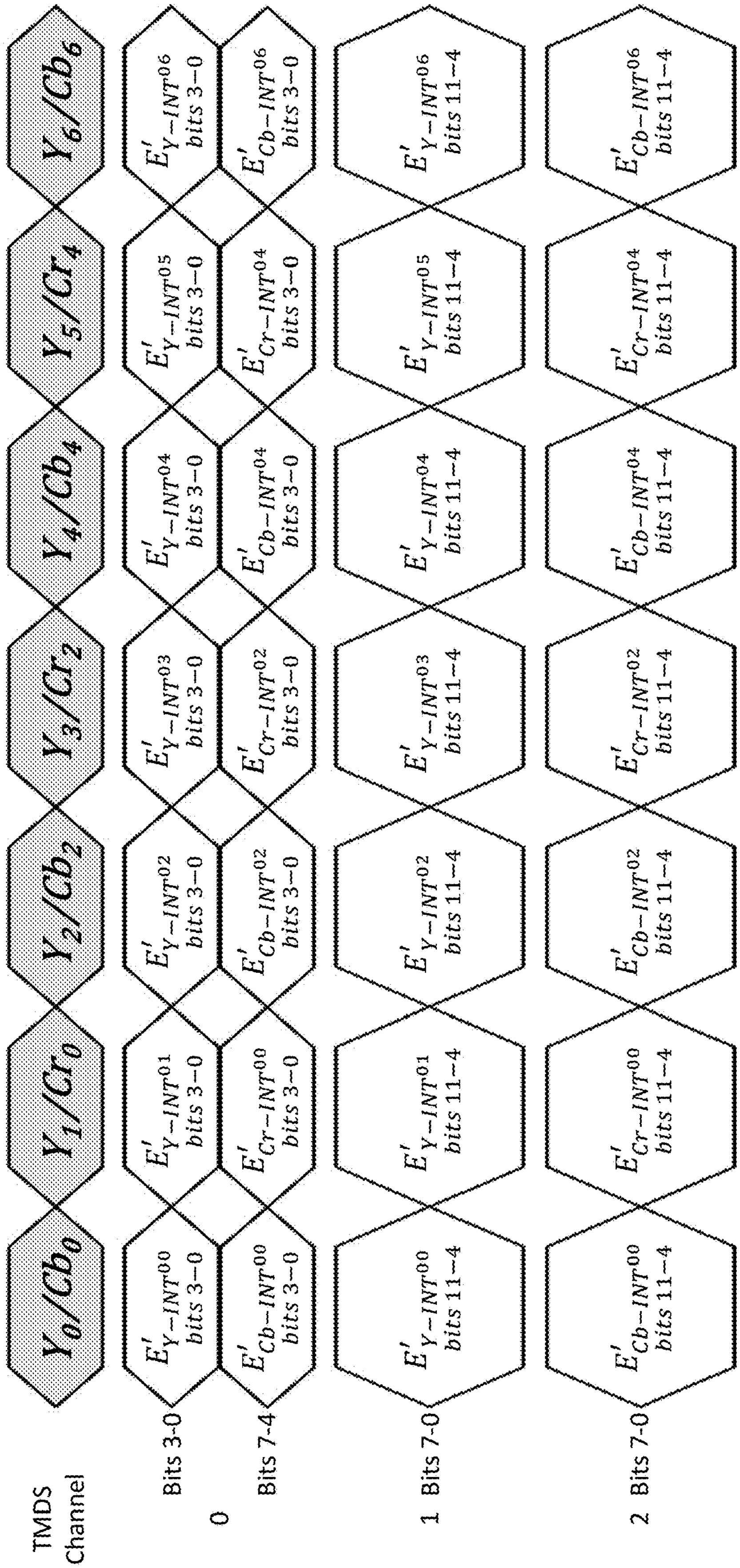
FIG. 67 illustrates a Y Cb Cr sampling transmission using a 4:2:2 sampling system.
Figure 68:
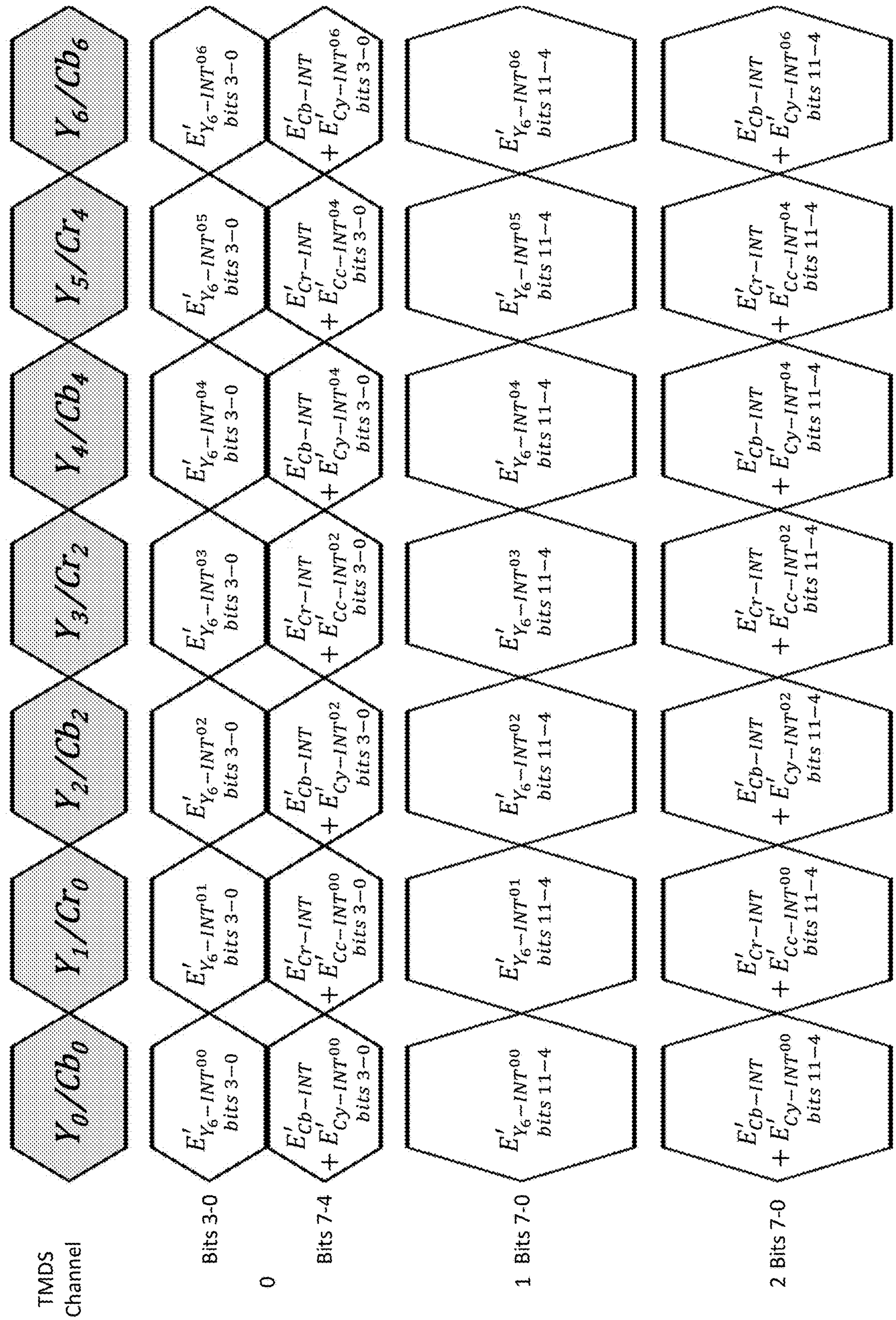
FIG. 68 illustrates a Y Cr Cb Cc Cy sampling transmission using a 4:2:2 sampling system.
Figure 69:
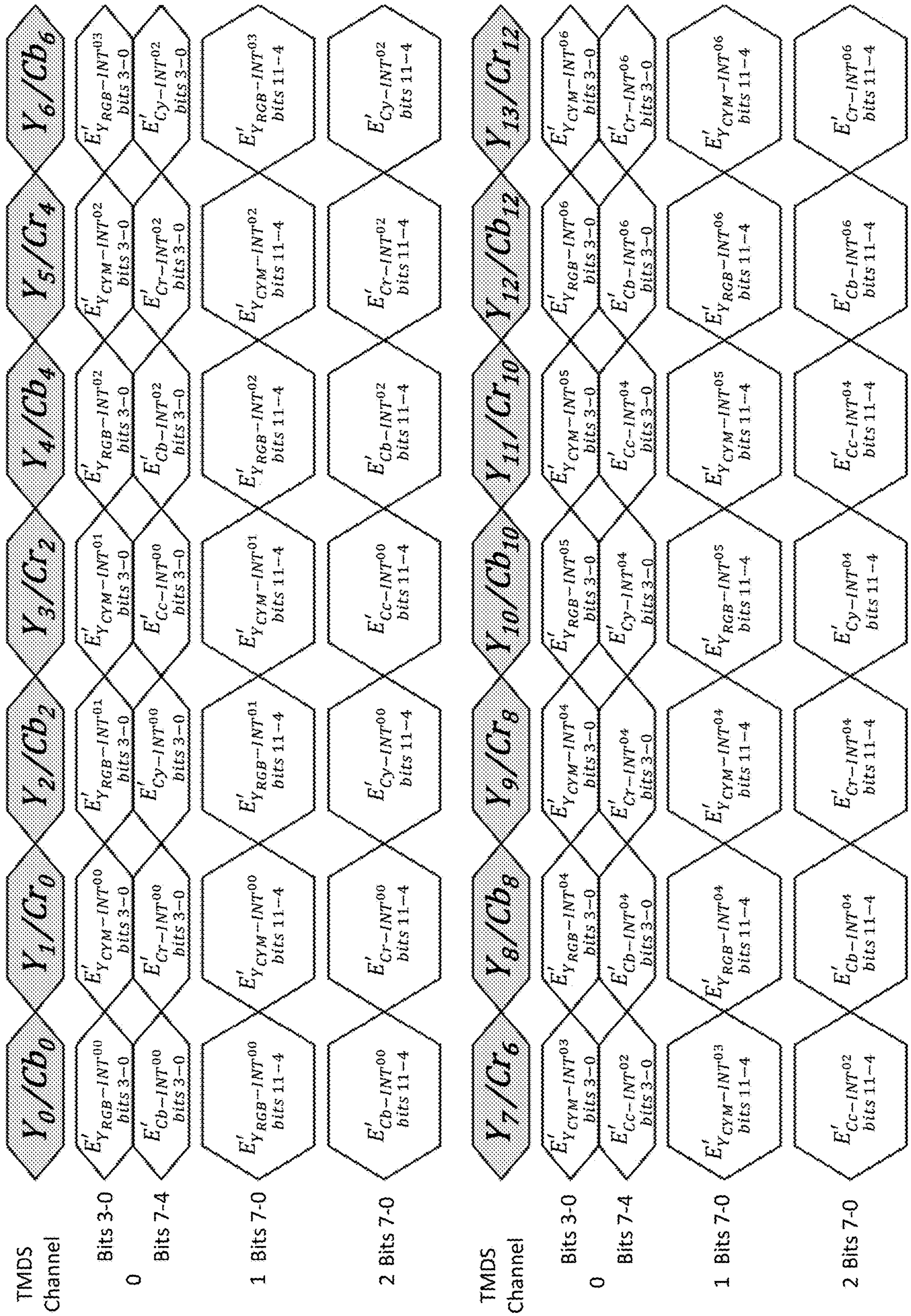
FIG. 69 illustrates an example of a System 2 to Y Cr Cb Cc Cy 4:2:2 Transmission as non-constant luminance.
Figure 70:
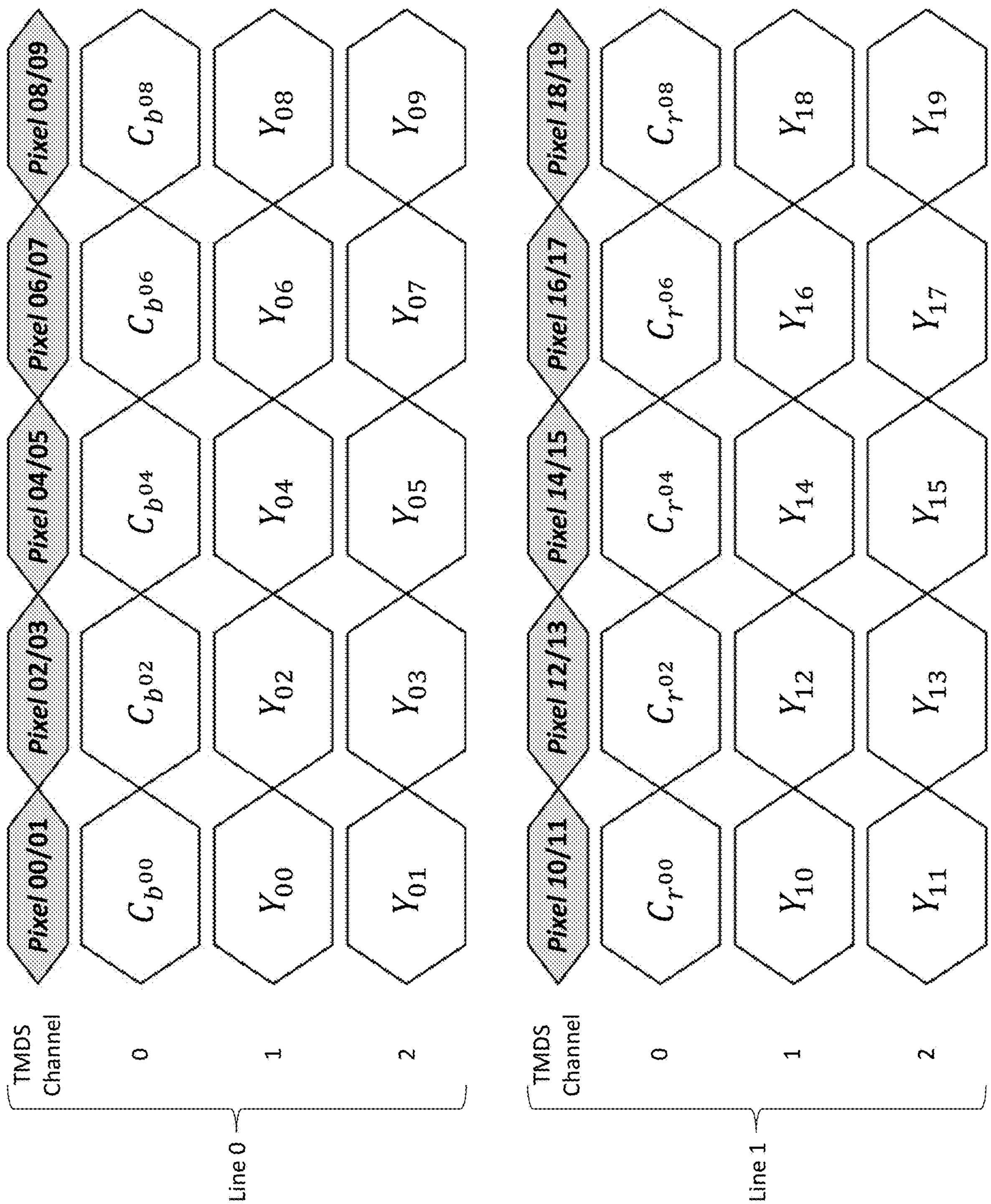
FIG. 70 illustrates a Y Cb Cr sampling transmission using a 4:2:0 sampling system.
Figure 71:
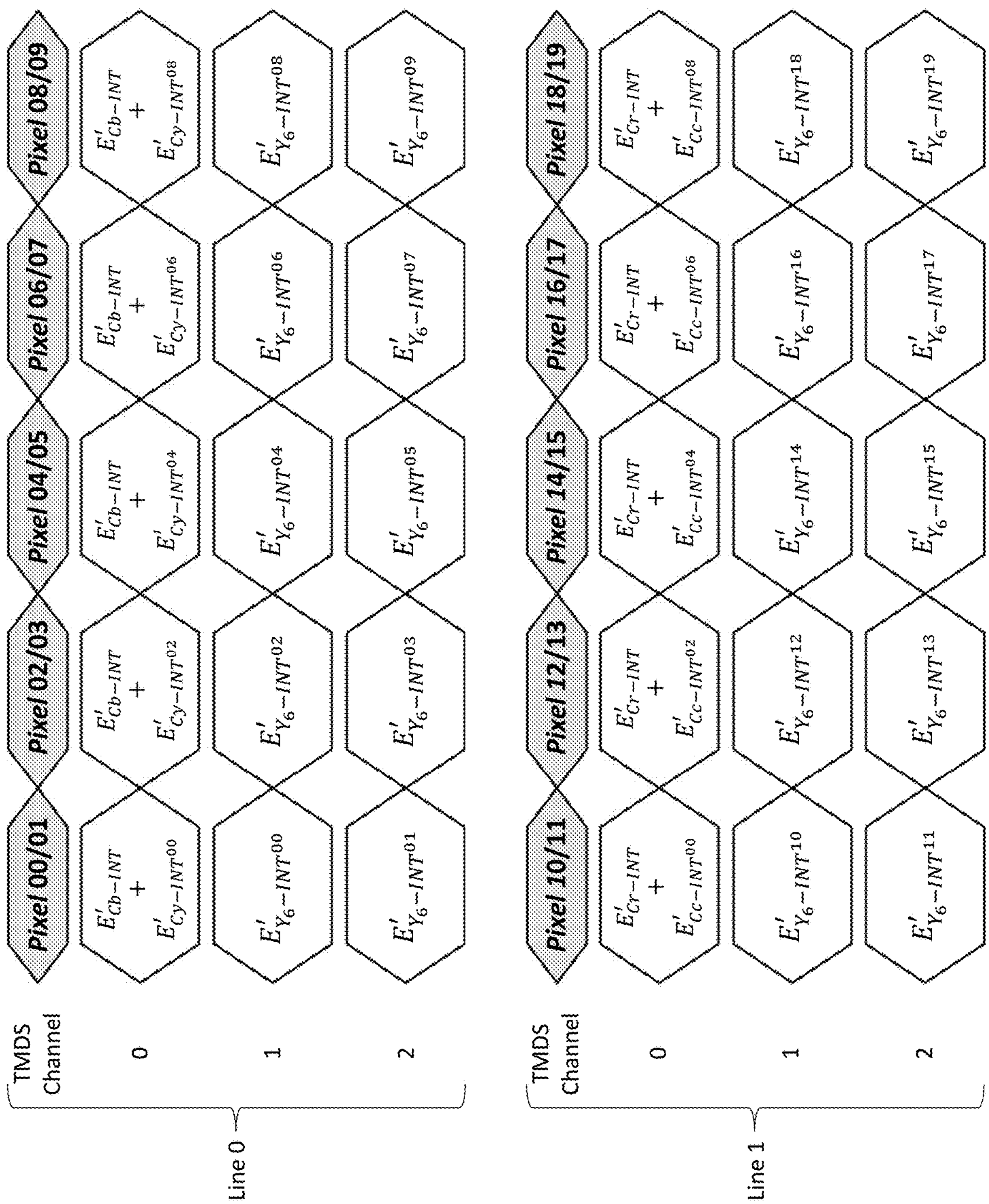
FIG. 71 illustrates a Y Cr Cb Cc Cy sampling transmission using a 4:2:0 sampling system.

FIG. 64 illustrates the current RGB sampling structure for 4:4:4 sampling video data transmission. For HDMI 4:4:4 sampling, video data is sent through three TMDS line pairs. FIG. 65 illustrates a six-primary color sampling structure, RGBCYM, using System 1 for 4:4:4 sampling video data transmission. In one embodiment, the six-primary color sampling structure complies with CTA 861-G, November 2016, Consumer Technology Association, which is incorporated herein by reference in its entirety. FIG. 66 illustrates an example of System 2 to RGBCYM 4:4:4 transmission. FIG. 67 illustrates current Y Cb Cr 4:2:2 sampling transmission as non-constant luminance. FIG. 68 illustrates a six-primary color system (System 1) using Y Cr Cb Cc Cy 4:2:2 sampling transmission as non-constant luminance. FIG. 69 illustrates an example of a System 2 to Y Cr Cb Cc Cy 4:2:2 Transmission as non-constant luminance. In one embodiment, the Y Cr Cb Cc Cy 4:2:2 sampling transmission complies with CTA 861-G, November 2016, Consumer Technology Association. FIG. 70 illustrates current Y Cb Cr 4:2:0 sampling transmission. FIG. 71 illustrates a six-primary color system (System 1) using Y Cr Cb Cc Cy 4:2:0 sampling transmission.

HDMI sampling systems include Extended Display Identification Data (EDID) metadata. EDID metadata describes the capabilities of a display device to a video source. The data format is defined by a standard published by the Video Electronics Standards Association (VESA). The EDID data structure includes, but is not limited to, manufacturer name and serial number, product type, phosphor or filter type, timings supported by the display, display size, luminance data, and/or pixel mapping data. The EDID data structure is modifiable and modification requires no additional hardware and/or tools.

EDID information is transmitted between the source device and the display through a display data channel (DDC), which is a collection of digital communication protocols created by VESA. With EDID providing the display information and DDC providing the link between the display and the source, the two accompanying standards enable an information exchange between the display and source.

In addition, VESA has assigned extensions for EDID. Such extensions include, but are not limited to, timing extensions (00), additional time data black (CEA EDID Timing Extension (02)), video timing block extensions (VTB-EXT (10)), EDID 2.0 extension (20), display information extension (DI-EXT (40)), localized string extension (LS-EXT (50)), microdisplay interface extension (MI-EXT (60)), display ID extension (70), display transfer characteristics data block (DTCDB (A7, AF, BF)), block map (F0), display device data block (DDDB (FF)), and/or extension defined by monitor manufacturer (FF).

In one embodiment, SDP parameters include data corresponding to a payload identification (ID) and/or EDID information.

Multi-Primary Color System Display

Figure 72:
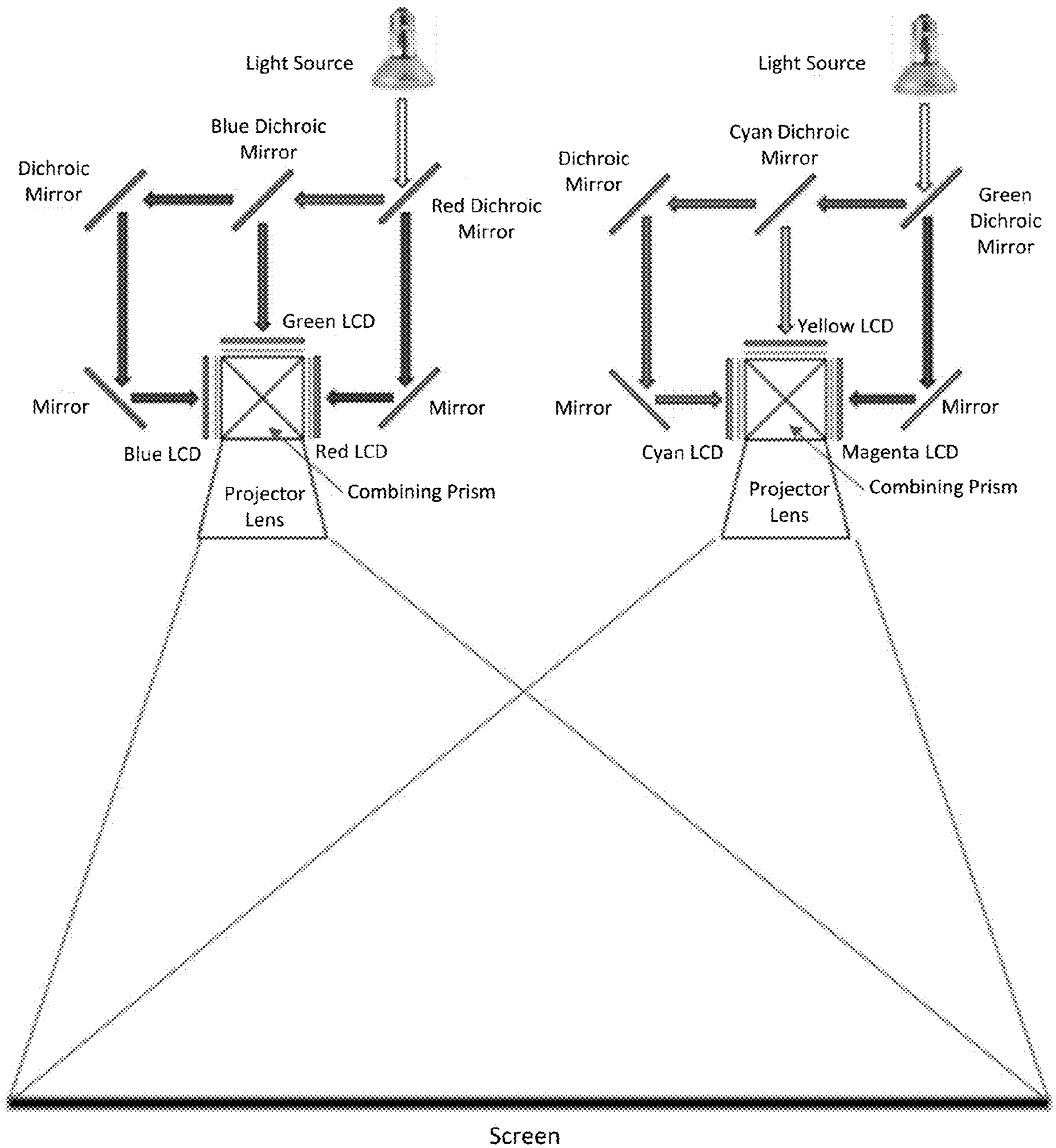
FIG. 72 illustrates a dual stack LCD projection system for a six-primary color system.

FIG. 72 illustrates a dual stack LCD projection system for a six-primary color system. In one embodiment, the display is comprised of a dual stack of projectors. This display uses two projectors stacked on top of one another or placed side by side. Each projector is similar, with the only difference being the color filters in each unit. Refresh and pixel timings are synchronized, enabling a mechanical alignment between the two units so that each pixel overlays the same position between projector units. In one embodiment, the two projectors are Liquid-Crystal Display (LCD) projectors. In another embodiment, the two projectors are Digital Light Processing (DLP) projectors. In yet another embodiment, the two projectors are Liquid-Crystal on Silicon (LCOS) projectors. In yet another embodiment, the two projectors are Light-Emitting Diode (LED) projectors.

Figure 73:
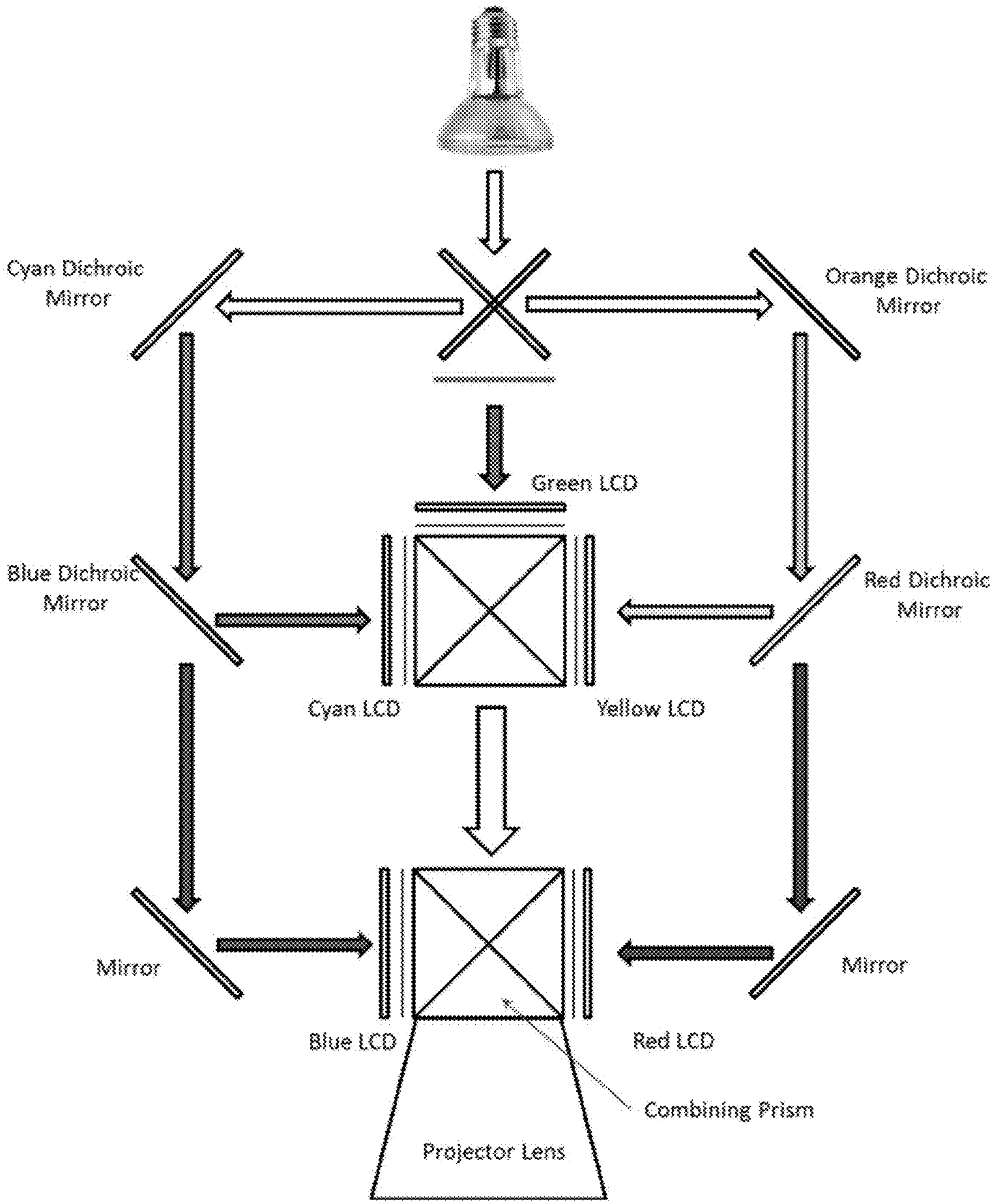
FIG. 73 illustrates one embodiment of a single projector.

In one embodiment, the display is comprised of a single projector. A single projector six-primary color system requires the addition of a second cross block assembly for the additional colors. One embodiment of a single projector (e.g., single LCD projector) is shown in FIG. 73. A single projector six-primary color system includes a cyan dichroic mirror, an orange dichroic mirror, a blue dichroic mirror, a red dichroic mirror, and two additional standard mirrors. In one embodiment, the single projector six-primary color system includes at least six mirrors. In another embodiment, the single projector six-primary color system includes at least two cross block assembly units.

Figure 74:
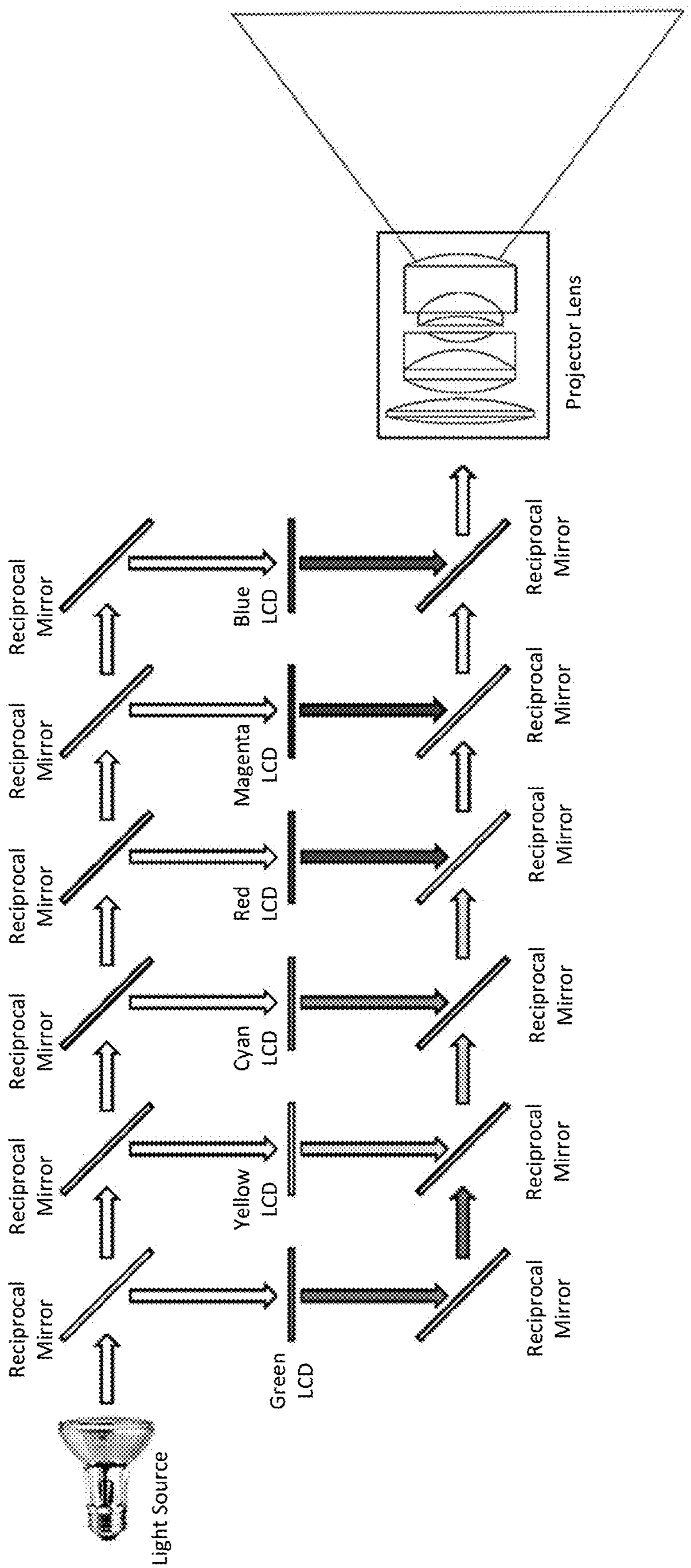
FIG. 74 illustrates a six-primary color system using a single projector and reciprocal mirrors.

FIG. 74 illustrates a six-primary color system using a single projector and reciprocal mirrors. In one embodiment, the display is comprised of a single projector unit working in combination with at first set of at least six reciprocal mirrors, a second set of at least six reciprocal mirrors, and at least six LCD units. Light from at least one light source emits towards the first set of at least six reciprocal mirrors. The first set of at least six reciprocal mirrors reflects light towards at least one of the at least six LCD units. The at least six LCD units include, but are not limited to, a Green LCD, a Yellow LCD, a Cyan, LCD, a Red LCD, a Magenta LCD, and/or a Blue LCD. Output from each of the at least six LCDs is received by the second set of at least six reciprocal mirrors. Output from the second set of at least six reciprocal mirrors is sent to the single projector unit. Image data output by the single projector unit is output as a six-primary color system. In another embodiment, there are more than two sets of reciprocal mirrors. In another embodiment, more than one projector is used.

Figure 75:
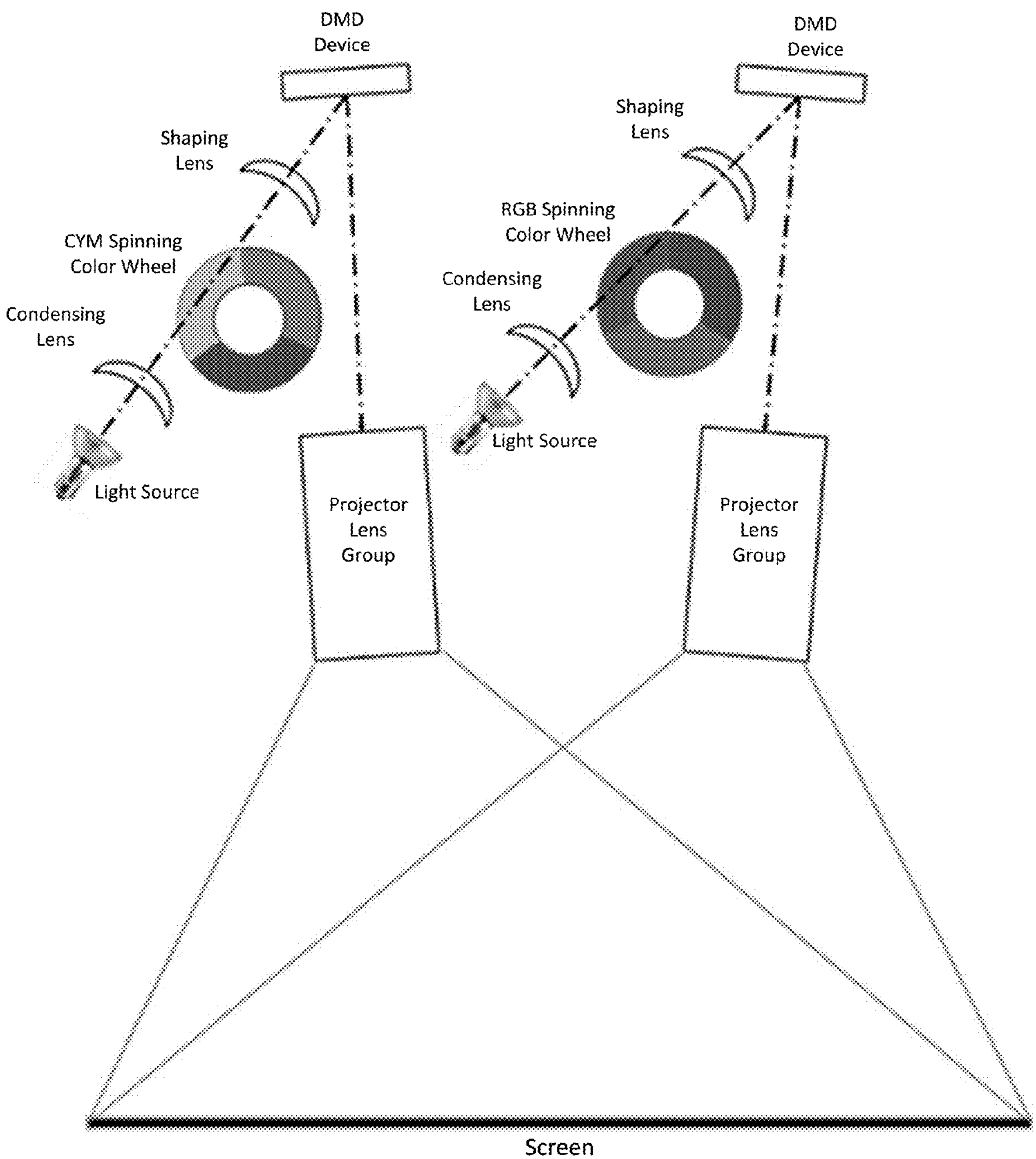
FIG. 75 illustrates a dual stack DMD projection system for a six-primary color system.

In another embodiment, the display is comprised of a dual stack Digital Micromirror Device (DMD) projector system. FIG. 75 illustrates one embodiment of a dual stack DMD projector system. In this system, two projectors are stacked on top of one another. In one embodiment, the dual stack DMD projector system uses a spinning wheel filter. In another embodiment, the dual stack DMD projector system uses phosphor technology. In one embodiment, the filter systems are illuminated by a xenon lamp. In another embodiment, the filter system uses a blue laser illuminator system. Filter systems in one projector are RGB, while the second projector uses a CYM filter set. The wheels for each projector unit are synchronized using at least one of an input video sync or a projector to projector sync, and timed so that the inverted colors are output of each projector at the same time.

In one embodiment, the projectors are phosphor wheel systems. A yellow phosphor wheel spins in time with a DMD imager to output sequential RG. The second projector is designed the same, but uses a cyan phosphor wheel. The output from this projector becomes sequential BG. Combined, the output of both projectors is YRGGCB. Magenta is developed by synchronizing the yellow and cyan wheels to overlap the flashing DMD.

Figure 76:
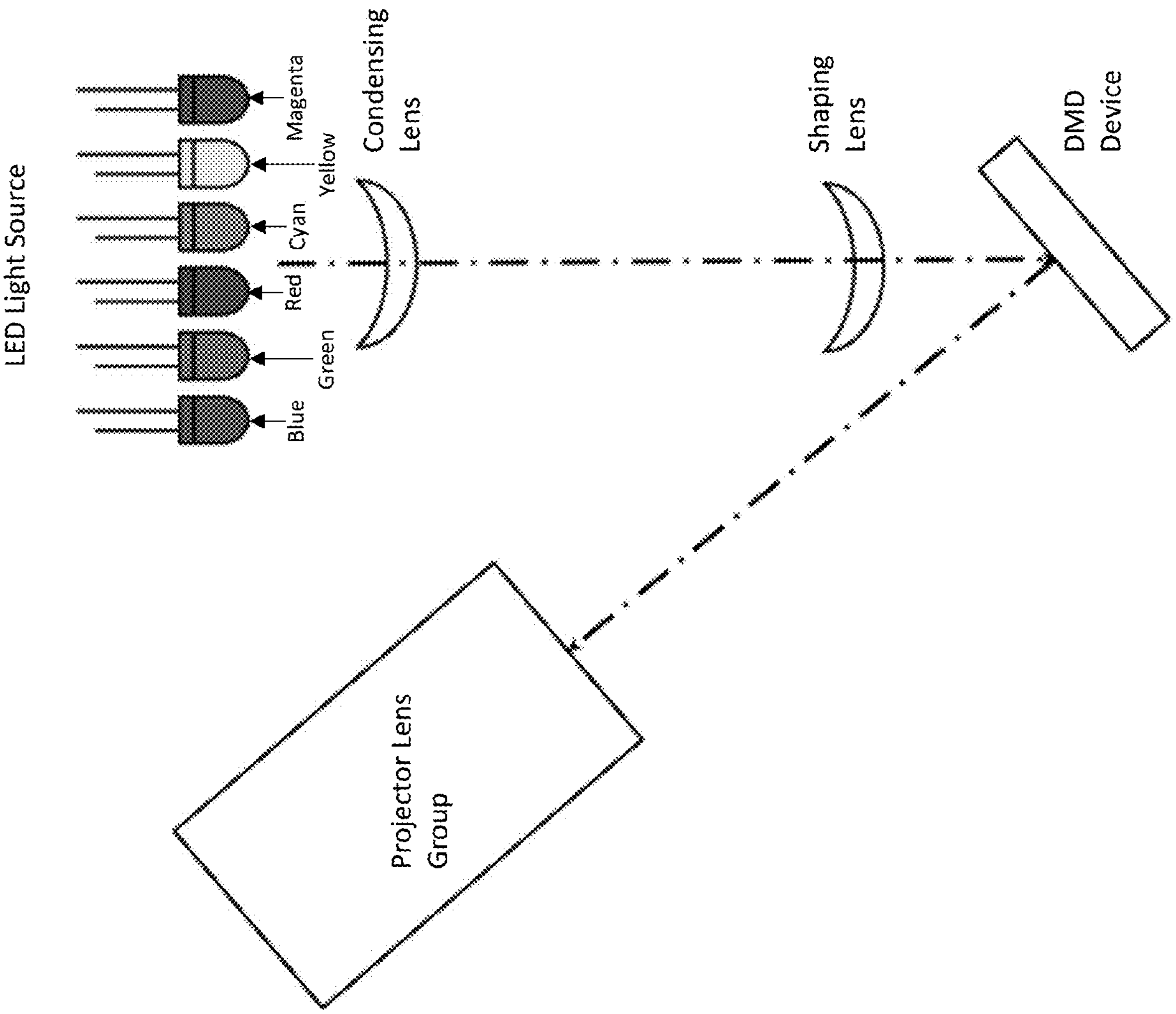
FIG. 76 illustrates one embodiment of a single DMD projector solution.

In another embodiment, the display is a single DMD projector solution. A single DMD device is coupled with an RGB diode light source system. In one embodiment, the DMD projector uses LED diodes. In one embodiment, the DMD projector includes CYM diodes. In another embodiment, the DMD projector creates CYM primaries using a double flashing technique. FIG. 76 illustrates one embodiment of a single DMD projector solution.

Figure 77:
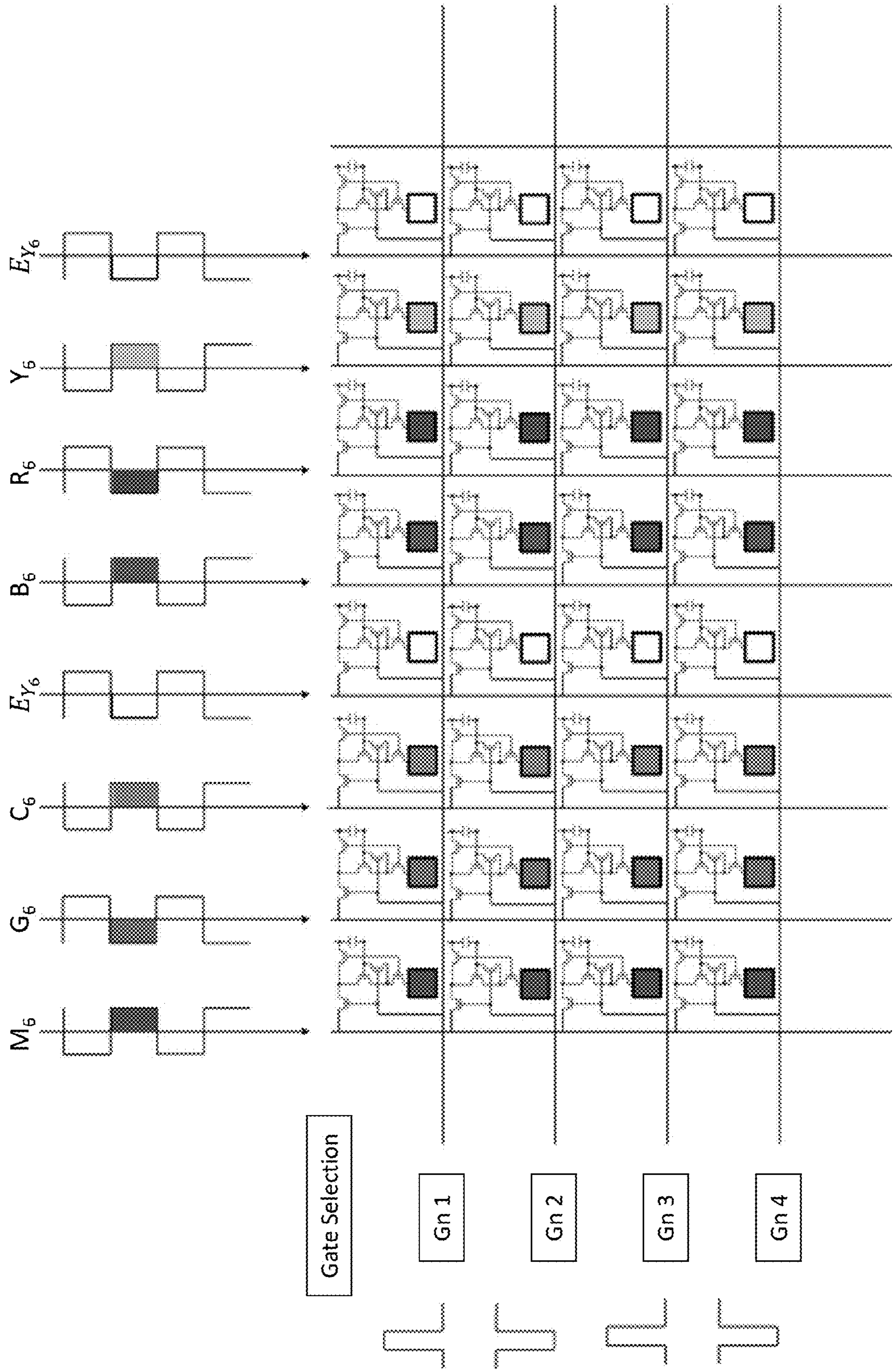
FIG. 77 illustrates one embodiment of a color filter array for a six-primary color system with a white OLED monitor.

FIG. 77 illustrates one embodiment of a six-primary color system using a white OLED display. In yet another embodiment, the display is a white OLED monitor. Current emissive monitor and/or television designs use a white emissive OLED array covered by a color filter. Changes to this type of display only require a change to pixel indexing and new six color primary filters. Different color filter arrays are used, placing each subpixel in a position that provides the least light restrictions, color accuracy, and off axis display.

Figure 78:
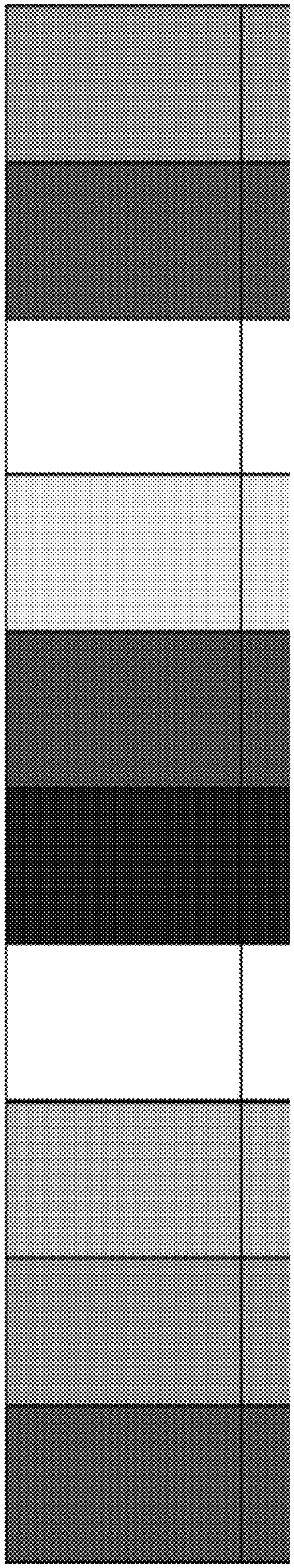
FIG. 78 illustrates one embodiment of an optical filter array for a six-primary color system with a white OLED monitor.

FIG. 78 illustrates one embodiment of an optical filter array for a white OLED display.

Figure 79:
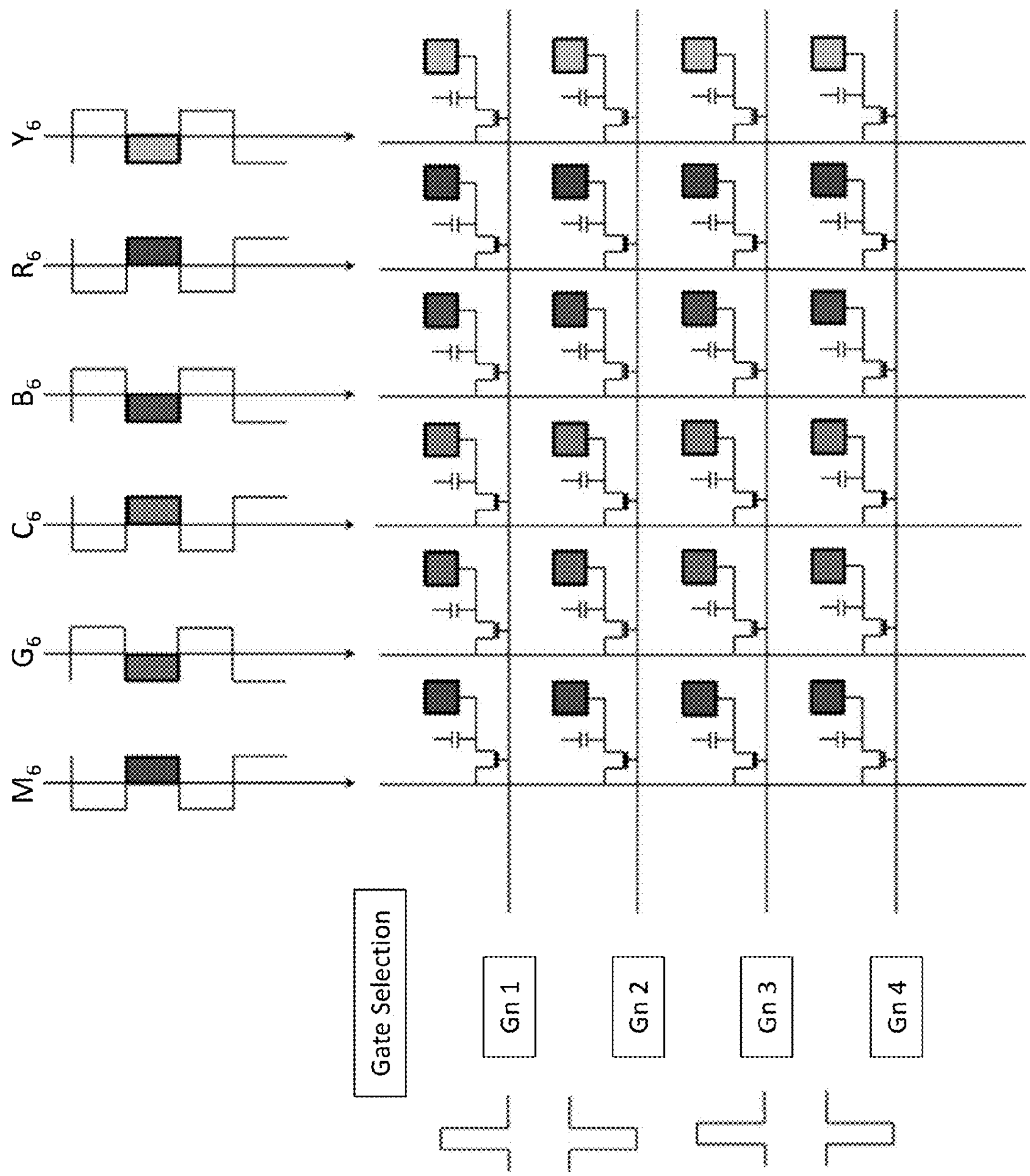
FIG. 79 illustrates one embodiment of a matrix of an LCD drive for a six-primary color system with a backlight illuminated LCD monitor.

FIG. 79 illustrates one embodiment of a matrix of an LCD drive for a six-primary color system with a backlight illuminated LCD monitor. In yet another embodiment, the display is a backlight illuminated LCD display. The design of an LCD display involves adding the CYM subpixels. Drives for these subpixels are similar to the RGB matrix drives. With the advent of 8K LCD televisions, it is technically feasible to change the matrix drive and optical filter and have a 4K six-primary color TV.

Figure 80:
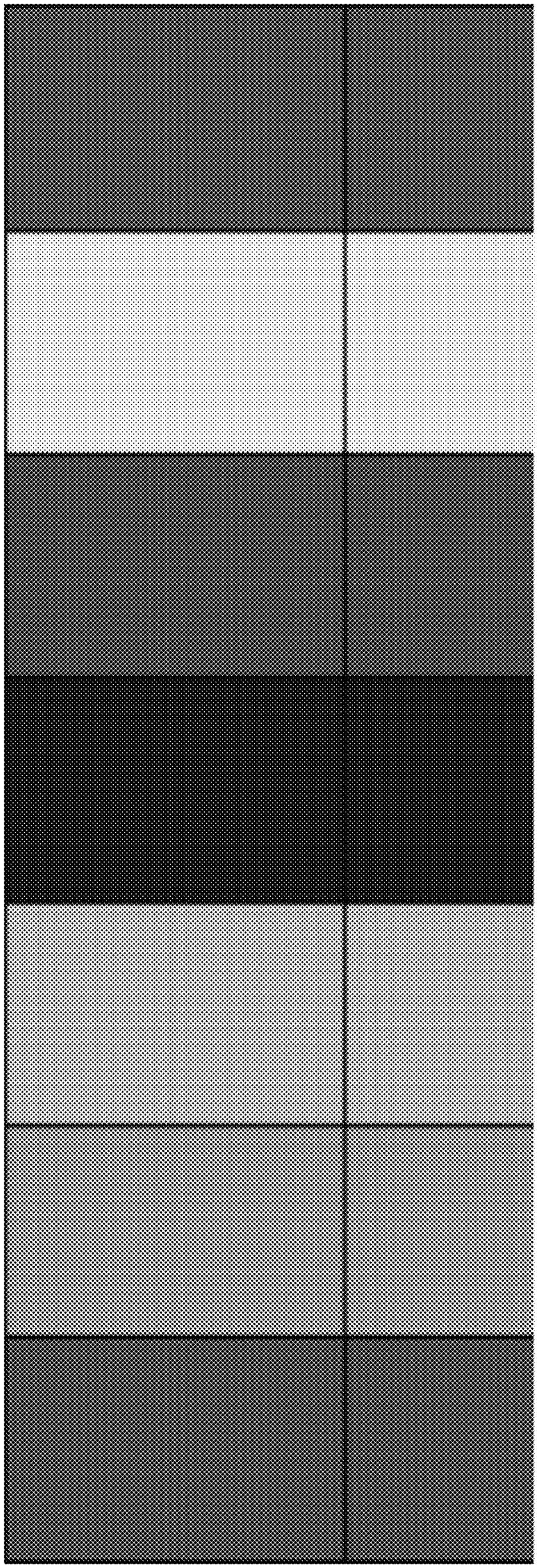
FIG. 80 illustrates one embodiment of an optical filter array for a six-primary color system with a backlight illuminated LCD monitor.

FIG. 80 illustrates one embodiment of an optical filter array for a six-primary color system with a backlight illuminated LCD monitor. The optical filter array includes the additional CYM subpixels.

In yet another embodiment, the display is a direct emissive assembled display. The design for a direct emissive assembled display includes a matrix of color emitters grouped as a six-color system. Individual channel inputs drive each Quantum Dot (QD) element illuminator and/or micro LED element.

Figure 81:
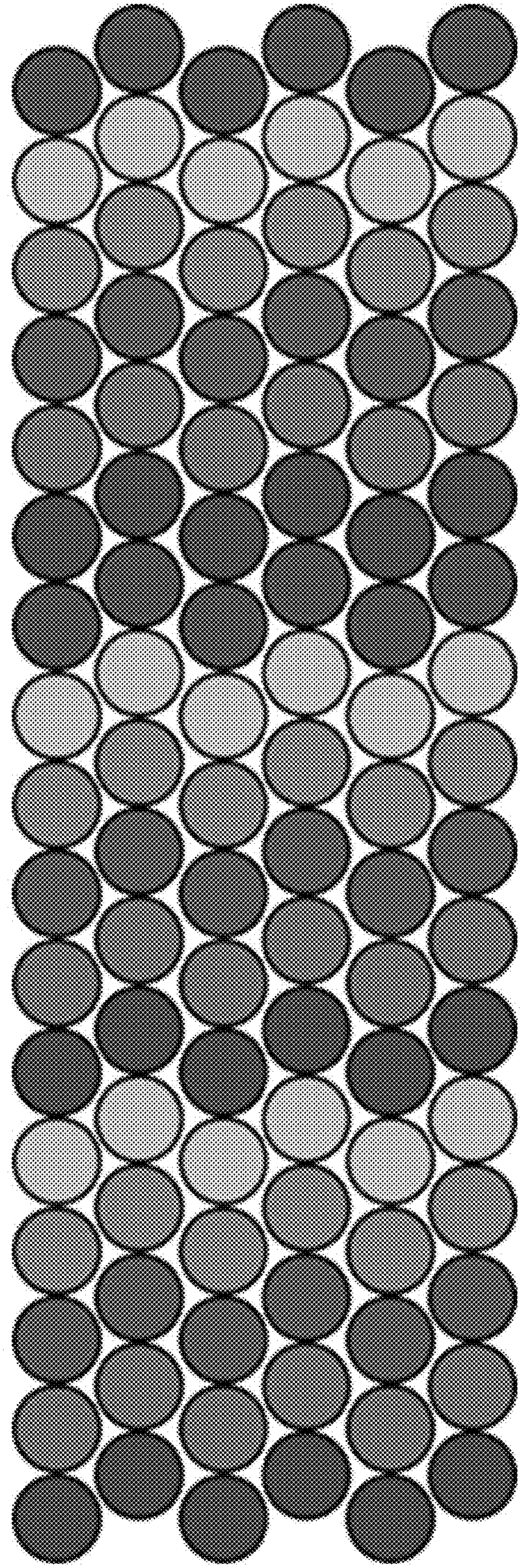
FIG. 81 illustrates an array for a Quantum Dot (QD) display device.

FIG. 81 illustrates an array for a Quantum Dot (QD) display device.

Figure 82:
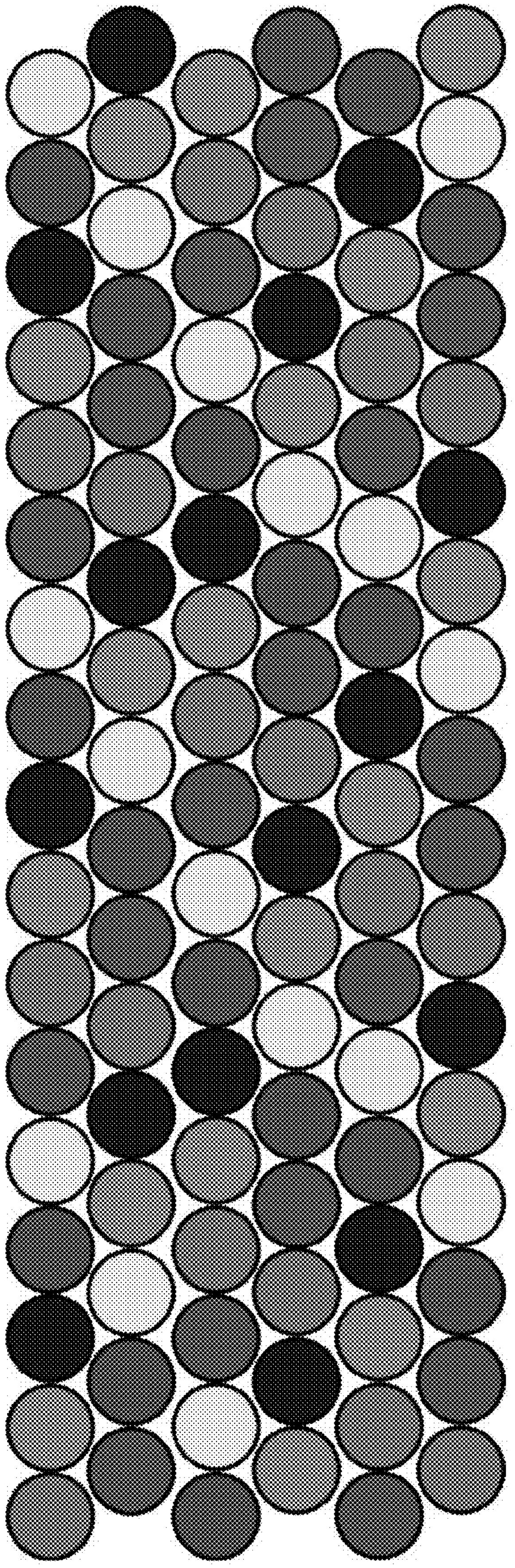
FIG. 82 illustrates one embodiment of an array for a six-primary color system for use with a direct emissive assembled display.

FIG. 82 illustrates one embodiment of an array for a six-primary color system for use with a direct emissive assembled display.

Figure 83:
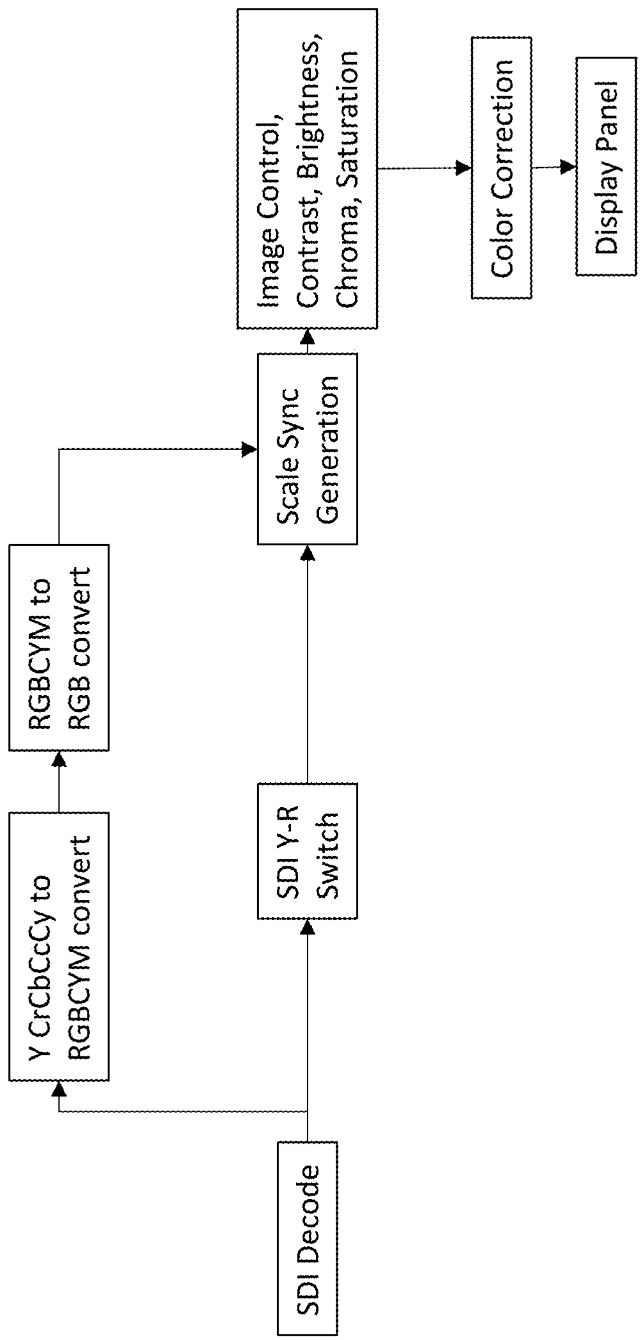
FIG. 83 illustrates one embodiment of a six-primary color system in an emissive display that does not incorporate color filtered subpixels.

FIG. 83 illustrates one embodiment of a six-primary color system in an emissive display that does not incorporate color filtered subpixels. For LCD and WOLED displays, this can be modified for a six-primary color system by expanding the RGB or WRGB filter arrangement to an RGBCYM matrix. For WRGB systems, the white subpixel could be removed as the luminance of the three additional primaries will replace it. SDI video is input through an SDI decoder. In one embodiment, the SDI decoder outputs to a Y CrCbCcCy-RGBCYM converter. The converter outputs RGBCYM data, with the luminance component (Y) subtracted. RGBCYM data is then converted to RGB data. This RGB data is sent to a scale sync generation component, receives adjustments to image controls, contrast, brightness, chroma, and saturation, is sent to a color correction component, and output to the display panel as LVDS data. In another embodiment the SDI decoder outputs to an SDI Y-R switch component. The SDI Y-R switch component outputs RGBCYM data. The RGBCYM data is sent to a scale sync generation component, receives adjustments to image controls, contrast, brightness, chroma, and saturation, is sent to a color correction component, and output to a display panel as LVDS data.

Narrow Band Illumination

In one embodiment, the display uses narrow band illumination technologies. In one embodiment, the display is a laser display. In another embodiment, the display includes light emitting diodes (LEDs). In one embodiment, the LEDs include, but are not limited to, pumped phosphor LEDs, perovskite LEDs, organic LEDs (OLEDs), micro LEDs, and/or nanorods. In one embodiment, the display uses other narrow band systems (e.g., narrow filtered broad band light). Advantageously, the multi-primary systems of the present invention provide an extended gamut along a right side of the CIE 1976 curve, which is important for flesh tones. Flesh tones are important for entertainment, medical, and/or scientific purposes. There is a long-standing, unmet need for an extended gamut providing more accurate flesh tones. Additionally, the multi-primary systems of the present invention provide an extended gamut in the cyan region of the CIE 1976 curve. The extension into the cyan area as well as into the shorter green area expands the reproduction of foliage, ice, and other natural items.

At Least Four Primaries

As previously described, in one embodiment, the multi-primary system of the present invention includes at least four primaries. In one embodiment, a first wavelength corresponding to a first primary is 460 nm, a second wavelength corresponding to a second primary is 493 nm, a third wavelength corresponding to a third primary is 540 nm, and a fourth wavelength corresponding to a fourth primary is 640 nm as shown in Table 18. In one embodiment, the first wavelength, the second wavelength, the third wavelength, and/or the fourth wavelength is approximately (e.g., within ±10%) the value listed in the table below. Alternatively, the first wavelength, the second wavelength, the third wavelength, and/or the fourth wavelength is within ±5% of the value listed in the table below. In yet another embodiment, the first wavelength, the second wavelength, the third wavelength, and/or the fourth wavelength is within ±2% of the value listed in the table below. In one embodiment, the first primary, the second primary, the third primary, and/or the fourth primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 18

| λ (nm) | x | y | z |
|---|---|---|---|
| 460 | 0.143958 | 0.029700 | 0.826342 |
| 493 | 0.031757 | 0.363575 | 0.604668 |
| 540 | 0.229633 | 0.754315 | 0.016053 |
| 640 | 0.719048 | 0.280920 | 0.000032 |

Figure 84:
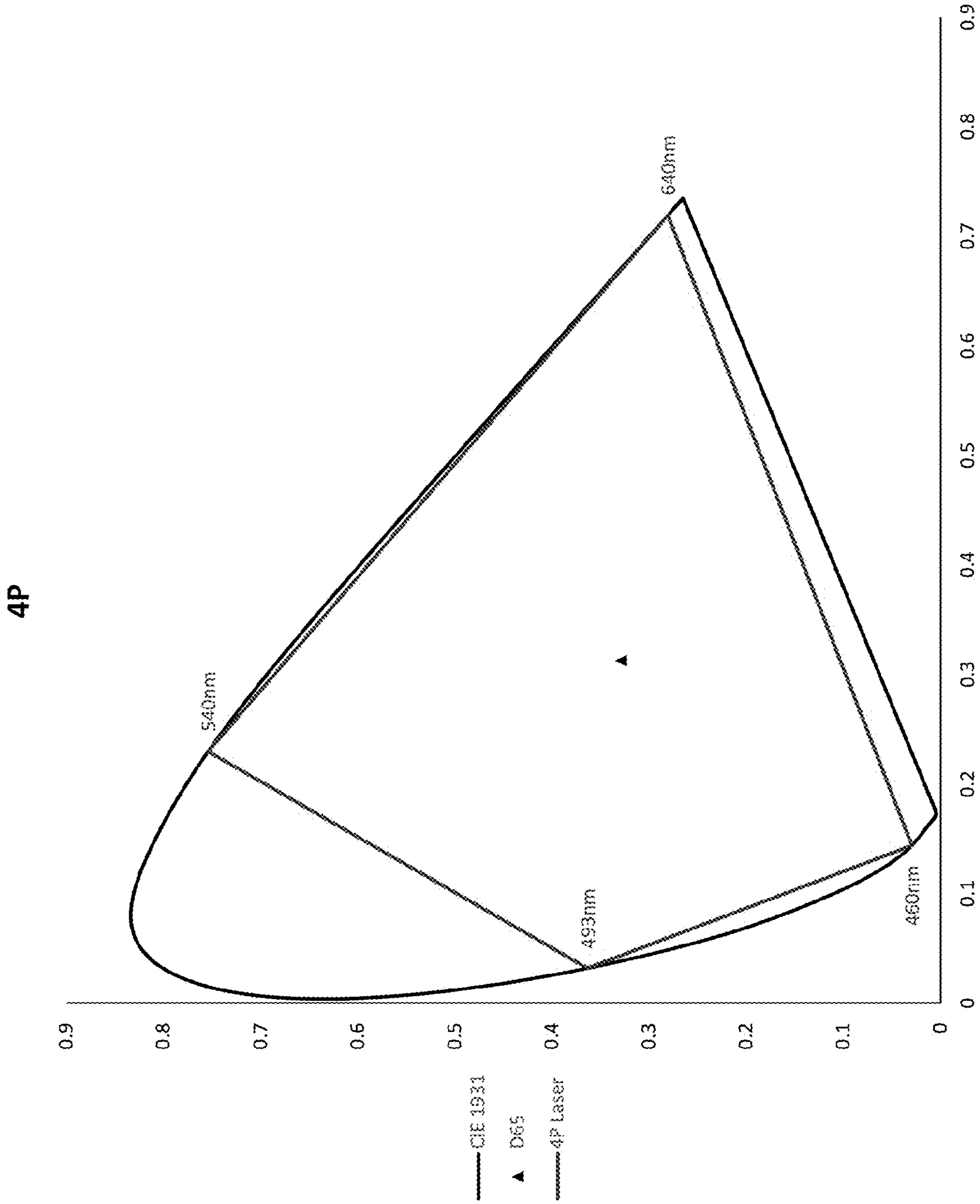
FIG. 84 illustrates a graph of one embodiment of a four primary system with respect to CIE 1931.

FIG. 84 illustrates a graph of the four primaries listed in Table 18 with respect to CIE 1931. In one embodiment, the at least four primaries encompass 75.57% of a total area covered between 400 nm and 700 nm for CIE 1931 as shown in FIG. 84. In a preferred embodiment, the at least four primaries encompass at least 75% of the total area covered between 400 nm and 700 nm for CIE 1931. Alternatively, the at least four primaries encompass at least 70% of the total area covered between 400 nm and 700 nm for CIE 1931. In another embodiment, the at least four primaries encompass at least 65% of the total area covered between 400 nm and 700 nm for CIE 1931.

In one embodiment, the at least four primaries include at least one white emitter. In one embodiment, the at least one white emitter includes a D65 white emitter, a D60 white emitter, a D45 white emitter, a D27 white emitter, and/or a D25 white emitter. Advantageously, using a D65 white emitter eliminates most of the problems with metamerism. In a preferred embodiment, the at least one white emitter is a single white emitter that matches the white point (e.g., a D65 white emitter for a D65 white point). In another embodiment, the at least one white emitter is at least two white emitters. The at least two white emitters are preferably separated such that a linear combination of the at least two white emitters covers a desired white Kelvin range. In one embodiment, the at least two white emitters include a D65 white emitter and a D27 white emitter. In another embodiment, the at least two white emitters include a D65 white emitter and a D25 white emitter.

In yet another embodiment, the at least two white emitters include three white emitters. In one embodiment, the three white emitters include a D65 white emitter, a D45 white emitter, and a D27 white emitter. Alternatively, the three white emitters include a D65 white emitter, a mid-Kelvin white emitter (e.g., D45), and a D27 white emitter. In a preferred embodiment, the mid-Kelvin white emitter includes a green bias. Advantageously, the green bias compensates for the slight magenta shift (e.g., when going from D25 to D65 with the straight line between the two points below the blackbody locus). Colors near the white locus and beyond are then a combination of the at least two white emitters (e.g., two white emitters, three white emitters). A majority of colors will have a white component that is broad band. Therefore, the resultant spectra of a mixture of color primaries and white primaries will also be broad band with an extent dependent on an amount of the at least one white primary. A higher broad band character of light results in fewer metameric problems. This is due to a white point being comprised of a combination of color primaries (e.g., RGB, CMY, RGBC, RGBCMY, etc.) in a non-white emitter system. Total luminance is then related to intensities of the color primaries (e.g., RGB, CMY, RGBC, RGBCMY, etc.).

Advantageously, if at least one white emitter is included, increased luminance can be achieved separate from the color primaries. Additionally, colors such as vibrantly colored pastels are attained by using the color primaries to "color shift" a bright white to the pastel. Alternatively, a fine balance of the color primaries is required, and small changes in a ratio of the color primaries will produce an unwanted color shift. Thus, a system with at least one white emitter is more tolerant to minor variations of intensity of the color primaries.

In another embodiment, the at least four primaries include RGBC, RGBW, or RG1G2B (i.e., a first green primary and a second green primary). Alternatively, the at least four primaries include RGBY.

At Least Five Primaries

As previously described, in one embodiment, the multi-primary system of the present invention includes at least five primaries. In one embodiment, a first wavelength corresponding to a first primary is 460 nm, a second wavelength corresponding to a second primary is 485 nm, a third wavelength corresponding to a third primary is 510 nm, a fourth wavelength corresponding to a fourth primary is 535 nm, and a fifth wavelength corresponding to a fifth primary is 640 nm as shown in Table 19. In one embodiment, the first wavelength, the second wavelength, the third wavelength, the fourth wavelength, and/or the fifth wavelength is approximately (e.g., within ±10%) the value listed in the table below. Alternatively, the first wavelength, the second wavelength, the third wavelength, the fourth wavelength, and/or the fifth wavelength is within ±5% of the value listed in the table below. In yet another embodiment, the first wavelength, the second wavelength, the third wavelength, the fourth wavelength, and/or the fifth wavelength is within ±2% of the value listed in the table below. In one embodiment, the first primary, the second primary, the third primary, the fourth primary, and/or the fifth primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 19

| λ (nm) | x | y | z |
|---|---|---|---|
| 460 | 0.143958 | 0.029700 | 0.826342 |
| 485 | 0.068706 | 0.200707 | 0.730587 |
| 510 | 0.013871 | 0.750168 | 0.235961 |
| 535 | 0.192887 | 0.781616 | 0.025497 |
| 640 | 0.719048 | 0.280920 | 0.000032 |

Figure 85:
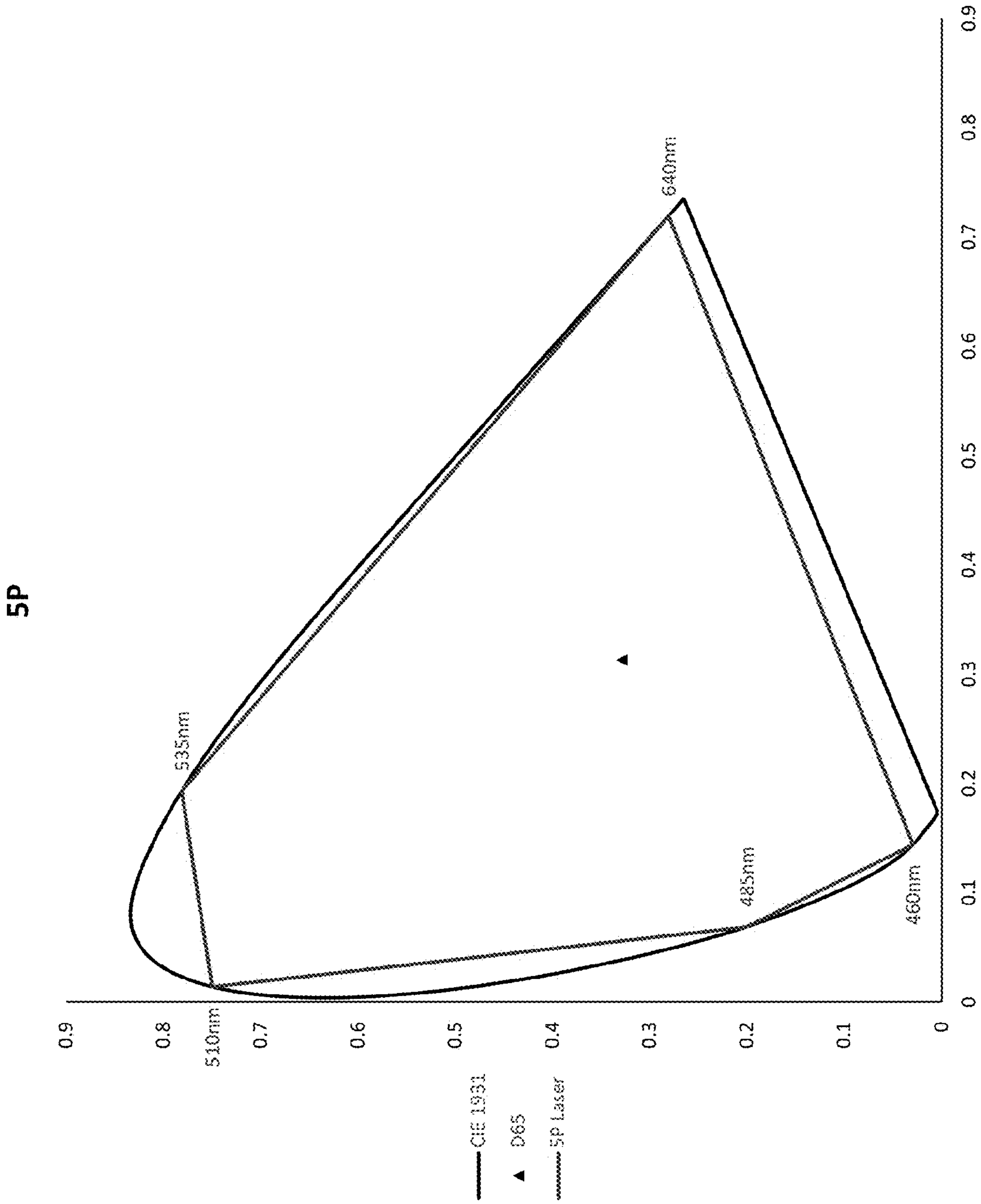
FIG. 85 illustrates a graph of one embodiment of a five primary system with respect to CIE 1931.

FIG. 85 illustrates a graph of the five primaries listed in Table 19 with respect to CIE 1931. In one embodiment, the at least four primaries encompass 87.55% of a total area covered between 400 nm and 700 nm for CIE 1931 as shown in FIG. 85. In a preferred embodiment, the at least five primaries encompass at least 87% of the total area covered between 400 nm and 700 nm for CIE 1931. Alternatively, the at least five primaries encompass at least 85% of a total area covered between 400 nm and 700 nm for CIE 1931. In another embodiment, the at least five primaries encompass at least 80% of a total area covered between 400 nm and 700 nm for CIE 1931. In yet another embodiment, the at least five primaries encompass at least 75% of a total area covered between 400 nm and 700 nm for CIE 1931.

In one embodiment, the at least five primaries include at least one white emitter. In one embodiment, the at least one white emitter includes a D65 white emitter, a D60 white emitter, a D45 white emitter, a D27 white emitter, and/or a D25 white emitter. Advantageously, using a D65 white emitter eliminates most of the problems with metamerism.

In another embodiment, the at least five primaries include RGBCY, RGBCW, RG1G2BW (i.e., a first green primary and a second green primary), RGBW1W2 (i.e., a first white emitter and a second white emitter), or RG1G2BY (i.e., a first green primary and a second green primary).

At Least Six Primaries

As previously described, in one embodiment, the multi-primary system of the present invention includes at least six primaries. In one embodiment, a first wavelength corresponding to a first primary is 460 nm, a second wavelength corresponding to a second primary is 490 nm, a third wavelength corresponding to a third primary is 506 nm, a fourth wavelength corresponding to a fourth primary is 520 nm, a fifth wavelength corresponding to a fifth primary is 545 nm, and a six wavelength corresponding to a sixth primary is 640 nm as shown in Table 20. In one embodiment, the first wavelength, the second wavelength, the third wavelength, the fourth wavelength, the fifth wavelength, and/or the sixth wavelength is approximately (e.g., within ±10%) the value listed in the table below. Alternatively, the first wavelength, the second wavelength, the third wavelength, the fourth wavelength, the fifth wavelength, and/or the sixth wavelength is within ±5% of the value listed in the table below. In yet another embodiment, the first wavelength, the second wavelength, the third wavelength, the fourth wavelength, the fifth wavelength, and/or the sixth wavelength is within ±2% of the value listed in the table below. In one embodiment, the first primary, the second primary, the third primary, the fourth primary, the fifth primary, and/or the sixth primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 20

| λ (nm) | x | y | z |
|---|---|---|---|
| 460 | 0.143958 | 0.029700 | 0.826342 |
| 490 | 0.045391 | 0.294955 | 0.659654 |
| 506 | 0.004646 | 0.675876 | 0.319478 |
| 520 | 0.074307 | 0.833791 | 0.091902 |
| 545 | 0.265790 | 0.724309 | 0.009902 |
| 640 | 0.719048 | 0.280920 | 0.000032 |

Figure 86:
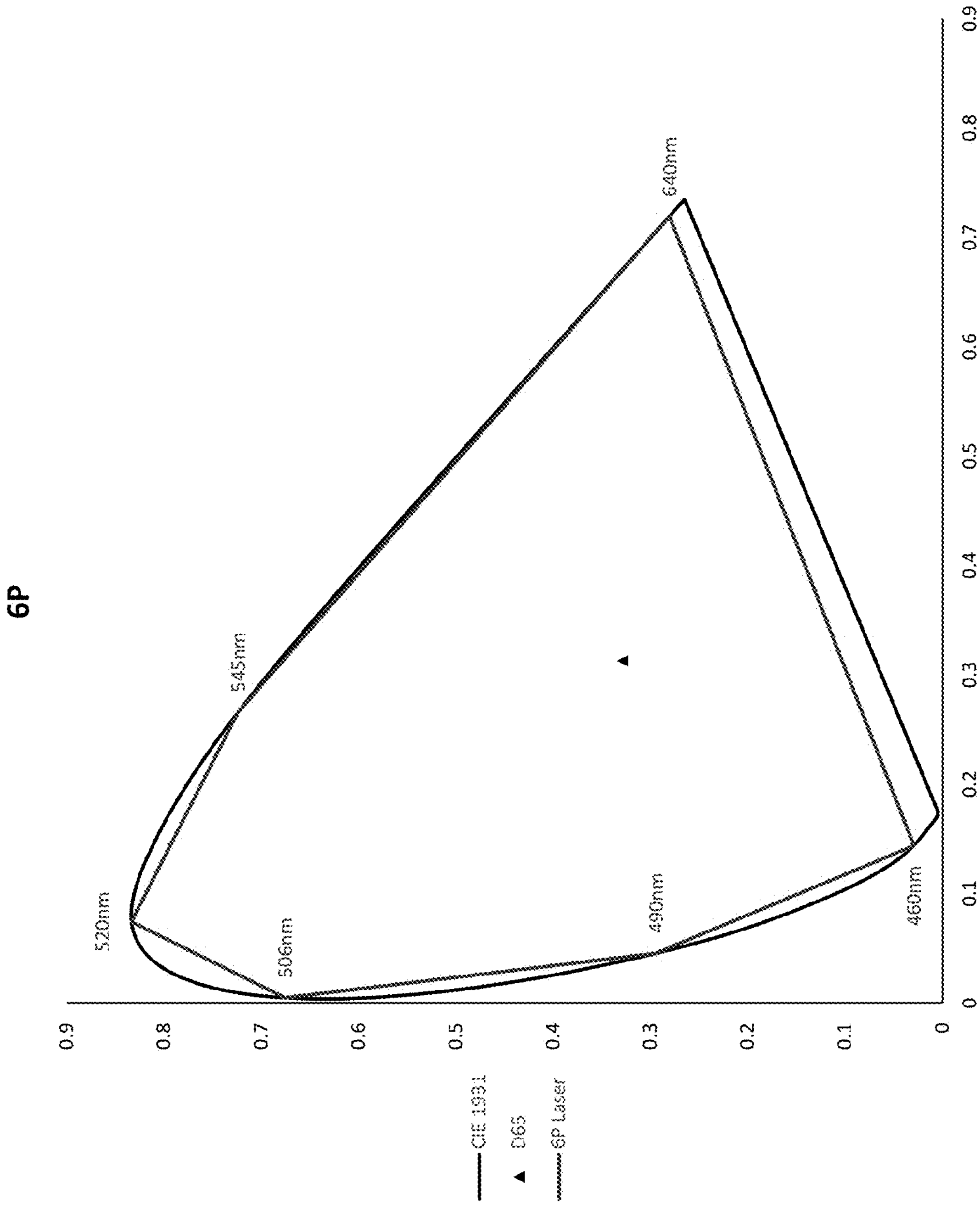
FIG. 86 illustrates a graph of one embodiment of a six primary system with respect to CIE 1931.

FIG. 86 illustrates a graph of the six primaries listed in Table 20 with respect to CIE 1931. In one embodiment, the at least six primaries encompass 91.11% of a total area covered between 400 nm and 700 nm for CIE 1931 as shown in FIG. 86. In a preferred embodiment, the at least six primaries encompass at least 90% of a total area covered between 400 nm and 700 nm for CIE 1931. Alternatively, the at least six primaries encompass at least 85% of a total area covered between 400 nm and 700 nm for CIE 1931. In another embodiment, the at least six primaries encompass at least 80% of a total area covered between 400 nm and 700 nm for CIE 1931. In yet another embodiment, the at least six primaries encompass at least 75% of a total area covered between 400 nm and 700 nm for CIE 1931.

In one embodiment, the at least six primaries include at least one white emitter. In one embodiment, the at least one white emitter includes a D65 white emitter, a D60 white emitter, a D45 white emitter, a D27 white emitter, and/or a D25 white emitter.

In another embodiment, the at least six primaries include RGBCMY, RGBCW1W2, RG1G2BW1W2 (i.e., a first green primary, a second green primary, a first white emitter, and a second white emitter), RGBW1W2W3 (i.e., a first white emitter, a second white emitter, and a third white emitter), or RG1G2BCY(i.e., a first green primary and a second green primary).

At Least Seven Primaries

As previously described, in one embodiment, the multi-primary system of the present invention includes at least seven primaries. In one embodiment, a first wavelength corresponding to a first primary is 460 nm, a second wavelength corresponding to a second primary is 480 nm, a third wavelength corresponding to a third primary is 495 nm, a fourth wavelength corresponding to a fourth primary is 508 nm, a fifth wavelength corresponding to a fifth primary is 520 nm, a sixth wavelength corresponding to a sixth primary is 540 nm, and a seventh wavelength corresponding to a seventh primary is 640 nm as shown in Table 21. In one embodiment, the first wavelength, the second wavelength, the third wavelength, the fourth wavelength, the fifth wavelength, the sixth wavelength, and/or the seventh wavelength is approximately (e.g., within ±10%) the value listed in the table below. Alternatively, the first wavelength, the second wavelength, the third wavelength, the fourth wavelength, the fifth wavelength, the sixth wavelength, and/or the seventh wavelength is within ±5% of the value listed in the table below. In yet another embodiment, the first wavelength, the second wavelength, the third wavelength, the fourth wavelength, the fifth wavelength, the sixth wavelength, and/or the seventh wavelength is within ±2% of the value listed in the table below. In one embodiment, the first primary, the second primary, the third primary, the fourth primary, the fifth primary, the sixth primary, and/or the seventh primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 21

| λ (nm) | x | y | z |
|---|---|---|---|
| 460 | 0.143958 | 0.029700 | 0.826342 |
| 480 | 0.091293 | 0.132691 | 0.776017 |
| 495 | 0.023460 | 0.412679 | 0.563860 |
| 508 | 0.007989 | 0.715321 | 0.276690 |
| 520 | 0.074307 | 0.833791 | 0.091902 |
| 540 | 0.229633 | 0.754315 | 0.016053 |
| 640 | 0.719048 | 0.280920 | 0.000032 |

Figure 87:
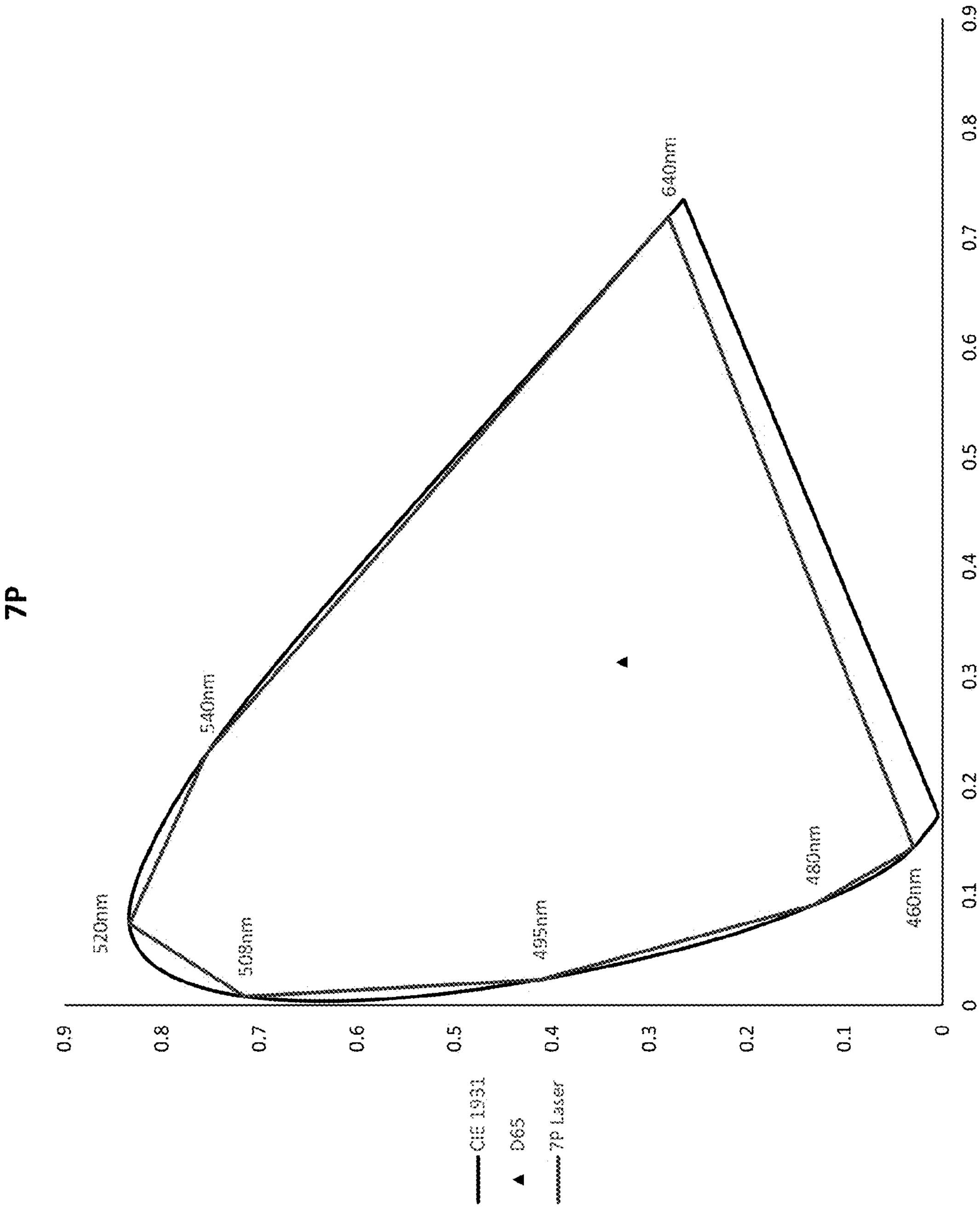
FIG. 87 illustrates a graph of one embodiment of a seven primary system with respect to CIE 1931.

FIG. 87 illustrates a graph of the seven primaries listed in Table 21 with respect to CIE 1931. In one embodiment, the at least four primaries encompass 91.93% of a total area covered between 400 nm and 700 nm for CIE 1931 as shown in FIG. 87. In a preferred embodiment, the at least seven primaries encompass at least 90% of a total area covered between 400 nm and 700 nm for CIE 1931. Alternatively, the at least seven primaries encompass at least 85% of a total area covered between 400 nm and 700 nm for CIE 1931. In another embodiment, the at least seven primaries encompass at least 80% of a total area covered between 400 nm and 700 nm for CIE 1931. In yet another embodiment, the at least seven primaries encompass at least 75% of a total area covered between 400 nm and 700 nm for CIE 1931.

In one embodiment, the at least seven primaries include at least one white emitter. In one embodiment, the at least one white emitter includes a D65 white emitter, a D60 white emitter, a D45 white emitter, a D27 white emitter, and/or a D25 white emitter.

At Least Eight Primaries

As previously described, in one embodiment, the multi-primary system of the present invention includes at least eight primaries. In one embodiment, a first wavelength corresponding to a first primary is 460 nm, a second wavelength corresponding to a second primary is 480 nm, a third wavelength corresponding to a third primary is 495 nm, a fourth wavelength corresponding to a fourth primary is 500 nm, a fifth wavelength corresponding to a fifth primary is 511 nm, a sixth wavelength corresponding to a sixth primary is 521 nm, a seventh wavelength corresponding to a seventh primary is 545 nm, and an eighth wavelength corresponding to an eighth primary is 640 nm as shown in Table 22. In one embodiment, the first wavelength, the second wavelength, the third wavelength, the fourth wavelength, the fifth wavelength, the sixth wavelength, the seventh wavelength, and/or the eighth wavelength is approximately (e.g., within ±10%) the value listed in the table below. Alternatively, the first wavelength, the second wavelength, the third wavelength, the fourth wavelength, the fifth wavelength, the sixth wavelength, the seventh wavelength, and/or the eighth wavelength is within ±5% of the value listed in the table below. In yet another embodiment, the first wavelength, the second wavelength, the third wavelength, the fourth wavelength, the fifth wavelength, the sixth wavelength, the seventh wavelength, and/or the eighth wavelength is within ±2% of the value listed in the table below. In one embodiment, the first primary, the second primary, the third primary, the fourth primary, the fifth primary, the sixth primary, the seventh primary, and/or the eighth primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 22

| λ (nm) | x | y | z |
|---|---|---|---|
| 460 | 0.143958 | 0.029700 | 0.826342 |
| 480 | 0.091293 | 0.132691 | 0.776017 |
| 495 | 0.023460 | 0.412679 | 0.563860 |
| 500 | 0.008168 | 0.538398 | 0.453434 |
| 511 | 0.017767 | 0.765594 | 0.216639 |
| 521 | 0.082058 | 0.834078 | 0.083863 |
| 545 | 0.265790 | 0.724309 | 0.009902 |
| 640 | 0.719048 | 0.280920 | 0.000032 |

Figure 88:
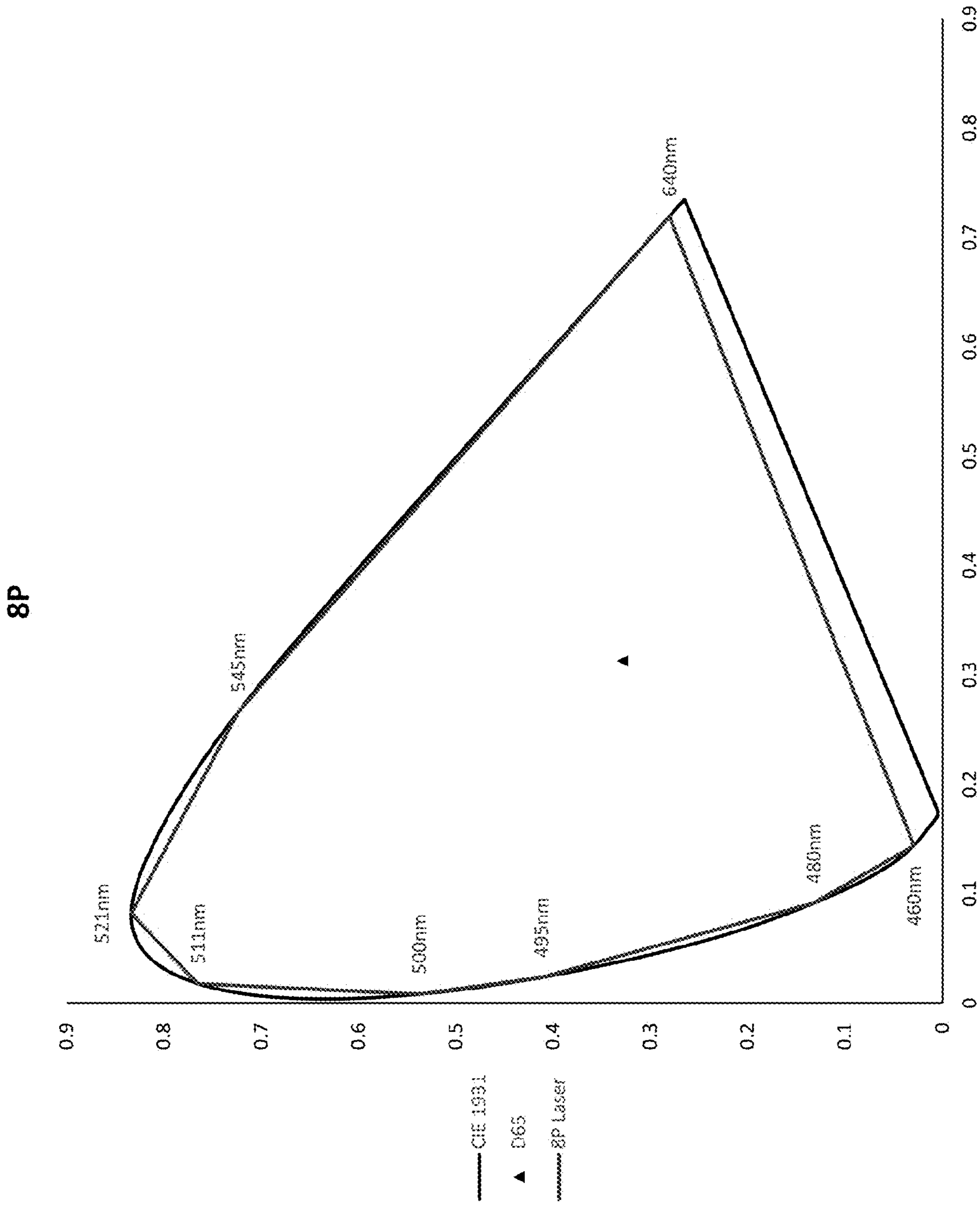
FIG. 88 illustrates a graph of one embodiment of an eight primary system with respect to CIE 1931.

FIG. 88 illustrates a graph of the eight primaries listed in Table 22 with respect to CIE 1931. In one embodiment, the at least eight primaries encompass 92.55% of a total area covered between 400 nm and 700 nm for CIE 1931 as shown in FIG. 88. In a preferred embodiment, the at least eight primaries encompass at least 90% of a total area covered between 400 nm and 700 nm for CIE 1931. Alternatively, the at least eight primaries encompass at least 85% of a total area covered between 400 nm and 700 nm for CIE 1931. In another embodiment, the at least eight primaries encompass at least 80% of a total area covered between 400 nm and 700 nm. In yet another embodiment, the at least eight primaries encompass at least 75% of a total area covered between 400 nm and 700 nm for CIE 1931.

In one embodiment, the at least eight primaries include at least one white emitter. In one embodiment, the at least one white emitter includes a D65 white emitter, a D60 white emitter, a D45 white emitter, a D27 white emitter, and/or a D25 white emitter.

At Least Nine Primaries

As previously described, in one embodiment, the multi-primary system of the present invention includes at least nine primaries.

At Least Ten Primaries

As previously described, in one embodiment, the multi-primary system of the present invention includes at least ten primaries. In one embodiment, a first wavelength corresponding to a first primary is 440 nm, a second wavelength corresponding to a second primary is 470 nm, a third wavelength corresponding to a third primary is 485 nm, a fourth wavelength corresponding to a fourth primary is 493 nm, a fifth wavelength corresponding to a fifth primary is 502 nm, a sixth wavelength corresponding to a sixth primary is 512 nm, a seventh wavelength corresponding to a seventh primary is 520 nm, an eighth wavelength corresponding to an eighth primary is 535 nm, a ninth wavelength corresponding to a ninth primary is 550 nm, and a tenth wavelength corresponding to a tenth primary is 660 nm as shown in Table 23. In one embodiment, the first wavelength, the second wavelength, the third wavelength, the fourth wavelength, the fifth wavelength, the sixth wavelength, the seventh wavelength, the eighth wavelength, the ninth wavelength, and/or the tenth wavelength is approximately (e.g., within ±10%) the value listed in the table below. Alternatively, the first wavelength, the second wavelength, the third wavelength, the fourth wavelength, the fifth wavelength, the sixth wavelength, the seventh wavelength, the eighth wavelength, the ninth wavelength, and/or the tenth wavelength is within ±5% of the value listed in the table below. In yet another embodiment, the first wavelength, the second wavelength, the third wavelength, the fourth wavelength, the fifth wavelength, the sixth wavelength, the seventh wavelength, the eighth wavelength, the ninth wavelength, and/or the tenth wavelength is within ±2% of the value listed in the table below. In one embodiment, the first primary, the second primary, the third primary, the fourth primary, the fifth primary, the sixth primary, the seventh primary, the eighth primary, the ninth primary, and/or the tenth primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 23

| λ (nm) | x | y | z |
|---|---|---|---|
| 440 | 0.164409 | 0.010857 | 0.824735 |
| 470 | 0.124117 | 0.057797 | 0.818086 |
| 485 | 0.068706 | 0.200707 | 0.730587 |
| 493 | 0.031757 | 0.363575 | 0.604668 |

TABLE 23-continued

| λ (nm) | x | y | z |
|---|---|---|---|
| 502 | 0.004876 | 0.587092 | 0.408032 |
| 512 | 0.022245 | 0.779613 | 0.198142 |
| 520 | 0.074307 | 0.833791 | 0.091902 |
| 535 | 0.192887 | 0.781616 | 0.025497 |
| 550 | 0.301620 | 0.692291 | 0.006089 |
| 660 | 0.729984 | 0.270016 | 0.000000 |

Figure 89:
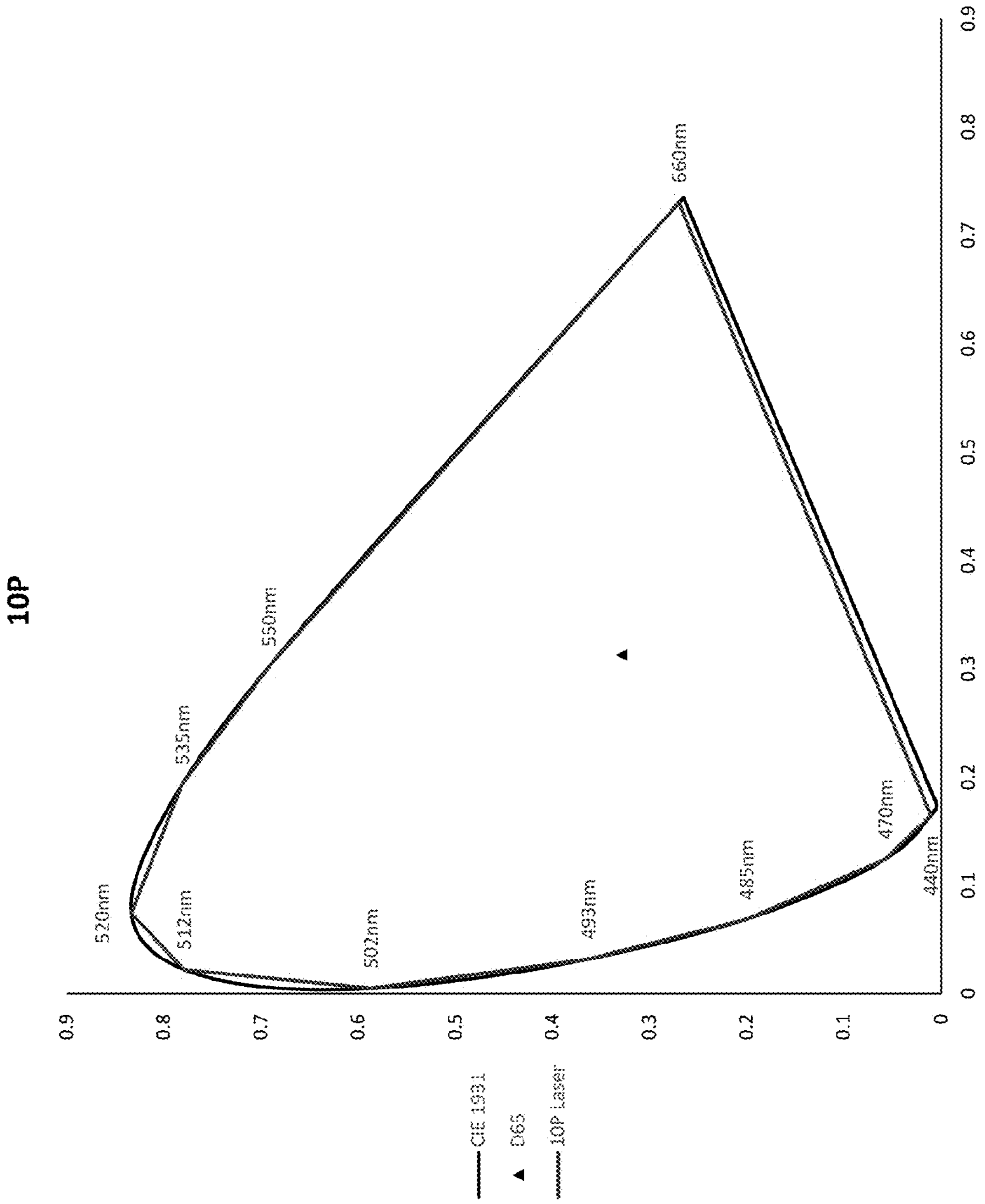
FIG. 89 illustrates a graph of one embodiment of a ten primary system with respect to CIE 1931.

FIG. 89 illustrates a graph of the ten primaries listed in Table 23 with respect to CIE 1931. In one embodiment, the at least ten primaries encompass 97.16% of a total area covered between 400 nm and 700 nm for CIE 1931 as shown in FIG. 89. In a preferred embodiment, the at least ten primaries encompass at least 95% of a total area covered between 400 nm and 700 nm for CIE 1931. Alternatively, the at least ten primaries encompass at least 90% of a total area covered between 400 nm and 700 nm for CIE 1931. In another embodiment, the at least ten primaries encompass at least 85% of a total area covered between 400 nm and 700 nm for CIE 1931. In yet another embodiment, the at least ten primaries encompass at least 80% of a total area covered between 400 nm and 700 nm for CIE 1931.

In one embodiment, the at least ten primaries include at least one white emitter. In one embodiment, the at least one white emitter includes a D65 white emitter, a D60 white emitter, a D45 white emitter, a D27 white emitter, and/or a D25 white emitter.

At Least Eleven Primaries

As previously described, in one embodiment, the multi-primary system of the present invention includes at least eleven primaries.

At Least Twelve Primaries

As previously described, in one embodiment, the multi-primary system of the present invention includes at least twelve primaries. In one embodiment, a first wavelength corresponding to a first primary is 440 nm, a second wavelength corresponding to a second primary is 470 nm, a third wavelength corresponding to a third primary is 485 nm, a fourth wavelength corresponding to a fourth primary is 493 nm, a fifth wavelength corresponding to a fifth primary is 500 nm, a sixth wavelength corresponding to a sixth primary is 505 nm, a seventh wavelength corresponding to a seventh primary is 511 nm, an eighth wavelength corresponding to an eighth primary is 517 nm, a ninth wavelength corresponding to a ninth primary is 523 nm, a tenth wavelength corresponding to a tenth primary is 535 nm, an eleventh wavelength corresponding to an eleventh primary is 550 nm, and a twelfth wavelength corresponding to a twelfth primary is 670 nm as shown in Table 24. In one embodiment, the first wavelength, the second wavelength, the third wavelength, the fourth wavelength, the fifth wavelength, the sixth wavelength, the seventh wavelength, the eighth wavelength, the ninth wavelength, the tenth wavelength, the eleventh wavelength, and/or the twelfth wavelength is approximately (e.g., within ±10%) the value listed in the table below. Alternatively, the first wavelength, the second wavelength, the third wavelength, the fourth wavelength, the fifth wavelength, the sixth wavelength, the seventh wavelength, the eighth wavelength, the ninth wavelength, the tenth wavelength, the eleventh wavelength, and/or the twelfth wavelength is within ±5% of the value listed in the table below. In yet another embodiment, the first wavelength, the second wavelength, the third wavelength, the fourth wavelength, the fifth wavelength, the sixth wavelength, the seventh wavelength, the eighth wavelength, the ninth wavelength, the tenth wavelength, the eleventh wavelength, and/or the twelfth wavelength is within ±2% of the value listed in the table below. In one embodiment, the first primary, the second primary, the third primary, the fourth primary, the fifth primary, the sixth primary, the seventh primary, the eighth primary, the ninth primary, the tenth primary, and/or the twelfth primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 24

| λ (nm) | x | y | z |
|---|---|---|---|
| 440 | 0.164409 | 0.010857 | 0.824735 |
| 470 | 0.124117 | 0.057797 | 0.818086 |
| 485 | 0.068706 | 0.200707 | 0.730587 |
| 493 | 0.031757 | 0.363575 | 0.604668 |
| 500 | 0.008168 | 0.538398 | 0.453434 |
| 505 | 0.003859 | 0.654800 | 0.341341 |
| 511 | 0.017767 | 0.765594 | 0.216639 |
| 517 | 0.052180 | 0.825150 | 0.122670 |
| 523 | 0.097946 | 0.831581 | 0.070474 |
| 535 | 0.192887 | 0.781616 | 0.025497 |
| 550 | 0.301620 | 0.692291 | 0.006089 |
| 670 | 0.732008 | 0.267992 | 0.000000 |

Figure 90:
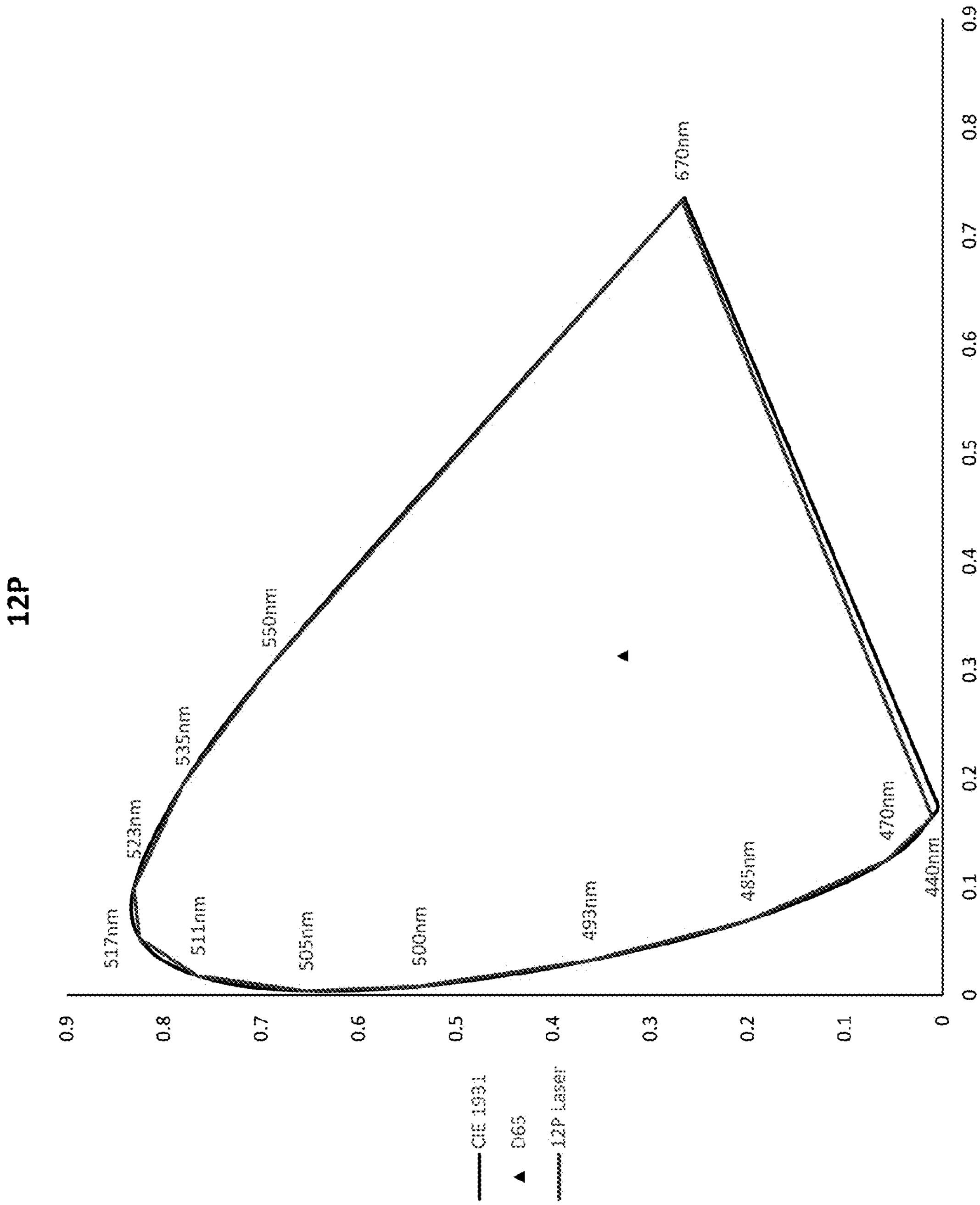
FIG. 90 illustrates a graph of one embodiment of a twelve primary system with respect to CIE 1931.

FIG. 90 illustrates a graph of the twelve primaries listed in Table 24 with respect to CIE 1931. In one embodiment, the at least twelve primaries encompass 97.91% of a total area covered between 400 nm and 700 nm for CIE 1931 as shown in FIG. 90. In a preferred embodiment, the at least twelve primaries encompass at least 95% of a total area covered between 400 nm and 700 nm for CIE 1931. In another embodiment, the at least twelve primaries encompass at least 90% of a total area covered between 400 nm and 700 nm for CIE 1931. In yet another embodiment, the at least twelve primaries encompass at least 85% of a total area covered between 400 nm and 700 nm for CIE 1931.

In another embodiment, a first wavelength corresponding to a first primary is 400 nm, a second wavelength corresponding to a second primary is 468 nm, a third wavelength corresponding to a third primary is 484 nm, a fourth wavelength corresponding to a fourth primary is 493 nm, a fifth wavelength corresponding to a fifth primary is 500 nm, a sixth wavelength corresponding to a sixth primary is 506 nm, a seventh wavelength corresponding to a seventh primary is 512 nm, an eighth wavelength corresponding to an eighth primary is 518 nm, a ninth wavelength corresponding to a ninth primary is 524 nm, a tenth wavelength corresponding to a tenth primary is 535 nm, an eleventh wavelength corresponding to an eleventh primary is 556 nm, and a twelfth wavelength corresponding to a twelfth primary is 700 nm as shown in Table 25. In one embodiment, the first wavelength, the second wavelength, the third wavelength, the fourth wavelength, the fifth wavelength, the sixth wavelength, the seventh wavelength, the eighth wavelength, the ninth wavelength, the tenth wavelength, the eleventh wavelength, and/or the twelfth wavelength is approximately (e.g., within ±10%) the value listed in the table below. Alternatively, the first wavelength, the second wavelength, the third wavelength, the fourth wavelength, the fifth wavelength, the sixth wavelength, the seventh wavelength, the eighth wavelength, the ninth wavelength, the tenth wavelength, the eleventh wavelength, and/or the twelfth wavelength is within ±5% of the value listed in the table below. In yet another embodiment, the first wavelength, the second wavelength, the third wavelength, the fourth wavelength, the fifth wavelength, the sixth wavelength, the seventh wavelength, the eighth wavelength, the ninth wavelength, the tenth wavelength, the eleventh wavelength, and/or the twelfth wavelength is within ±2% of the value listed in the table below. In one embodiment, the first primary, the second primary, the third primary, the fourth primary, the fifth primary, the sixth primary, the seventh primary, the eighth primary, the ninth primary, the tenth primary, and/or the twelfth primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 25

| λ (nm) | x | y | z |
|---|---|---|---|
| 400 | 0.173333 | 0.004796 | 0.821870 |
| 471 | 0.121467 | 0.062582 | 0.815951 |
| 484 | 0.073437 | 0.185017 | 0.741546 |
| 493 | 0.031757 | 0.363575 | 0.604668 |
| 500 | 0.008168 | 0.538398 | 0.453434 |
| 506 | 0.004646 | 0.675876 | 0.319478 |
| 512 | 0.022245 | 0.779613 | 0.198142 |
| 518 | 0.059329 | 0.829413 | 0.111258 |
| 524 | 0.106028 | 0.829166 | 0.064806 |
| 538 | 0.215042 | 0.765581 | 0.019377 |
| 556 | 0.344530 | 0.652011 | 0.003459 |
| 700 | 0.734705 | 0.265295 | 0.000000 |

Figure 91:
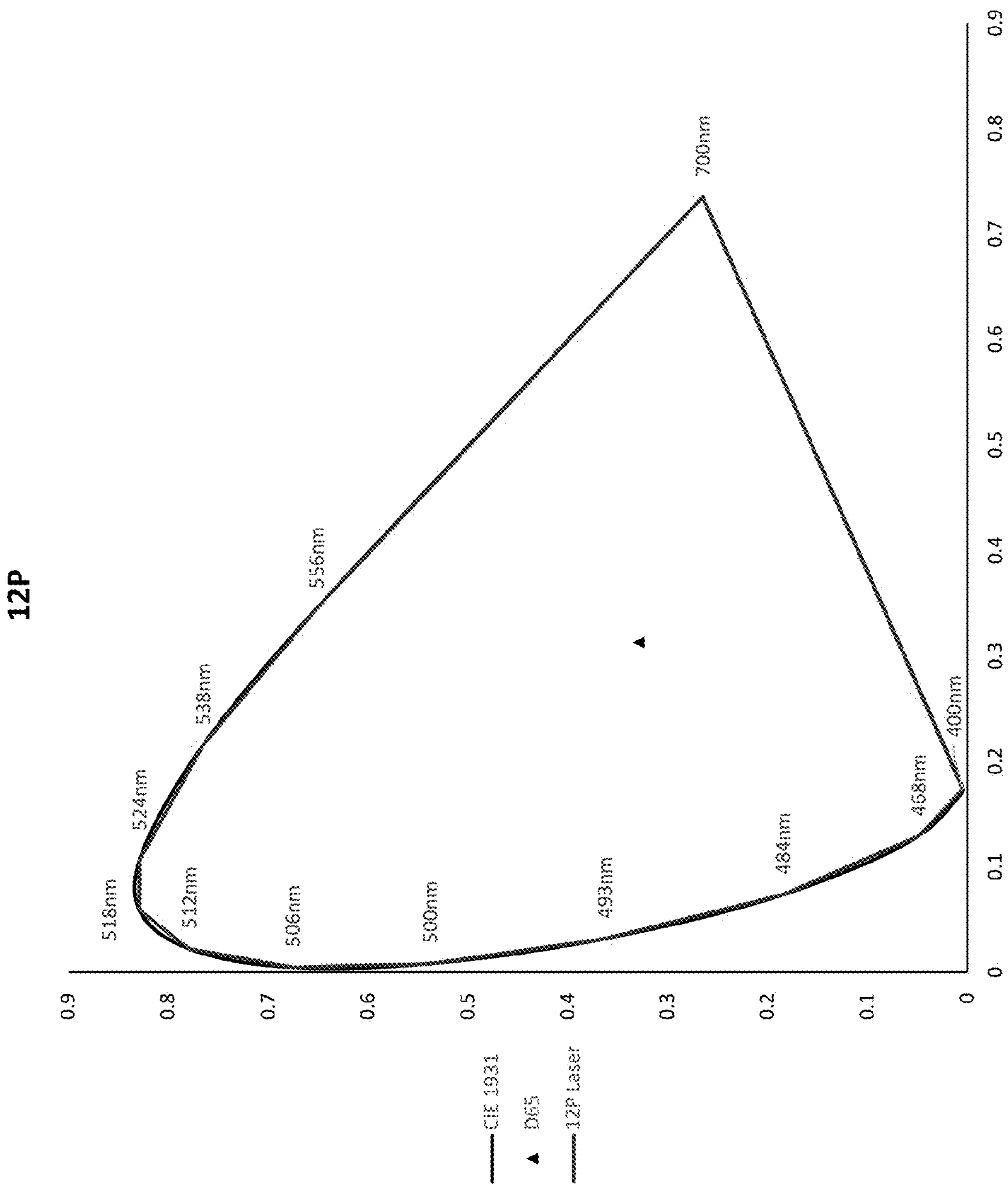
FIG. 91 illustrates a graph of another embodiment of a twelve primary system with respect to CIE 1931.

FIG. 91 illustrates a graph of the twelve primaries listed in Table 25 with respect to CIE 1931. In one embodiment, the at least twelve primaries encompass 99.14% of a total area covered between 400 nm and 700 nm for CIE 1931 as shown in FIG. 91. In a preferred embodiment, the at least twelve primaries encompass at least 97.5% of a total area covered between 400 nm and 700 nm for CIE 1931. In another embodiment, the at least twelve primaries encompass at least 95% of a total area covered between 400 nm and 700 nm for CIE 1931. In yet another embodiment, the at least twelve primaries encompass at least 90% of a total area covered between 400 nm and 700 nm for CIE 1931.

In yet another embodiment, a twelve primary system is backwards compatible with 6P-C. In one embodiment, the twelve primary system includes a magenta primary, a blue-magenta primary, a blue primary, a cyan-blue primary, a cyan primary, a green-cyan primary, a green primary, a yellow-green primary, a yellow primary, a red-yellow primary, a red primary, and a magenta-red primary as shown in Table 26. In one embodiment, the magenta primary, the blue-magenta primary, the blue primary, the cyan-blue primary, the cyan primary, the green-cyan primary, the green primary, the yellow-green primary, the yellow primary, the red-yellow primary, the red primary, and/or the magenta-red primary is approximately (e.g., within ±10%) the value listed in the table below. Alternatively, the magenta primary, the blue-magenta primary, the blue primary, the cyan-blue primary, the cyan primary, the green-cyan primary, the green primary, the yellow-green primary, the yellow primary, the red-yellow primary, the red primary, and/or the magenta-red primary is within ±5% of the value listed in the table below. In yet another embodiment, the magenta primary, the blue-magenta primary, the blue primary, the cyan-blue primary, the cyan primary, the green-cyan primary, the green primary, the yellow-green primary, the yellow primary, the red-yellow primary, the red primary, and/or the magenta-red primary is within ±2% of the value listed in the table below. In one embodiment, the magenta primary, the blue-magenta primary, the blue primary, the cyan-blue primary, the cyan primary, the green-cyan primary, the green primary, the yellow-green primary, the yellow primary, the red-yellow primary, the red primary, and/or the magenta-red primary has a bandwidth that is very narrow (e.g., 1-10 nm half band width), medium (e.g., 10-50 nm half band width), and/or wide (e.g., 50-100 nm half band width). The bandwidth chosen depends on the application. For example, wider bandwidth primaries will have fewer metameric perceptual differences.

TABLE 26

| | x | y | u' | v' | λ (nm) |
|---|---|---|---|---|---|
| M | 0.3445 | 0.0940 | 0.4007 | 0.2460 | |
| BM | 0.1677 | 0.0078 | 0.2433 | 0.0255 | 433 |
| B | 0.1355 | 0.0399 | 0.1690 | 0.1119 | 465 |
| CB | 0.0953 | 0.1219 | 0.0892 | 0.2569 | 479 |
| C | 0.0362 | 0.3399 | 0.0207 | 0.4366 | 492 |
| GC | 0.0667 | 0.8323 | 0.0208 | 0.5827 | 519 |
| G | 0.2658 | 0.7243 | 0.0953 | 0.5841 | 545 |
| YG | 0.3588 | 0.6383 | 0.1444 | 0.5778 | 558 |
| Y | 0.4441 | 0.5547 | 0.2026 | 0.5694 | 570 |
| RY | 0.5922 | 0.4072 | 0.3535 | 0.5468 | 593 |
| R | 0.6801 | 0.3197 | 0.4967 | 0.5254 | 615 |
| MR | 0.7216 | 0.2784 | 0.5893 | 0.5116 | 643 |

Figure 92:
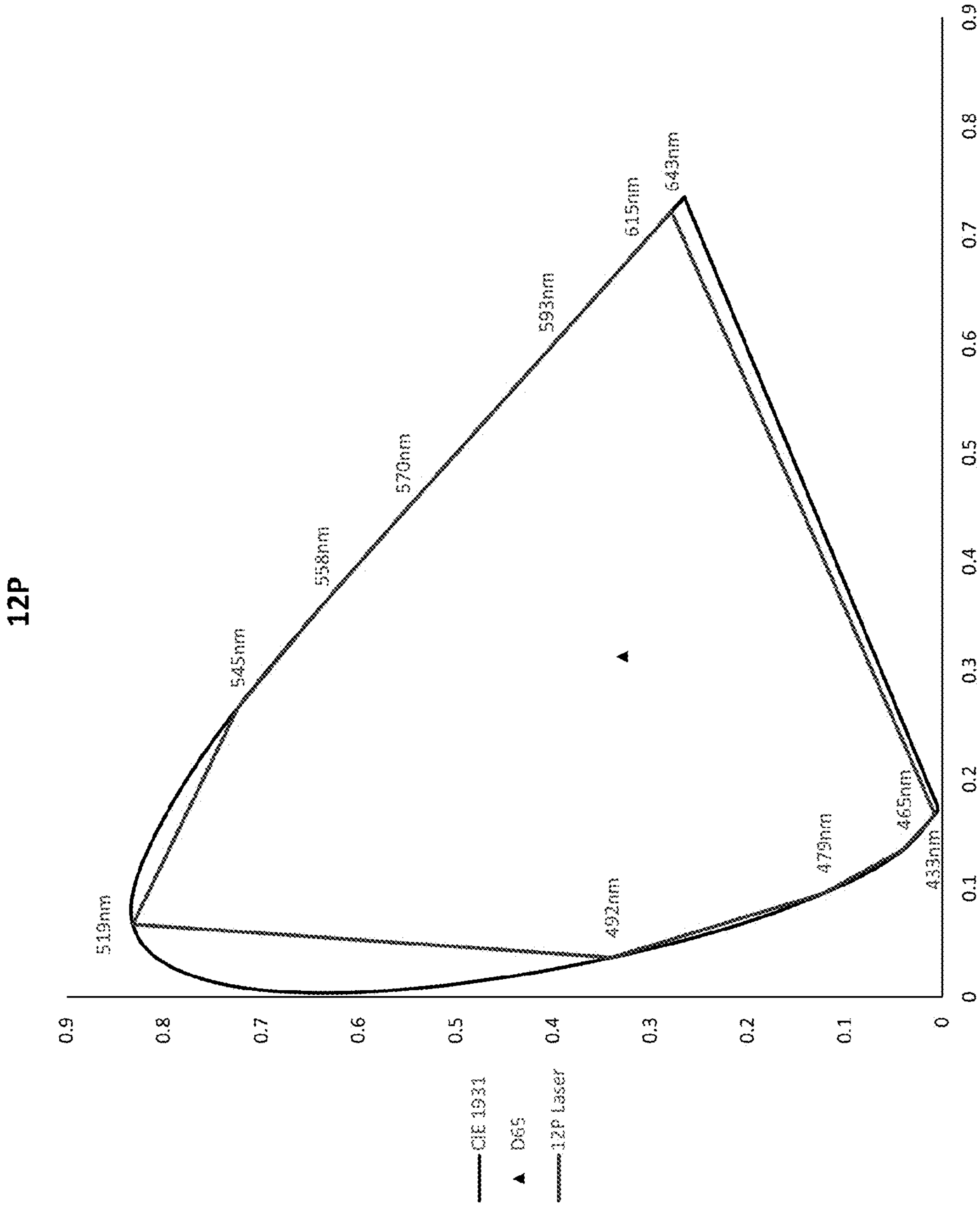
FIG. 92 illustrates a graph of a twelve primary system that is backwards compatible with 6P-C with respect to CIE 1931.

FIG. 92 illustrates a graph of the twelve primaries listed in Table 26 with respect to CIE 1931.

In one embodiment, the at least twelve primaries include at least one white emitter. In one embodiment, the at least one white emitter includes a D65 white emitter, a D60 white emitter, a D45 white emitter, a D27 white emitter, and/or a D25 white emitter.

Transportation of Up to 6 Primaries

To transport up to six color components (e.g., four, five, or six), System 1, System 2, or System 3 can be used as previously described. If four color components are used, two of the channels are set to "0". If five color components are used, one of the channels is set to "0".

Transportation of More than 6 Primaries

Figure 93:
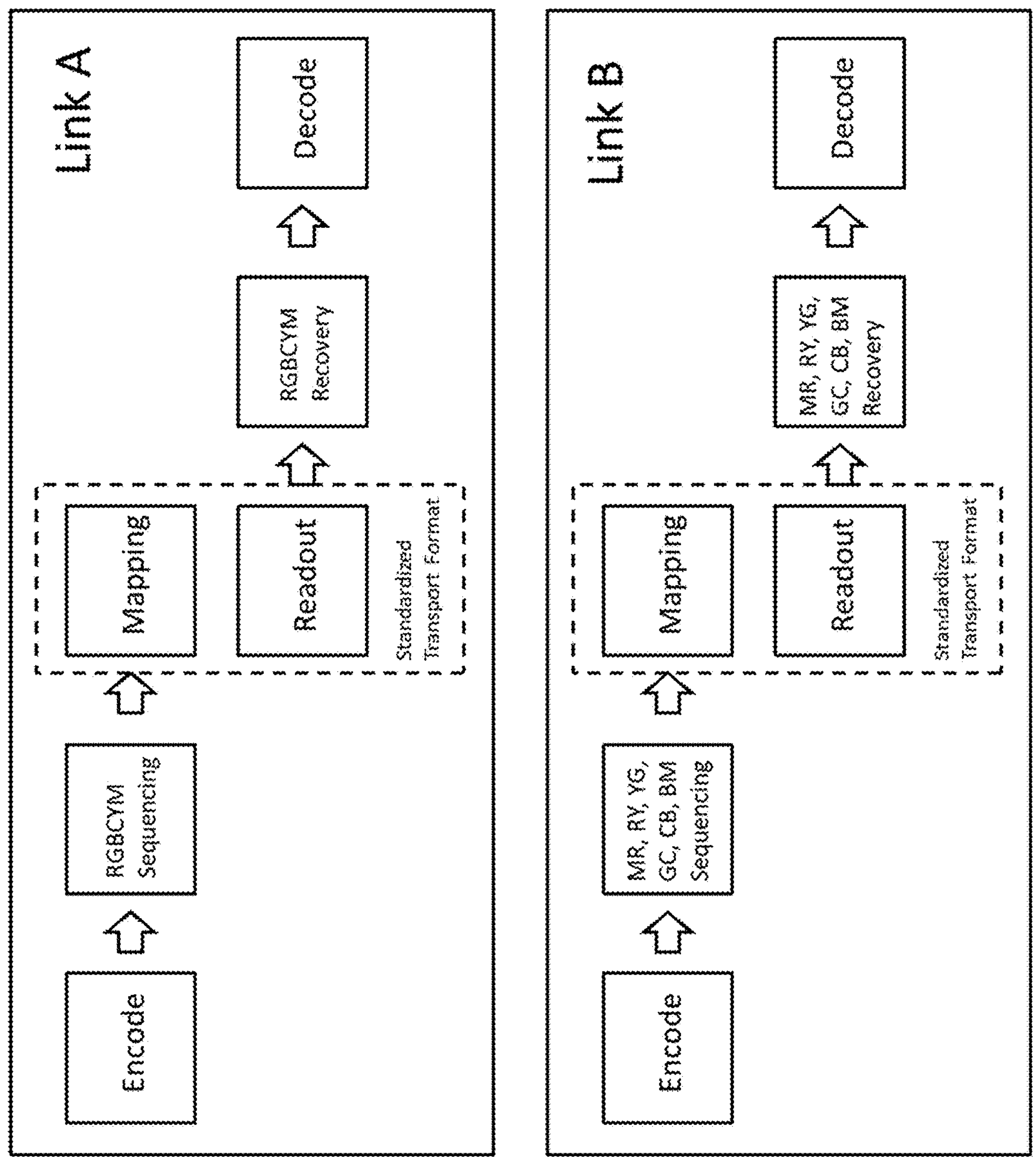
FIG. 93 shows one embodiment of transportation of twelve individual color channels on a first link (Link A) and a second link (Link B).

To allow for transportation of more than six color components (e.g., seven, eight, nine, ten, eleven, twelve), a hybrid of System 2 and System 3 is used to transport up to and including twelve individual color channels. FIG. 93 shows one embodiment of transportation of twelve individual color channels using the example in Table 26 with a magenta primary, a blue-magenta primary, a blue primary, a cyan-blue primary, a cyan primary, a green-cyan primary, a green primary, a yellow-green primary, a yellow primary, a red-yellow primary, a red primary, and a magenta-red primary on a first link (Link A) and a second link (Link B).

Figure 94A:
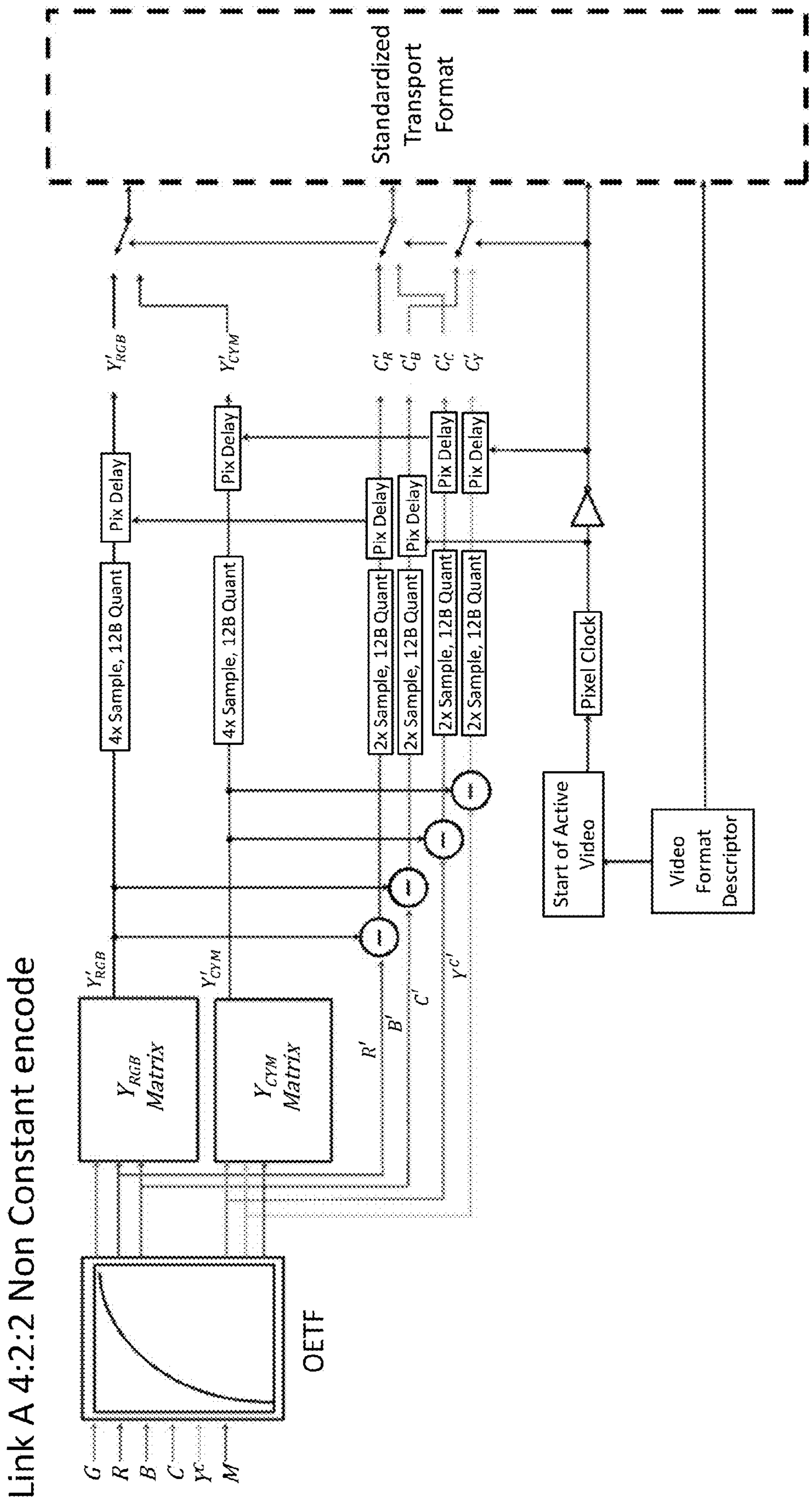
FIG. 94A shows one embodiment of a 4:2:2 Non-Constant Luminance Encode for a first link (Link A).
Figure 94B:
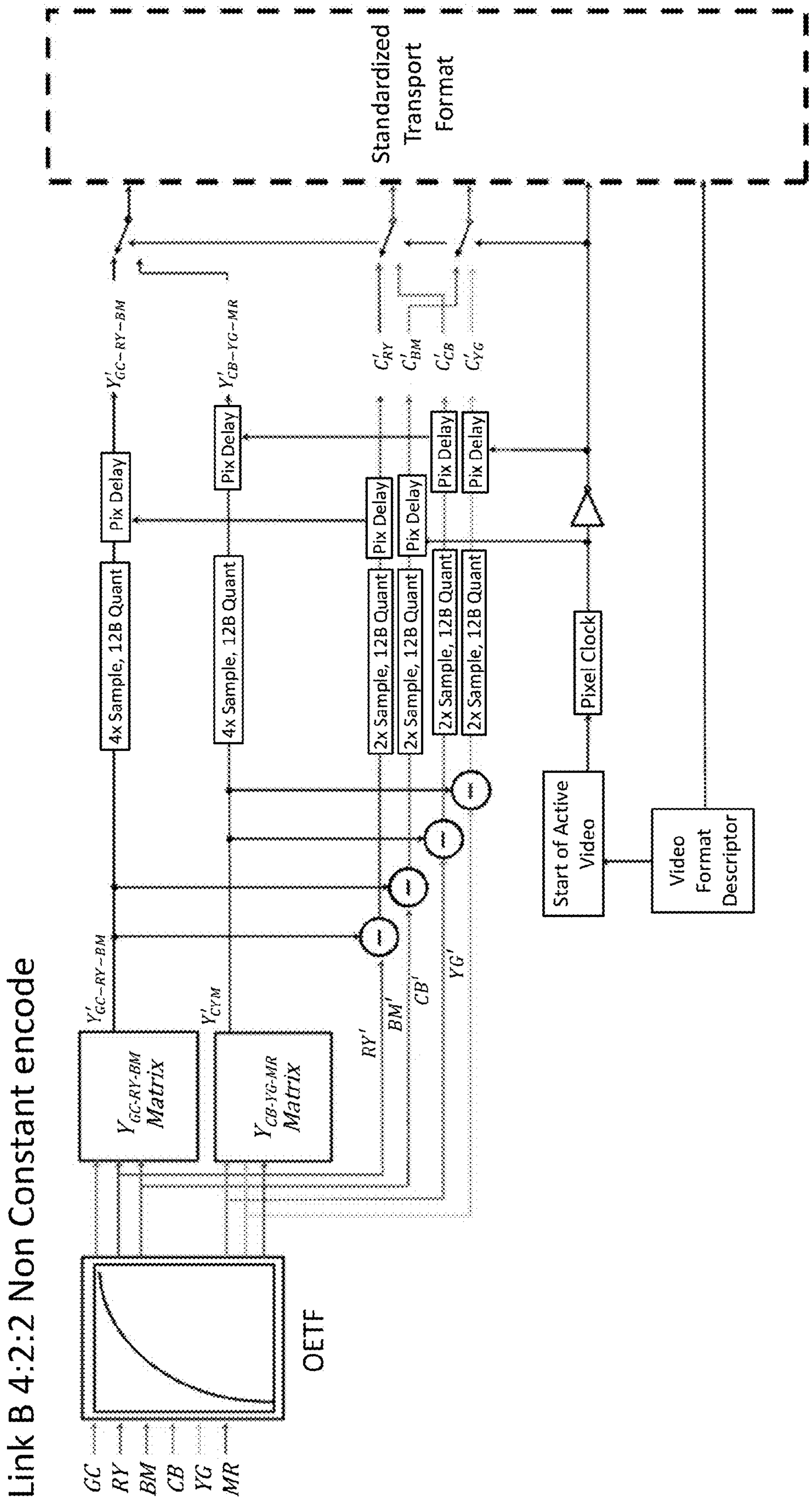
FIG. 94B shows one embodiment of a 4:2:2 Non-Constant Luminance Encode for a second link (Link B).

FIG. 94A shows one embodiment of a 4:2:2 Non-Constant Luminance Encode for a first link (Link A). FIG. 94B shows one embodiment of a 4:2:2 Non-Constant Luminance Encode for a second link (Link B).

Figure 95A:
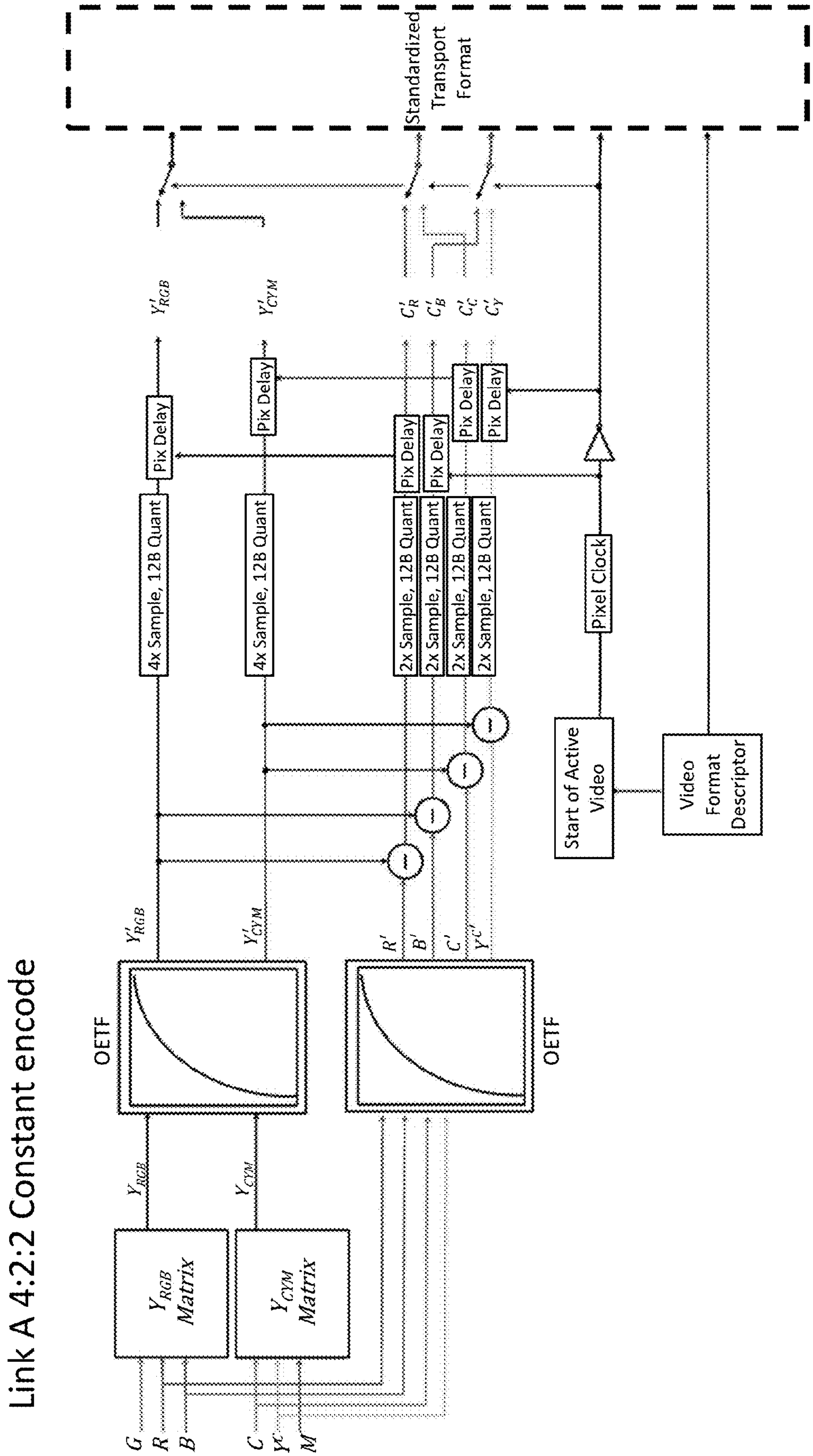
FIG. 95A shows one embodiment of a 4:2:2 Constant Luminance Encode for a first link (Link A).
Figure 95B:
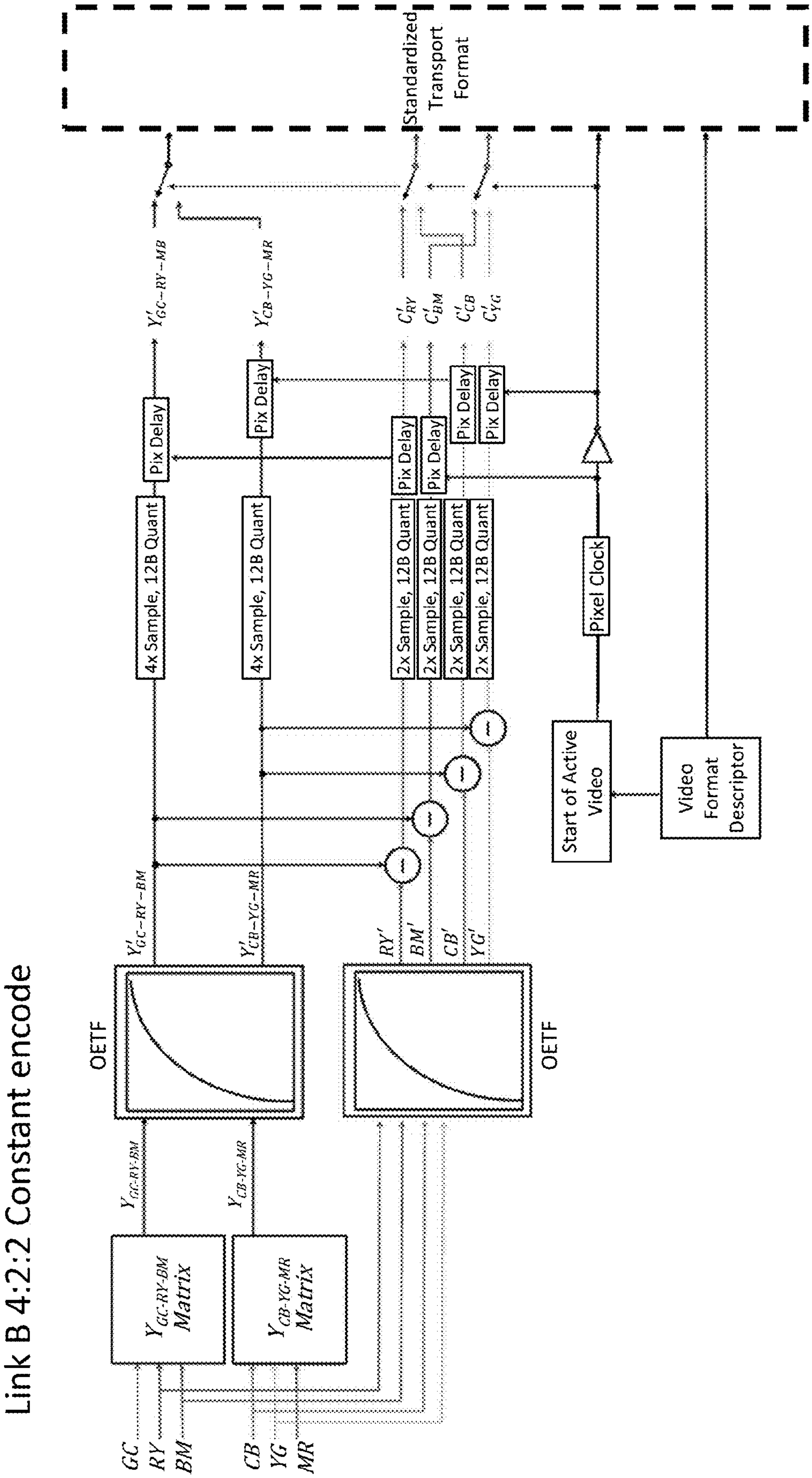
FIG. 95B shows one embodiment of a 4:2:2 Constant Luminance Encode for a second link (Link B).

FIG. 95A shows one embodiment of a 4:2:2 Constant Luminance Encode for a first link (Link A). FIG. 95B shows one embodiment of a 4:2:2 Constant Luminance Encode for a second link (Link B).

Figure 96A:
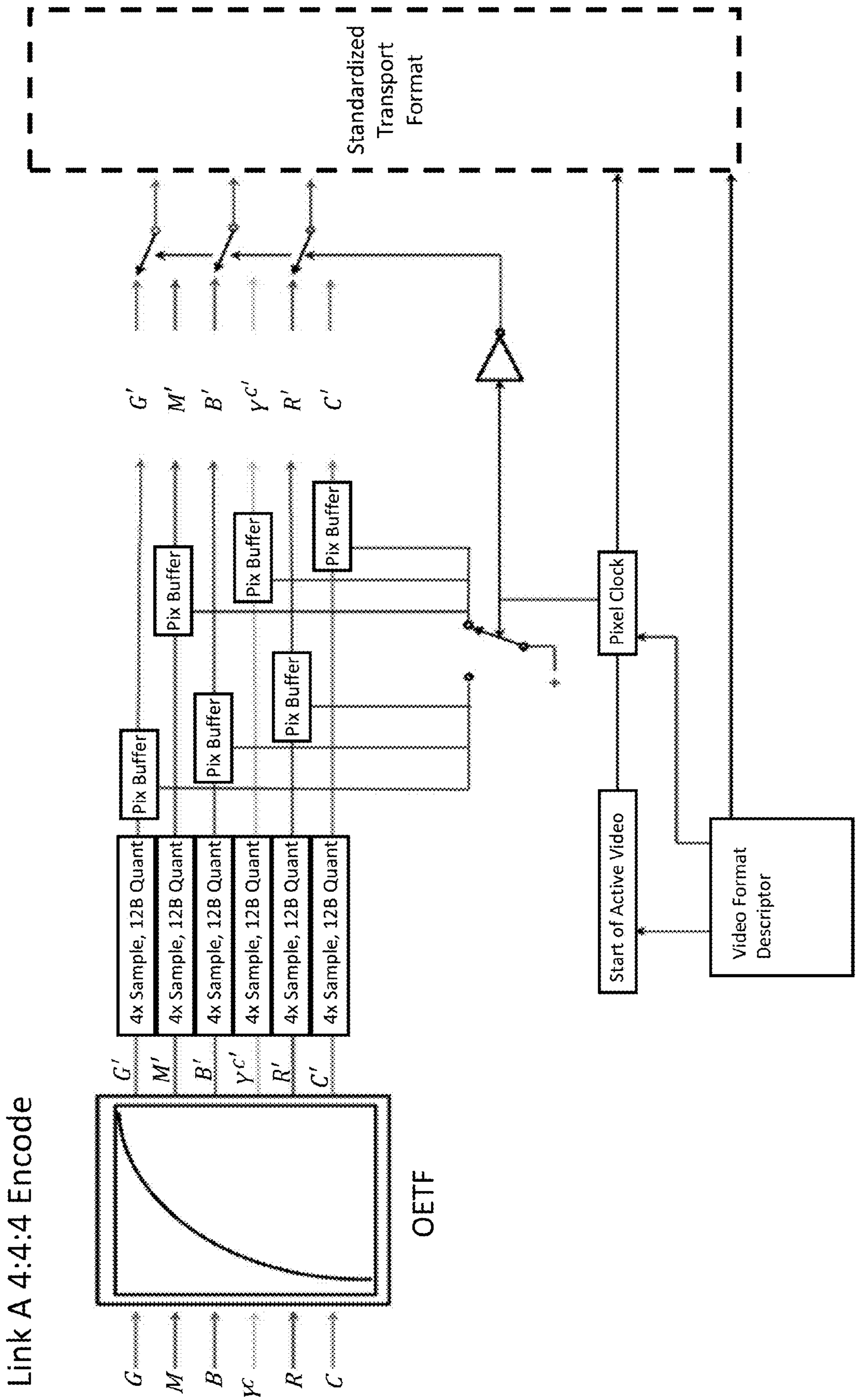
FIG. 96A shows one embodiment of a 4:4:4 Encode for a first link (Link A).
Figure 96B:
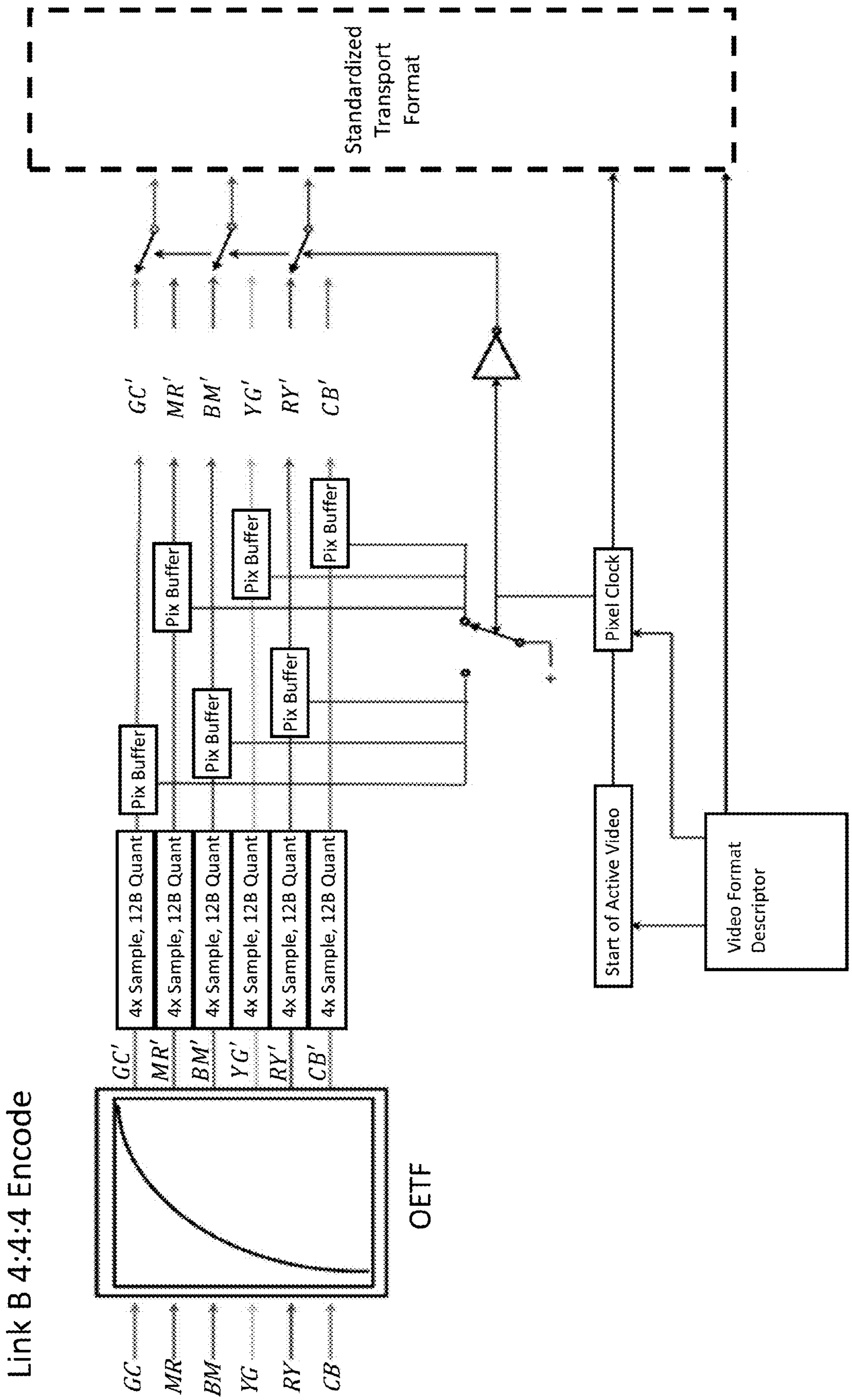
FIG. 96B shows one embodiment of a 4:4:4 Encode for a second link (Link B).

FIG. 96A shows one embodiment of a 4:4:4 Encode for a first link (Link A). FIG. 96B shows one embodiment of a 4:4:4 Encode for a second link (Link B).

Figure 97A:
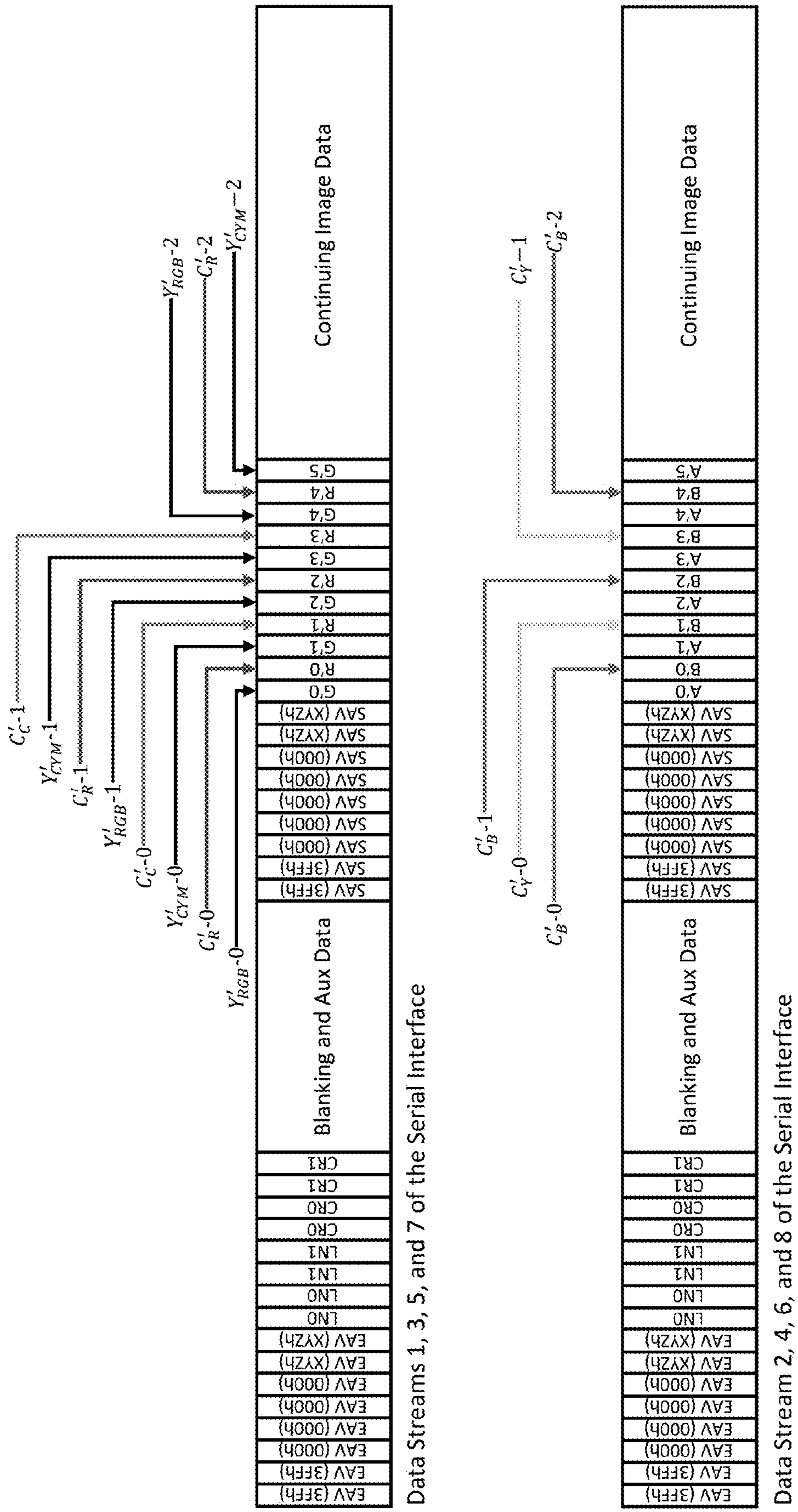
FIG. 97A shows one embodiment of component mapping into SMPTE 2081-1 for a first link (Link A).
Figure 97B:
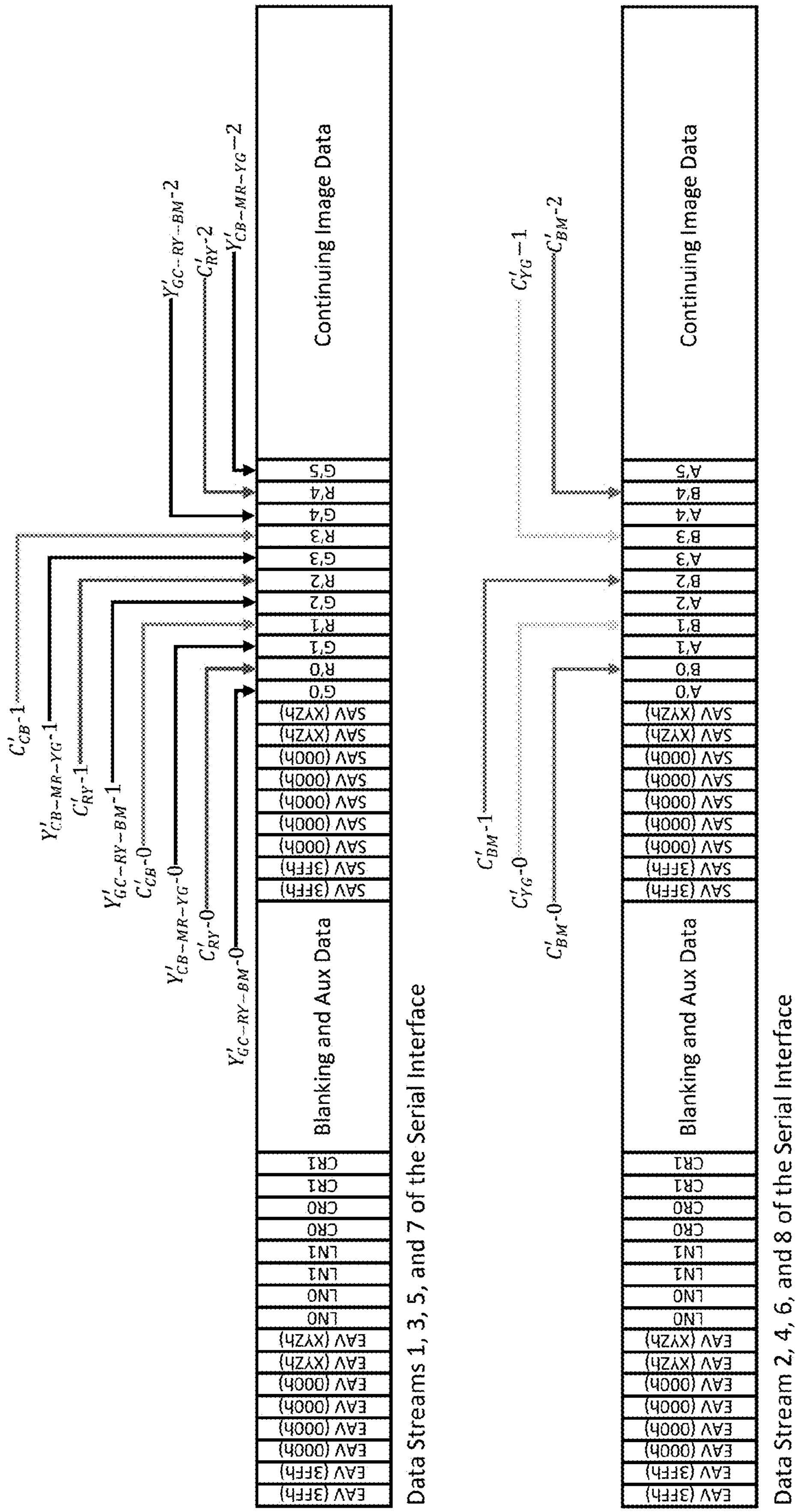
FIG. 97B shows one embodiment of component mapping into SMPTE 2081-1 for a second link (Link B).

FIG. 97A shows one embodiment of component mapping into SMPTE 2081-1 for a first link (Link A). FIG. 97B shows one embodiment of component mapping into SMPTE 2081-1 for a second link (Link B).

Figure 98A:
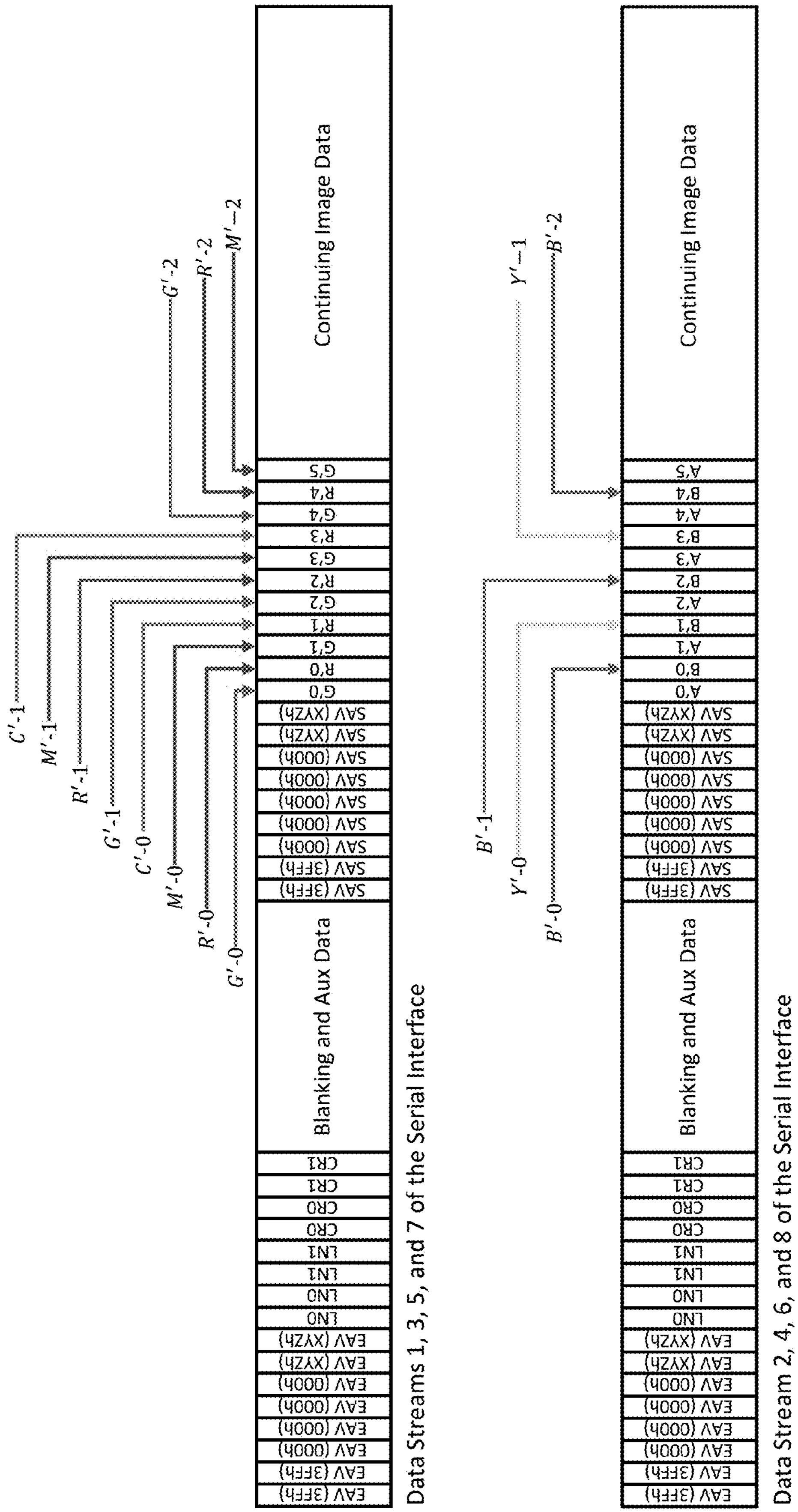
FIG. 98A shows one embodiment of a twelve primary system mapping into SMPTE 2081-1 for a first link (Link A).
Figure 98B:
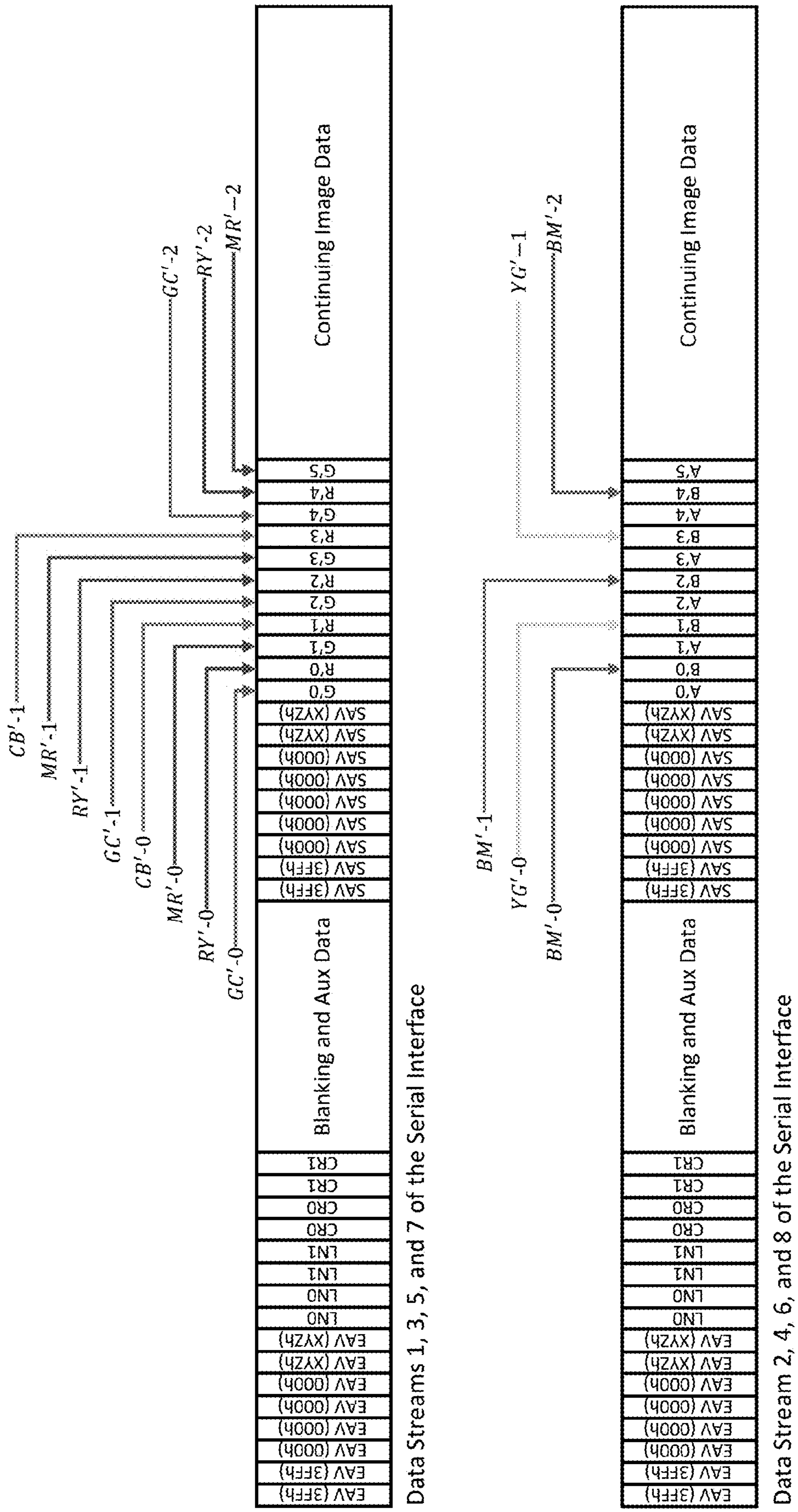
FIG. 98B shows one embodiment of the twelve primary system mapping into SMPTE 2081-1 for a second link (Link B).

FIG. 98A shows one embodiment of R,G,B,C,M,Y,GC, MR,BM,YG,RY,CB mapping into SMPTE 2081-1 for a first link (Link A). FIG. 98B shows one embodiment of R,G,B, C,M,Y,GC,MR,BM,YG,RY,CB mapping into SMPTE 2081-1 for a second link (Link B).

Figure 99A:
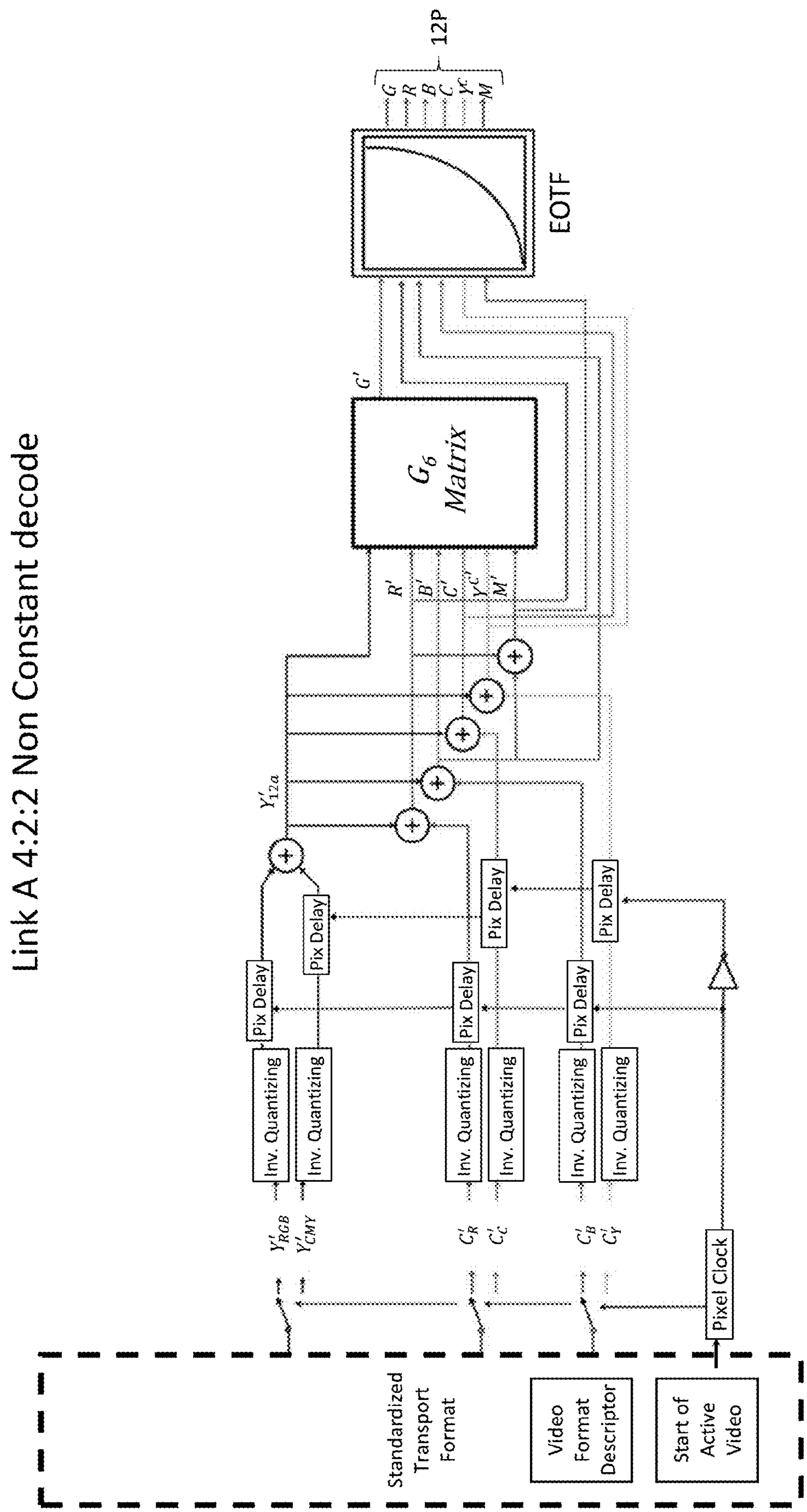
FIG. 99A shows one embodiment of a 4:2:2 Non-Constant Luminance Decode for a first link (Link A).
Figure 99B:
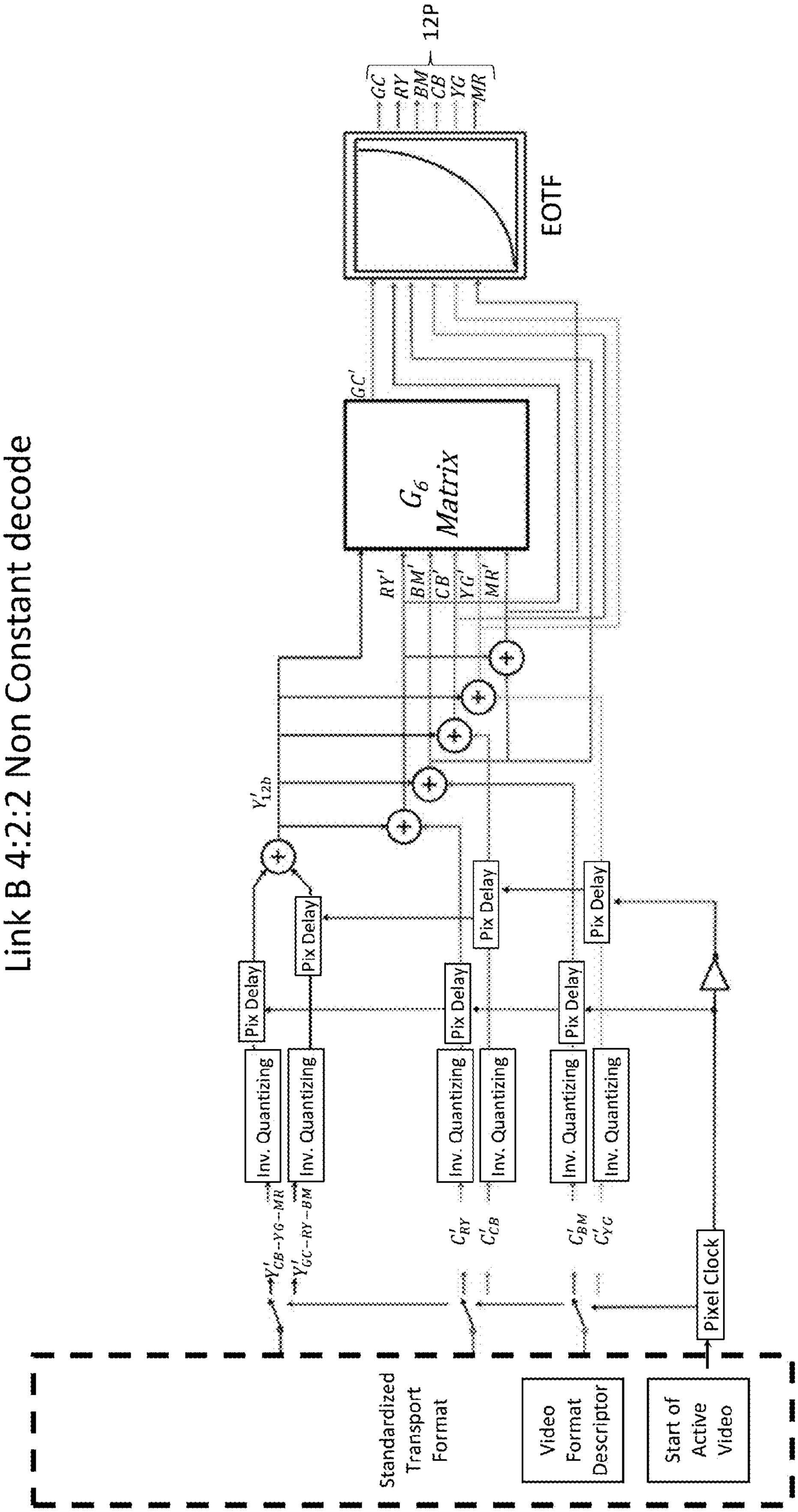
FIG. 99B shows one embodiment of a 4:2:2 Non-Constant Luminance Decode for a second link (Link B).

FIG. 99A shows one embodiment of a 4:2:2 Non-Constant Luminance Decode for a first link (Link A). FIG. 99B shows one embodiment of a 4:2:2 Non-Constant Luminance Decode for a second link (Link B).

Figure 100A:
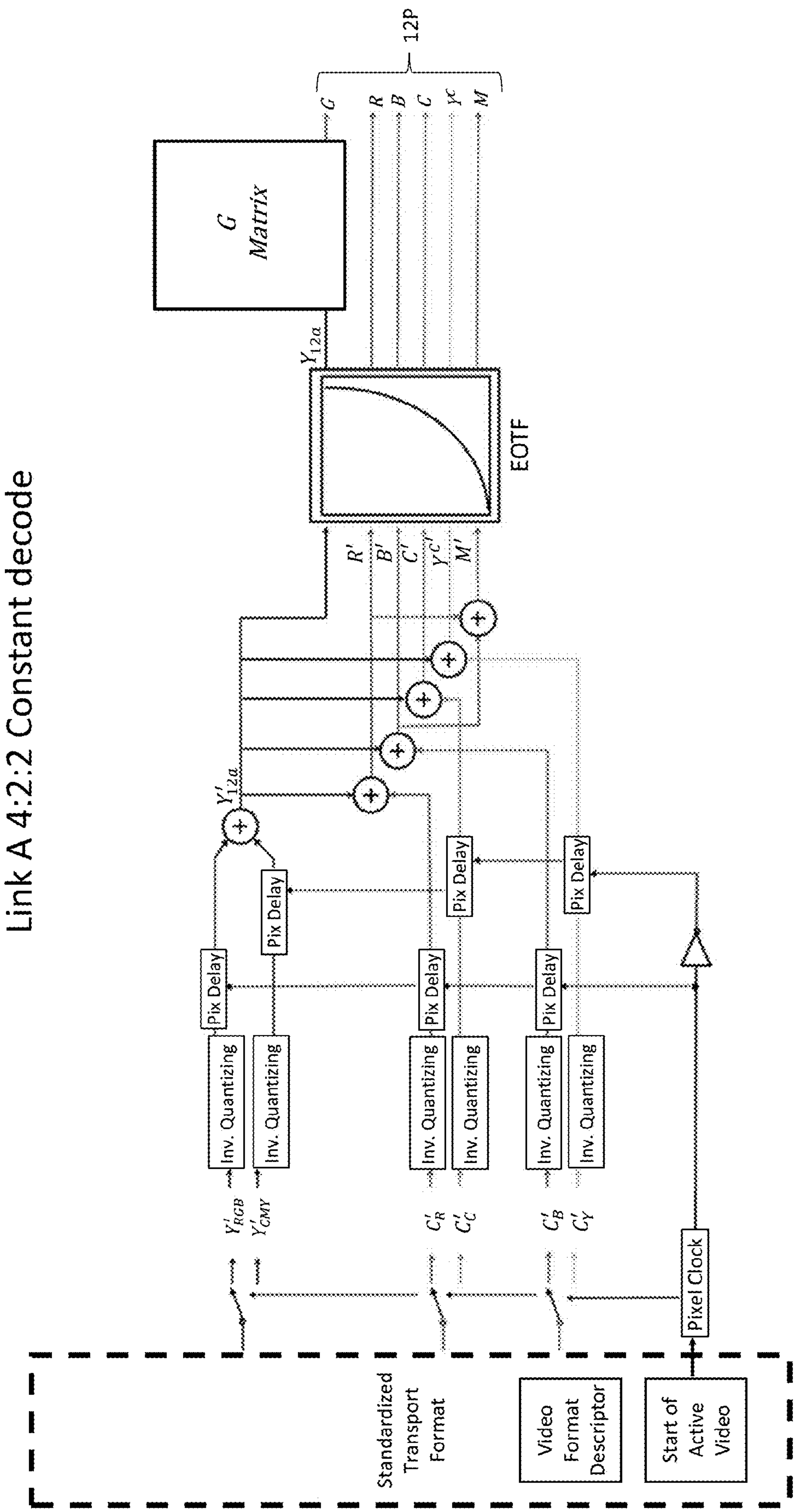
FIG. 100A shows one embodiment of a 4:2:2 Constant Luminance Decode for a first link (Link A).
Figure 100B:
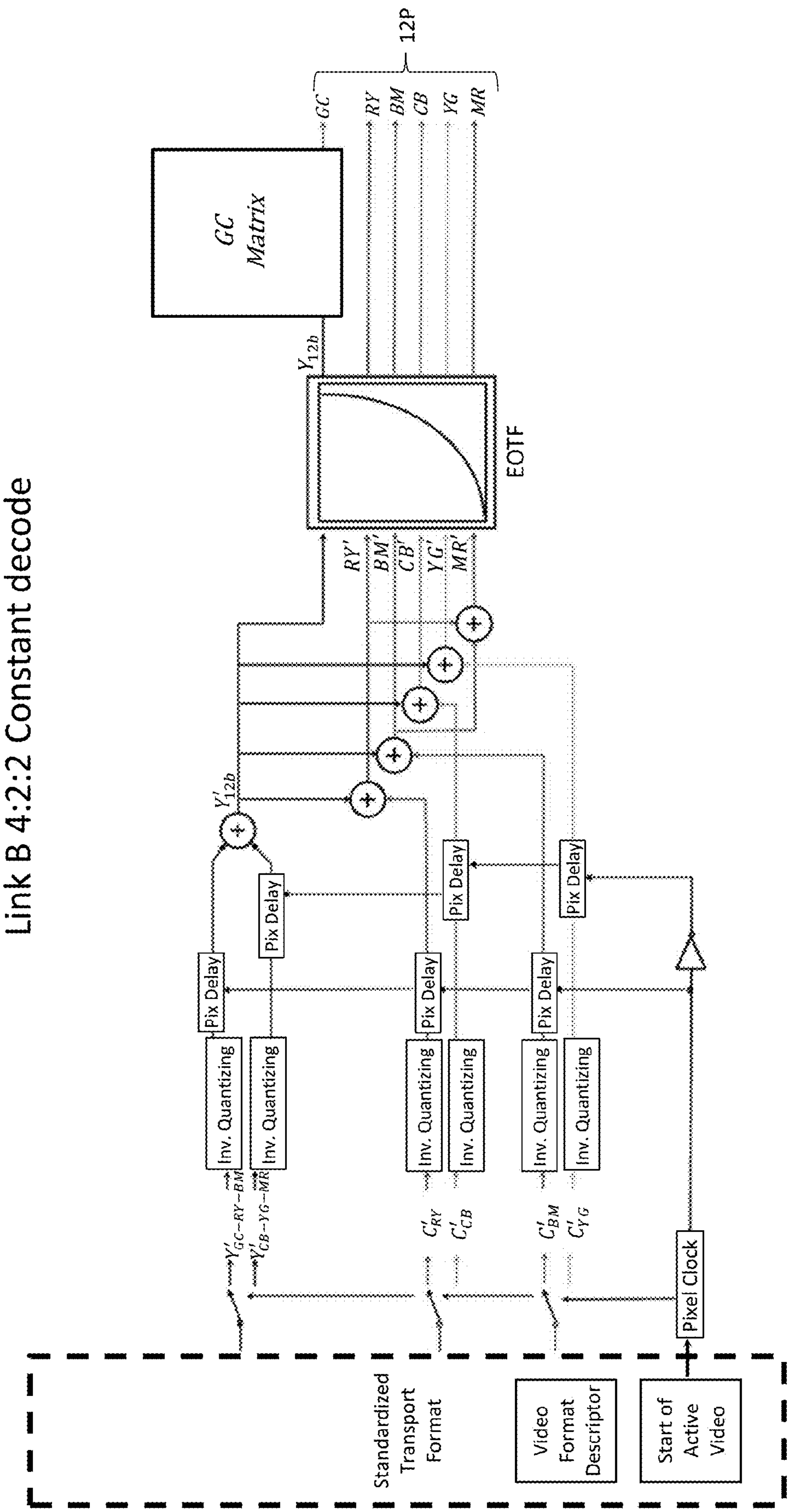
FIG. 100B shows one embodiment of a 4:2:2 Constant Luminance Decode for a second link (Link B).

FIG. 100A shows one embodiment of a 4:2:2 Constant Luminance Decode for a first link (Link A). FIG. 100B shows one embodiment of a 4:2:2 Constant Luminance Decode for a second link (Link B).

Figure 101A:
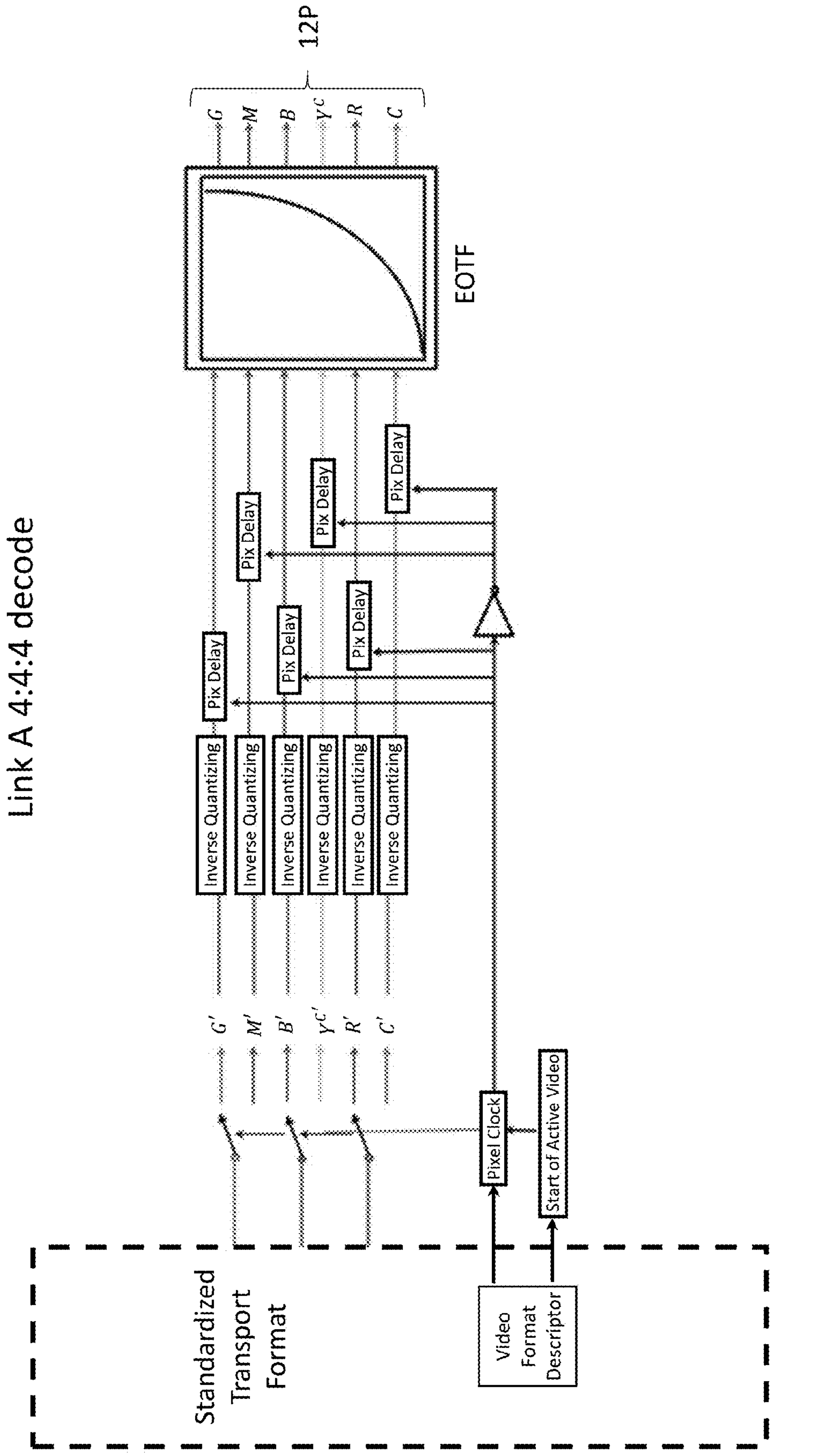
FIG. 101A shows one embodiment of a 4:4:4 Decode for a first link (Link A).
Figure 101B:
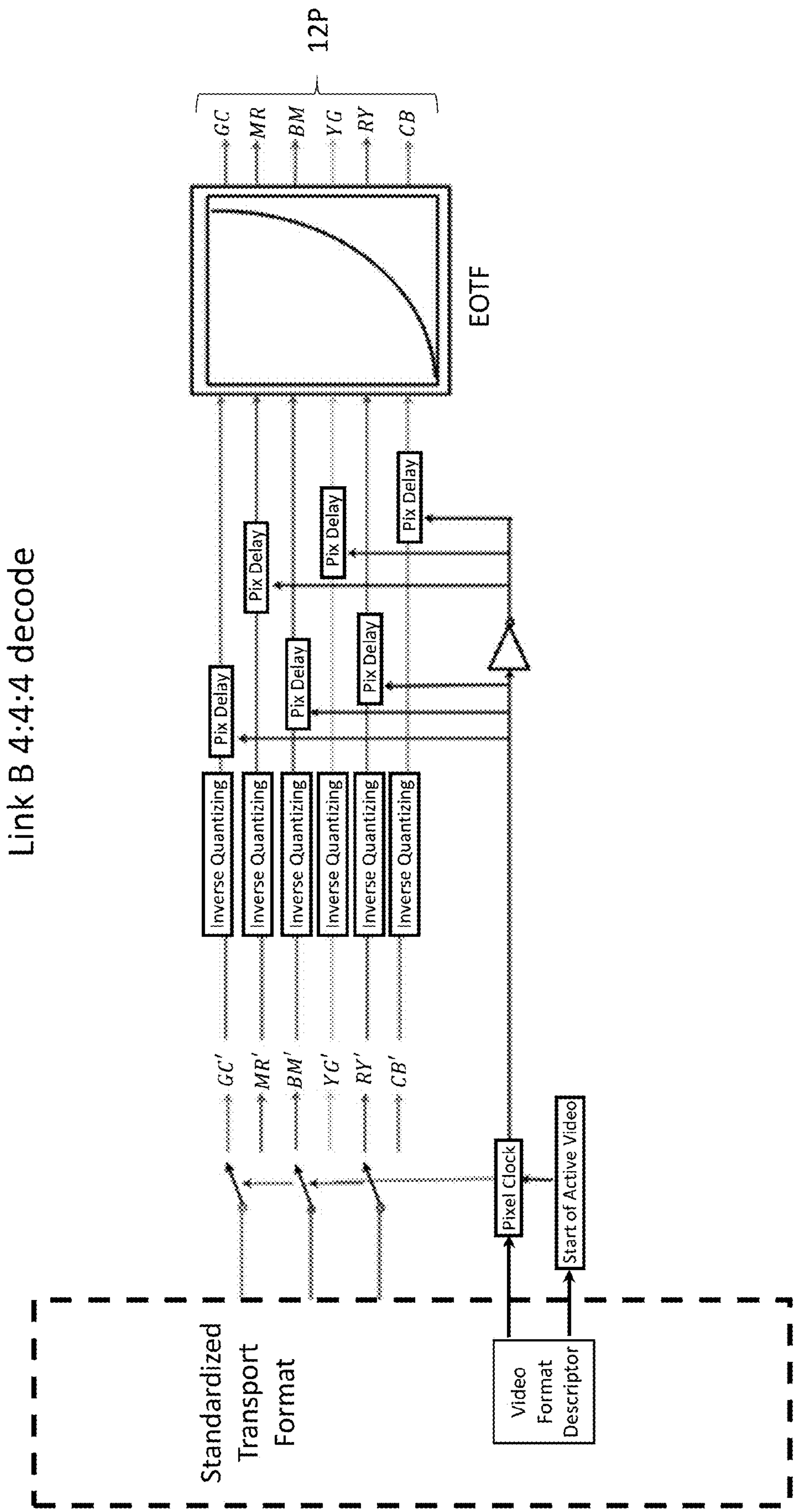
FIG. 101B shows one embodiment of a 4:4:4 Decode for a second link (Link B).

FIG. 101A shows one embodiment of a 4:4:4 Decode for a first link (Link A). FIG. 101B shows one embodiment of a 4:4:4 Decode for a second link (Link B).

If seven color components are used, five of the channels in the hybrid of System 2 and System 3 are set to “0”. If eight color components are used, four of the channels in the hybrid of System 2 and System 3 are set to “0”. If nine color components are used, three of the channels in the hybrid of System 2 and System 3 are set to “0”. If ten color components are used, two of the channels in the hybrid of System 2 and System 3 are set to “0”. If eleven color components are used, one of the channels in the hybrid of System 2 and System 3 is set to “0”.

Figure 102:
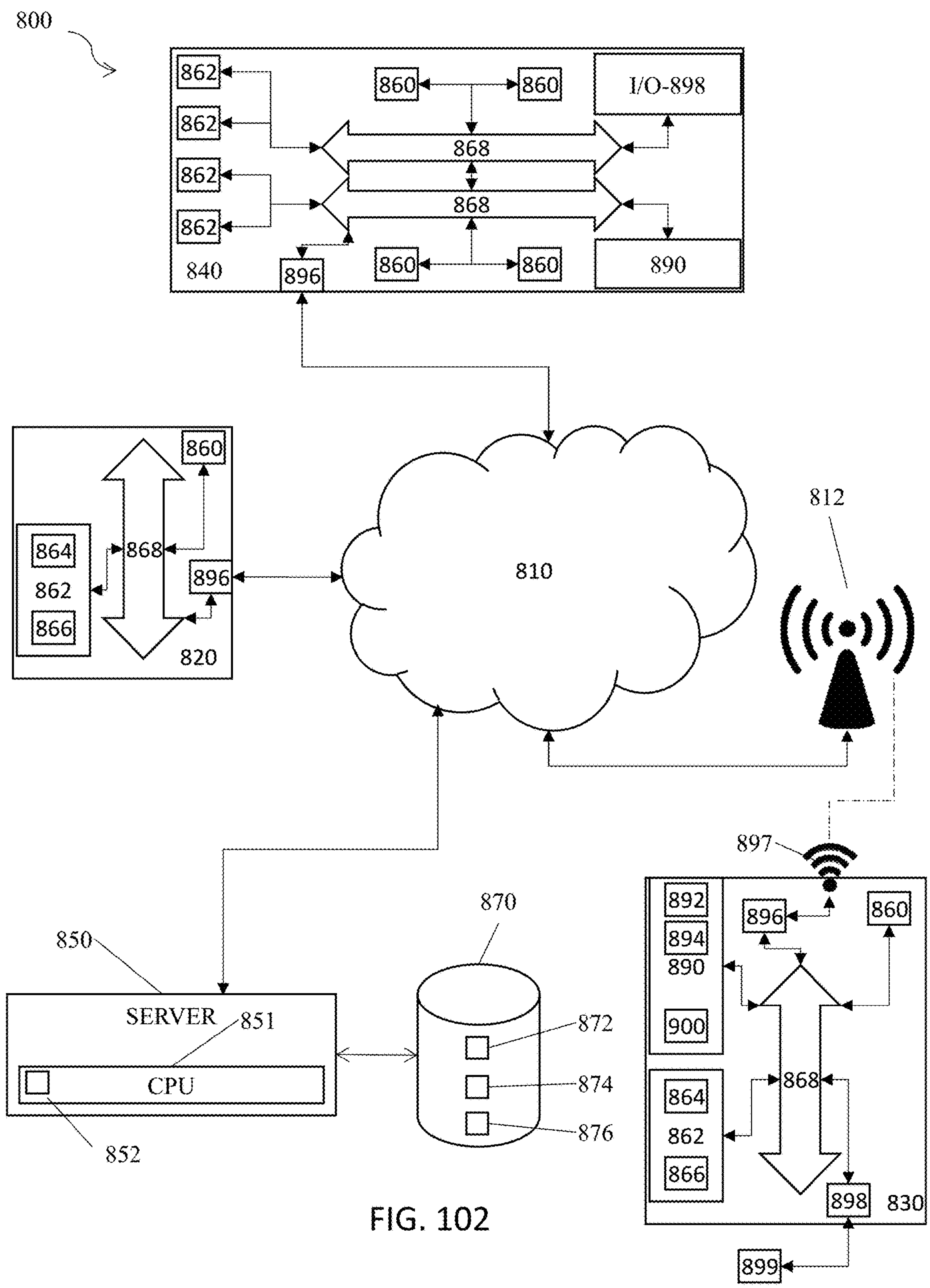
FIG. 102 is a schematic diagram of an embodiment of the invention illustrating a computer system.

FIG. 102 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, notebook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 102 multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840 through a network 810. A computing device 830 may connect to a network 810 through a network interface unit 896 connected to a bus 868. Computing devices may communicate communication media through wired networks, direct-wired connections or wirelessly, such as acoustic, RF, or infrared, through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications, or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any deliver media. The term “modulated data signal” means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology, discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for computing devices 820, 830, and 840. The distributed computing devices 820, 830, and 840 are connected to an edge server in the edge computing network based on proximity, availability, latency, bandwidth, and/or other factors.

It is also contemplated that the computer system 800 may not include all of the components shown in FIG. 102 may include other components that are not explicitly shown in FIG. 102 or may utilize an architecture completely different than that shown in FIG. 102. The various illustrative logical blocks, modules, elements, circuits, and algorithms described in connection with the embodiments discussed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or positioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for converting a primary color system for display, comprising:
- a set of image data; and
- an image data converter including a first link component and a second link component;
- wherein the set of image data includes a bit level, a first set of color channel data, a second set of color channel data, and primary color data for at least four primary color values;
- wherein the image data converter is operable to convert the set of image data;
- wherein the conversion introduces a first pixel delay to sequence the first set of color channel data;
- wherein the conversion introduces a second pixel delay to sequence the second set of color channel data;
- wherein the first link component is operable to transport the first set of color channel data;
- wherein the second link component is operable to transport the second set of color channel data in parallel with the first link component;
- wherein the first set of color channel data and the second set of color channel data are combined to create a combined set of image data before being displayed on a display device; and
- wherein the combined set of image data has a combined bit level equal to the bit level of the set of image data.

2. The system of claim 1, wherein the display device is operable to display the primary color system based on the set of image data, wherein the primary color system displayed on the display device is based on the set of image data.

3. The system of claim 1, wherein the at least four primary color values include a magenta primary, a blue-magenta primary, a blue primary, a cyan-blue primary, a cyan primary, a green-cyan primary, a green primary, a yellow-green primary, a yellow primary, a red-yellow primary, a red primary, and a magenta-red primary.

4. The system of claim 1, wherein the at least four primary color values include at least two white primaries corresponding to at least two white emitters, wherein the at least two white emitters each have a different color temperature.

5. The system of claim 4, wherein the at least two white emitters include a D65 white emitter, a D60 white emitter, a D45 white emitter, a D27 white emitter, and/or a D25 white emitter.

6. The system of claim 4, wherein the at least two white emitters include a mid-Kelvin white emitter, and wherein the mid-Kelvin white emitter is modified to include a green bias.

7. The system of claim 1, wherein the first set of color channel data is converted by the first link component and the second set of color channel data is converted by the second link component.

8. The system of claim 1, further comprising a standardized transport format, wherein the first link component includes a first standardized transport format link and wherein the second link component includes a second standardized transport format link, wherein the standardized transport format is operable to receive the first set of color channel data and the second set of color channel data using the first standardized transport format link and the second standardized transport format link, and wherein the first standardized transport format link and the second standardized transport format link are operable to combine the first set of color channel data and the second set of color channel data into the combined set of image data.

9. The system of claim 1, further comprising at least one electronic luminance component, wherein the at least one electronic luminance component is not calculated within the display device.

10. The system of claim 1, wherein the at least four primary color values include a magenta primary, wherein the magenta primary is derived from the set of image data, and wherein the magenta primary is not defined as a wavelength.

11. A system for converting a primary color system for display, comprising:

- a set of image data; and
- an image data converter;
- wherein the set of image data includes a bit level, a first set of color channel data, a second set of color channel data;
- wherein the image data converter is operable to convert the set of image data;
- wherein the conversion introduces a first pixel delay to sequence the first set of color channel data;
- wherein the conversion introduces a second pixel delay to sequence the second set of color channel data;
- wherein the image data converter is operable to transport the first set of color channel data;
- wherein the image data converter is operable to transport the second set of color channel data in parallel with the first set of color channel data and create a combined set of image data before being displayed on a display device; and
- wherein the combined set of image data has a combined bit level equal to the bit level of the set of image data.

12. The system of claim 11, wherein the display device is operable to display the primary color system based on the set of image data, wherein the primary color system displayed on the display device is based on the set of image data.

13. The system of claim 11, wherein the first set of color channel data is converted by a first link component of the image data converter and the second set of color channel data is converted by a second link component of the image data converter.

14. The system of claim 11, wherein the set of image data further includes data primary color data for at least four primary color values.

15. The system of claim 11, further comprising at least one electronic luminance component, wherein the at least one electronic luminance component is not calculated within the display device.

16. A system for converting a primary color system for display, comprising:

- a set of image data; and
- an image data converter;
- wherein the set of image data includes a bit level, a first set of color channel data, a second set of color channel data;
- wherein the image data converter introduces a first pixel delay to sequence the first set of color channel data;
- wherein the image data converter introduces a second pixel delay to sequence the second set of color channel data;
- wherein the image data converter is operable to create a combined set of image data from the first set of color channel data and the second set of color channel data before being displayed on a display device; and
- wherein the combined set of image data has a combined bit level equal to the bit level of the set of image data.

17. The system of claim 16, wherein the image data converter comprises a first link component and a second link component, wherein the first link component is operable to transport the first set of color channel data and wherein the second link component is operable to transport the second set of color channel data to create the combined set of image data for display on the display device.

18. The system of claim 16, wherein the set of image data further includes data primary color data for at least four primary color values.

19. The system of claim 16, further comprising at least one electronic luminance component, wherein the at least one electronic luminance component is not calculated within the display device.

20. The system of claim 16, further comprising a set of saturation data corresponding to the set of image data, wherein the set of saturation data is used to extend a set of hue angles for the first set of color channel data and the second set of color channel data.

* * * * *